United States Patent
Zauli

(10) Patent No.: US 11,532,943 B1
(45) Date of Patent: Dec. 20, 2022

(54) ENERGY STORAGE DEVICE MANGER, MANAGEMENT SYSTEM, AND METHODS OF USE

(71) Applicant: Thomas Zauli, Boston, MA (US)

(72) Inventor: Thomas Zauli, Boston, MA (US)

( * ) Notice: Subject to any disclaimer, the term of this patent is extended or adjusted under 35 U.S.C. 154(b) by 173 days.

(21) Appl. No.: 17/081,885

(22) Filed: Oct. 27, 2020

Related U.S. Application Data

(60) Provisional application No. 62/926,564, filed on Oct. 27, 2019.

(51) Int. Cl.
  *H02J 7/00* (2006.01)
  *H02J 3/00* (2006.01)
  (Continued)

(52) U.S. Cl.
  CPC ............ *H02J 7/0068* (2013.01); *G01W 1/10* (2013.01); *G05B 13/048* (2013.01); *H02J 3/003* (2020.01); *H02J 13/00002* (2020.01)

(58) Field of Classification Search
  CPC .... H02J 7/0068; H02J 3/003; H02J 13/00002; G01W 1/10; G05B 13/048
  See application file for complete search history.

(56) References Cited

U.S. PATENT DOCUMENTS

| | | |
|---|---|---|
| 8,101,848 B2 | 1/2012 | Kelly et al. |
| 8,527,398 B2 | 9/2013 | Bing |

(Continued)

FOREIGN PATENT DOCUMENTS

| | | |
|---|---|---|
| CA | 2798825 A1 | 11/2011 |
| WO | 2005019870 A3 | 3/2005 |

(Continued)

OTHER PUBLICATIONS

Manuallib (Online) "The BMW i3 Owner's Manual. Online Edition for Part No. 01 40 2 960 865—II/15." Excerpt: Chapter: "Mobility: Charging Vehicle." pp. 160-168. Sep. 24, 2016 Retrieved from the Internet URL<https://www.manualslib.com/manual/1043128/Bmw-I3.html>. Retrieved on Dec. 24, 2021.

(Continued)

*Primary Examiner* — Ziaul Karim
(74) *Attorney, Agent, or Firm* — The Fedde Law Firm; Nathaniel Fedde; Kenton Fedde

(57) ABSTRACT

This invention provides an energy storage device manager, a system comprising the energy storage device manager, computer-readable media configured for providing the energy storage device manager, and methods of using the energy storage device manager. The energy storage device manager can optionally control charge buses and/or load buses to modulate the state of charge of an energy storage device. The energy storage device manager can optionally be configured with a plurality of modes that target different states of charge. The plurality of modes can optionally comprise a maintain mode which targets a nominal (e.g. 50%) charge state and a high-charge mode that targets a state of charge greater than the maintain mode. The plurality of modes can optionally further include an in-use mode which targets a state of charge greater than the maintain mode, and turns on a load bus that is turned off in the preparation mode. The energy storage device manager can optionally be configured to determine a charge start time to execute the preparation mode. The energy storage device manager can optionally be configured to determine the charge start time based on forecast data (e.g. power prediction forecast determined based on weather forecast).

22 Claims, 38 Drawing Sheets

(51) Int. Cl.
  *G01W 1/10* (2006.01)
  *G05B 13/04* (2006.01)
  *H02J 13/00* (2006.01)

(56) References Cited

U.S. PATENT DOCUMENTS

| | | | |
|---|---|---|---|
| 8,600,572 | B2 | 12/2013 | Sri-Jayantha |
| 8,909,390 | B2 | 12/2014 | Tonegawa et al. |
| 9,644,993 | B2* | 5/2017 | Adest ................ H02J 13/00002 |
| 10,031,542 | B2 | 7/2018 | Marom et al. |
| 10,046,651 | B2 | 8/2018 | Lin et al. |
| 10,284,140 | B2 | 5/2019 | Leary et al. |
| 2008/0046387 | A1 | 2/2008 | Rajeev et al. |
| 2010/0198420 | A1 | 8/2010 | Rettger et al. |
| 2011/0276269 | A1 | 11/2011 | Hummel |
| 2012/0046795 | A1 | 2/2012 | Kelty |
| 2013/0229153 | A1* | 9/2013 | Sarkar ................ B60L 58/18 320/137 |
| 2014/0358295 | A1* | 12/2014 | Warren ............ G05D 23/1902 700/278 |
| 2015/0186904 | A1 | 7/2015 | Guha et al. |
| 2017/0005470 | A1* | 1/2017 | Wagoner .................. H02J 3/28 |
| 2017/0262007 | A1* | 9/2017 | Zhiwu .................. G05B 11/01 |
| 2018/0233945 | A1 | 8/2018 | Wilkinson |
| 2019/0042992 | A1 | 2/2019 | Fife |
| 2019/0165580 | A1* | 5/2019 | Doherty .................... H02J 3/32 |
| 2020/0059098 | A1* | 2/2020 | Dong ...................... H02J 3/381 |
| 2020/0164763 | A1* | 5/2020 | Holme .................... B60L 58/10 |

FOREIGN PATENT DOCUMENTS

| | | |
|---|---|---|
| WO | 2015139061 A1 | 9/2015 |
| WO | 2016036806 A1 | 3/2016 |
| WO | 2017193172 A1 | 11/2017 |

OTHER PUBLICATIONS

Revolu Sun (online). "Tesla Powerwall Gets Smarter with Storm Watch" Aug. 20, 2018. 6p. Retrieved from the internet URL: <https://massachusetts.revolusun.com/blog/tesla-powerwall-gets-smarter-with-storm-watch/>. Retreived on Dec. 24, 2021.

Electrek (online). "Tesla releases Powerwall 2 update to let owners take better advantage of variable energy costs" May 13, 2018. 6p. Retrieved from the internet URL: <http://web.archive.org/web/20180608171727/https://electrek.co/2018/05/13/tesla-releases-powerwall-2-update/>. Retreived on Dec. 24, 2021.

PV Magazine (online). "Tesla Powerwall adds time-based control" May 15, 2018. 7p. Retrieved from the internet URL: <http://web.archive.org/web/20180619033751/https://pv-magazine-usa.com/2018/05/15/tesla-powerwall-adds-time-based-control/>. Retreived on Dec. 24, 2021.

* cited by examiner

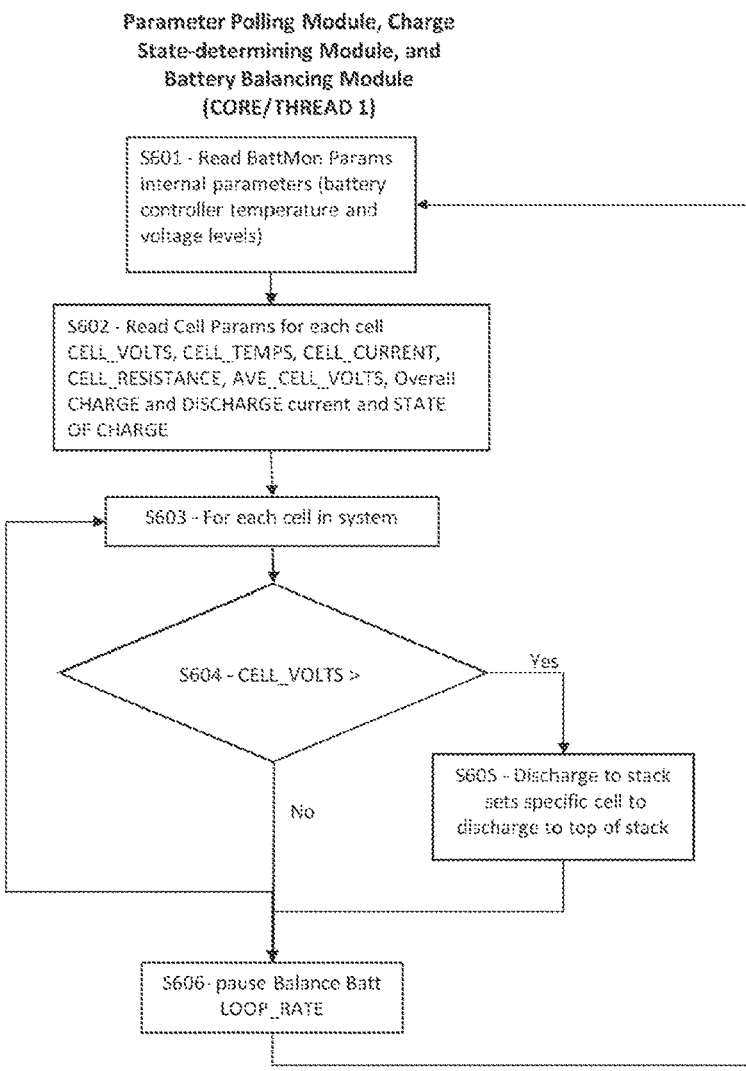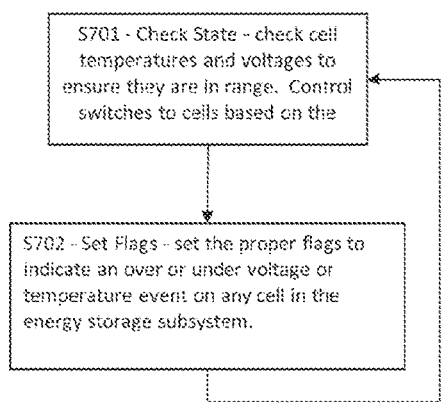
FIG. 3

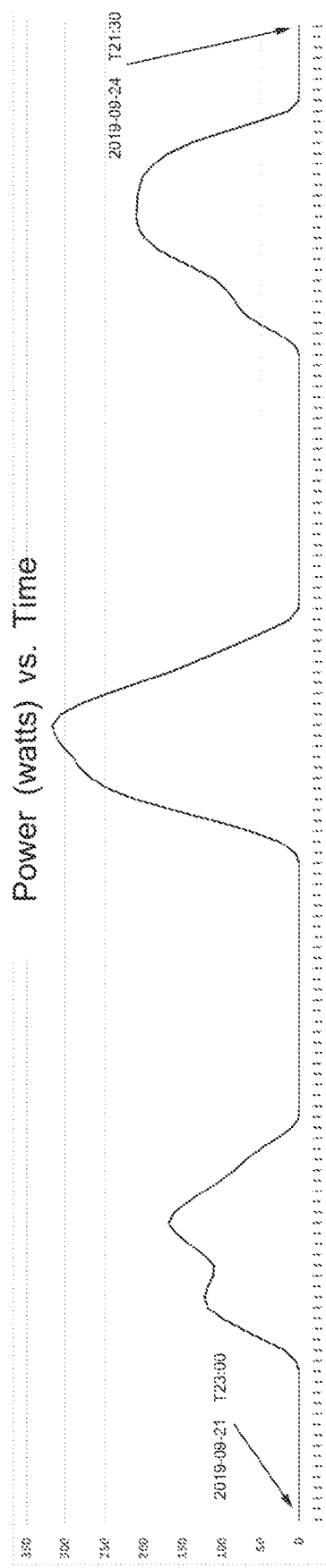
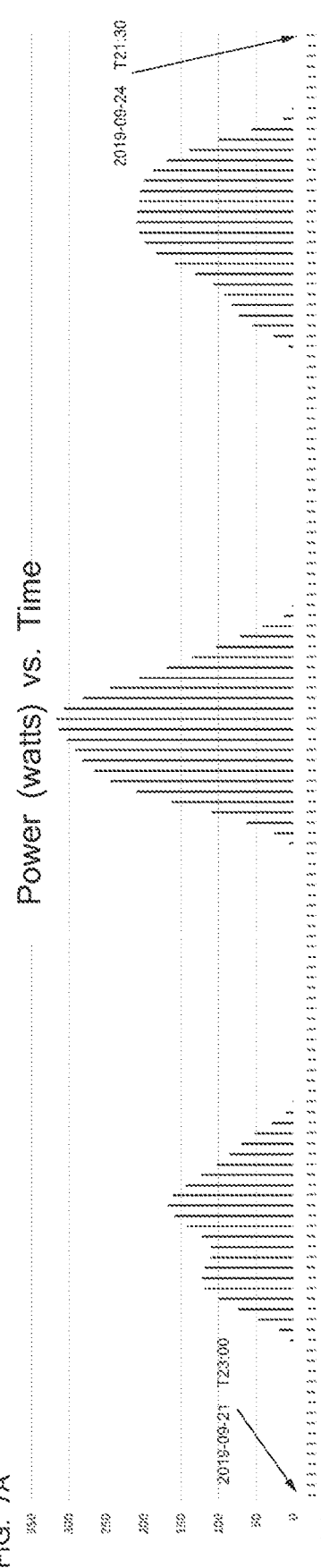
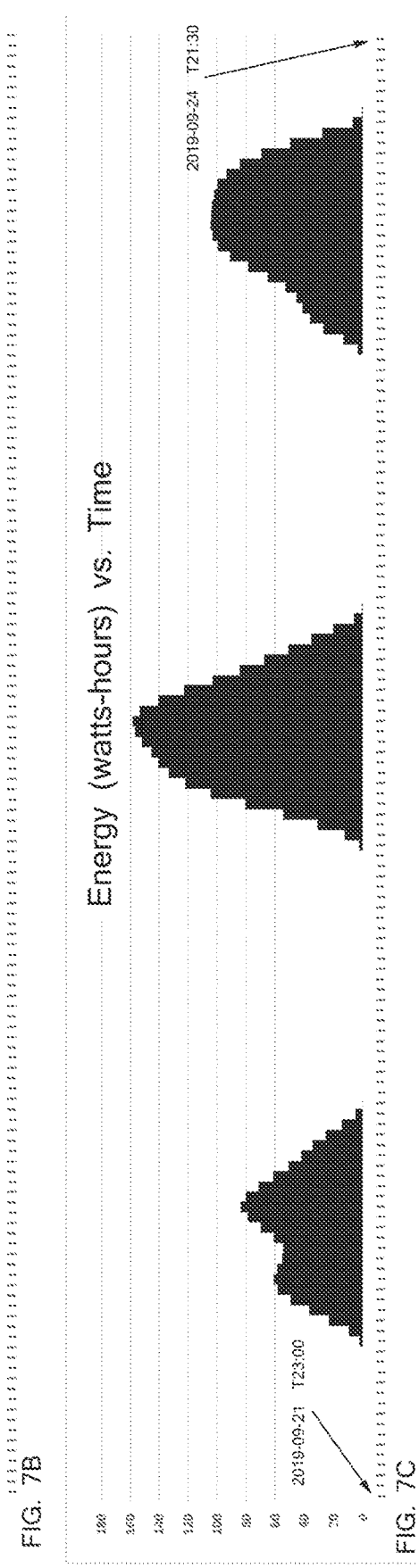

Configuration 1

| | Maintain Mode (optionally Turn off load 1 on start) | | Preparation Mode | | In-use mode (Turn on load 1 on start) | |
|---|---|---|---|---|---|---|
| | over target | under target | over target | under target | over target | under target |
| energy source | optionally off | on | optionally off | on | optionally off | on |
| load switch 1 (e.g. load panel) | optionally on | off | optionally on | off | on | on |
| load switch 2 (e.g. discharge bus) | on | off | optionally on | off | optionally off | off |
| optional load switch 3 (e.g. critical load) | on | on | on | on | on | on |

Configuration 2

| | Maintain Mode | | Preparation Mode | | In-use mode (Turn on load 1 on start) | |
|---|---|---|---|---|---|---|
| | over target | under target | over target | under target | over target | under target |
| energy source | optionally off | on | optional off | on | optional off | on |
| load switch 1 (e.g. load panel) | on | off | optional on | off | on | on |
| optional load switch 3 (e.g. critical load) | on | on | on | on | on | on |

Configuration 3

| | Maintain Mode | | Preparation Mode | | In-use mode | |
|---|---|---|---|---|---|---|
| | over target | under target | over target | under target | over target | under target |
| energy source | optionally off | on | optionally off | on | optionally off | on |
| load switch 1 (e.g. load panel) | off | off | off | off | on | on |
| load switch 2 (e.g. discharge bus) | on | off | optionally on | off | off | off |

FIG. 15

| Time | Power (watts) (Fig. 7B) | Energy (watt-hours) (Fig. 7C) | Sum of previous energy produced (watt-hours) (Fig. 9) | Sum of future energy produced (watt hours) (Fig. 10) |
|---|---|---|---|---|
| Time 1 (example of a data point) | raw data for time 1 | =1hour x raw data for time 1 | =energy for time 1 + and all previous times | =energy for time 1 + and all future times |
| 2019-09-21 T23:00 | 0 | 0 | 0 | 4682.268714 |
| 2019-09-21 T23:30 | 0 | 0 | 0 | 4682.268714 |
| 2019-09-22 T00:00 | 0 | 0 | 0 | 4682.268714 |
| 2019-09-22 T00:30 | 0 | 0 | 0 | 4682.268714 |
| 2019-09-22 T01:00 | 0 | 0 | 0 | 4682.268714 |
| 2019-09-22 T01:30 | 0 | 0 | 0 | 4682.268714 |
| 2019-09-22 T02:00 | 0 | 0 | 0 | 4682.268714 |
| 2019-09-22 T02:30 | 0 | 0 | 0 | 4682.268714 |
| 2019-09-22 T03:00 | 0 | 0 | 0 | 4682.268714 |
| 2019-09-22 T03:30 | 0 | 0 | 0 | 4682.268714 |
| 2019-09-22 T04:00 | 0 | 0 | 0 | 4682.268714 |
| 2019-09-22 T04:30 | 0 | 0 | 0 | 4682.268714 |
| 2019-09-22 T05:00 | 0 | 0 | 0 | 4682.268714 |
| 2019-09-22 T05:30 | 0 | 0 | 0 | 4682.268714 |
| 2019-09-22 T06:00 | 0 | 0 | 0 | 4682.268714 |
| 2019-09-22 T06:30 | 4.879425696 | 2.439712848 | 2.439712848 | 4682.268714 |
| 2019-09-22 T07:00 | 18.80068337 | 9.400341686 | 11.84005453 | 4679.829001 |
| 2019-09-22 T07:30 | 46.69972915 | 23.34986457 | 35.18991911 | 4670.428659 |
| 2019-09-22 T08:00 | 73.69483617 | 36.84741808 | 72.03733719 | 4647.078795 |
| 2019-09-22 T08:30 | 99.4586035 | 49.72930175 | 121.7666389 | 4610.231377 |
| 2019-09-22 T09:00 | 117.4395219 | 58.71976095 | 180.4863999 | 4560.502075 |
| 2019-09-22 T09:30 | 121.8120088 | 60.9060044 | 241.3924043 | 4501.782314 |
| 2019-09-22 T10:00 | 117.8249425 | 58.91247124 | 300.3048755 | 4440.87631 |
| 2019-09-22 T10:30 | 110.8398156 | 55.41990781 | 355.7247833 | 4381.963838 |
| 2019-09-22 T11:00 | 110.0286845 | 55.01434225 | 410.7391256 | 4326.543931 |
| 2019-09-22 T11:30 | 121.7265119 | 60.86325595 | 471.6023815 | 4271.529588 |
| 2019-09-22 T12:00 | 140.7854262 | 70.39271311 | 541.9950946 | 4210.666332 |
| 2019-09-22 T12:30 | 158.5403048 | 79.27015238 | 621.265247 | 4140.273619 |
| 2019-09-22 T13:00 | 167.785828 | 83.89291399 | 705.158161 | 4061.003467 |
| 2019-09-22 T13:30 | 161.148329 | 80.57416451 | 785.7323255 | 3977.110553 |
| 2019-09-22 T14:00 | 143.4019454 | 71.70097272 | 857.4332982 | 3896.536388 |
| 2019-09-22 T14:30 | 122.4543508 | 61.2271754 | 918.6604736 | 3824.835416 |
| 2019-09-22 T15:00 | 101.9501701 | 50.97508506 | 969.6355587 | 3763.60824 |
| 2019-09-22 T15:30 | 84.63432952 | 42.31216476 | 1011.947723 | 3712.633155 |
| 2019-09-22 T16:00 | 69.35190428 | 34.67595214 | 1046.623676 | 3670.32099 |
| 2019-09-22 T16:30 | 51.24250518 | 25.62125259 | 1072.244928 | 3635.645038 |
| 2019-09-22 T17:00 | 29.04921953 | 14.52460977 | 1086.769538 | 3610.023786 |
| 2019-09-22 T17:30 | 9.945320648 | 4.972660324 | 1091.742198 | 3595.499176 |
| 2019-09-22 T18:00 | 0.559061655 | 0.279530827 | 1092.021729 | 3590.526516 |
| 2019-09-22 T18:30 | 0 | 0 | 1092.021729 | 3590.246985 |
| 2019-09-22 T19:00 | 0 | 0 | 1092.021729 | 3590.246985 |
| 2019-09-22 T19:30 | 0 | 0 | 1092.021729 | 3590.246985 |
| 2019-09-22 T20:00 | 0 | 0 | 1092.021729 | 3590.246985 |
| 2019-09-22 T20:30 | 0 | 0 | 1092.021729 | 3590.246985 |
| 2019-09-22 T21:00 | 0 | 0 | 1092.021729 | 3590.246985 |
| 2019-09-22 T21:30 | 0 | 0 | 1092.021729 | 3590.246985 |
| 2019-09-22 T22:00 | 0 | 0 | 1092.021729 | 3590.246985 |
| 2019-09-22 T22:30 | 0 | 0 | 1092.021729 | 3590.246985 |
| 2019-09-22 T23:00 | 0 | 0 | 1092.021729 | 3590.246985 |
| 2019-09-22 T23:30 | 0 | 0 | 1092.021729 | 3590.246985 |
| 2019-09-23 T00:00 | 0 | 0 | 1092.021729 | 3590.246985 |
| 2019-09-23 T00:30 | 0 | 0 | 1092.021729 | 3590.246985 |
| 2019-09-23 T01:00 | 0 | 0 | 1092.021729 | 3590.246985 |
| 2019-09-23 T01:30 | 0 | 0 | 1092.021729 | 3590.246985 |
| 2019-09-23 T02:00 | 0 | 0 | 1092.021729 | 3590.246985 |
| 2019-09-23 T02:30 | 0 | 0 | 1092.021729 | 3590.246985 |
| 2019-09-23 T03:00 | 0 | 0 | 1092.021729 | 3590.246985 |
| 2019-09-23 T03:30 | 0 | 0 | 1092.021729 | 3590.246985 |
| 2019-09-23 T04:00 | 0 | 0 | 1092.021729 | 3590.246985 |
| 2019-09-23 T04:30 | 0 | 0 | 1092.021729 | 3590.246985 |
| 2019-09-23 T05:00 | 0 | 0 | 1092.021729 | 3590.246985 |
| 2019-09-23 T05:30 | 0 | 0 | 1092.021729 | 3590.246985 |
| 2019-09-23 T06:00 | 0 | 0 | 1092.021729 | 3590.246985 |
| 2019-09-23 T06:30 | 5.311085721 | 2.65554286 | 1094.677272 | 3590.246985 |
| 2019-09-23 T07:00 | 24.86698116 | 12.43349058 | 1107.110763 | 3587.591442 |
| 2019-09-23 T07:30 | 62.39105969 | 31.19552984 | 1138.306292 | 3575.157951 |
| 2019-09-23 T08:00 | 109.4557979 | 54.72789897 | 1193.034191 | 3543.962422 |
| 2019-09-23 T08:30 | 161.7310396 | 80.86551978 | 1273.899711 | 3489.234523 |
| 2019-09-23 T09:00 | 209.3622973 | 104.6811487 | 1378.58086 | 3408.369003 |

FIG. 16A

| | | | | |
|---|---|---|---|---|
| 2019-09-23 T09:30 | 244.3522812 | 122.1761406 | 1500.757 | 3303.687854 |
| 2019-09-23 T10:00 | 267.0869606 | 133.5434803 | 1634.300481 | 3181.511714 |
| 2019-09-23 T10:30 | 281.6032131 | 140.8016066 | 1775.102087 | 3047.968233 |
| 2019-09-23 T11:00 | 290.9797671 | 145.4898835 | 1920.591971 | 2907.166627 |
| 2019-09-23 T11:30 | 303.0124178 | 151.5062089 | 2072.09818 | 2761.676743 |
| 2019-09-23 T12:00 | 313.4375009 | 156.7187505 | 2228.81693 | 2610.170534 |
| 2019-09-23 T12:30 | 316.9026953 | 158.4513476 | 2387.268278 | 2453.451784 |
| 2019-09-23 T13:00 | 306.5297263 | 153.2648631 | 2540.533141 | 2295.000436 |
| 2019-09-23 T13:30 | 281.3624369 | 140.6812185 | 2681.214359 | 2141.735573 |
| 2019-09-23 T14:00 | 245.6565096 | 122.8282548 | 2804.042614 | 2001.054354 |
| 2019-09-23 T14:30 | 206.7796578 | 103.3898289 | 2907.432443 | 1878.2261 |
| 2019-09-23 T15:00 | 169.1999778 | 84.59998889 | 2992.032432 | 1774.836271 |
| 2019-09-23 T15:30 | 134.8066078 | 67.40330389 | 3059.435736 | 1690.236282 |
| 2019-09-23 T16:00 | 102.5705946 | 51.28529729 | 3110.721033 | 1622.832978 |
| 2019-09-23 T16:30 | 71.02501527 | 35.51250763 | 3146.233541 | 1571.547681 |
| 2019-09-23 T17:00 | 40.40418867 | 20.20209434 | 3166.435635 | 1536.035173 |
| 2019-09-23 T17:30 | 12.25759109 | 6.128795546 | 3172.564431 | 1515.833079 |
| 2019-09-23 T18:00 | 1.10378128 | 0.55189064 | 3173.116321 | 1509.704283 |
| 2019-09-23 T18:30 | 0 | 0 | 3173.116321 | 1509.152393 |
| 2019-09-23 T19:00 | 0 | 0 | 3173.116321 | 1509.152393 |
| 2019-09-23 T19:30 | 0 | 0 | 3173.116321 | 1509.152393 |
| 2019-09-23 T20:00 | 0 | 0 | 3173.116321 | 1509.152393 |
| 2019-09-23 T20:30 | 0 | 0 | 3173.116321 | 1509.152393 |
| 2019-09-23 T21:00 | 0 | 0 | 3173.116321 | 1509.152393 |
| 2019-09-23 T21:30 | 0 | 0 | 3173.116321 | 1509.152393 |
| 2019-09-23 T22:00 | 0 | 0 | 3173.116321 | 1509.152393 |
| 2019-09-23 T22:30 | 0 | 0 | 3173.116321 | 1509.152393 |
| 2019-09-23 T23:00 | 0 | 0 | 3173.116321 | 1509.152393 |
| 2019-09-23 T23:30 | 0 | 0 | 3173.116321 | 1509.152393 |
| 2019-09-24 T00:00 | 0 | 0 | 3173.116321 | 1509.152393 |
| 2019-09-24 T00:30 | 0 | 0 | 3173.116321 | 1509.152393 |
| 2019-09-24 T01:00 | 0 | 0 | 3173.116321 | 1509.152393 |
| 2019-09-24 T01:30 | 0 | 0 | 3173.116321 | 1509.152393 |
| 2019-09-24 T02:00 | 0 | 0 | 3173.116321 | 1509.152393 |
| 2019-09-24 T02:30 | 0 | 0 | 3173.116321 | 1509.152393 |
| 2019-09-24 T03:00 | 0 | 0 | 3173.116321 | 1509.152393 |
| 2019-09-24 T03:30 | 0 | 0 | 3173.116321 | 1509.152393 |
| 2019-09-24 T04:00 | 0 | 0 | 3173.116321 | 1509.152393 |
| 2019-09-24 T04:30 | 0 | 0 | 3173.116321 | 1509.152393 |
| 2019-09-24 T05:00 | 0 | 0 | 3173.116321 | 1509.152393 |
| 2019-09-24 T05:30 | 0 | 0 | 3173.116321 | 1509.152393 |
| 2019-09-24 T06:00 | 0 | 0 | 3173.116321 | 1509.152393 |
| 2019-09-24 T06:30 | 6.564323839 | 3.282161919 | 3176.398483 | 1509.152393 |
| 2019-09-24 T07:00 | 27.17484364 | 13.58742182 | 3189.985905 | 1505.870231 |
| 2019-09-24 T07:30 | 54.54306271 | 27.27153136 | 3217.257436 | 1492.282609 |
| 2019-09-24 T08:00 | 72.89658334 | 36.44819167 | 3253.705628 | 1465.011277 |
| 2019-09-24 T08:30 | 82.76353245 | 41.38176623 | 3295.087394 | 1428.563086 |
| 2019-09-24 T09:00 | 91.68254682 | 45.84127341 | 3340.928668 | 1387.18132 |
| 2019-09-24 T09:30 | 106.7641681 | 53.38208404 | 3394.310752 | 1341.340046 |
| 2019-09-24 T10:00 | 130.3541741 | 65.17708706 | 3459.487839 | 1287.957962 |
| 2019-09-24 T10:30 | 157.9203954 | 78.96019771 | 3538.448037 | 1222.780875 |
| 2019-09-24 T11:00 | 183.1532906 | 91.5766453 | 3630.024682 | 1143.820677 |
| 2019-09-24 T11:30 | 199.2602294 | 99.63011472 | 3729.654797 | 1052.244032 |
| 2019-09-24 T12:00 | 206.9777223 | 103.4888612 | 3833.143658 | 952.6139173 |
| 2019-09-24 T12:30 | 209.5444609 | 104.7722304 | 3937.915888 | 849.1250562 |
| 2019-09-24 T13:00 | 208.7162268 | 104.3581134 | 4042.274002 | 744.3528257 |
| 2019-09-24 T13:30 | 207.8778515 | 103.938926 | 4146.212927 | 639.9947123 |
| 2019-09-24 T14:00 | 204.7760236 | 102.3880118 | 4248.600959 | 536.0557866 |
| 2019-09-24 T14:30 | 199.774034 | 99.887017 | 4348.487956 | 433.6677748 |
| 2019-09-24 T15:00 | 187.5095177 | 93.75475887 | 4442.242715 | 333.7807578 |
| 2019-09-24 T15:30 | 168.962271 | 84.48113548 | 4526.72385 | 248.0259989 |
| 2019-09-24 T16:00 | 139.6381034 | 69.81905168 | 4596.542902 | 155.5448634 |
| 2019-09-24 T16:30 | 100.2990204 | 50.14951022 | 4646.692412 | 85.72581177 |
| 2019-09-24 T17:00 | 55.78361642 | 27.89180821 | 4674.584221 | 35.57630155 |
| 2019-09-24 T17:30 | 13.98926008 | 6.994630042 | 4681.578851 | 7.684493341 |
| 2019-09-24 T18:00 | 1.3797266 | 0.6898633 | 4682.268714 | 0.6898633 |
| 2019-09-24 T18:30 | 0 | 0 | 4682.268714 | 0 |
| 2019-09-24 T19:00 | 0 | 0 | 4682.268714 | 0 |
| 2019-09-24 T19:30 | 0 | 0 | 4682.268714 | 0 |
| 2019-09-24 T20:00 | 0 | 0 | 4682.268714 | 0 |
| 2019-09-24 T20:30 | 0 | 0 | 4682.268714 | 0 |
| 2019-09-24 T21:00 | 0 | 0 | 4682.268714 | 0 |
| 2019-09-24 T21:30 | 0 | 0 | 4682.268714 | 0 |

Table 5 - Example CELL_HEALTH TABLE

| % Bucket start | % Bucket stop | Cell # | RESLOOP_INTERVAL seconds | measured integral % deviation state-of-charge from nominal | starting resistance (mOhm) | ending resistance (mOhm) | % change resistance DELTA_RESn | Ave. Temp C |
|---|---|---|---|---|---|---|---|---|
| 0 | 1 | 1 | 72000 | 0.543 | 40.0034 | 40.0049 | 0.0015 | 31.2 |
| 0 | 1 | 2 | 72000 | 0.543 | 40.00323 | 40.00463 | 0.0014 | 31.2 |
| 0 | 1 | 3 | 72000 | 0.543 | 40.00334 | 40.00499 | 0.00165 | 31.2 |
| 0 | 1 | 4 | 72000 | 0.543 | 40.00022 | 40.00182 | 0.0016 | 31.2 |
| 1 | 2 | 1 | 48000 | 1.211 | 40.0052 | 40.0077 | 0.0025 | 28.4 |
| 1 | 2 | 2 | 48000 | 1.211 | 40.00509 | 40.00749 | 0.0024 | 28.4 |
| 1 | 2 | 3 | 48000 | 1.211 | 40.00514 | 40.00776 | 0.00262 | 28.4 |
| 1 | 2 | 4 | 48000 | 1.211 | 40.00682 | 40.00941 | 0.00259 | 28.4 |
| 2 | 3 | 1 | 36000 | 2.898 | 40.007 | 40.0094 | 0.0024 | 28.7 |
| 2 | 3 | 2 | 36000 | 2.898 | 40.00683 | 40.00953 | 0.0027 | 28.7 |
| 2 | 3 | 3 | 36000 | 2.898 | 40.00684 | 40.00969 | 0.00285 | 28.7 |
| 2 | 3 | 4 | 36000 | 2.898 | 40.00662 | 40.0095 | 0.00288 | 28.7 |
| 24 | 25 | 1 | 18000 | 24.211 | 40.1311 | 40.1362 | 0.0051 | 28.3 |
| 24 | 25 | 2 | 18000 | 24.311 | 40.1335 | 40.1374 | 0.0039 | 28.3 |
| 24 | 25 | 3 | 18000 | 24.211 | 40.1357 | 40.141 | 0.0053 | 28.3 |
| 24 | 25 | 4 | 18000 | 24.311 | 40.1299 | 40.1341 | 0.0052 | 28.3 |

Fig. 29A

| time slice interval | | | 57 | seconds | | | | | | | | | | | |
|---|---|---|---|---|---|---|---|---|---|---|---|---|---|---|---|
| Second unit value (Rate 8am-5pm) | | | $ | 0.26 | $/kwatt-hr | | | | | | | | | | |
| First unit value (Rate 5pm-8am) | | | $ | 0.52 | $/kwatt-hr | | | | | | | | | | |
| | | | | | | | Without Time Shifting | | | | With Time Shifting | | | | |
| | | | | | | | Forecast | | | | Forecast | | | | Deviation in state of charge |
| Stage | comment | Time Slice | Time of Day | Power Forecast | Energy Forecast | | Predicted State of Charge | Net Metering of current time slice | Cum Net Metering sum of present and past time slices | | Predicted State of Charge | Net Metering of current time slice | Cum Net Metering sum of present and past time slices | Deviation from nominal | Maximum |
| | | | | Watts | watt-hrs | | watt-hrs | | | | watt-hrs | Value of present time slice | sum of present and past time slices | | |
| 1 | | 1 | 15:13:36 | 6438.958112 | 101.9501701 | | 2500 | $0.0265 | $0.0265 | | 2500 | $0.0265 | $0.0265 | | |
| 1 | | 2 | 15:14:33 | 6390.636858 | 101.1850836 | | 2500 | $0.0263 | $0.0528 | | 2500 | $0.0263 | $0.0528 | | |
| 1 | | 3 | 15:15:30 | 6342.779094 | 100.4273357 | | 2500 | $0.0261 | $0.0789 | | 2500 | $0.0261 | $0.0789 | | |
| 1 | | 4 | 15:16:27 | 6295.365533 | 99.67662093 | | 2500 | $0.0259 | $0.1048 | | 2500 | $0.0259 | $0.1048 | | |
| 1 | | 5 | 15:17:24 | 6248.377581 | 98.93264503 | | 2500 | $0.0257 | $0.1306 | | 2500 | $0.0257 | $0.1306 | | |
| 1 | | 6 | 15:18:21 | 6201.797328 | 98.19512436 | | 2500 | $0.0255 | $0.1561 | | 2500 | $0.0255 | $0.1561 | | |
| 1 | | 7 | 15:19:18 | 6155.607535 | 97.46378597 | | 2500 | $0.0253 | $0.1814 | | 2500 | $0.0253 | $0.1814 | | |
| 1 | | 8 | 15:20:15 | 6109.791623 | 96.73836736 | | 2500 | $0.0252 | $0.2066 | | 2500 | $0.0252 | $0.2066 | | |
| 1 | | 9 | 15:21:12 | 6064.333659 | 96.01861626 | | 2500 | $0.0250 | $0.2316 | | 2500 | $0.0250 | $0.2316 | | |
| 1 | | 10 | 15:22:09 | 6019.218346 | 95.30429048 | | 2500 | $0.0248 | $0.2563 | | 2500 | $0.0248 | $0.2563 | | |
| 1 | | 11 | 15:23:06 | 5974.43101 | 94.59515765 | | 2500 | $0.0246 | $0.2809 | | 2500 | $0.0246 | $0.2809 | | |
| 1 | | 12 | 15:24:03 | 5929.957586 | 93.89099511 | | 2500 | $0.0244 | $0.3053 | | 2500 | $0.0244 | $0.3053 | | |
| 1 | | 13 | 15:25:00 | 5885.784609 | 93.19158964 | | 2500 | $0.0242 | $0.3296 | | 2500 | $0.0242 | $0.3296 | | |
| 1 | | 14 | 15:25:57 | 5841.899197 | 92.49673729 | | 2500 | $0.0240 | $0.3536 | | 2500 | $0.0240 | $0.3536 | | |
| 1 | | 15 | 15:26:54 | 5798.289041 | 91.80624316 | | 2500 | $0.0239 | $0.3775 | | 2500 | $0.0239 | $0.3775 | | |
| 1 | | 16 | 15:27:51 | 5754.942393 | 91.11992122 | | 2500 | $0.0237 | $0.4012 | | 2500 | $0.0237 | $0.4012 | | |
| 1 | | 17 | 15:28:48 | 5711.84805 | 90.43759412 | | 2500 | $0.0235 | $0.4247 | | 2500 | $0.0235 | $0.4247 | | |
| 1 | | 18 | 15:29:45 | 5668.995344 | 89.75909294 | | 2500 | $0.0233 | $0.4480 | | 2500 | $0.0233 | $0.4480 | | |
| 1 | | 19 | 15:30:42 | 5344.694496 | 84.62432952 | | 2500 | $0.0220 | $0.4700 | | 2500 | $0.0220 | $0.4700 | | |
| 1 | | 20 | 15:31:39 | 5313.434607 | 84.19938127 | | 2500 | $0.0219 | $0.4919 | | 2500 | $0.0219 | $0.4919 | | |
| 1 | | 21 | 15:32:36 | 5282.025622 | 83.63207235 | | 2500 | $0.0217 | $0.5136 | | 2500 | $0.0217 | $0.5136 | | |
| 1 | | 22 | 15:33:33 | 5250.463701 | 83.13234194 | | 2500 | $0.0216 | $0.5353 | | 2500 | $0.0216 | $0.5353 | | |
| 1 | | 23 | 15:34:30 | 5218.745641 | 82.63013931 | | 2500 | $0.0215 | $0.5567 | | 2500 | $0.0215 | $0.5567 | | |
| 1 | | 24 | 15:35:27 | 5186.868848 | 82.12542342 | | 2500 | $0.0214 | $0.5781 | | 2500 | $0.0214 | $0.5781 | | |
| 1 | | 25 | 15:36:24 | 5154.831315 | 81.61816249 | | 2500 | $0.0212 | $0.5993 | | 2500 | $0.0212 | $0.5993 | | |
| 1 | | 26 | 15:37:21 | 5122.631597 | 81.10833361 | | 2500 | $0.0211 | $0.6204 | | 2500 | $0.0211 | $0.6204 | | |
| 1 | | 27 | 15:38:18 | 5090.268784 | 80.59592242 | | 2500 | $0.0210 | $0.6414 | | 2500 | $0.0210 | $0.6414 | | |
| 1 | | 28 | 15:39:15 | 5057.742484 | 80.08092266 | | 2500 | $0.0208 | $0.6622 | | 2500 | $0.0208 | $0.6622 | | |
| 1 | | 29 | 15:40:12 | 5025.052791 | 79.56335586 | | 2500 | $0.0207 | $0.6829 | | 2500 | $0.0207 | $0.6829 | | |
| 1 | | 30 | 15:41:09 | 4992.200271 | 79.04317095 | | 2500 | $0.0206 | $0.7034 | | 2500 | $0.0206 | $0.7034 | | |
| 1 | | 31 | 15:42:06 | 4959.185935 | 78.52044397 | | 2500 | $0.0204 | $0.7238 | | 2500 | $0.0204 | $0.7238 | | |
| 1 | | 32 | 15:43:03 | 4926.011221 | 77.99517767 | | 2500 | $0.0203 | $0.7441 | | 2500 | $0.0203 | $0.7441 | | |
| 1 | | 33 | 15:44:00 | 4892.677971 | 77.46740121 | | 2500 | $0.0201 | $0.7643 | | 2500 | $0.0201 | $0.7643 | | |
| 1 | | 34 | 15:44:57 | 4859.188411 | 76.93714984 | | 2500 | $0.0200 | $0.7843 | | 2500 | $0.0200 | $0.7843 | | |
| 1 | | 35 | 15:45:54 | 4825.545132 | 76.40446459 | | 2500 | $0.0199 | $0.8041 | | 2500 | $0.0199 | $0.8041 | | |

Fig. 29B

| | | | | | | | | | | | | |
|---|---|---|---|---|---|---|---|---|---|---|---|---|
| 36 | 1 | 15:46:51 | 4791.75107 | 75.86939194 | 2500 | $0.0197 | $0.8239 | 2500 | $0.0197 | $0.8239 | | |
| 37 | 1 | 15:47:48 | 4757.809489 | 75.33196357 | 2500 | $0.0196 | $0.8434 | 2500 | $0.0196 | $0.8434 | | |
| 38 | 1 | 15:48:45 | 4723.723959 | 74.79229601 | 2500 | $0.0194 | $0.8629 | 2500 | $0.0194 | $0.8629 | | |
| 39 | 1 | 15:49:42 | 4689.498342 | 74.25039042 | 2500 | $0.0193 | $0.8822 | 2500 | $0.0193 | $0.8822 | | |
| 40 | 1 | 15:50:39 | 4655.136774 | 73.70633226 | 2500 | $0.0192 | $0.9014 | 2500 | $0.0192 | $0.9014 | | |
| 41 | 1 | 15:51:36 | 4620.643646 | 73.16019106 | 2500 | $0.0190 | $0.9204 | 2500 | $0.0190 | $0.9204 | | |
| 42 | 1 | 15:52:33 | 4586.023589 | 72.61204015 | 2500 | $0.0189 | $0.9393 | 2500 | $0.0189 | $0.9393 | | |
| 43 | 1 | 15:53:30 | 4551.281458 | 72.06195642 | 2500 | $0.0187 | $0.9580 | 2500 | $0.0187 | $0.9580 | | |
| 44 | 1 | 15:54:27 | 4516.422317 | 71.51002003 | 2500 | $0.0186 | $0.9766 | 2500 | $0.0186 | $0.9766 | | |
| 45 | 1 | 15:55:24 | 4481.451425 | 70.95631422 | 2500 | $0.0184 | $0.9950 | 2500 | $0.0184 | $0.9950 | | |
| 46 | 1 | 15:56:21 | 4446.374216 | 70.40092509 | 2500 | $0.0183 | $1.0133 | 2500 | $0.0183 | $1.0133 | | |
| 47 | 1 | 15:57:18 | 4411.196293 | 69.84394131 | 2500 | $0.0182 | $1.0315 | 2500 | $0.0182 | $1.0315 | | |
| 48 | 1 | 15:58:15 | 4375.923408 | 69.28545396 | 2500 | $0.0180 | $1.0495 | 2500 | $0.0180 | $1.0495 | | |
| 49 | 1 | 15:59:12 | 4340.561451 | 68.7255563 | 2500 | $0.0179 | $1.0674 | 2500 | $0.0179 | $1.0674 | | |
| 50 | 1 | 16:00:09 | 4380.12027 | 69.35190428 | 2500 | $0.0180 | $1.0854 | 2500 | $0.0180 | $1.0854 | | |
| 51 | 1 | 16:01:06 | 4344.378035 | 68.78598556 | 2500 | $0.0179 | $1.1033 | 2500 | $0.0179 | $1.1033 | | |
| 52 | 1 | 16:02:03 | 4308.347094 | 68.21549566 | 2500 | $0.0177 | $1.1210 | 2500 | $0.0177 | $1.1210 | | |
| 53 | 1 | 16:03:00 | 4272.04416 | 67.64069921 | 2500 | $0.0176 | $1.1386 | 2500 | $0.0176 | $1.1386 | | |
| 54 | 1 | 16:03:57 | 4235.485767 | 67.06185797 | 2500 | $0.0174 | $1.1561 | 2500 | $0.0174 | $1.1561 | | |
| 55 | 1 | 16:04:54 | 4198.688261 | 66.4792308 | 2500 | $0.0173 | $1.1733 | 2500 | $0.0173 | $1.1733 | | |
| 56 | 1 | 16:05:51 | 4161.667797 | 65.83307346 | 2500 | $0.0171 | $1.1905 | 2500 | $0.0171 | $1.1905 | | |
| 57 | 1 | 16:06:48 | 4124.44033 | 65.30363856 | 2500 | $0.0170 | $1.2074 | 2500 | $0.0170 | $1.2074 | | |
| 58 | 1 | 16:07:45 | 4087.021606 | 64.71117543 | 2500 | $0.0168 | $1.2243 | 2500 | $0.0168 | $1.2243 | | |
| 59 | 1 | 16:08:42 | 4049.427162 | 64.11593006 | 2500 | $0.0167 | $1.2409 | 2500 | $0.0167 | $1.2409 | | |
| 60 | 2 (charge start time) | 16:09:39 | 4011.673212 | 63.51814494 | 2500 | $0.0165 | $1.2575 | 2500 | $0.0165 | $1.2575 | | |
| 61 | 2 | 16:10:36 | 3973.7772148 | 62.91805902 | 2500 | $0.0164 | $1.2575 | 2562.918059 | $0.0000 | $1.2575 | 62.91805902 | 2500 |
| 62 | 2 | 16:11:33 | 3935.741533 | 62.31590761 | 2500 | $0.0162 | $1.2900 | 2625.2339667 | $0.0000 | $1.2575 | 125.2399666 | 2500 |
| 63 | 2 | 16:12:30 | 3897.595094 | 61.71192232 | 2500 | $0.0160 | $1.3061 | 2686.945889 | $0.0000 | $1.2575 | 186.945889 | 2500 |
| 64 | 2 | 16:13:27 | 3859.347217 | 61.10633094 | 2500 | $0.0159 | $1.3220 | 2748.05222 | $0.0000 | $1.2575 | 248.05222199 | 2500 |
| 65 | 2 | 16:14:24 | 3821.012047 | 60.4993574 | 2500 | $0.0157 | $1.3377 | 2808.551577 | $0.0000 | $1.2575 | 308.551.5773 | 2500 |
| 66 | 2 | 16:15:21 | 3782.603477 | 59.89122172 | 2500 | $0.0156 | $1.3533 | 2868.442799 | $0.0000 | $1.2575 | 368.442799 | 2500 |
| 67 | 2 | 16:16:18 | 3744.135153 | 59.28213992 | 2500 | $0.0154 | $1.3687 | 2927.724939 | $0.0000 | $1.2575 | 427.7249389 | 2500 |
| 68 | 2 | 16:17:15 | 3705.620461 | 58.67232396 | 2500 | $0.0153 | $1.3839 | 2986.397263 | $0.0000 | $1.2575 | 486.3972629 | 2500 |
| 69 | 2 | 16:18:12 | 3667.07253 | 58.06198173 | 2500 | $0.0151 | $1.3990 | 3044.459245 | $0.0000 | $1.2575 | 544.4592446 | 2500 |
| 70 | 2 | 16:19:09 | 3628.50423 | 57.45131697 | 2500 | $0.0149 | $1.4140 | 3101.910562 | $0.0000 | $1.2575 | 601.91056616 | 2500 |
| 71 | 2 | 16:20:06 | 3589.928163 | 56.84052925 | 2500 | $0.0148 | $1.4287 | 3158.751091 | $0.0000 | $1.2575 | 658.75109909 | 2500 |
| 72 | 2 | 16:21:03 | 3551.356669 | 56.22981392 | 2500 | $0.0146 | $1.4434 | 3214.980905 | $0.0000 | $1.2575 | 714.9809048 | 2500 |
| 73 | 2 | 16:22:00 | 3512.801816 | 55.61936208 | 2500 | $0.0145 | $1.4578 | 3270.600267 | $0.0000 | $1.2575 | 770.6002669 | 2500 |
| 74 | 2 | 16:22:57 | 3474.275404 | 55.00936057 | 2500 | $0.0143 | $1.4721 | 3325.609627 | $0.0000 | $1.2575 | 825.6096274 | 2500 |
| 75 | 2 | 16:23:54 | 3435.788964 | 54.39999193 | 2500 | $0.0141 | $1.4863 | 3380.009619 | $0.0000 | $1.2575 | 880.0096194 | 2500 |
| 76 | 2 | 16:24:51 | 3397.353753 | 53.79143442 | 2500 | $0.0140 | $1.5002 | 3433.801054 | $0.0000 | $1.2575 | 933.8010538 | 2500 |
| 77 | 2 | 16:25:48 | 3358.980754 | 53.18386193 | 2500 | $0.0138 | $1.5141 | 3486.984916 | $0.0000 | $1.2575 | 986.9849157 | 2500 |
| 78 | 2 | 16:26:45 | 3320.680679 | 52.57744408 | 2500 | $0.0137 | $1.5277 | 3539.56236 | $0.0000 | $1.2575 | 1039.56236 | 2500 |
| 79 | 2 | 16:27:42 | 3282.463965 | 51.97234612 | 2500 | $0.0135 | $1.5413 | 3591.534706 | $0.0000 | $1.2575 | 1091.534706 | 2500 |
| 80 | 2 | 16:28:39 | 3244.340778 | 51.36872898 | 2500 | $0.0134 | $1.5546 | 3642.903435 | $0.0000 | $1.2575 | 1142.903435 | 2500 |
| 81 | 2 | 16:29:36 | 3206.321007 | 50.76674928 | 2500 | $0.0132 | $1.5678 | 3693.670184 | $0.0000 | $1.2575 | 1193.670184 | 2500 |
| 82 | 2 | 16:30:33 | 3236.368748 | 51.24250518 | 2500 | $0.0133 | $1.5811 | 3744.912689 | $0.0000 | $1.2575 | 1244.912689 | 2500 |
| 83 | 2 | 16:31:30 | 3191.387927 | 50.53030885 | 2500 | $0.0131 | $1.5943 | 3795.442998 | $0.0000 | $1.2575 | 1295.442998 | 2500 |
| 84 | 2 | 16:32:27 | 3146.653204 | 49.82200906 | 2500 | $0.0130 | $1.6072 | 3845.265007 | $0.0000 | $1.2575 | 1345.265007 | 2500 |

| | | | | | | | | | |
|---|---|---|---|---|---|---|---|---|---|
| 2 | 85 | 16:33:24 | 3102.175564 | 49.11777976 | $0.0128 | $1.6200 | 3894.382787 | $0.0000 | $1.2575 | 1394.382787 | 2500 |
| 2 | 86 | 16:34:21 | 3057.965582 | 48.41778839 | $0.0126 | $1.6326 | 3942.800575 | $0.0000 | $1.2575 | 1442.800575 | 2500 |
| 2 | 87 | 16:35:18 | 3014.033423 | 47.72219587 | $0.0124 | $1.6450 | 3990.522771 | $0.0000 | $1.2575 | 1490.522771 | 2500 |
| 2 | 88 | 16:36:15 | 2970.388084 | 47.03115663 | $0.0122 | $1.6572 | 4037.553928 | $0.0000 | $1.2575 | 1537.553928 | 2500 |
| 2 | 89 | 16:37:12 | 2927.041178 | 46.34481865 | $0.0120 | $1.6693 | 4083.898747 | $0.0000 | $1.2575 | 1583.898747 | 2500 |
| 2 | 90 | 16:38:09 | 2883.999375 | 45.66332344 | $0.0119 | $1.6811 | 4129.56207 | $0.0000 | $1.2575 | 1629.56207 | 2500 |
| 2 | 91 | 16:39:06 | 2841.271966 | 44.98680613 | $0.0117 | $1.6928 | 4174.548876 | $0.0000 | $1.2575 | 1674.548876 | 2500 |
| 2 | 92 | 16:40:03 | 2798.867085 | 44.31539551 | $0.0115 | $1.7044 | 4218.864272 | $0.0000 | $1.2575 | 1718.864272 | 2500 |
| 2 | 93 | 16:41:00 | 2756.79247 | 43.64921411 | $0.0113 | $1.7157 | 4262.513486 | $0.0000 | $1.2575 | 1762.513486 | 2500 |
| 2 | 94 | 16:41:57 | 2715.055468 | 42.98837824 | $0.0112 | $1.7269 | 4305.501864 | $0.0000 | $1.2575 | 1805.501864 | 2500 |
| 2 | 95 | 16:42:54 | 2673.663037 | 42.33299809 | $0.0110 | $1.7379 | 4347.834862 | $0.0000 | $1.2575 | 1847.834862 | 2500 |
| 2 | 96 | 16:43:51 | 2632.621757 | 41.68317782 | $0.0108 | $1.7487 | 4389.51804 | $0.0000 | $1.2575 | 1889.51804 | 2500 |
| 2 | 97 | 16:44:48 | 2591.93783 | 41.03901564 | $0.0107 | $1.7594 | 4430.557056 | $0.0000 | $1.2575 | 1930.557056 | 2500 |
| 2 | 98 | 16:45:45 | 2551.61709 | 40.40060392 | $0.0105 | $1.7699 | 4470.957659 | $0.0000 | $1.2575 | 1970.957659 | 2500 |
| 2 | 99 | 16:46:42 | 2511.665006 | 39.76802926 | $0.0103 | $1.7802 | 4510.725689 | $0.0000 | $1.2575 | 2010.725689 | 2500 |
| 2 | 100 | 16:47:39 | 2472.086694 | 39.14137265 | $0.0102 | $1.7904 | 4549.867061 | $0.0000 | $1.2575 | 2049.867061 | 2500 |
| 2 | 101 | 16:48:36 | 2432.886918 | 38.52070953 | $0.0100 | $1.8004 | 4588.387771 | $0.0000 | $1.2575 | 2088.387771 | 2500 |
| 2 | 102 | 16:49:33 | 2394.070101 | 37.90610993 | $0.0099 | $1.8103 | 4626.293881 | $0.0000 | $1.2575 | 2126.293881 | 2500 |
| 2 | 103 | 16:50:30 | 2355.640331 | 37.29763858 | $0.0097 | $1.8200 | 4663.591519 | $0.0000 | $1.2575 | 2163.591519 | 2500 |
| 2 | 104 | 16:51:27 | 2317.60137 | 36.69535502 | $0.0095 | $1.8295 | 4700.286874 | $0.0000 | $1.2575 | 2200.286874 | 2500 |
| 2 | 105 | 16:52:24 | 2279.956657 | 36.09931373 | $0.0094 | $1.8389 | 4736.386188 | $0.0000 | $1.2575 | 2236.386188 | 2500 |
| 2 | 106 | 16:53:21 | 2242.709322 | 35.50956426 | $0.0092 | $1.8482 | 4771.895752 | $0.0000 | $1.2575 | 2271.895752 | 2500 |
| 2 | 107 | 16:54:18 | 2205.862189 | 34.92615152 | $0.0091 | $1.8572 | 4806.821904 | $0.0000 | $1.2575 | 2306.821904 | 2500 |
| 2 | 108 | 16:55:15 | 2169.417787 | 34.34911496 | $0.0089 | $1.8662 | 4841.171019 | $0.0000 | $1.2575 | 2341.171019 | 2500 |
| 2 | 109 | 16:56:12 | 2133.378355 | 33.77849063 | $0.0088 | $1.8749 | 4874.949509 | $0.0000 | $1.2575 | 2374.949509 | 2500 |
| 2 | 110 | 16:57:09 | 2097.745853 | 33.21430935 | $0.0086 | $1.8836 | 4908.163819 | $0.0000 | $1.2575 | 2408.163819 | 2500 |
| 2 | 111 | 16:58:06 | 2062.521968 | 32.65659782 | $0.0085 | $1.8921 | 4940.820417 | $0.0000 | $1.2575 | 2440.820417 | 2500 |
| 2 | 112 | 16:59:03 | 2027.708119 | 32.10537856 | $0.0083 | $1.9004 | 4972.925795 | $0.0000 | $1.2575 | 2472.925795 | 2500 |
| time of need (start of grid ld int) | | | | | | | | | | |
| 3a | 113 | 17:00:00 | 1834.687549 | 29.04921953 | $0.0151 | $1.9155 | 5001.975015 | $0.0000 | $1.2575 | 2501.975015 | 2500 |
| 3a | 114 | 17:00:57 | 1796.982486 | 28.45222269 | $0.0148 | $1.9303 | 4930.427237 | $0.0372 | $1.2947 | 2430.427237 | 2500 |
| 3a | 115 | 17:01:54 | 1759.876783 | 27.86471573 | $0.0145 | $1.9448 | 4858.291953 | $0.0375 | $1.3322 | 2358.291953 | 2500 |
| 3a | 116 | 17:02:51 | 1723.368725 | 27.28667148 | $0.0142 | $1.9590 | 4785.578625 | $0.0378 | $1.3700 | 2285.578625 | 2500 |
| 3a | 117 | 17:03:48 | 1687.456152 | 26.71805573 | $0.0139 | $1.9729 | 4712.29668 | $0.0381 | $1.4081 | 2212.29668 | 2500 |
| 3a | 118 | 17:04:45 | 1652.136485 | 26.15882769 | $0.0136 | $1.9865 | 4638.455508 | $0.0384 | $1.4465 | 2138.455508 | 2500 |
| 3a | 119 | 17:05:42 | 1617.406761 | 25.60894039 | $0.0133 | $1.9998 | 4564.064448 | $0.0387 | $1.4852 | 2064.064448 | 2500 |
| 3a | 120 | 17:06:39 | 1583.26365 | 25.06834113 | $0.0130 | $2.0128 | 4489.132789 | $0.0390 | $1.5241 | 1989.132789 | 2500 |
| 3a | 121 | 17:07:36 | 1549.703486 | 24.53697186 | $0.0128 | $2.0256 | 4413.669761 | $0.0392 | $1.5634 | 1913.669761 | 2500 |
| 3a | 122 | 17:08:33 | 1516.722286 | 24.01476954 | $0.0125 | $2.0381 | 4337.684531 | $0.0395 | $1.6029 | 1837.684531 | 2500 |
| 3a | 123 | 17:09:30 | 1484.315777 | 23.50166647 | $0.0122 | $2.0503 | 4261.186197 | $0.0398 | $1.6427 | 1761.186197 | 2500 |
| 3a | 124 | 17:10:27 | 1452.479411 | 22.99759068 | $0.0120 | $2.0623 | 4184.183788 | $0.0400 | $1.6827 | 1684.183788 | 2500 |
| 3a | 125 | 17:11:24 | 1421.208393 | 22.50246623 | $0.0117 | $2.0740 | 4106.686254 | $0.0403 | $1.7230 | 1606.686254 | 2500 |
| 3a | 126 | 17:12:21 | 1390.497695 | 22.0162135 | $0.0114 | $2.0854 | 4028.702468 | $0.0406 | $1.7636 | 1528.702468 | 2500 |
| 3a | 127 | 17:13:18 | 1360.342073 | 21.53874949 | $0.0112 | $2.0966 | 3950.241217 | $0.0408 | $1.8044 | 1450.241217 | 2500 |
| 3a | 128 | 17:14:15 | 1330.736091 | 21.06998811 | $0.0110 | $2.1076 | 3871.311205 | $0.0410 | $1.8454 | 1371.311205 | 2500 |
| 3a | 129 | 17:15:12 | 1301.674132 | 20.60984043 | $0.0107 | $2.1183 | 3791.921046 | $0.0413 | $1.8867 | 1291.921046 | 2500 |
| 3a | 130 | 17:16:09 | 1273.150416 | 20.15821492 | $0.0105 | $2.1288 | 3712.079261 | $0.0415 | $1.9282 | 1212.079261 | 2500 |
| 3a | 131 | 17:17:06 | 1245.159014 | 19.71501772 | $0.0103 | $2.1390 | 3631.794278 | $0.0417 | $1.9700 | 1131.794278 | 2500 |
| 3a | 132 | 17:18:03 | 1217.693863 | 19.28015283 | $0.0100 | $2.1491 | 3551.074431 | $0.0420 | $2.0119 | 1051.074431 | 2500 |

| | | | | | | | | | | |
|---|---|---|---|---|---|---|---|---|---|---|
| 3a | 133 | 17:19:00 | 1190.748779 | 18.85352234 | 2500 | $0.0098 | $2.1589 | 3469.927954 | $0.0422 | $2.0541 | 969.9279535 | 2500 |
| 3a | 134 | 17:19:57 | 1164.317473 | 18.43520265 | 2500 | $0.0096 | $2.1684 | 3388.36298 | $0.0424 | $2.0965 | 888.3629802 | 2500 |
| 3a | 135 | 17:20:54 | 1138.393556 | 18.02456463 | 2500 | $0.0094 | $2.1778 | 3306.387545 | $0.0426 | $2.1392 | 806.3875448 | 2500 |
| 3a | 136 | 17:21:51 | 1112.970557 | 17.62203382 | 2500 | $0.0092 | $2.1870 | 3224.009579 | $0.0428 | $2.1820 | 724.0095767 | 2500 |
| 3a | 137 | 17:22:48 | 1088.041933 | 17.2273306 | 2500 | $0.0090 | $2.1959 | 3141.236909 | $0.0430 | $2.2250 | 641.2369092 | 2500 |
| 3a | 138 | 17:23:45 | 1063.601075 | 16.84035036 | 2500 | $0.0088 | $2.2047 | 3058.07726 | $0.0432 | $2.2683 | 558.0772596 | 2500 |
| 3a | 139 | 17:24:42 | 1039.641325 | 16.46098764 | 2500 | $0.0086 | $2.2133 | 2974.538247 | $0.0434 | $2.3117 | 474.5382472 | 2500 |
| 3a | 140 | 17:25:39 | 1016.155977 | 16.0891363 | 2500 | $0.0084 | $2.2216 | 2890.627384 | $0.0436 | $2.3554 | 390.6273835 | 2500 |
| 3a | 141 | 17:26:36 | 993.1382925 | 15.72468963 | 2500 | $0.0082 | $2.2298 | 2806.352073 | $0.0438 | $2.3992 | 306.3520732 | 2500 |
| 3a | 142 | 17:27:33 | 970.5815056 | 15.3675405 | 2500 | $0.0080 | $2.2378 | 2721.719614 | $0.0440 | $2.4432 | 221.7196137 | 2500 |
| 3a | 143 | 17:28:30 | 948.478831 | 15.01758149 | 2500 | $0.0078 | $2.2456 | 2636.737195 | $0.0442 | $2.4874 | 136.7371952 | 2500 |
| 3a | 144 | 17:29:27 | 926.8234719 | 14.67470497 | 2500 | $0.0076 | $2.2532 | 2551.4119 | $0.0444 | $2.5318 | 51.41190015 | 2500 |
| 3b nominal state reached | 145 | 17:30:24 | 628.1255146 | 9.945320648 | 2500 | $0.0052 | $2.2584 | 2461.357221 | $0.0468 | $2.5786 | 38.64277921 | 2500 |
| 3b | 146 | 17:31:21 | 609.6000034 | 9.652000054 | 2500 | $0.0050 | $2.2634 | 2461.357221 | $0.0050 | $2.5836 | 38.64277921 | 2500 |
| 3b | 147 | 17:32:18 | 591.6189329 | 9.36729977 | 2500 | $0.0049 | $2.2683 | 2461.357221 | $0.0049 | $2.5885 | 38.64277921 | 2500 |
| 3b | 148 | 17:33:15 | 574.1663667 | 9.090967473 | 2500 | $0.0047 | $2.2730 | 2461.357221 | $0.0047 | $2.5932 | 38.64277921 | 2500 |
| 3b | 149 | 17:34:12 | 557.2268331 | 8.822758191 | 2500 | $0.0046 | $2.2776 | 2461.357221 | $0.0046 | $2.5978 | 38.64277921 | 2500 |
| 3b | 150 | 17:35:09 | 540.785311 | 8.562434091 | 2500 | $0.0045 | $2.2821 | 2461.357221 | $0.0045 | $2.6022 | 38.64277921 | 2500 |
| 3b | 151 | 17:36:06 | 524.8272172 | 8.309764272 | 2500 | $0.0043 | $2.2864 | 2461.357221 | $0.0043 | $2.6066 | 38.64277921 | 2500 |
| 3b | 152 | 17:37:03 | 509.3383936 | 8.064524565 | 2500 | $0.0042 | $2.2906 | 2461.357221 | $0.0042 | $2.6108 | 38.64277921 | 2500 |
| 3b | 153 | 17:38:00 | 494.3050949 | 7.826497336 | 2500 | $0.0041 | $2.2946 | 2461.357221 | $0.0041 | $2.6148 | 38.64277921 | 2500 |
| 3b | 154 | 17:38:57 | 479.7139766 | 7.595471296 | 2500 | $0.0039 | $2.2986 | 2461.357221 | $0.0039 | $2.6188 | 38.64277921 | 2500 |
| 3b | 155 | 17:39:54 | 465.5520833 | 7.371124132 | 2500 | $0.0038 | $2.3024 | 2461.357221 | $0.0038 | $2.6226 | 38.64277921 | 2500 |
| 3b | 156 | 17:40:51 | 451.8068378 | 7.153603264 | 2500 | $0.0037 | $2.3061 | 2461.357221 | $0.0037 | $2.6263 | 38.64277921 | 2500 |
| 3b | 157 | 17:41:48 | 438.4660293 | 6.943378797 | 2500 | $0.0036 | $2.3098 | 2461.357221 | $0.0036 | $2.6299 | 38.64277921 | 2500 |
| 3b | 158 | 17:42:45 | 425.5178038 | 6.737365226 | 2500 | $0.0035 | $2.3133 | 2461.357221 | $0.0035 | $2.6334 | 38.64277921 | 2500 |
| 3b | 159 | 17:43:42 | 412.9506529 | 6.538385337 | 2500 | $0.0034 | $2.3167 | 2461.357221 | $0.0034 | $2.6368 | 38.64277921 | 2500 |
| 3b | 160 | 17:44:39 | 400.7534041 | 6.345262232 | 2500 | $0.0033 | $2.3200 | 2461.357221 | $0.0033 | $2.6401 | 38.64277921 | 2500 |
| 3b | 161 | 17:45:36 | 388.9152113 | 6.157824418 | 2500 | $0.0032 | $2.3232 | 2461.357221 | $0.0032 | $2.6433 | 38.64277921 | 2500 |
| 3b | 162 | 17:46:33 | 377.4255449 | 5.975904446 | 2500 | $0.0031 | $2.3263 | 2461.357221 | $0.0031 | $2.6464 | 38.64277921 | 2500 |
| 3b | 163 | 17:47:30 | 366.2741825 | 5.799341223 | 2500 | $0.0030 | $2.3293 | 2461.357221 | $0.0030 | $2.6495 | 38.64277921 | 2500 |
| 3b | 164 | 17:48:27 | 355.4512007 | 5.627977344 | 2500 | $0.0029 | $2.3322 | 2461.357221 | $0.0029 | $2.6524 | 38.64277921 | 2500 |
| 3b | 165 | 17:49:24 | 344.9469656 | 5.461660288 | 2500 | $0.0028 | $2.3351 | 2461.357221 | $0.0028 | $2.6552 | 38.64277921 | 2500 |
| 3b | 166 | 17:50:21 | 334.7521249 | 5.300241977 | 2500 | $0.0028 | $2.3378 | 2461.357221 | $0.0028 | $2.6580 | 38.64277921 | 2500 |
| 3b | 167 | 17:51:18 | 324.8575994 | 5.143578657 | 2500 | $0.0027 | $2.3405 | 2461.357221 | $0.0027 | $2.6607 | 38.64277921 | 2500 |
| 3b | 168 | 17:52:15 | 315.2545754 | 4.991530778 | 2500 | $0.0026 | $2.3431 | 2461.357221 | $0.0026 | $2.6633 | 38.64277921 | 2500 |
| 3b | 169 | 17:53:12 | 305.9344967 | 4.843962865 | 2500 | $0.0025 | $2.3456 | 2461.357221 | $0.0025 | $2.6658 | 38.64277921 | 2500 |
| 3b | 170 | 17:54:09 | 296.8890571 | 4.700743404 | 2500 | $0.0024 | $2.3480 | 2461.357221 | $0.0024 | $2.6682 | 38.64277921 | 2500 |
| 3b | 171 | 17:55:06 | 288.1101933 | 4.561744728 | 2500 | $0.0024 | $2.3504 | 2461.357221 | $0.0024 | $2.6706 | 38.64277921 | 2500 |
| 3b | 172 | 17:56:03 | 279.5900778 | 4.426842899 | 2500 | $0.0023 | $2.3527 | 2461.357221 | $0.0023 | $2.6729 | 38.64277921 | 2500 |
| 3b | 173 | 17:57:00 | 271.3211119 | 4.295917605 | 2500 | $0.0022 | $2.3550 | 2461.357221 | $0.0022 | $2.6751 | 38.64277921 | 2500 |
| 3b | 174 | 17:57:57 | 263.2959192 | 4.168852053 | 2500 | $0.0022 | $2.3571 | 2461.357221 | $0.0022 | $2.6773 | 38.64277921 | 2500 |
| 3b | 175 | 17:58:54 | 255.507339 | 4.045532867 | 2500 | $0.0021 | $2.3592 | 2461.357221 | $0.0021 | $2.6794 | 38.64277921 | 2500 |
| 3b | 176 | 17:59:51 | 247.9484201 | 3.925849985 | 2500 | $0.0020 | $2.3613 | 2461.357221 | $0.0020 | $2.6814 | 38.64277921 | 2500 |
| 3b | 177 | 18:00:48 | 35.30915715 | 0.559061655 | 2500 | $0.0003 | $2.3616 | 2461.357221 | $0.0003 | $2.6817 | 38.64277921 | 2500 |
| 3b | 178 | 18:01:45 | 34.20574599 | 0.541590978 | 2500 | $0.0003 | $2.3618 | 2461.357221 | $0.0003 | $2.6820 | 38.64277921 | 2500 |
| 3b | 179 | 18:02:42 | 33.13681642 | 0.524666626 | 2500 | $0.0003 | $2.3621 | 2461.357221 | $0.0003 | $2.6823 | 38.64277921 | 2500 |
| 3b | 180 | 18:03:39 | 32.10129091 | 0.508270439 | 2500 | $0.0003 | $2.3624 | 2461.357221 | $0.0003 | $2.6825 | 38.64277921 | 2500 |
| 3b | 181 | 18:04:36 | 31.09812557 | 0.492386988 | 2500 | $0.0003 | $2.3626 | 2461.357221 | $0.0003 | $2.6828 | 38.64277921 | 2500 |

Fig. 29E

| | | | | | | | | | | | |
|---|---|---|---|---|---|---|---|---|---|---|---|
| 182 | 3b | 18:05:33 | 30.12630915 | 0.476999895 | 2500 | $0.0002 | $2.3629 | 2461.357221 | $0.0002 | $2.6831 | 38.64277921 | 2500 |
| 183 | 3b | 18:06:30 | 29.18486198 | 0.462093648 | 2500 | $0.0002 | $2.3631 | 2461.357221 | $0.0002 | $2.6833 | 38.64277921 | 2500 |
| 184 | 3b | 18:07:27 | 28.27283505 | 0.447653222 | 2500 | $0.0002 | $2.3634 | 2461.357221 | $0.0002 | $2.6835 | 38.64277921 | 2500 |
| 185 | 3b | 18:08:24 | 27.38930895 | 0.433664058 | 2500 | $0.0002 | $2.3636 | 2461.357221 | $0.0002 | $2.6838 | 38.64277921 | 2500 |
| 186 | 3b | 18:09:21 | 26.53339305 | 0.420112057 | 2500 | $0.0002 | $2.3638 | 2461.357221 | $0.0002 | $2.6840 | 38.64277921 | 2500 |
| 187 | 3b | 18:10:18 | 25.70422451 | 0.406983555 | 2500 | $0.0002 | $2.3640 | 2461.357221 | $0.0002 | $2.6842 | 38.64277921 | 2500 |
| 188 | 3b | 18:11:15 | 24.9009675 | 0.394265319 | 2500 | $0.0002 | $2.3642 | 2461.357221 | $0.0002 | $2.6844 | 38.64277921 | 2500 |
| 189 | 3b | 18:12:12 | 24.12281226 | 0.381944528 | 2500 | $0.0002 | $2.3644 | 2461.357221 | $0.0002 | $2.6846 | 38.64277921 | 2500 |
| 190 | 3b | 18:13:09 | 23.36897438 | 0.370008761 | 2500 | $0.0002 | $2.3646 | 2461.357221 | $0.0002 | $2.6848 | 38.64277921 | 2500 |
| 191 | 3b | 18:14:06 | 22.63869393 | 0.358445987 | 2500 | $0.0002 | $2.3648 | 2461.357221 | $0.0002 | $2.6850 | 38.64277921 | 2500 |
| 192 | 3b | 18:15:03 | 21.93123475 | 0.347244455 | 2500 | $0.0002 | $2.3650 | 2461.357221 | $0.0002 | $2.6851 | 38.64277921 | 2500 |
| 193 | 3b | 18:16:00 | 21.24588366 | 0.336393158 | 2500 | $0.0002 | $2.3651 | 2461.357221 | $0.0002 | $2.6853 | 38.64277921 | 2500 |
| 194 | 3b | 18:16:57 | 20.5819498 | 0.325880872 | 2500 | $0.0002 | $2.3653 | 2461.357221 | $0.0002 | $2.6855 | 38.64277921 | 2500 |
| 195 | 3b | 18:17:54 | 19.93876386 | 0.315697095 | 2500 | $0.0002 | $2.3655 | 2461.357221 | $0.0002 | $2.6857 | 38.64277921 | 2500 |
| 196 | 3b | 18:18:51 | 19.31567749 | 0.305831156 | 2500 | $0.0002 | $2.3656 | 2461.357221 | $0.0002 | $2.6858 | 38.64277921 | 2500 |
| 197 | 3b | 18:19:48 | 18.71206257 | 0.296274324 | 2500 | $0.0002 | $2.3658 | 2461.357221 | $0.0002 | $2.6860 | 38.64277921 | 2500 |
| 198 | 3b | 18:20:45 | 18.12731062 | 0.287015751 | 2500 | $0.0001 | $2.3659 | 2461.357221 | $0.0001 | $2.6861 | 38.64277921 | 2500 |
| 199 | 3b | 18:21:42 | 17.56083216 | 0.278046509 | 2500 | $0.0001 | $2.3661 | 2461.357221 | $0.0001 | $2.6863 | 38.64277921 | 2500 |
| 200 | 3b | 18:22:39 | 17.01205616 | 0.269357556 | 2500 | $0.0001 | $2.3662 | 2461.357221 | $0.0001 | $2.6864 | 38.64277921 | 2500 |
| 201 | 3b | 18:23:36 | 16.4804294 | 0.260940132 | 2500 | $0.0001 | $2.3664 | 2461.357221 | $0.0001 | $2.6865 | 38.64277921 | 2500 |
| 202 | 3b | 18:24:33 | 15.96541598 | 0.252785753 | 2500 | $0.0001 | $2.3665 | 2461.357221 | $0.0001 | $2.6867 | 38.64277921 | 2500 |
| 203 | 3b | 18:25:30 | 15.46649673 | 0.244886198 | 2500 | $0.0001 | $2.3666 | 2461.357221 | $0.0001 | $2.6868 | 38.64277921 | 2500 |
| 204 | 3b | 18:26:27 | 14.98316871 | 0.237233505 | 2500 | $0.0001 | $2.3667 | 2461.357221 | $0.0001 | $2.6869 | 38.64277921 | 2500 |
| 205 | 3b | 18:27:24 | 14.51494469 | 0.229819958 | 2500 | $0.0001 | $2.3669 | 2461.357221 | $0.0001 | $2.6870 | 38.64277921 | 2500 |
| 206 | 3b | 18:28:21 | 14.06135267 | 0.222638084 | 2500 | $0.0001 | $2.3670 | 2461.357221 | $0.0001 | $2.6872 | 38.64277921 | 2500 |
| 207 | 3b | 18:29:18 | 13.62193539 | 0.215680644 | 2500 | $0.0001 | $2.3671 | 2461.357221 | $0.0001 | $2.6873 | 38.64277921 | 2500 |
| 208 | 3b | 18:30:15 | 0 | 0 | 2500 | $0.0000 | $2.3671 | 2461.357221 | $0.0000 | $2.6873 | 38.64277921 | 2500 |
| 209 | 3b | 18:31:12 | 0 | 0 | 2500 | $0.0000 | $2.3671 | 2461.357221 | $0.0000 | $2.6873 | 38.64277921 | 2500 |
| 210 | 3b | 18:32:09 | 0 | 0 | 2500 | $0.0000 | $2.3671 | 2461.357221 | $0.0000 | $2.6873 | 38.64277921 | 2500 |
| 211 | 3b | 18:33:06 | 0 | 0 | 2500 | $0.0000 | $2.3671 | 2461.357221 | $0.0000 | $2.6873 | 38.64277921 | 2500 |
| 212 | 3b | 18:34:03 | 0 | 0 | 2500 | $0.0000 | $2.3671 | 2461.357221 | $0.0000 | $2.6873 | 38.64277921 | 2500 |
| 213 | 3b | 18:35:00 | 0 | 0 | 2500 | $0.0000 | $2.3671 | 2461.357221 | $0.0000 | $2.6873 | 38.64277921 | 2500 |
| 214 | 3b | 18:35:57 | 0 | 0 | 2500 | $0.0000 | $2.3671 | 2461.357221 | $0.0000 | $2.6873 | 38.64277921 | 2500 |
| 215 | 3b | 18:36:54 | 0 | 0 | 2500 | $0.0000 | $2.3671 | 2461.357221 | $0.0000 | $2.6873 | 38.64277921 | 2500 |
| 216 | 3b | 18:37:51 | 0 | 0 | 2500 | $0.0000 | $2.3671 | 2461.357221 | $0.0000 | $2.6873 | 38.64277921 | 2500 |
| 217 | 3b | 18:38:48 | 0 | 0 | 2500 | $0.0000 | $2.3671 | 2461.357221 | $0.0000 | $2.6873 | 38.64277921 | 2500 |
| 218 | 3b | 18:39:45 | 0 | 0 | 2500 | $0.0000 | $2.3671 | 2461.357221 | $0.0000 | $2.6873 | 38.64277921 | 2500 |
| 219 | 3b | 18:40:42 | 0 | 0 | 2500 | $0.0000 | $2.3671 | 2461.357221 | $0.0000 | $2.6873 | 38.64277921 | 2500 |
| 220 | 3b | 18:41:39 | 0 | 0 | 2500 | $0.0000 | $2.3671 | 2461.357221 | $0.0000 | $2.6873 | 38.64277921 | 2500 |
| 221 | 3b | 18:42:36 | 0 | 0 | 2500 | $0.0000 | $2.3671 | 2461.357221 | $0.0000 | $2.6873 | 38.64277921 | 2500 |
| 222 | 3b | 18:43:33 | 0 | 0 | 2500 | $0.0000 | $2.3671 | 2461.357221 | $0.0000 | $2.6873 | 38.64277921 | 2500 |
| 223 | 3b | 18:44:30 | 0 | 0 | 2500 | $0.0000 | $2.3671 | 2461.357221 | $0.0000 | $2.6873 | 38.64277921 | 2500 |
| 224 | 3b | 18:45:27 | 0 | 0 | 2500 | $0.0000 | $2.3671 | 2461.357221 | $0.0000 | $2.6873 | 38.64277921 | 2500 |
| 225 | 3b | 18:46:24 | 0 | 0 | 2500 | $0.0000 | $2.3671 | 2461.357221 | $0.0000 | $2.6873 | 38.64277921 | 2500 |
| 226 | 3b | 18:47:21 | 0 | 0 | 2500 | $0.0000 | $2.3671 | 2461.357221 | $0.0000 | $2.6873 | 38.64277921 | 2500 |
| 227 | 3b | 18:48:18 | 0 | 0 | 2500 | $0.0000 | $2.3671 | 2461.357221 | $0.0000 | $2.6873 | 38.64277921 | 2500 |
| 228 | 3b | 18:49:15 | 0 | 0 | 2500 | $0.0000 | $2.3671 | 2461.357221 | $0.0000 | $2.6873 | 38.64277921 | 2500 |
| 229 | 3b | 18:50:12 | 0 | 0 | 2500 | $0.0000 | $2.3671 | 2461.357221 | $0.0000 | $2.6873 | 38.64277921 | 2500 |
| 230 | 3b | 18:51:09 | 0 | 0 | 2500 | $0.0000 | $2.3671 | 2461.357221 | $0.0000 | $2.6873 | 38.64277921 | 2500 |

Fig. 29F

| | | | | | | | | | | |
|---|---|---|---|---|---|---|---|---|---|---|
| 3b | 231 | 18:52:06 | 0 | 0 | 2500 | $0.0000 | $2.3671 | 2461.357221 | $0.0000 | $2.6873 | 38.64277921 | 2500 |
| 3b | 232 | 18:53:03 | 0 | 0 | 2500 | $0.0000 | $2.3671 | 2461.357221 | $0.0000 | $2.6873 | 38.64277921 | 2500 |
| 3b | 233 | 18:54:00 | 0 | 0 | 2500 | $0.0000 | $2.3671 | 2461.357221 | $0.0000 | $2.6873 | 38.64277921 | 2500 |
| 3b | 234 | 18:54:57 | 0 | 0 | 2500 | $0.0000 | $2.3671 | 2461.357221 | $0.0000 | $2.6873 | 38.64277921 | 2500 |
| 3b | 235 | 18:55:54 | 0 | 0 | 2500 | $0.0000 | $2.3671 | 2461.357221 | $0.0000 | $2.6873 | 38.64277921 | 2500 |
| 3b | 236 | 18:56:51 | 0 | 0 | 2500 | $0.0000 | $2.3671 | 2461.357221 | $0.0000 | $2.6873 | 38.64277921 | 2500 |
| 3b | 237 | 18:57:48 | 0 | 0 | 2500 | $0.0000 | $2.3671 | 2461.357221 | $0.0000 | $2.6873 | 38.64277921 | 2500 |
| 3b | 238 | 18:58:45 | 0 | 0 | 2500 | $0.0000 | $2.3671 | 2461.357221 | $0.0000 | $2.6873 | 38.64277921 | 2500 |
| 3b | 239 | 18:59:42 | 0 | 0 | 2500 | $0.0000 | $2.3671 | 2461.357221 | $0.0000 | $2.6873 | 38.64277921 | 2500 |
| 3b | 240 | 19:00:39 | 0 | 0 | 2500 | $0.0000 | $2.3671 | 2461.357221 | $0.0000 | $2.6873 | 38.64277921 | 2500 |
| 3b | 241 | 19:01:36 | 0 | 0 | 2500 | $0.0000 | $2.3671 | 2461.357221 | $0.0000 | $2.6873 | 38.64277921 | 2500 |
| 3b | 242 | 19:02:33 | 0 | 0 | 2500 | $0.0000 | $2.3671 | 2461.357221 | $0.0000 | $2.6873 | 38.64277921 | 2500 |
| 3b | 243 | 19:03:30 | 0 | 0 | 2500 | $0.0000 | $2.3671 | 2461.357221 | $0.0000 | $2.6873 | 38.64277921 | 2500 |
| 3b | 244 | 19:04:27 | 0 | 0 | 2500 | $0.0000 | $2.3671 | 2461.357221 | $0.0000 | $2.6873 | 38.64277921 | 2500 |
| 3b | 245 | 19:05:24 | 0 | 0 | 2500 | $0.0000 | $2.3671 | 2461.357221 | $0.0000 | $2.6873 | 38.64277921 | 2500 |
| 3b | 246 | 19:06:21 | 0 | 0 | 2500 | $0.0000 | $2.3671 | 2461.357221 | $0.0000 | $2.6873 | 38.64277921 | 2500 |
| 3b | 247 | 19:07:18 | 0 | 0 | 2500 | $0.0000 | $2.3671 | 2461.357221 | $0.0000 | $2.6873 | 38.64277921 | 2500 |
| 3b | 248 | 19:08:15 | 0 | 0 | 2500 | $0.0000 | $2.3671 | 2461.357221 | $0.0000 | $2.6873 | 38.64277921 | 2500 |
| 3b | 249 | 19:09:12 | 0 | 0 | 2500 | $0.0000 | $2.3671 | 2461.357221 | $0.0000 | $2.6873 | 38.64277921 | 2500 |
| 3b | 250 | 19:10:09 | 0 | 0 | 2500 | $0.0000 | $2.3671 | 2461.357221 | $0.0000 | $2.6873 | 38.64277921 | 2500 |
| 3b | 251 | 19:11:06 | 0 | 0 | 2500 | $0.0000 | $2.3671 | 2461.357221 | $0.0000 | $2.6873 | 38.64277921 | 2500 |
| 3b | 252 | 19:12:03 | 0 | 0 | 2500 | $0.0000 | $2.3671 | 2461.357221 | $0.0000 | $2.6873 | 38.64277921 | 2500 |
| 3b | 253 | 19:13:00 | 0 | 0 | 2500 | $0.0000 | $2.3671 | 2461.357221 | $0.0000 | $2.6873 | 38.64277921 | 2500 |
| 3b | 254 | 19:13:57 | 0 | 0 | 2500 | $0.0000 | $2.3671 | 2461.357221 | $0.0000 | $2.6873 | 38.64277921 | 2500 |
| 3b | 255 | 19:14:54 | 0 | 0 | 2500 | $0.0000 | $2.3671 | 2461.357221 | $0.0000 | $2.6873 | 38.64277921 | 2500 |
| 3b | 256 | 19:15:51 | 0 | 0 | 2500 | $0.0000 | $2.3671 | 2461.357221 | $0.0000 | $2.6873 | 38.64277921 | 2500 |
| 3b | 257 | 19:16:48 | 0 | 0 | 2500 | $0.0000 | $2.3671 | 2461.357221 | $0.0000 | $2.6873 | 38.64277921 | 2500 |
| 3b | 258 | 19:17:45 | 0 | 0 | 2500 | $0.0000 | $2.3671 | 2461.357221 | $0.0000 | $2.6873 | 38.64277921 | 2500 |
| 3b | 259 | 19:18:42 | 0 | 0 | 2500 | $0.0000 | $2.3671 | 2461.357221 | $0.0000 | $2.6873 | 38.64277921 | 2500 |
| 3b | 260 | 19:19:39 | 0 | 0 | 2500 | $0.0000 | $2.3671 | 2461.357221 | $0.0000 | $2.6873 | 38.64277921 | 2500 |
| 3b | 261 | 19:20:36 | 0 | 0 | 2500 | $0.0000 | $2.3671 | 2461.357221 | $0.0000 | $2.6873 | 38.64277921 | 2500 |
| 3b | 262 | 19:21:33 | 0 | 0 | 2500 | $0.0000 | $2.3671 | 2461.357221 | $0.0000 | $2.6873 | 38.64277921 | 2500 |
| 3b | 263 | 19:22:30 | 0 | 0 | 2500 | $0.0000 | $2.3671 | 2461.357221 | $0.0000 | $2.6873 | 38.64277921 | 2500 |
| 3b | 264 | 19:23:27 | 0 | 0 | 2500 | $0.0000 | $2.3671 | 2461.357221 | $0.0000 | $2.6873 | 38.64277921 | 2500 |
| 3b | 265 | 19:24:24 | 0 | 0 | 2500 | $0.0000 | $2.3671 | 2461.357221 | $0.0000 | $2.6873 | 38.64277921 | 2500 |
| 3b | 266 | 19:25:21 | 0 | 0 | 2500 | $0.0000 | $2.3671 | 2461.357221 | $0.0000 | $2.6873 | 38.64277921 | 2500 |
| 3b | 267 | 19:26:18 | 0 | 0 | 2500 | $0.0000 | $2.3671 | 2461.357221 | $0.0000 | $2.6873 | 38.64277921 | 2500 |
| 3b | 268 | 19:27:15 | 0 | 0 | 2500 | $0.0000 | $2.3671 | 2461.357221 | $0.0000 | $2.6873 | 38.64277921 | 2500 |
| 3b | 269 | 19:28:12 | 0 | 0 | 2500 | $0.0000 | $2.3671 | 2461.357221 | $0.0000 | $2.6873 | 38.64277921 | 2500 |
| 3b | 270 | 19:29:09 | 0 | 0 | 2500 | $0.0000 | $2.3671 | 2461.357221 | $0.0000 | $2.6873 | 38.64277921 | 2500 |
| 3b | 271 | 19:30:06 | 0 | 0 | 2500 | $0.0000 | $2.3671 | 2461.357221 | $0.0000 | $2.6873 | 38.64277921 | 2500 |
| 3b | 272 | 19:31:03 | 0 | 0 | 2500 | $0.0000 | $2.3671 | 2461.357221 | $0.0000 | $2.6873 | 38.64277921 | 2500 |
| 3b | 273 | 19:32:00 | 0 | 0 | 2500 | $0.0000 | $2.3671 | 2461.357221 | $0.0000 | $2.6873 | 38.64277921 | 2500 |
| 3b | 274 | 19:32:57 | 0 | 0 | 2500 | $0.0000 | $2.3671 | 2461.357221 | $0.0000 | $2.6873 | 38.64277921 | 2500 |
| 3b | 275 | 19:33:54 | 0 | 0 | 2500 | $0.0000 | $2.3671 | 2461.357221 | $0.0000 | $2.6873 | 38.64277921 | 2500 |
| 3b | 276 | 19:34:51 | 0 | 0 | 2500 | $0.0000 | $2.3671 | 2461.357221 | $0.0000 | $2.6873 | 38.64277921 | 2500 |
| 3b | 277 | 19:35:48 | 0 | 0 | 2500 | $0.0000 | $2.3671 | 2461.357221 | $0.0000 | $2.6873 | 38.64277921 | 2500 |
| 3b | 278 | 19:36:45 | 0 | 0 | 2500 | $0.0000 | $2.3671 | 2461.357221 | $0.0000 | $2.6873 | 38.64277921 | 2500 |
| 3b | 279 | 19:37:42 | 0 | 0 | 2500 | $0.0000 | $2.3671 | 2461.357221 | $0.0000 | $2.6873 | 38.64277921 | 2500 |

Fig. 29G

| | | | | | | | | | | |
|---|---|---|---|---|---|---|---|---|---|---|
| 3b | 280 | 19:38:39 | 0 | 0 | 2500 | $0.0000 | $2.3671 | 2461.357221 | $0.0000 | $2.6873 | 38.64277921 | 2500 |
| 3b | 281 | 19:39:36 | 0 | 0 | 2500 | $0.0000 | $2.3671 | 2461.357221 | $0.0000 | $2.6873 | 38.64277921 | 2500 |
| 3b | 282 | 19:40:33 | 0 | 0 | 2500 | $0.0000 | $2.3671 | 2461.357221 | $0.0000 | $2.6873 | 38.64277921 | 2500 |
| 3b | 283 | 19:41:30 | 0 | 0 | 2500 | $0.0000 | $2.3671 | 2461.357221 | $0.0000 | $2.6873 | 38.64277921 | 2500 |
| 4 | 284 | 19:42:27 discharge remainder time | 0 | 0 | 2500 | $0.0000 | $2.3671 | 2461.357221 | $0.0000 | $2.6873 | 38.64277921 | 2500 |
| 4 | 285 | 19:43:24 | 0 | 0 | 2500 | $0.0000 | $2.3671 | 2361.357221 | $0.0520 | $2.7393 | 138.6427792 | 2500 |
| 4 | 286 | 19:44:21 | 0 | 0 | 2500 | $0.0000 | $2.3671 | 2261.357221 | $0.0520 | $2.7913 | 238.6427792 | 2500 |
| 4 | 287 | 19:45:18 | 0 | 0 | 2500 | $0.0000 | $2.3671 | 2161.357221 | $0.0520 | $2.8433 | 338.6427792 | 2500 |
| 4 | 288 | 19:46:15 | 0 | 0 | 2500 | $0.0000 | $2.3671 | 2061.357221 | $0.0520 | $2.8953 | 438.6427792 | 2500 |
| 4 | 289 | 19:47:12 | 0 | 0 | 2500 | $0.0000 | $2.3671 | 1961.357221 | $0.0520 | $2.9473 | 538.6427792 | 2500 |
| 4 | 290 | 19:48:09 | 0 | 0 | 2500 | $0.0000 | $2.3671 | 1861.357221 | $0.0520 | $2.9993 | 638.6427792 | 2500 |
| 4 | 291 | 19:49:06 | 0 | 0 | 2500 | $0.0000 | $2.3671 | 1761.357221 | $0.0520 | $3.0513 | 738.6427792 | 2500 |
| 4 | 292 | 19:50:03 | 0 | 0 | 2500 | $0.0000 | $2.3671 | 1661.357221 | $0.0520 | $3.1033 | 838.6427792 | 2500 |
| 4 | 293 | 19:51:00 | 0 | 0 | 2500 | $0.0000 | $2.3671 | 1561.357221 | $0.0520 | $3.1553 | 938.6427792 | 2500 |
| 4 | 294 | 19:51:57 | 0 | 0 | 2500 | $0.0000 | $2.3671 | 1461.357221 | $0.0520 | $3.2073 | 1038.642779 | 2500 |
| 4 | 295 | 19:52:54 | 0 | 0 | 2500 | $0.0000 | $2.3671 | 1361.357221 | $0.0520 | $3.2593 | 1138.642779 | 2500 |
| 4 | 296 | 19:53:51 | 0 | 0 | 2500 | $0.0000 | $2.3671 | 1261.357221 | $0.0520 | $3.3113 | 1238.642779 | 2500 |
| 4 | 297 | 19:54:48 | 0 | 0 | 2500 | $0.0000 | $2.3671 | 1161.357221 | $0.0520 | $3.3633 | 1338.642779 | 2500 |
| 4 | 298 | 19:55:45 | 0 | 0 | 2500 | $0.0000 | $2.3671 | 1061.357221 | $0.0520 | $3.4153 | 1438.642779 | 2500 |
| 4 | 299 | 19:56:42 | 0 | 0 | 2500 | $0.0000 | $2.3671 | 961.3572208 | $0.0520 | $3.4673 | 1538.642779 | 2500 |
| 4 | 300 | 19:57:39 | 0 | 0 | 2500 | $0.0000 | $2.3671 | 861.3572208 | $0.0520 | $3.5193 | 1638.642779 | 2500 |
| 4 | 301 | 19:58:36 | 0 | 0 | 2500 | $0.0000 | $2.3671 | 761.3572208 | $0.0520 | $3.5713 | 1738.642779 | 2500 |
| 4 | 302 | 19:59:33 | 0 | 0 | 2500 | $0.0000 | $2.3671 | 661.3572208 | $0.0520 | $3.6233 | 1838.642779 | 2500 |
| 5 | 303 | 20:00:30 end of peak | 0 | 0 | 2500 | $0.0000 | $2.3671 | 561.3572208 | $0.0520 | $3.6753 | 1938.642779 | 2500 |
| 5 | 304 | 20:01:27 | 0 | 0 | 2500 | $0.0000 | $2.3671 | 661.3572208 | $0.0260 | $3.6493 | 1838.642779 | 2500 |
| 5 | 305 | 20:02:24 | 0 | 0 | 2500 | $0.0000 | $2.3671 | 761.3572208 | -$0.0260 | $3.6233 | 1738.642779 | 2500 |
| 5 | 306 | 20:03:21 | 0 | 0 | 2500 | $0.0000 | $2.3671 | 861.3572208 | -$0.0260 | $3.5973 | 1638.642779 | 2500 |
| 5 | 307 | 20:04:18 | 0 | 0 | 2500 | $0.0000 | $2.3671 | 961.3572208 | -$0.0260 | $3.5713 | 1538.642779 | 2500 |
| 5 | 308 | 20:05:15 | 0 | 0 | 2500 | $0.0000 | $2.3671 | 1061.357221 | -$0.0260 | $3.5453 | 1438.642779 | 2500 |
| 5 | 309 | 20:06:12 | 0 | 0 | 2500 | $0.0000 | $2.3671 | 1161.357221 | -$0.0260 | $3.5193 | 1338.642779 | 2500 |
| 5 | 310 | 20:07:09 | 0 | 0 | 2500 | $0.0000 | $2.3671 | 1261.357221 | -$0.0260 | $3.4933 | 1238.642779 | 2500 |
| 5 | 311 | 20:08:06 | 0 | 0 | 2500 | $0.0000 | $2.3671 | 1361.357221 | -$0.0260 | $3.4673 | 1138.642779 | 2500 |
| 5 | 312 | 20:09:03 | 0 | 0 | 2500 | $0.0000 | $2.3671 | 1461.357221 | -$0.0260 | $3.4413 | 1038.642779 | 2500 |
| 5 | 313 | 20:10:00 | 0 | 0 | 2500 | $0.0000 | $2.3671 | 1561.357221 | -$0.0260 | $3.4153 | 938.6427792 | 2500 |
| 5 | 314 | 20:10:57 | 0 | 0 | 2500 | $0.0000 | $2.3671 | 1661.357221 | -$0.0260 | $3.3893 | 838.6427792 | 2500 |
| 5 | 315 | 20:11:54 | 0 | 0 | 2500 | $0.0000 | $2.3671 | 1761.357221 | -$0.0260 | $3.3633 | 738.6427792 | 2500 |
| 5 | 316 | 20:12:51 | 0 | 0 | 2500 | $0.0000 | $2.3671 | 1861.357221 | -$0.0260 | $3.3373 | 638.6427792 | 2500 |
| 5 | 317 | 20:13:48 | 0 | 0 | 2500 | $0.0000 | $2.3671 | 1961.357221 | -$0.0260 | $3.3113 | 538.6427792 | 2500 |
| 5 | 318 | 20:14:45 | 0 | 0 | 2500 | $0.0000 | $2.3671 | 2061.357221 | -$0.0260 | $3.2853 | 438.6427792 | 2500 |
| 5 | 319 | 20:15:42 | 0 | 0 | 2500 | $0.0000 | $2.3671 | 2161.357221 | -$0.0260 | $3.2593 | 338.6427792 | 2500 |
| 5 | 320 | 20:16:39 | 0 | 0 | 2500 | $0.0000 | $2.3671 | 2261.357221 | -$0.0260 | $3.2333 | 238.6427792 | 2500 |
| 5 | 321 | 20:17:36 | 0 | 0 | 2500 | $0.0000 | $2.3671 | 2361.357221 | -$0.0260 | $3.2073 | 138.6427792 | 2500 |
| 5 | 322 | 20:18:33 end of grid load int | 0 | 0 | 2500 | $0.0000 | $2.3671 | 2461.357221 | -$0.0260 | $3.1813 | 38.64277921 | 2500 |
| | | | | | | | | Sum of Slices (Numeric integral of deviation) | | | 157,624.530 | 655,000 |
| | | | | | | | | Sum of slices (Total Numeric integral of theoretical maximum deviation) | | | | |
| | | | | | | | | % deviation of state of charge over interval (numerical integral of deviation/theoretical maximum) | | | 24.065% | |

| | seconds in peak time | 10800 |
|---|---|---|
| | number of intervals | 188 |
| | seconds per interval | 57.446809 |
| | time per interval | 12:00 AM |

| TOU | Summer Rates | | Winter Rates | |
| --- | --- | --- | --- | --- |
| | Weekdays | Weekend | Weekdays | Weekend |
| 8am-5pm | $.26 | $.26 | $.24 | $.24 |
| 5pm-8pm | $.52 | $.39 | $.42 | $.42 |
| 8pm-8am | $.26 | $.26 | $.28 | $.28 |

ENERGY STORAGE DEVICE MANGER, MANAGEMENT SYSTEM, AND METHODS OF USE

TECHNICAL FIELD

The present invention relates to the management of the state of charge of an energy storage device.

SUMMARY OF THE INVENTION

Among the embodiments of the present invention, the invention provides a battery manager, a system comprising the battery manager, a method of using the battery manager, a method of managing a charge state of a battery, and a computer-readable medium that causes the computer to function as the battery manager.

A first aspect of the invention provides a battery manager comprising a controller configured to control one or more switches based on one or more parameters.

The one or more switches can include one or more energy source switches that each connect a respective energy source to an energy storage device and/or one or more load switches that each connect a respective load or loads to the energy storage device. The one or more switches include a first switch that connects an energy storage device to a first energy source and/or a second switch that connects the energy storage device to a first load. The one more switches can additionally include a third switch connecting the energy storage device to a second energy source and/or a fourth switch that connects the energy storage device to a second load. Accordingly, the one or more switches can optionally include a single energy source switch or an array of energy source switches and/or a single load switch or an array of load switches.

The parameters can include parameters provided, for example, by user input, sensor input, and/or determinations made based on forecast data (e.g. power prediction or weather forecast data), as well as other parameters taught herein.

Accordingly, the battery manager can change the present state of charge of the energy storage device by obtaining one or more parameters and controlling the one or more switches based on the one or more parameters.

Optionally, controlling the one or more switches based on the one or more parameters comprises obtaining a time of need (e.g. an arrival time corresponding to an arrival of a user to the location of the energy storage device), determining a charge start time that precedes the time of need, and turning on an energy source switch and/or turning off a load switch at the charge start time. Optionally, the charge start time is determined based on forecast data. For example, the determined charge start time can be the latest time for which the controller determines that charging from the one or more energy sources can be started to obtain a target state of charge (e.g. full charge) on the energy storage device by the time of need. Optionally, the duration of charging time from the charge start time to the time of need is determined based on forecast data which comprises a predicted power production ('power prediction') for a respective energy source of the one or more energy sources. Optionally, the power prediction is determined based on weather forecast data using a correlation of weather forecast values to power production for the respective energy source.

Optionally, the time of need is a parameter received by user input (e.g. the user inputting an arrival time). Alternatively, the time of need is a determined parameter. For example, the time of need can be determined as a future time at which a severe weather alert exists in the weather forecast data. As another example, the time of need is determined as the time (e.g. the earliest time) at which a wind speed forecast value exceeds a user specified parameter (e.g. maximum wind speed). As another example, the time of need can be determined as the time (e.g. earliest time) at which the total amount of precipitation over a time window exceeds a user specified parameter (e.g. maximum precipitation in a specified period of time such as 24 hours).

Optionally, the controller is configured to operate in a plurality of modes from which the controller can be selected between or switched between, wherein the plurality of modes target different states of charge of the energy storage device and/or modulate the state of charge by differentially controlling switches, wherein the controller can control one more energy source switches and/or load switches to change the charge state of the energy storage device to obtain the target charge state of the respective mode. For example, the plurality of modes can comprise a first charge mode, a second charge mode, and optionally a third charge mode.

Optionally the first charge mode is a maintain mode that targets a state of charge of the energy storage device that provides maximum longevity of the energy storage device. For example, optionally, the energy storage device comprises a lithium-ion battery, and the maintain mode targets (e.g. obtains and holds) a charge state of about 50%, or charge state range of, for example from 40% to 60% or from 20% to 80% (e.g. relative to an absolute full state of charge). Optionally, the maintain mode sends excess energy to a load (e.g. power grid) to maintain the energy storage device at a nominal state of charge.

Optionally, the second charge mode is preparation mode configured to prepare the energy storage device or the system for use by a user (e.g. to power a load such as a load panel), e.g. by targeting a higher state of charge than the maintain mode (e.g. full charge). The controller can optionally be configured to switch from the maintain mode to the preparation mode (e.g. at a charge start time). The preparation mode can be executed as a transitional mode between the first charge mode (maintain mode) and a third charge mode (in-use mode), for example a transitional charging mode that raises the state of charge from a lower charge state targeted by the maintain mode to a higher charge state as preparation for use of the energy storage device to drive a load.

Optionally, the third charge mode is an in-use mode (e.g. an in-use mode switched to when the controller is running in preparation mode) that is configured to allow the user to power one or more loads, such as a load that is turned off (or not turned on) in preparation mode. The in-use mode can be configured to target a high state of charge (e.g. the same state of charge targeted by the preparation mode) and turn on a switch connecting the energy source to a first load (e.g. a switch that is turned off in the preparation mode while charging the energy source) and allow the switch to the first load to remain on even when the present state of charge is less than the target state of charge of the in-use mode. The in-use mode can optionally target a state of the energy storage device that provides maximum utility of the system, e.g. a charge state equal to the usable energy capacity of the energy storage device or a state of charge at or near the absolute full state of charge of the system, or a charge state specified by the user (e.g. as a percentage of absolute full state of charge or usable energy capacity).

Optionally, the preparation mode targets a state of charge below the absolute full state of charge. Optionally, the target state of charge is determined as a state of charge below the absolute full state of charge that will meet a predicted energy requirement for the duration of a scheduled in-use period (e.g. a period starting at a time of need (e.g. arrival time) and ending with a time of cessation of need time (e.g. leave time). Optionally, the predicted energy requirement is determined based on historical energy use data (e.g. of the system or of a specified user of the system) and/or forecasted power production by an energy source.

Optionally, the preparation mode is configured for charging the system at the maximum rate that can be provided by an energy source (e.g. turning on the respective one or more energy source switches and turning off the one or more load switches).

Optionally, the preparation mode turns off (and/or does not turn on) a load switch (e.g. to a first load such a load panel) that is turned on (or kept on) by the third charge mode (in-use mode).

Optionally, the in-use mode turns off (and/or does not turn on) a load switch (e.g. to a second load) that the maintain mode turns on in order to reduce the present state of charge to the target of the maintain mode.

Optionally, the preparation mode and the in-use mode target the same state of charge (e.g. usable energy capacity defined by user input).

Optionally, the controller is configured to execute the preparation mode when a charge start time is reached, e.g. as determined by 'charge start determining module', wherein the controller, responsive to executing the preparation mode, turns on one or more energy sources and/or turns off one or more loads in order to raise the present state of charge. Optionally, the controller is figured to execute in-use mode when a time of need is reached or when the controller receives user input to cause execution of the in-use mode, e.g. wherein the controller, responsive to executing the in-use mode, turns on one or more loads. Optionally, the controller is configured to execute the first charge mode (maintain mode) when a cessation (i.e. end) of time of need (e.g. leave time or a parameter of time received by user input, indicating when the user will no longer need to drive loads from the battery, such as notification that the user is leaving the domicile) is reached or when the controller receives user input to cause execution of the maintain mode.

In one embodiment, the present invention is a battery management system, comprising a battery manager of the present invention and one or more (e.g. each) of the following components: at least one load and a respective load switch, at least one energy source and a respective energy source switch, and at least one energy storage device.

Optionally, the battery manager or the battery management system is connected to grid power. For example, the grid power can be connected, via a first controllable switch, to the energy storage device, and optionally, a second energy source (e.g. wind energy source or solar) can be connected, via a second controllable switch, to the energy storage device. The battery manager can be configured to turn on at least the first switch to the grid power when an obtained weather forecast is determined to include an event that is catastrophic to grid power (e.g. wind speed forecast exceeding a specified threshold), or set a charge start time to turn on the first switch based on a forecasted power prediction of grid power such that the time of the forecasted catastrophic event is set as a time of need (e.g. to bring the energy storage device to a target state of charge by the time of the catastrophic event).

Optionally, the system is connected to one or more renewable power sources (e.g. wind, hydraulic, or solar).

Optionally, a charge start time-determining module is configured to prioritize and select an energy source from a plurality of energy sources which can charge the energy storage device, for example, wherein the priority is determined based on one or more factors, (e.g., cost, rate of charge, environmental friendliness, availability of energy source, or dependability of energy source), and determine a charge start time for each of the plurality of energy sources based on the priority and forecasted power prediction of the energy sources. For example, the charge start time-determining module can determine whether a higher priority energy source is predicted to be able to charge the energy source by the time of need and, if the higher priority energy source is determined not to be able to charge the energy source by the time of need, determining whether the combination of the higher priority energy source and lower priority energy source predicted to be able to charge the energy source by the time of need.

Optionally, the maintain mode comprises a grid mode. In the grid mode, the controller is configured to discharge energy stored in the energy storage device to a load (e.g. a first load bus or a second load bus). Optionally, in the grid mode, the controller can be configured to obtain a time of need and determine a charge start time that can be used to charge the energy storage device, e.g., starting from nominal, to obtain a higher target state of charge by the time of need. Optionally, in the grid mode, the controller is configured to determine a predicted detriment (e.g. based on a predicted change in resistance) to the energy storage device due to storing energy in the energy storage device at a level in excess of nominal, and compare the detriment to a value, and then, responsive to determining that the value is greater than the detriment, the controller determines to turn off the load at the charge start time and turn on the load at the time of need, thereby temporarily storing energy in excess of nominal. Optionally, the value is any value, e.g. a user-entered value, a value preset in the controller, or a value determined based on a calculation of the value of the energy stored in excess of the nominal state of charge. Additionally or alternatively, in the grid mode, the controller is optionally configured to determine a predicted detriment (e.g. based on a predicted change in resistance) to the energy storage device due to discharging the energy storage device to a level less than nominal, and compare the detriment to a value, and then, responsive to determining that the value is greater than the detriment, the controller determines to turn on the load at a time when the energy storage device is predicted to be at a nominal state of charge (e.g. the beginning of the stage 4 window of FIG. 22) and then turn off the load when the energy storage device is predicted to reach a target state of charge that is lower than the nominal state of charge (e.g. at the end of the stage 4 window of FIG. 22). Optionally, the controller can time the step of turning on the load (e.g. the beginning of the stage 4 window of FIG. 22) such that the lower target state of charge (end of the stage 4 window of FIG. 22) coincides with the end of a window at which a unit value of energy is determined to drop below a threshold (e.g. drop below peak rate).

BRIEF DESCRIPTION OF THE DRAWINGS

FIG. 3 depicts an example of steps that can be performed by a parameter polling module, a charge state-determining module, a battery balancing module, and a battery health-checking module useful in the present invention.

FIG. 7A depicts a curve of predicted power over time. FIG. 7B depicts a plot of an array of points of predicted power and time at 30 minute time intervals. FIG. 7C depicts the amount of energy predicted to be generated for each 30 minute time slice. For each of FIGS. 7A-7C, the window of time represented by the data starts at the present time (2019-09-21; 23:00) and ending at a time of need (e.g. arrival time) (2019-09-24; 21:30). Each time increment (the increment for each data point) is 0.5 hour.

FIG. 15 depicts a plurality of configurations useful in the present invention.

FIGS. 16A and 16B depict a table of data used to produce the graphs shown in FIGS. 7B, 7C, 9, and 10.

FIG. 26 is an example of a correlation of % deviation of state of charge from nominal over time (column 5) and detriment (change in internal resistance, column 8).

FIGS. 29A-29H depict a table showing a predicted power forecast and respective energy forecast for individual time slices over the same period of time (five stages) shown in FIG. 22. The table also shows the resulting predicted state of charge (columns 7, 10), value of energy transferred to the grid for each time slice (columns 8, 11), running total of value of energy transferred to the grid for each time slice (columns 9, 12), deviation from nominal for the time shifted scenario (column 13), and theoretical maximum deviation from nominal for the energy storage device (column 14). Data for the non-time shifted scenario (maintaining the battery at nominal state the entire time) is shown in columns 7-9. Data for the time shifted scenario (charge states shown in FIG. 22) is shown in columns 10-13. At the bottom of the table, the "sum of slices" is the sum of the numbers in the same column as the respective calculated sums (157,624.530 and 655,000). The % deviation is the quotient of the two sums, which is an example of a first approximation of a time-weighted absolute deviation of state of charge.

FIG. 30 depicts a table correlating the unit value of energy with time.

DETAILED DESCRIPTION OF THE INVENTION

Systems

Figure 1:
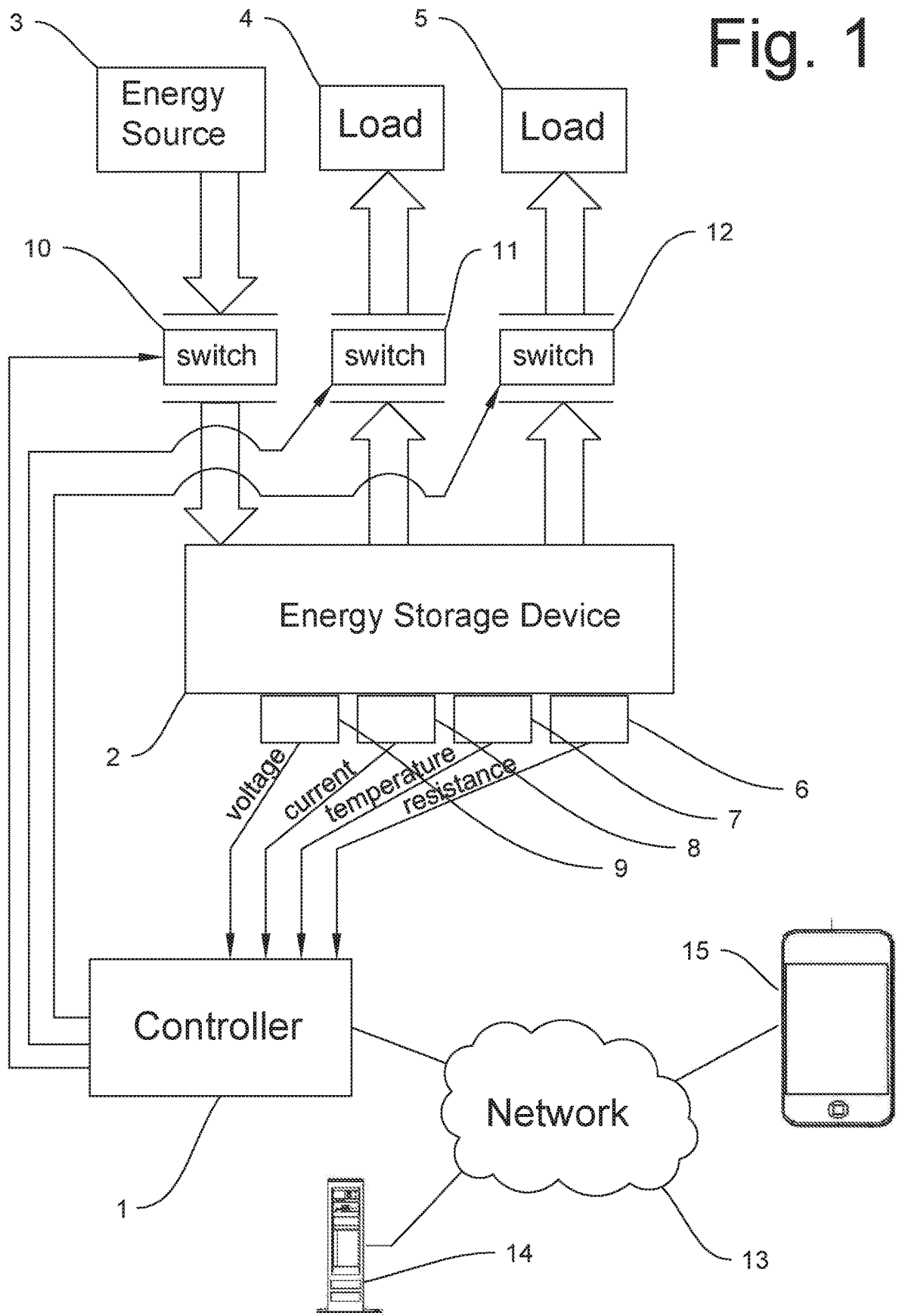
FIG. 1 depicts a system of the invention.

A system of the present invention comprises a battery manager taught herein and other components such as one or more energy storage devices, one or more energy sources, one or more loads, one or more sensors, and one or more switches.

The one or more switches can include one or more switches configured for controlling the flow of energy (e.g.

electricity) to an energy storage device from a respective energy source ('energy source switch') and/or one or more switches configured for controlling the flow of energy (e.g. electricity) from an energy storage device and a respective load ('load switch').

Optionally, the system comprises a remote device (e.g. user interface) networked with the battery manager, e.g., wherein each of the remote device and the battery manager are distinct networked computers.

Optionally, the system comprises a forecast server (e.g. a distinct computer) networked with the battery manager (e.g. via the internet).

In a system of the invention, a controller is configured for performing certain functions, e.g. by providing one or more modules that cause the controller to perform the functions when the controller reads the module from memory. One or more modules can be configured for controlling (e.g. turning on or off) switches and/or controlling sensors (e.g. obtaining readings therefrom), for example, a module that is a charge mode such as preparation mode or a maintain mode). Additionally, one or more modules can be configured for making determinations (e.g. charge start determination or power prediction module). Modules useful in the system can be provided on one or more memory devices accessible by a controller. A controller comprised by the system, or a computer thereof, can a single physical controller (e.g. microprocessor) on a computer, or can be a plurality of distinct controllers (e.g. microprocessors) of the same computer, or of separate computers that can communicate with each other (e.g. via network). For example, a controller useful in a system or battery manager of the invention can comprise a first controller that performs all of the functions taught herein, or can comprise a first controller and at least a second controller, wherein the first controller controls the switches and sensors and wherein the second controller makes one or more determinations (e.g. providing a power prediction) and sends the determinations to the first controller (e.g. via a computer bus or via a network such as the internet). The system can comprise one or more modules configured for making determinations (e.g. forecast-retrieving module, power-prediction module, and/or charge-start time determining module), which may be configured for running (i.e. execution) by the first controller or may be configured for running by a second controller (e.g. of a computer, such as a remote device, networked with the first controller, wherein the second controller can send one or more determinations made from its respective module(s) to a module of the first controller. Accordingly, a controller of the system can comprise one or more controllers configured to perform functions of controlling devices connected to the battery manager (e.g. switches and sensors) and functions of making determinations. Such one or more controllers at least comprise at least a first controller for said control of devices, and can optionally comprise one or more additional controllers that can communicate with the first controller (e.g. via network or computer bus).

Energy Storage Devices

In the present invention, the battery manager can be configured to control one or more switches that each connect an energy storage device to a respective energy source or load.

Useful energy storage devices include any device that can store energy, can be charged by an energy source, and can be discharged by a load. Examples of useful energy storage devices include a) electrical energy storage devices such as batteries, capacitors (e.g. capacitors or super-capacitors), and carbon nanotube energy storage, b) mechanical energy storage devices such as elevated water tanks, compressed air tanks, and flywheels, and c) thermal energy storage devices such as molten salt tanks and steam accumulators.

Useful types of batteries include lithium-ion batteries, e.g. of any battery chemistry. Examples include lead-acid, applied glassmat (AGM), gel-cell batteries, Nickel Cadmium, Nickel Metal-Hydride. Batteries can be maintained at a state which maximizes longevity (referred to herein as a 'nominal state'). As another example, in the case of lead-acid, applied glassmat, and gel cell batteries, this nominal state can optionally be expressed as a voltage or state of charge (e.g. representing a high state-of-charge at or near the absolute full state of charge).

Each battery type has its own specifications with respect to charging speed for optimizing battery longevity, such specifications can also be factored into the charging scheme.

Optionally, the controller is configured for a lithium-ion battery and targets a nominal state (e.g. in maintain mode) of about 50% state of charge (or, for example, a range of 40%-60% or 20%-80%), which is known to increase the battery longevity for most lithium ion chemistries.

According to the present inventor, longevity of an energy storage device is reduced based on the magnitude of the deviation from the nominal state, the amount of time the energy storage device is in the non-nominal state, and optionally parameters such as temperature (during charge and discharge as well as when the energy storage system is neither charging or discharging) and optionally charge and discharge rate. Optionally, the battery manager controller allows for specifying a definition (e.g. charge state value, or range of values) to set as the nominal state (e.g. changing the definition of a targeted state of charge in maintain mode). For example, this definition can be based on energy storage type and the battery manager controller can be configured to receive an input (e.g. selection) of an energy storage type (e.g. selection from an on-screen list), wherein the battery manager controller defines the nominal state (e.g. target of a maintain mode) using a definition specified based on energy storage type. As another example, the battery manager controller can be configured to obtain (e.g. via user input on a user interface or "UI") a numerical specification of a state of charge or a range of state of charge (e.g. expressed as a percentage of the absolute full state of charge).

Of particular use in the present invention are electrical energy storage devices. Electrical energy storage devices such as batteries have a life-span that is affected by how the charge state is maintained. For example, for many types of lithium-ion batteries, life-span can be increased by minimizing time spent at, or close, to maximum or minimum state of charge. Although life-span of these batteries can be maximized by keeping the batteries at, for example, 50% charge, such a nominal state of the battery greatly diminishes the ability of the battery to meet the energy needs of the user, especially when the demand on the battery is high. Accordingly, batteries are typically maintained at a higher energy storage state such that they are more useful to the user for a time of energy need. However, with the present invention, it has been discovered that a battery of (e.g. an off-grid) weekend home can be simultaneously optimized for load use and battery life if the battery is at a high state of charge upon the arrival of the home owner. In another example, stored energy of the battery of a present system can serve as a backup power source in the event of extreme weather that is catastrophic to grid power. In such a scenario, the energy storage system can be in a period of non-use which may be an extended period of time, in some cases months or years (e.g. while the battery manager is in maintain mode), but is most useful to the user for driving loads if fully charged in advance of the extreme weather event (such as a high wind event, a severe storm warning, an event of high precipitation in a small window of time). Thus, when energy need is high, the present invention provides the battery with a high charge state, and when energy need is low, it provides the battery with a nominal charge state.

Accordingly, a battery manager of the present invention can be configured to control the charge state of a battery, e.g. providing a first mode targeting nominal charge state that maximizes the life-span of the battery, and by providing a second charge mode that maximizes the amount of energy the battery can supply at a time of need (or over an in-use period).

Through insight in the mind of the inventor, the invention contemplates the use of all types of energy storage devices, not only batteries. These energy storage devices may have life spans that are impacted by how the storage device is managed, e.g. including parameters such as state of charge, magnitude of deviation of state of charge from a nominal value, time spent in deviation of state of charge, charge & discharge rate, charge & discharge duration, temperature of the energy storage device during times of charging and discharging, temperature of the energy storage device when not charging or discharging. Accordingly, while the present disclosure frequently uses the term "battery" for illustrative purposes and for the sake of brevity, the present invention contemplates alternative embodiments where any energy storage device is substituted for the battery, such as a different type of electrical energy storage device (e.g. capacitor) or an energy storage device of a different type of energy (e.g. mechanical or thermal).

While the instant specification uses the term "battery" as an example of an energy storage device, it is to be noted that, anywhere a battery is discussed, the invention alternatively contemplates the use of any energy storage device.

Energy Sources

In the present invention, the battery manager can be configured to control one or more switches that each connect an energy storage device to a respective energy source.

Any type of energy source is useful according to the present invention.

Optionally, the energy source is a renewable electrical energy source, e.g., a wind energy source, a solar energy source, or a hydroelectric energy source.

Optionally, the energy source is a non-renewable electrical energy source, e.g., a grid power energy source, Optionally, the energy source is a wind energy source, such as a wind turbine. For example, any wind generator or wind farm may be used. Examples of structures of such wind energy sources are well known in the art.

Optionally, the energy source a solar energy source. Examples include solar cells such as monocrystalline cells, polycrystalline cells, and thin film (e.g. amorphous cells). Other examples include a solar heater (e.g. a solar water heater). Examples of structures of such solar energy sources are well known in the art.

Optionally, the energy source is a grid power energy source. Grid power is a source of electrical energy, often municipal, that is shared by a network of many residential, commercial, and/or industrial locations, often >100, >1000, or >100,000 locations. Grid power is typically supplied by a large-scale power (e.g. nuclear, coal, or oil) plant or a grid energy storage system thereof. Grid power is often supplied in a standard voltage and/or frequency, e.g. between 100 and 250 volt and/or between 25 Hz and 133 hz. In the United States, for example, grid power is often supplied at 120 v and 60 Hz, while many other countries supply grid power at 220 v or 230 v and 50 Hz or 60 hz.

Optionally, the energy source is a hydroelectric energy source. Examples include generators that rely on flowing water or wave or tidal energy. Examples of generators that rely on flowing water include hydroelectric dams and hydroelectric turbines. Examples of generators that rely on wave or tidal energy include pendulor devices, tapchans, and oscillating water columns. Examples of structures of such hydroelectric energy sources are well known in the art.

Optionally, a plurality of energy sources are provided, e.g. a plurality of electrical energy sources of different types, such as two or more sources selected from a wind energy source, a solar energy source, and a grid power energy source. Each of the energy sources is connected to the energy storage device by a different controllable switch (i.e. a switch that can be controlled by the battery manager controller).

Through insight of the mind of the inventor, it has been discovered that the availability and/or rate of energy supply from energy sources can be correlated to environmental conditions which can be predicted (e.g. through weather forecast) or other conditions that can be predicted (e.g. such as planned grid power outages) and that when such availability and/or rate of energy supply is factored into the charge profile, user satisfaction (i.e. from having energy to meet the needs) can be greatly increased and battery life can be remarkably extended. As an example, the rate and duration of generation of solar power at a specific geographical location (based on longitude and latitude) is correlated to the measure of solar radiance for said geographic location at a specific time of year, and can be predicted by forecast data of solar radiance, optionally in combination with other weather forecast data such as satellite imagery, including cloud cover, characterization of cloud cover (e.g. evaluation of impact on solar radiance), and optionally in combination with configuration parameters of the energy source such as solar panel size, and solar panel positioning.

Optionally, the battery manager is configured to control only a single energy source switch (e.g. connected to a respective energy source) or is configured to control a plurality of energy source switches (e.g. each connected to a respective energy source).

Loads

In the present invention, the battery manager can be configured to control a switch that connects an energy storage device to a load or loads. Optionally, the battery manager can be configured to control a plurality of switches that each connect an energy storage device to a respective load or loads.

A load is any device or combination of devices that can draw electrical energy from the energy storage device. Examples include a load panel, also known in the art as a load center, (e.g. circuit breaker panel) and individual devices such as a water pump, air conditioner, lighting (e.g. emergency lighting), sensors, and alarms (e.g. sirens). Typically, a load panel (e.g. circuit breaker panel) contains connections to a plurality of devices connected to the load panel.

Optionally, a plurality of loads is provided, each connected to a respective switch that is controllable by the battery manager (e.g. the battery manager has a respective switch controller for each of the switches). For example, the plurality of loads can comprise a load panel and a second load. Optionally, the second load is a load that is switched on by the battery manager when the battery manager has been triggered to discharge the battery, e.g. a load switched on as part of a maintain mode (sometimes referred to herein as a discharge bus). Such a second load can be a device that is not used or is used less frequently when the battery manager has been triggered to charge the battery to a higher charge state (e.g. in a preparation mode that prepares the battery for use by charging, e.g. for a user's return to a home). For example, the second load can be a water pump that pumps water to an elevated storage tank, to be used as a source of energy potential mechanical energy (e.g. which is connected to another energy system). Such a water pump, or other device, can be switched on (e.g. periodically) to intentionally discharge the battery to and/or maintain a nominal state (e.g. 50% charge or range of charge states). This configuration has the advantage of maintaining, through a cycle of charging and discharging the battery within a tight range, the battery in a lifespan-saving charge state, while at the same time providing a practical use of the energy being produced and consumed. Stated another way, if an alternate form of storing energy is available (such as pumped water), the battery manager can simultaneously maintain the primary energy storage devices longevity (i.e. the battery) in the first charge mode (maintain mode), while channeling all (or specified) available, connected energy sources, to the further task of storing more energy (in this case through pumped water, or some similar mechanism) throughout the duration of the maintain state, or until the secondary storage device's capacity is reached. Optionally, the second (or a third) load is a critical load panel that provides power to elements such as sump pumps, emergency lighting, sirens, alarms and other such loads deemed critical.

Optionally, this second load (or first load if the system is only configured for one load) is configured for transferring power from the energy storage subsystem to a connected 'grid'. The 'grid load' algorithm identified is optionally used to balance the desire to optimize longevity of the battery with optimal return of power to a connected 'grid'. In this manner, scenarios are examined through discrete event simulations to determine the balance between these optimizations to instruct the controlling of, or the setting time points for control (turning on/off), the one or more energy source switches and the load switch connected to the grid. One such optimization could include expansion of the boundaries of 'maintain' mode (as represented by an upper and lower-bound threshold expressed as a percentage of absolute full state of charge), thereby increasing the amount of power available to return to the grid and trading longevity of battery for optimization of power return to the grid.

Optionally, the system comprises a heater and/or a cooler of the energy storage device (e.g. battery), wherein the heater and/or the cooler are controlled by the battery manager controller. The heater and/or cooler can be loads connected to the energy storage device. For example, the battery manager controller can control (e.g. by switch) one or more discrete loads that perform the function of heating and/or cooling the battery. Optionally, the battery manager acts to pre-condition the battery to the optimal temperature based on a predicted rate of charge determined based on forecast data prior to a determined charge start time (e.g. in maintain mode), or to a specified temperature or range of temperatures for discharge prior to a time of need event (e.g. in a transition mode).

Optionally, the controller is configured to control a first load switch to a first load (e.g. a load panel used in the in-use mode), an optional second load switch to an optional second load (e.g. a device used to discharge the battery maintenance mode) and a third load switch to a third load (e.g. wherein the third load is a load used in preparation, maintenance and in-use mode, such as a critical load panel that provides power to elements such as sump pumps, emergency lighting, sirens, alarms and other such loads deemed critical).

Optionally, when the controller is configured to control switches to multiple different loads, each of the load busses or switches thereof can be configured to have the same current rating or different current ratings. For example, a load panel bus and/or a gird load bus can optionally be rated at 20 amps or greater and/a critical load bus can optionally be rated at 10 amps or greater (e.g. a critical load bus can be configured to supply less current than the load panel bus or gird load bus).

Network

A system of the invention optionally comprises a communications network ('network') to connect the controller with one or more other components, e.g., a forecast server and/or a user interface, for data transmission. The network can be any network that can transmit the data between the respective components.

Useful networks include wireless networks and wired networks.

In one embodiment, the network comprises a wide area network (WAN) or a local area network (LAN).

In one embodiment, the network comprises a wide area network (WAN). Optionally, the WAN comprises the internet. Optionally, the WAN comprises a wireless WAN such a cellular network. Optionally, the WAN comprises the internet and a wireless WAN (e.g. cellular network).

In one embodiment, the network comprises a wireless network. Optionally, the wireless network comprises a cellular network, a wireless local area network, or a wireless metropolitan area network.

In one embodiment, the network comprises a cellular network. Useful cellular networks include Advanced Cellular telephone System (AMPS), Narrowband Advanced Cellular telephone Service (NAMPS), Frequency Shift Keying (FSK), Frequency Division Multiple Access (FDMA), Time Division Multiple Access (TDMA), and Code Division Multiple Access (CDMA), or any standard, such as Global System for Mobile communications (GSM) or Cellular Digital Packet Data (CDPD), a GPRS network, an EDGE network, and a 3G, 4G, or 5G network.

The network can use any network protocol, for example, TCP/IP or UDP, which are commonly used over the internet.

Computers

A battery manager of the present invention can be configured as a computer. Optionally, the battery manager is connected to one or more additional computers (e.g. via the network), such as a first computer ("remote device") providing a user interface and/or a second computer ("forecast server") providing a forecast data service.

Computers useful as a battery manager, and optional computers of a system (e.g. forecast server or remote device) of the invention each comprise:
  a. a controller;
  b. a memory comprising a non-transitory computer readable medium for storing modules and optionally other data such as parameters;
  c. optionally, a network access device; and
  d. a structure configured for connecting the controller to the other components of the computer such as the memory and network access device.

Useful computer-readable media include any physical media configured to store code and be readable by a computer or controller thereof. For example, useful computer-readable media computer includes volatile media, nonvolatile media, removable media, non-removable media, RAM, ROM, EEPROM, flash memory or other memory technology, SD (e.g. microSD), CD-ROM, digital versatile disks (DVD), holographic media or other optical disk storage, magnetic cassettes, magnetic tape, magnetic disk storage, or other magnetic storage devices.

Useful controllers include any processor configured to access the memory devices and the network access device. Examples of such processors are well known in the art and are commonly connected to the storage device and network access device by a system bus (e.g. on a motherboard). Optionally, a useful controller can be any controller that can read instructions present in a module stored on a storage device, and control the computer or attached devices according to the instructions. Optionally, the controller comprises a microcontroller such as a microprocessor. Other useful controller types include reconfigurable logic devices such as a Field-programmable gate arrays (FPGA), complex programmable logic devices (CPLD), programmable array logic (PAL) devices, application specific integrated circuits (ASIC), and special-purpose computing engines.

Useful network access devices include any devices configured to transmit data between the computer and the network. Examples include network adapters wired adapters such as ethernet adapters and wireless adapters such as Wi-Fi adapters (e.g. 802.11 adapter) and cellular adapters (e.g. GSM, TDMA, CDMA, 3G, and 4G adapters).

Useful structures configured for connecting the one or more processors to other components include, e.g. a motherboard comprising a northbridge and southbridge. Other structures are well known in the art.

A controller of a computer useful in the present invention can be configured to read the modules stored in memory, and control the computer according to instructions provided by the modules.

Battery Manager

A manager useful in the present invention can be any computer having linkage(s) to transmit signals to switches and receive signals from sensors. A battery manager according to the present is sometimes referred to herein as an energy storage device manager.

Optionally, the linkage(s) comprises any wired or wireless linkage(s) configured for transmitting signals to or from the switch(es) and sensor(s), respectively. Examples of useful wired linkages include electrical connections (e.g. for triggering a solenoid type switch), serial ports, parallels ports, and Universal Serial Bus ('USB'). For wireless communication, the battery manager and the switches and sensors can each comprise a wireless transmitter or receiver configured to communicate with each other (e.g. electromagnetic linkage based such as Radio, Infrared, Bluetooth or WiFi communications linkage or optical linkage, or wireless LAN or other wireless network connection).

The battery manager can comprise a user interface comprising a display and a user input device. Additionally, or alternatively, the battery manager can be configured to connect (e.g. via network) with a remote device which provides a user interface comprising a display and a user input device. The display can be any output device that produces a graphic viewable by the user. Optionally, the display is selected from: an LCD, an LED, and a monitor. The user input device can be any device or combination of devices configured for operation by a user to control the remote device and/or the user module. Optionally, the input device comprises a keypad, one or more buttons, one or more scroll wheels, or one or more other devices that can be operated by a user. Optionally, the user interface comprises a touchscreen.

The battery manager can be configured to receive forecast data, e.g. through a forecast data service provided by a networked forecast server. Additionally, or alternatively, the forecast data (sometimes referred to as a forecast) can be provided locally, for example, by a user uploading forecast data to a storage device of the battery manager using a removable memory device (e.g. USB drive, CD drive, or SD).

The battery manager controller can be configured to receive sensor signals and transmit controlling signals to switches by any types of linkages. For example, with respect to sensors, two nine pin connectors can be connected to a micro-controller on a controller circuit board. The other side of the connectors can be connected through wires to sensors used in sensing the battery. For example, pins 1-8 of one connector can represent 1 of 8 cell temperatures (as measured as a voltage via a thermistor placed in the location of each cell), with the ninth pin being a ground. The thermistor changes resistance based on temperature, which in turn changes voltage on the wire via a voltage divider (comprised of another fixed resistor on the board). The resulting analog voltage reading is converted into a number by an ND (analog/digital) converter on the board. This number is then converted to temperature by, e.g. the processing in one core of a multi core micro-controller). The second connector represents 1 of 8 cell voltages which is directly converted by the A/D converter from an analog voltage to a digital number. This number is converted to voltage by the same, or another, core of the 8 core micro-controller.

In terms of actuators, for example, the controller can optionally be configured to switch a pin on the microcontroller itself from a zero to a 1 (switching from 0 volts to 3.3 volts). This pin is capable of producing a current (e.g. 50 milli-amps of current), and is enough to drive the base pin of a transistor which acts as the first switch. When the base pin is activated, a higher current (e.g. on the order of ⅓rd-½ an amp) is allowed to flow from collector to emitter in the transistor. This is enough to power a relay on the circuit board. This relay is capable of passing greater current (e.g. over 2 amps of current) when switched on. This greater current is used to throw a large contactor switch (and keep it on). The contactor switch can switch current in even greater amount (e.g. in excess of 300 amps). It is these contactor switches that are used as the switches connecting an energy storage device to a respective load or energy source that are used to turn on and off the respective load or energy source. Larger ultimate current can optionally be switched through either larger contactor switches or another layer of switching.

The controller of the battery manager can be configured to perform a specified function when (e.g. responsive to the controller determining that) a specific condition occurs. For example, the condition can be the present state of charge being greater than (or rising above) a target state of charge or being less than (or dropping below) a target state of charge. Many other examples of conditions are taught herein, in which the controller (or module) performs (or avoids performing) a specified action based on a specified condition.

Forecast Server

A system of the invention optionally comprises (or a battery manager is configured to connect to) one or more forecast servers for providing forecast data to the battery manager. According to the present invention, the forecast server is any computer having the following technical features:
  a. a forecast module (also referred to as a 'forecast data service') configured to provide forecast data to the battery manager, e.g. via a network.

A useful forecast server, can be configured to use the forecast module to provide a specific forecast based on one or more parameters, e.g. based on a forecast request received from the battery manager, wherein the request comprises the one or more parameters (e.g. location and/or configuration parameters of an energy source). Optionally, the forecast server is configured to receive a request which is in the form of an API call which includes the one or more parameters, e.g. as currently utilized by the Solcast API service and other known services.

Remote Device

A system of the invention optionally comprises a remote device for providing a user interface with the battery manager. According to the present invention, the remote device is any computer having the following technical features:
  a. a user module configured to provide a graphic user interface (GUI) for interacting with (e.g. via network) the module(s) of the battery manager;
  b. a user input device; and
  c. a display.

The remote device can be any type of computer, for example, a fixed device or a mobile device. Examples include a mobile phone, a handheld computer, a personal digital assistant (PDA), a Personal Computer, a tablet Personal Computer, a cellular phone, a network appliance, a camera, a smart phone, a media player, a navigation device, an email device, a game console, a television, a cable box, a set-top box or a combination thereof.

In one embodiment, the remote device is a mobile device. Optionally, the mobile device is cellular device. Optionally, the mobile device is a cellular device, wherein the cellular device is a cellular phone or a cellular-enabled PDA or tablet PC (e.g. iPad™)

The user input device can be any device or combination of devices configured for operation by a user to control the remote device and/or the user module. Optionally, the input device comprises a keypad, one or more buttons, one or more scroll wheels, or one or more buttons or other device that can be operated by a user.

The display can be any output device that produces a graphic viewable by the user. Optionally, the display is selected from: an LCD, an LED, and a monitor.

Optionally, the remote device provides a user interface comprising a touchscreen.

Tables and Arrays

According to the present invention, the battery manager (or controller thereof) can be configured to read and write to one or more tables or arrays.

The one or more tables or arrays can include a parameter table, e.g. including factory default settings, user input parameters, sensed parameters, determined parameters, and/or target parameters, as well as forecast data stored in one or more arrays.

The one or more tables or arrays can include forecast data (e.g. of time vs forecast value). Optionally, the battery manager controller can be configured to populate one or more tables of forecast data with data obtained locally (e.g. by user input or local memory). This configuration can be used, e.g. to remove the requirement that the battery manager be able to communicate with a remote server of forecast data.

The one or more tables or arrays can include a conversion table with correlation values for converting one or more forecasts to one or more power generation values (for example wind turbine power generation as a function of wind speed, or solar power generation as a function of solar radiance as a function of longitude and latitude).

Parameters

In the present invention, the battery manager can write and/or read parameters stored in the memory device of the battery manager or parameters transmitted by network connection (e.g. to another computer such as a forecast server). Parameters can be used by the controller to set targets and other settings.

Optionally, a plurality of modules can read and/or write to the same one or more tables of parameters. Such a configuration allows modules to share parameter data.

Optionally, the present invention can use one or more parameters selected from:
  a. User Input Parameters;
  b. Sensed Parameters;
  c. Determined (e.g. calculated) Parameters; and
  d. Target Parameters.

User Input Parameter

A user input parameter is a parameter that is stored as the result of user input. For example, the battery manager can be configured to interact with a user interface for accepting an input that the battery manager uses to create and store a parameter. The user input parameter can be a user event that happens at the current time or a scheduled time (e.g. arrival or leave event); a setting (e.g. a mode of the battery manager); or configuration data (e.g. specifications of the energy storage device, energy source, attached load, or location info).

Examples of useful user-input parameters include
  a. User Events such as
    i. Arrival event (e.g. scheduled or immediate) such as
      a) A time at which the user needs to use start using an energy storage device to provide power. For example, the arrival event can be the selection or scheduling of an option such as "user is arriving home" or "grid power will be shut down". An arrival event can be set as a time of need for which a preparation mode prepares by charging an energy storage device.
    ii. Leave event (e.g. scheduled or immediate) such as
      a) A time at which a user no longer needs to use the energy storage device to provide power. For example, the leave event can be the user selection or scheduling of an option such as "user is leaving the home" or "grid power will be used".
    iii. In-use period such as
      a) A period of time (e.g. scheduled in the future) during which a user needs to use an energy storage device. The in-use period can correspond to a stay of a user (e.g. period of time from an arrival event to a leave event)
    iv. Wind Speed Threshold such as
      a) A wind speed over which the system should be considered to be in use, and therefore drives a calculation of a charge start time (e.g. a wind speed considered to be catastrophic to an energy source, e.g. such as grid power).
    v. 'Number of Cells' or 'cell count'
      a) the number of cells contained in the energy storage system or energy storage device (e.g. applied for battery type storage, particularly lithium-ion type batteries). This number might be 1 for energy storage devices that do not require independent monitoring of individual cells (such as lead-acid).

vi. Min Cell Volts such as
  a) the lowest allowable voltage on any cell before taking preventative or safety measures (e.g. turning off the switch(es) connecting the energy source to any connected load, thereby preventing further discharge)

vii. Max Cell Volts such as
  a) the highest allowable voltage on any cell before taking preventative or safety measures (e.g. turning off the switch(es) connecting the energy source to any connected charge source, thereby preventing further charge)

viii. Min Cell Temp such as
  a) the lowest allowable temperature of any cell before taking preventative or safety measures (e.g. turning off all charge and discharge switches).

ix. Max Cell Temp such as
  a) the highest allowable temperature of any cell before taking preventative or safety measures (e.g. turning off all charge and discharge switches).

x. Battery Capacity (e.g. Kwatt/hrs) such as
  a) the capacity of the battery (e.g. expressed in Kwatt-hours)

xi. Charge Start Threshold such as
  a) A parameter controlling the recovery voltage from a charge shut down event. This will typically be a value some level below the absolute maximum voltage that any cell can attain.

xii. Discharge Start Threshold such as
  a) A parameter controlling the recovery voltage from a discharge shutdown event. This will typically be a value some level above the absolute minimum voltage that any cell can attain.

xiii. Nominal range-high such as
  a) the top of the nominal range (e.g. used to define the state of charge range targeted by the first charge mode or 'maintain mode')

xiv. Nominal range-low such as
  a) the bottom of the nominal range (e.g. used to define the state of charge range targeted by the first charge mode or 'maintain mode').

xv. Latitude such as
  a) a present latitude. This can be entered by the user or read by a controller from a GPS device.

xvi. Longitude such as
  a) a present longitude. This can be entered by the user or read by a controller from a GPS device.

xvii. Charge Start Over-ride such as
  a) A parameter that enables an end user to start charging immediately, or at any future time, thereby over-riding any schedule of charging as determined by the system from forecast data or other.

xviii. Discharge Charge Start Over-ride such as
  a) A parameter that enables an end user to start discharging immediately, or at any future time, thereby over-riding any schedule of charging as determined by the system from forecast data or other.

xix. Power source 1 such as
  a) A parameter that defines the type of power source attached to a $1^{st}$ energy source switch (e.g. user-selected from a pre-populated list)

xx. Power source 2 such as
  a) A parameter that defines the type of power source attached to a $2^{nd}$ energy source switch (e.g. user-selected from a pre-populated list)

xxi. Power source n such as
  a) A parameter that defines the type of power source attached to an nth energy source switch (e.g. user-selected from a pre-populated list)

xxii. Load source 1 such as
  a) A parameter that defines the type of load attached to an $1^{st}$ load switch (e.g. user-selected from a pre-populated load type, e.g. Main Load, Discrete Load(n), Critical Load)

xxiii. Load source 2 such as
  a) A parameter that defines the type of load attached to an $2^{nd}$ load switch (e.g. user-selected from a pre-populated load type, e.g. Main Load, Discrete Load(n), Critical Load)

xxiv. Load source n such as
  a) A parameter that defines the type of load attached to an nth load switch (e.g. user-selected from a pre-populated load type, e.g. Main Load, Discrete Load(n), Critical Load)

b. Settings such as
  i. Selection of which module(s) to use
  ii. Module settings
  iii. Override settings, e.g. a parameter that causes the battery manager to enter into a mode (e.g. preparation mode) at a specific time (e.g. regardless of a charge start time determined by forecast data), as in step s305.

c. Configuration Data (e.g. can be pre-configured, determined, or entered as user input parameters) such as
  i. energy storage device specifications such as
    a) absolute full charge is the total amount of energy that an energy storage device is physically capable of handling. Optionally this value can be inputted by user input or can be determined by sensors of the energy storage device (e.g. increasing the charge on the energy storage device until a rapid voltage spike indicates a full charge and decreasing the charge on the energy storage device until a rapid voltage drop indicates an empty state of charge. The rapid spike or drop can be identified by an algorithm that can be used to detect these spikes or drops as a 'knee of the curve', a characteristic of Li-ion cells and others, whereby voltage begins to increase parabolically as full state of charge is reached or decrease parabolically as minimal state of charge is reached).
    b) usable energy capacity: the amount of energy held by the energy storage device when the energy storage device is considered by the battery manager as fully charged (e.g. the maximum recommended number of kilo-watt hours of energy for storing in the energy storage device). Optionally, this value is user-input or determined as a percentage (e.g. 90%) of the absolute full charge.
  ii. energy source specifications such as
    a) Solar array size
    b) Angle of incidence
    c) Geographic location data (e.g. GPS location), used, for example, to obtain appropriate forecast data.
    d) Correlation factor of weather data to energy production such as for a. Wind generator; Correlation of wind-speed to power generated
b. Solar array; Correlation of radiance to power generated (e.g. an efficiency rating)
iii. load specifications such as
a) Selection of load type such as
a. Primary; indicating the load represents the main or primary distribution panel (for example, circuit breaker or fuse panel).
b. Critical; indicating the loads represent a critical power load or distribution panel (such as water pumps, emergency lighting, alarms, sirens, etc.)
c. Discrete; setting the load a 1 of n discrete loads attached to the system.

Sensed Parameters

A battery manager of the present invention can be configured to obtain a parameter as the result of a sensor reading. Useful sensed parameters include parameters of:
a. a storage device, or cell thereof, for example:
i. voltage, temperature, current, and/or resistance;
b. a balancer or other chip on a battery's controller board (e.g. temperature); and
c. a battery parameter, for example:
i. Charge current (current entering battery expressed, e.g., in kilowatts);
ii. Discharge current (current leaving battery expressed, e.g., in kilowatts); and/or
iii. Present State of charge (e.g., amount of charge in the battery expressed in kilowatt-hours and/or as a percent of the absolute full state of charge)

Calculated and Determined Parameters

A battery manager of the present invention can be configured to obtain a parameter as the result of a calculation or determination made, e.g., based on one or more other parameters. Examples include:
a. Energy storage device parameters such as
i. charge state, or current charge state, or present charge state (e.g. number of kilo-watt hours of energy the battery presently stores; e.g. calculated based on current sensor readings)
ii. cumulative charge (e.g. cumulative charge-to-full) the amount of charge or energy, such as kwatt-hours, required to reach a specified charge state (e.g. a full charge state). Optionally the specified charge state is a target state of charge, e.g. a target set by a preparation mode (e.g. a target set as a specified percentage of the absolute full charge state, or a determined target charge state, e.g. determined to meet predicted demand during a time of need).
b. Cell Calculation Parameters such as
i. Sum of cell parameters (e.g. sum of voltage of each cell)
ii. Average of cell parameters (e.g. average voltage across the cells)
iii. Discharge/charge flag (indicates a cell is charging/discharging)
iv. Over/under flag (indicates a cell is over or under a target voltage)
c. Arrival/Leave Event Determined Parameters such as
i. Charge start time, e.g. a time at which the battery manager should turn on a switch connecting an energy source to an energy storage device (e.g. switching to a preparation mode that turns on the switch), determined, e.g. by a charge start time-determining module based on forecast data.
ii. Discharge start time, e.g. a time at which the battery manager should switch to maintain mode, e.g. determined based on a grid power's scheduled resume time, or as a parameter entered by the user.

Target Parameters

A battery manager of the present invention can provide one or more target parameters that, for example, provide a basis for comparison to another parameter (e.g. sensed or determined parameter). Optionally, a target parameter can be a preset parameter or it can be another sensed or determined parameter. For example, the battery manager controller can be configured to compare a sensed or determined parameter to a target parameter (e.g. another sensed or determined parameter), determine whether the sensed or determined parameter meets or exceeds the target parameter, and then perform one or more actions responsive to whether the sensed or determine parameter meets or exceeds the target parameter. The one or more actions can include switching on or off one or more switches connecting an energy storage device with a respective energy source or load, outputting an alarm or notification, or changing one or more settings. Examples of target parameters include:
a. Battery or Cell Target Parameters such as
i. Set cell voltage maximum or minimum, e.g. used for comparison against sensed cell voltage
ii. Average of cell parameters (e.g. average voltage across a set of cells) used for comparison to a sensed cell parameter (e.g. voltage of a given cell)
iii. Set cell temperature maximum or minimum, e.g. used for comparison against sensed cell temperature
iv. Usable energy capacity or portion thereof (e.g. a percentage of the usable energy capacity which can be maximally targeted by a charge mode)

Modules

According to the present invention, a controller can be configured to perform functions by reading a module stored on a computer-readable medium, wherein reading of the module by the controller causes the controller to perform the functions. Modules are compilations of control instructions ('code') executable by a controller to perform one or more functions. The modules can be provided on any memory assessable by the one or more computers. Any type of module is useful in the present invention. Collectively, one or more modules can be configured for providing the features and/or methods taught herein. Although detailed module logic/procedures are provided for certain steps in the present methods, the skilled artisan, with the teachings provided herein, can readily configure the modules to provide any methods or steps taught herein in a number of manners.

In one embodiment, a battery manager or system of the present invention comprises a plurality of modules performing discrete functions. The modules can be stored on the same or different computer readable media. The modules can be included together in a single program or can be included in distinct programs configured to interact with each other to provide the methods or configurations taught herein.

The modules can be configured, for example, as a program, an application, a library, an applet, a macro, a script, a subroutine unit of code, a software function unit of code, an object (as in an object-oriented paradigm), firmware, or any other type of computer code. The code can include any code, e.g. source code, object code, machine code, or any other stored data that is operable to cause a processing system to perform methods described herein.

The code and functionality of a given module can be located on a processor, core, or computer or distributed across multiple processors, cores, computers. Additionally, or alternatively, the code and functionality of different modules can be located on different processors, cores, or computers. For example, while the invention teaches many modules which can be comprised by the battery manager, the invention also contemplates a system in which another computer (e.g. such as a remote device or a server) comprises the module(s) (e.g. has a controller that runs the module from memory) and sends data from the module to battery manager. For example, any of the modules that produce information can be placed on a networked computer. Examples of such modules include a forecast-retrieving module, power-prediction module, and/or charge-start time determining module, which may comprise a remote device that retrieves a forecast and determines one or more charge start times there from, and sends the charge start time(s) to the battery manager.

In illustrative example of how modules can be distributed, the battery manager controller can comprise a plurality of cores, wherein the plurality of cores comprises a first core that runs an initialization and communicates with the User Interface, a second core that runs the parameter polling module to sense battery parameters and runs the battery balancing module, a third core that controls switches based on over/under voltage and temperature events, and a fourth core that runs the control switches on determination of a time of need or end of time of need event, and a fifth core that communicates with a remote forecast data service and runs a forecasts module.

Optionally, the modules taught herein are configured to save (write) data to or poll (read) data from one or more parameter tables (e.g. containing parameters taught herein). Optionally, a plurality of the modules taught herein are configured as independently-executable modules, and each of the plurality of modules uses the same one or more parameter tables (sometimes referred to herein as a global table or a table of global variables).

Optionally, a battery manager of the present invention is configured to operate in a plurality of modes that can be selected for execution (e.g. by the mode-execution module). For example, the plurality of modes can include a) a preparation mode that is used in preparation for a time of need, such as an arrival event (e.g. a preparation mode executed at a charge start time determined based on forecast data prior to a time of need); b) a mode configured for use of the energy storage device by the user (e.g. an in-use mode); and c) a maintain mode which targets a lower (e.g. nominal and/or optimal) charge state that maximizes the life-span of the energy storage device.

Optionally, the battery manager controller is configured according to any of configurations 1-3 shown in FIG. 15. Each configuration includes maintain mode, preparation mode, and in-use mode and indicates how each of the modes control switches for respective components (energy source or load) when the present state of charge is over or under the target state of the charge for the respective charge mode. In this embodiment, the controller is optionally configured to, responsive to the controller determining that the energy storage device falls out healthy or safe state (e.g. out of a temperature range, voltage range, or charge state range specified as a safe or healthy range), the controller can switch off each of said modes (whichever is presently running) and enter a safe mode which turns off one or more loads (e.g. all loads) and/or turns off one or more energy sources (e.g. all energy sources).

Optionally, each of the modes are additionally configured to supply power (i.e. operate one or more switches) to one or more loads such as critical water pumps, emergency lighting, or other such loads (e.g. a critical power mode), e.g. and turning off which one or more loads (e.g. non-critical loads).

Forecast Service

A battery manager of the present invention (or forecast-retrieving module thereof) can be configured to obtain forecast data from one or more forecast services. The forecast service can be any module that provides (e.g. transmits) forecast data to the battery manager or forecast-retrieving module thereof.

Optionally, the forecast service is provided by a computer (e.g. forecast server) networked with the battery manager. Alternatively, the forecast service can be a module, provided by the battery manager itself, from which a forecast-retrieving module thereof can obtain the forecast data.

Optionally, the forecast service obtains forecast data from tables stored on fixed media such as a CDROM, microSD card, USB memory, or any other storage device.

Optionally, the forecast data service provides weather data (e.g. solar radiance data or wind data).

Optionally, the forecast data service provides a power prediction comprising estimated power or energy generation based on weather data. For example, commercially available forecast data services (e.g. the Solcast API) can provide a forecast of estimated power generation per 30 minute time-slice for each 30 minute time-slice in the forecast as an array, based on an input of parameters (e.g. received from the battery manager) such as latitude, longitude, solar array size, and angle of incidence of the panels.

The forecast data (e.g. weather or power) can be provided in an array format. An example API is able to return actual power produced per 30 minute time-slice by a specific array because the parameter of solar array size, and the parameters of latitude and longitude of the array are passed to the forecast service as part of an API call from the battery manager controller.

Forecast Retrieving Module

A battery manager of the present invention can be configured to provide a module that obtains forecast data ('forecast-retrieving module').

Optionally, the forecast-retrieving module is configured to obtain the forecast data from a forecast service, for example, a forecast service provided by a networked computer (e.g. forecast server). Additionally, or alternatively, the forecast-retrieving module can be configured to obtain the forecast data from a local memory drive (e.g. removable memory device) or from user input (e.g. text input).

Optionally, the controller of the battery manager is configured to execute the forecast-retrieving module periodically, at regular time intervals, responsive to a scheduled time being reached, responsive to a step performed by another module, or on demand (e.g. based on a user input command to execute). Additionally, or alternatively, the forecast-retrieving module of the battery manager can be configured to receive forecast data via a push notification from a forecast service.

Optionally, the forecast-retrieving module reads from a memory storing a plurality of forecasts (e.g. corresponding to respective geographic locations, and the forecast-retrieving module is configured to request forecast data for a specific geographic location (e.g. a geographic location defined by a stored parameter and/or a type of energy or energy source defined by a stored parameter).

Optionally, a battery manager is configured to obtain a forecast specific to one or more parameters. For example, the forecast-retrieving module can create a request, such as an API call, that includes parameter values that causes the forecast server to return a forecast specific for the parameter value (e.g. location or configuration parameter of the energy source).

As one example, the forecast-retrieving module can be configured to create an application programming interface (API) string for each of one or more forecast data services. For example, the location (e.g. GPS, or geographic location) of the battery manager and the type of energy source (e.g. solar) are used as parameters to construct an API string for forecast data corresponding to the location and the type of energy source. Then the API call(s) is made and the data is returned data is, e.g. passed into an array.

For example, commercially available forecast data services such as Solcast provide APIs that will return power data (e.g. measured in kilowatts) as an array of data (often in JSON), where each array element represents a progressive slice of time, and each array value represents the expected power (i.e. rate of energy) to be generated, e.g. in kilowatts, in this given time slice (e.g. 30-minute slice).

For example, the commercially available Solcast API takes as parameters, latitude, longitude, solar array size, and, optionally, angle of incidence of the panels and returns the estimated power generation per 30-minute time-slice for each 30 minute time-slice in the forecast as an array. Their determination of this hourly power is based on data maintained at Solcast regarding solar radiance per time of year as well as satellite imagery data related to cloud cover and cloud cover type.

For example, an API call can be accomplished with the Solcast API via the following Javascript code: var SolAPIStr="https://api.solcast.com.au/pv_power/forecasts?", var SolAPIKey="&api_key=nxdUmDxiaWgBbX_VrdLHwjNOx_m"; These two constant strings are defined. Then the overall string is assembled from these and the other parameters provided via the following line of code (note the +=below means it takes whatever is in SolAPIStr (from above) and adds the rest of it: SolAPIStr +="longitude="+longitude+"&latitude="+latitude+"&capacity="+pvcapkwatts+SolAPIK ey+"&format=json", Optionally, the battery manager is configured to obtain forecast data from a forecast data service that can output estimated power generation, wherein the data is optionally directly parsed into a 'power-generation' table (of power or energy vs time) that is referenced by a charge start time-determining module. Alternatively, the battery manager is configured to obtain forecast data from a forecast data service that outputs weather data (e.g. solar radiance or wind speed forecast data), and the charge start time-determining module is configured to perform calculations to estimate (i.e. predict) power generation based on the forecast data, for example, by converting the data into estimated power generation (e.g. in a power per time-slice format) as taught herein. For example, a forecast data service might return predicted wind speed (e.g. for each one-hour period) over a number of days. This wind speed data can be converted, for example, via a table relating wind speed to power generated for a particular wind generator, into an array or table of power generated per hour over a number of days.

Optionally, the forecast obtained (or determined) by the controller is a forecast of power versus time, wherein the value of power changes over time (e.g. where power is dependent on weather forecast) in the forecast. Optionally, the forecast is of a window of time comprising a plurality of different power values, e.g. at least about 10, at least about 20, at least about 40, at least about 80, or at least about 200 different power values. For example, FIG. 7B depicts a window having Steps S305-S306 in the drawings are examples of steps that can be performed by a forecast-retrieving module.

System Module

A battery manager of the present invention comprises a module configured to execute modes of the battery manager or other modules of the battery manager (system module), e.g. to switch between a plurality of charging modes of the battery manager and execute various tasks.

The plurality of charge modes can comprise, for example, a preparation mode and a maintain mode, wherein the preparation mode is configured to target a higher state of charge to the energy storage device relative to the maintain mode.

The plurality of charge modes can comprise, for example, a preparation mode, an in-use mode, and a maintain mode, wherein each of the preparation mode and the in-use mode is configured to target a higher charge state for the energy storage device relative to the maintain mode (e.g. by turning on a switch connecting an energy source to an energy storage device and/or turning off a switch connecting a load to the energy storage device), and wherein the in-use mode and the preparation mode differentially control a switch connecting a load to the energy storage device (e.g. the in-use mode allows use of a certain load or turns it on by default whereas the preparation mode does not or turns it off by default). Optionally, the system module selects between the modes based on a parameter polled from a parameter table (e.g. charge start time, leave time, and/or arrival time), e.g. as detailed in steps S801 and steps S8A1-S8A14.

The system module can be configured to execute a mode, or switch between modes, responsive to user input (e.g. by a user selecting the mode) or a determination made (e.g. a sensing a parameter reaching a target or determining that a charge start time or discharge start time has been reached).

Optionally, the system module is, e.g. automatically executed at startup, and configured to poll a parameter table for parameter values and then select one or more modules from a plurality of modules executable by the battery manger controller, wherein the module selected for execution is selected by determining whether one or more of the parameter values match a trigger of the selected module. For example, the user can specify a threshold wind speed. A wind forecast containing a wind-speed in any time-slice in excess of the threshold wind speed will cause the system module to execute the preparation mode. Other triggers include the elapse of a time of need, charge start time, and/or leave time.

The controller can, for example, execute a plurality of modules simultaneously (e.g. a battery temperature and voltage sensing module and a module responding to time of need or end of time events, which together can control one or more switches connecting a storage device to a respective energy source or load.

The system module can be configured to execute and/or communicate with any of the other modules taught herein.

The system module can optionally be configured to communicate with a user interface module, e.g. receive user input and provide the user input to another module and/or receive data from another module and display information based on the received data (e.g. a power graph from data produced by the power-prediction module or parameters polled by the parameter-polling module). For example, the system module can communicate with a different processor that runs the user interface module, e.g. via a serial interface or network interface).

In illustrative examples, the system module can be configured to switch from a maintain mode to a preparation mode upon a charge start time elapsing, for example, a charge start time determined by a charge start time determining module that determines a start time based on forecast data.

Optionally, the system module is configured to select a mode of charging based on an override parameter (e.g. inputted by a user). For example, the system module can be configured to determine if an override parameter (e.g. user-set override) is set to start charging (e.g. execute a preparation mode) at a time indicated by the override parameter (e.g. regardless of a charge start time determined based on forecast data). Such a step can be performed, e.g. as in step s306.

For example, steps S501-s505 and s801-s808 can be executed by a system module.

Maintain Mode

A battery manager of the present invention comprises a module configured to target a specified charge state of the energy storage device that is beneficial to the lifespan of the energy storage device ("maintain mode"), for example, a reduced charge state compared to another mode such as preparation mode and/or in-use mode. The maintain mode can modulate the state of charge of the energy source to reach the target state of charge by controlling switches. For example, when the present state of charge is greater than the target state of charge, the maintain mode can switch off one more switches connecting the energy storage device to a respective energy source and/or by switching on one more switches connecting the energy storage device to a respective load. Such a mode is useful for targeting a state of charge (e.g. nominal state) that is beneficial to the energy storage device (e.g. maximizes longevity of overall life span) when the battery's energy is not needed by the user to power a load (e.g. load panel).

Optionally, the controller is configured to switch from an in-use mode to the maintain mode, e.g. upon the elapse of a leave time. Optionally, the controller is configured to switch from the maintain mode to a preparation mode.

The maintain mode can provide the reduced charge state by, for example, targeting a specified charge state of the energy storage device (e.g. setting a target state of charge as a parameter for the maintain mode).

Optionally, the state of charge is from about 20% to about 80% of an energy capacity of the energy storage device (e.g. relative to an absolute full state of charge or a capacity designated by a stored parameter), or about 30%-70% or about 40%-60% thereof, or about 50% thereof. Such a target charge state is useful, e.g., for batteries such as lithium ion batteries.

Optionally, the maintain mode can target state of charge can be a range of state of charge (e.g. a range that includes 50% state of charge). Optionally, the maintain mode is configured to, when the present state of charge of the storage device is greater than the higher end of the range (e.g. greater than a specified charge state maximum by a specific margin), switch off one or more energy sources and/or turn on one or more loads (e.g. a first load or a second load). Optionally, the maintain mode is configured to, when the present state of charge of the storage device is less than the lower end of the range (e.g. less than a specified charge state minimum by a specific margin), switch on one or more energy sources and/or turn off one or more loads.

The maintain mode can be configured to maintain an energy storage device at a state of charge that maximizes longevity of the energy storage device or increases the longevity of the energy storage device relative to a less optimal state of charge (referred to herein as a 'nominal state'). As such, the nominal state of charge can be a precise state of charge (e.g. 50%) or can be a range of state of charge (e.g. 40%-60% or 30%-70%).

As taught herein, the life-span of energy storage devices (e.g. batteries such as lithium ion batteries) is maximized when the energy storage devices are maintained at a nominal state (e.g. 50% state of charge), but the utility of the energy storage devices to the user is often greater when the energy storage devices are charged to a higher state of charge. The maintain mode can reduce the state of charge of the energy storage device (e.g. after an in-use period) by switching on one more switches connecting the energy storage device to a respective load. Specifically, the switched on load(s) drains energy (e.g. electricity) from the energy storage device (e.g. battery) until the target state (e.g. nominal state) of charge is reached. Additionally, or alternatively, the maintain mode can reduce the state of charge of the energy storage by switching off one more switches connecting the energy storage device to a respective energy source, for example when one or more loads are currently connected to and draining the energy storage device.

Optionally, the specified charge state targeted by the maintain mode can be any charge state that is different (e.g. less) than the charge state targeted by another mode of the battery manager (e.g. relative to the charge state provided by a preparation mode or in-use mode).

The maintain mode can be executed by the controller of the battery manager responsive to one or more triggers. For example, the trigger can be a user input such as the user selecting or scheduling a "leave event" option provided by the controller. Optionally, the battery manager controller can be configured to execute the maintain mode from, or at a time when the battery manager is running in a previous mode such as in-use mode (i.e. the controller changes from the previous mode to the maintain mode). For example, the battery manager runs an in-use mode and then, then executes the maintain mode and terminates the in-use mode when the maintain mode is executed.

Optionally, the battery manager is configured to control (e.g. provide linkages to) a plurality of switches, each connecting a respective load to the energy storage device, e.g., wherein the plurality of loads controlled by the respective switches comprises, as an example, a first load (e.g. a load panel) connected to a first switch, a second load connected to a second switch, and a third load connected to a third switch. Optionally, the second load is a load that is switched on by the battery manager responsive to the battery manager controller executing the maintain mode, or switched on responsive to the maintain mode determining that the present state of charge is greater than the target state of charge of the maintain mode. Optionally, the second load is a load that is switched off by the battery manager responsive to the controller transitioning to a preparation mode from the maintain mode (e.g. a preparation mode targeting a higher state of charge than the maintain mode). Optionally, the second load is a load that is switched off or kept off by an in-use mode, e.g. an in-use mode that turns on a first load, wherein the first load is turned when the controller transitions from the in-use mode to the maintain mode. For example, the second load can be a water pump that pumps water to an elevated storage tank, to be used as a source of potential mechanical energy, e.g. wherein the first load is a load panel. Such a water pump, or other device, can be switched on to intentionally discharge the battery to the target state of charge of the maintain mode (e.g. a nominal state of charge). This configuration has the advantage of discharging the battery to the lifespan-saving charge state (e.g. 50%), while at the same time providing a practical use of the energy being consumed. Optionally, the third load is a load that provides power to critical devices such as a basement sump pump, emergency lighting, sirens, or other such critical devices. Optionally, the third load is switched on or kept on in all charge modes, e.g., assuming there has been no thermal or voltage event causing this third load to be switched off for safety reasons.

Grid Mode

Optionally, the controller comprises a grid mode. Optionally, the grid mode can be a specific type of maintain mode or can be a submode (i.e. a mode operable within) any other maintain mode taught herein. Alternatively, the grid mode can be the maintain mode itself. Accordingly, a maintain mode useful in the present invention can be a grid mode itself or can comprise (e.g. as a submode) a grid mode. The grid mode can optionally have any of the features of maintain mode described herein, unless such features conflict with the features explicitly described for the grid mode.

In the grid mode, the controller is configured to discharge energy stored in the energy storage device to a load (e.g. second load bus if the in use mode is configured to use a first load bus). Optionally, in the grid mode, the controller can be configured to obtain a time of need and determine a charge start time that can be used to charge the energy storage device, e.g., starting from nominal, to obtain a higher target state of charge by the time of need. Optionally, in the grid mode, the controller is configured to determine a predicted detriment (e.g. based on a predicted change in resistance) to the energy storage device due to storing energy in the energy storage device at a level in excess of nominal, and compare the detriment to a value, and then, responsive to determining that the value is greater than the detriment, the controller determines to turn off the load at the charge start time and turn on the load at the time of need, thereby temporarily storing energy in excess of nominal. Additionally or alternatively, in the grid mode, the controller is optionally configured to determine a predicted detriment (e.g. based on a predicted change in resistance) to the energy storage device due to discharging the energy storage device to a level less than nominal, and compare the detriment to a value, and then, responsive to determining that the value is greater than the detriment, the controller determines to turn on the load at a time when the when the energy storage device is predicted to be at a nominal state of charge (e.g. the beginning of the stage 4 window of FIG. 22) and then turn off the load when the energy storage device is predicted to reach a target state of charge that is lower than the nominal state of charge (e.g. at the end of the stage 4 window of FIG. 22). Optionally, the controller can time the step of turning on the load (e.g. the beginning of the stage 4 window of FIG. 22) such that the lower target state of charge (end of the stage 4 window of FIG. 22) coincides with the end of a window at which a unit value of energy is determined to drop below a threshold (e.g. drop below peak rate).

Optionally, the grid mode is a mode that uses a grid load algorithm to control a load bus (e.g. a second load bus) that is connected (or connectable) to a power grid (or any other load) configured for metering (e.g. net metering) the amount of energy transferred to the load from the controller, e.g. for determining a sale price of the energy transferred. The power grid can be, for example, the same power grid to which embodiments of this invention connect to as an energy source.

Figure 17:
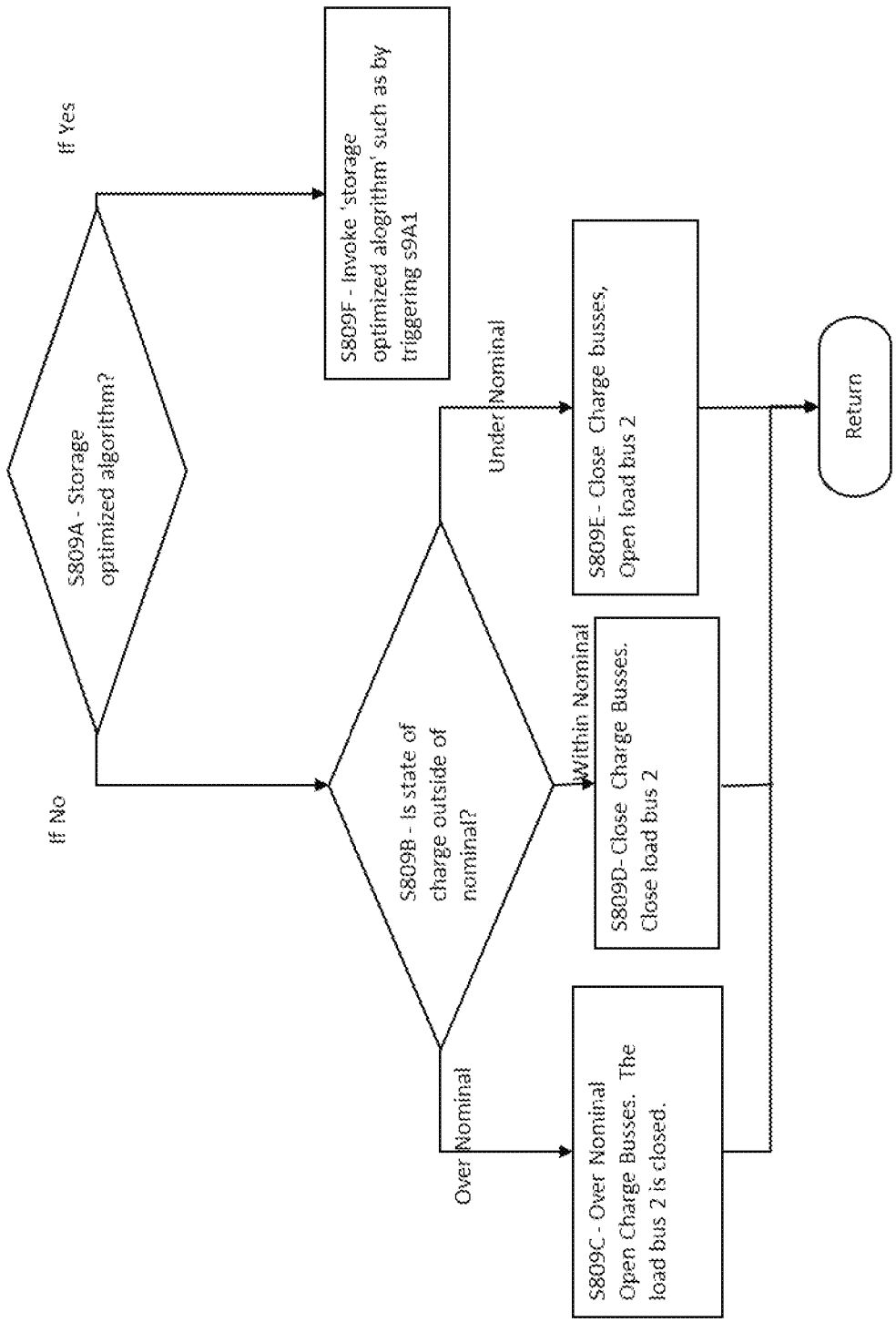
FIG. 17 depicts steps that may be performed by a controller that has been set to grid mode.

Optionally, the grid mode uses a first grid load algorithm configured to close the load bus (i.e. turn on the respective switch to the load) when the current state (i.e. present state) of charge is greater than the state of charge presently being targeted (e.g. nominal state of charge). Optionally, the grid load algorithm is configured to close (or keep closed) the load bus when the current state of charge is within a target range of state of charge. Optionally, the grid load algorithm is configured to open the load bus when the current state of charge is less than the target state of charge. Optionally, the grid load algorithm is configured to close a charge bus (e.g. turn on a switch connected to a renewable energy source) when the present state of charge is less than the target state of charge presently being targeted. An example of such a grid load algorithm is depicted in FIG. 17 (see 5809B-5809E). Optionally, such a grid mode determines to use said first grid load algorithm, irrespective of the unit value (e.g. price per kwh) of the energy delivered to the load (grid).

Figure 18:
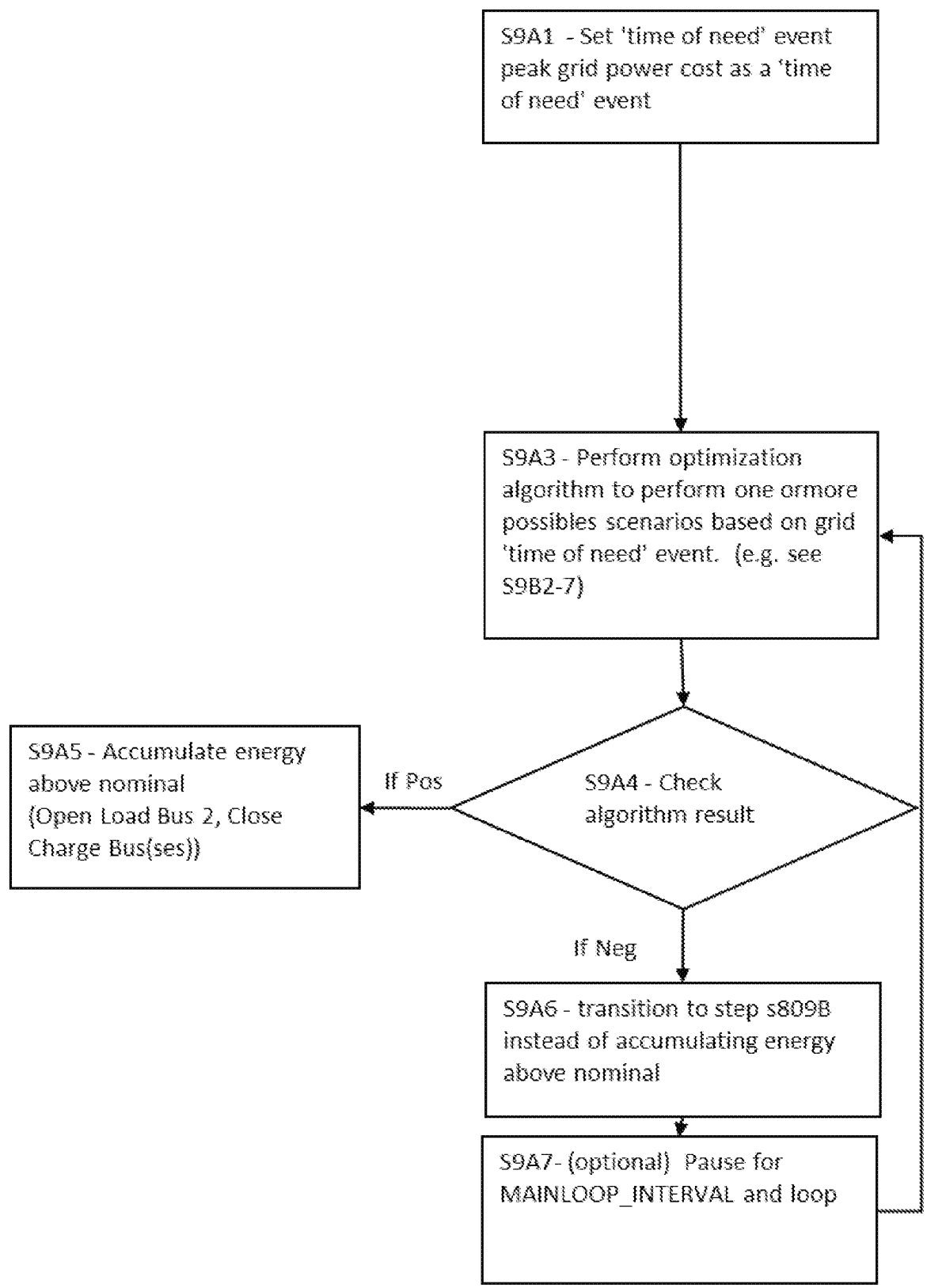
FIG. 18 depicts steps that may be performed by a controller that has been set to grid mode.
Figure 19:
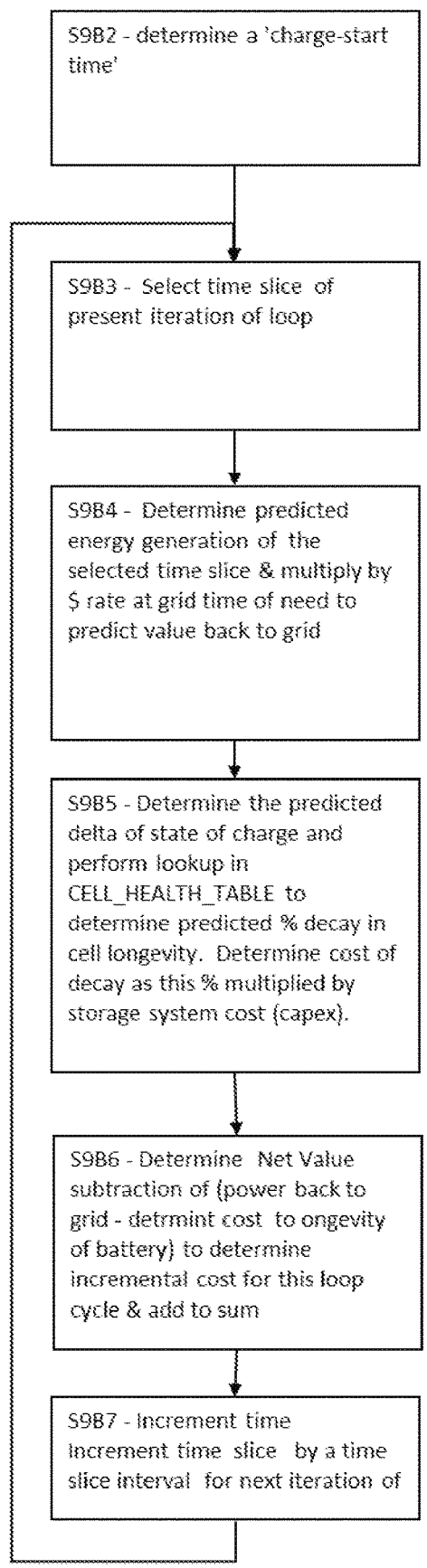
FIG. 19 depicts an algorithm for determining the value of stored energy relative to cost of exceeding a nominal state of charge.
Figure 20:
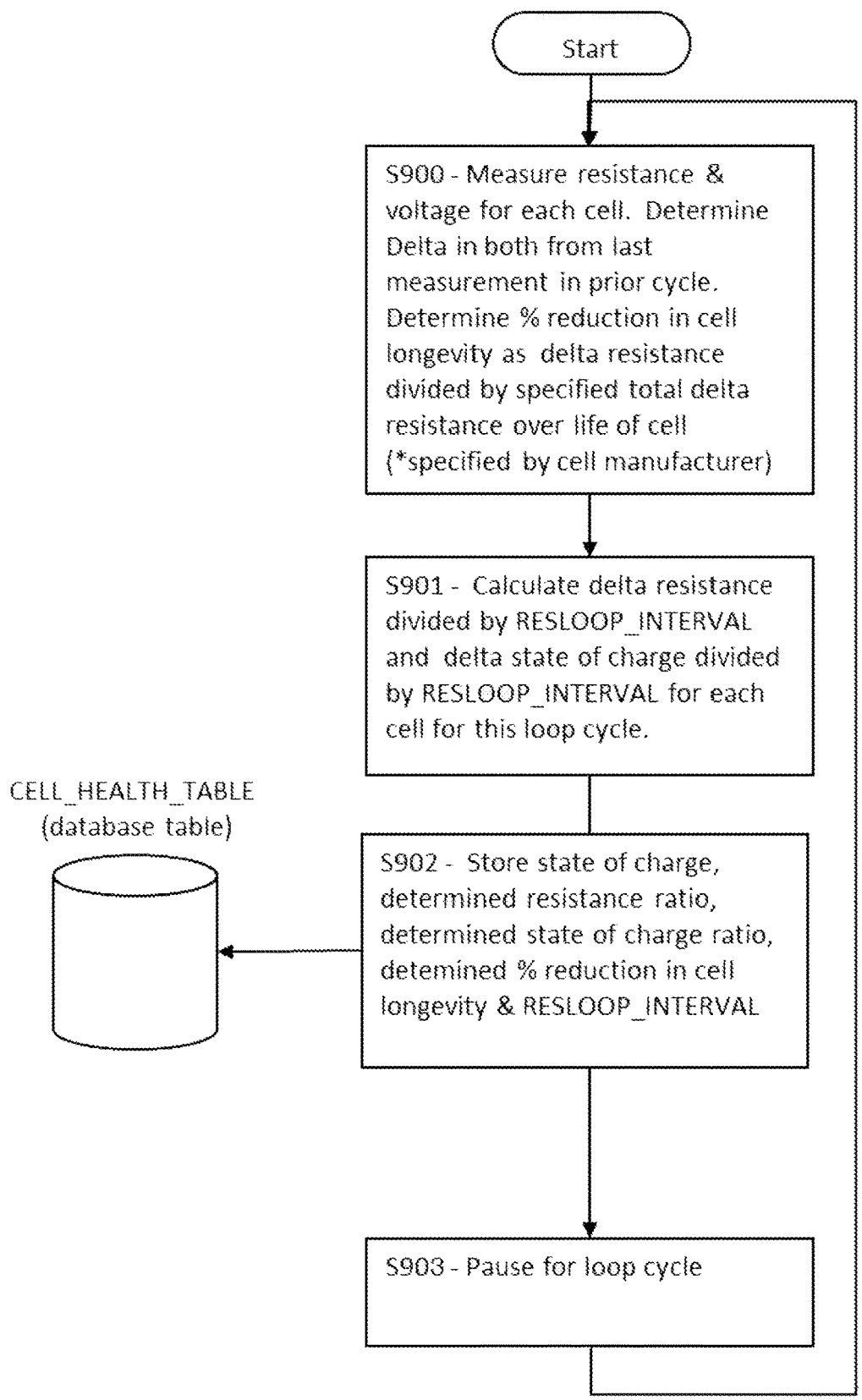
FIG. 20 depicts an algorithm for tracking resistance (as a measurement of cell life or detriment thereof) and charge state to provide a correlation of resistance and charge state saved to a lookup (database) table (CELL_HEALTH_TABLE).
Figure 28:
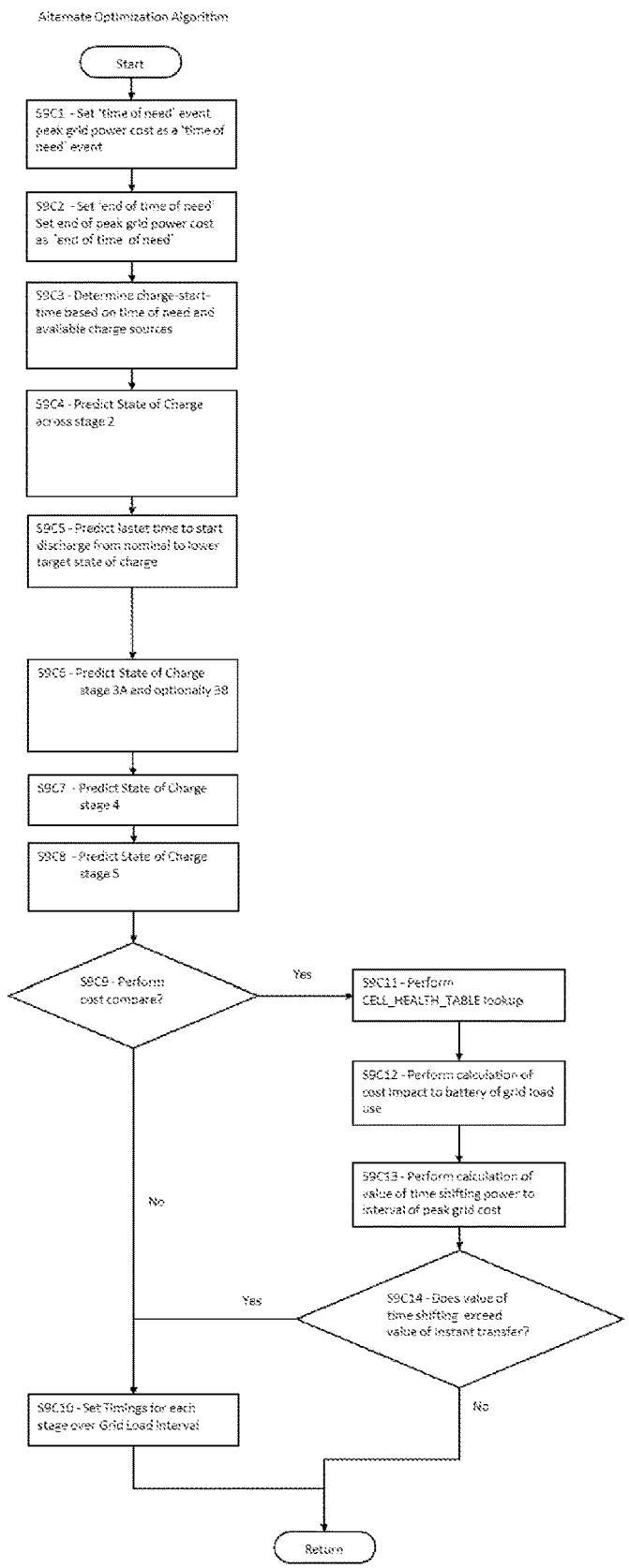
FIG. 28 depicts an algorithm for determining the value of time shifting delivery of energy to a load bus and determining whether to perform the time shift delivery.

Additionally, or alternatively, the grid mode can be configured to execute a second grid load algorithm which performs steps of (e.g. as shown in FIGS. 18 and 19 and the accompanying examples or FIG. 28 and the accompanying example)

a) setting a time of need (e.g. 'grid time of need'), b) using forecast data to determine a charge start time by which charging from one or more charge buses (e.g. renewable energy source) can be commenced to reach a target state of charge by the time of need (e.g. as described herein), c) for the window of time between the charge start time and the time of need, determine a predicted deviation of the state of charge of the energy storage relative to a specified optimum (e.g. nominal) and a corresponding loss of longevity to the energy storage device due to exceeding a specified optimum (e.g. nominal) state of charge;

d) correlate the loss of longevity with a negative value (cost) of storing the energy at said excess of optimal stage of charge;

e) determine a first value of the energy stored at said excess of the nominal state of charge per a first unit value (a specified unit value such as a price per unit of energy, e.g. a peak price per kwh, e.g. determined via table lookup) corresponding to the time of need;

f) determine a second value of the energy stored at said excess of the nominal state of charge per a second unit value (e.g. a unit value corresponding to the time of energy production by the energy source, e.g. determined via table lookup);

g) if it is determined that the difference of the first value minus the second value is greater than the negative value (i.e. the cost)', then h) open the load bus connected to the grid at the charge start time, thereby commencing charging of the energy storage to accumulate energy in excess of the optimum (e.g. nominal) state of charge; and i) close the load bus at the time of need, thereby commencing discharging of the energy storage device to the load.

Steps h and i above result in temporarily storing energy in the energy storage device in excess of the nominal state of charge and transferring the energy stored in excess of the nominal state of charge to the load at a later time. This is referred to herein as time shifting power delivery, because the power (or energy) would otherwise have been sent to the grid at the time it was produced by the energy source(s) in order to maintain the energy storage device at the nominal state of charge. Additionally, the controller can choose to deliver to the load (once the time of need occurs), not only the energy stored in excess of the nominal state of charge (thereby discharging the energy storage device to nominal), but additional energy such that the present state of charge of the energy storage device drops below nominal. When the controller predicts that additional energy will be sent to the grid, thereby reducing the state of charge below nominal, the controller can determine a loss of longevity due to the period of time at which the energy storage device is predicted to be below the nominal state of charge and correlate the loss of longevity with a negative value (cost) of discharging the energy storage device below the nominal (optimal) state of charge.

Optionally, if it is determined that the difference of the first value minus the second value is not greater than the negative value (i.e. the cost), the controller targets the optimum state of charge by controlling the load bus and/or charge bus (e.g. by executing steps 809B-E of the first grid load algorithm).

Optionally, if it is determined that the difference of the first value minus the second value is not greater than the negative value (i.e. the cost), the controller increases (delays) the charge start time, thereby providing a new charge start time, determines a new target charge state that is predicted to be able to be reached based on the forecast data and the new charge start time, and repeats steps c-g using the new charge start time and new target charge state.

Optionally, the controller obtains unit value (price data) of electrical energy and the grid time of need is set to be the time at which the unit value will meet a specified condition. The condition can be, for example, the unit value exceeding a threshold cost (i.e. absolute cost), the unit value exceeding a threshold deviation from average cost (e.g. average over a specified period of time such as 1 month or 1 day), the unit value exceeding a threshold deviation from minimum cost (e.g. minimum cost over a specified period such as 1 day or 1 month), the unit value being equal to peak unit value or within a specified percentage of peak unit value (e.g. where unit value is determined over a specified period such as 1 day or 1 month). As a specific example, the time of need can be set to be the time of peak power cost (and therefore peak benefit for net metering).

Optionally, step c above, includes determining a loss of longevity to the energy storage device due to exceeding a specified optimum (e.g. nominal) state of charge comprises the steps of dividing the window into a plurality of intervals, determining for each interval, the predicted deviation from the specified optimum, and correlating the deviation with a loss of longevity, and summing the loss of longevity for each of the intervals of the window.

While the invention contemplates optional embodiments in which the controller comprises a maintain mode and a separate preparation mode and separate in use mode, it is to be noted that the grid mode (e.g. submode of maintain mode) can use several features or configurations described for the other modes taught herein. For example, the grid mode can perform functions of setting a time of need (e.g. by user input or by table lookup), obtaining (e.g. determining) a power-prediction (e.g. via a power prediction module), determining a charge start time (e.g. via a charge start time-determining module), and predicting future charge states (e.g. by using a charge state determining module to simulate changes to charge state for hypothetical future times). For the sake of brevity, the present application will not repeat the corresponding steps used by the grid mode, but the skilled artisan will recognize when the grid mode can use a feature, function, or module of another mode to carry out a specified determination, and that various substitutions may be made relative to the preparation mode or in-use mode. For example, the grid mode may optionally use different target states of charge, different load(s) (e.g. the grid mode can deliver energy to a different load than the in use mode), and/or different charge source(s). Alternatively, the invention also contemplates a system in which only the grid mode is present in the controller (i.e. the controller doesn't necessarily need to have the preparation or in use modes)

Among the various embodiments of the grid mode are the following non-limiting examples.

A controller of any embodiment of the invention can be provided with a grid mode. As a non-limiting example, the controller is configured to operate in a grid mode that targets an optimal (nominal) state of charge, e.g. 50% state of charge by controlling a switch to a respective load (grid) and optionally controlling one or more switches to a respective one or more energy (charge) source(s), for example, as detailed in 5809B-5809E of FIG. 17. The controller optionally configured to use a grid load algorithm to determine whether to switch from said targeting of the nominal state of charge to targeting a higher state of charge (e.g. performing step S809F of FIG. 17).

Optionally, the controller comprises a plurality of modes, one of which is the grid mode, e.g. the plurality of modes can comprise a first mode (a grid mode or 'maintain mode' comprising the grid mode), and one or both of a second mode ('preparation mode'), and a third mode ('in-use mode'). Alternatively, the invention contemplates a configuration in which the controller is limited only to the first mode.

Optionally, the maintain mode targets a nominal state of charge as a first target state of charge, for example, as detailed in 5809B-5809E of FIG. 17. The nominal state of charge can be selected by the user, e.g. based on a manual entry of a target charge state or the selection of a battery type for which the controller has a pre-set respective nominal state of charge (such as a range of nominal state of charge).

Optionally, the controller is configured to obtain a time of need and set the time of need as a time at which to complete charging to a second target state of charge. This time of need is sometimes referred to herein as 'a charge finish time'. The controller is configured to obtain a power prediction for a window of time including at least the time of need and a period of time preceding the time of need. In the embodiments described with respect to this grid mode, this window of time is sometimes referred to herein as a first window of time and can optionally correspond to any of the stages shown in FIG. 22. The power prediction comprises a correlation of one or more times and a respective energy production or one or more rates of power production for the one or more energy sources (e.g. as detailed herein with respect to a charge start time determination module). The controller is configured to determine a charge start time based on a) the power prediction and b) the difference between the nominal state of charge (or the present state of charge) and a second target state of charge ('first cumulative charge'). The second target state of charge is greater than the nominal state of charge and can optionally be the same state of charge targeted in the preparation mode or in-use modes taught herein (e.g. a usable capacity of the energy storage device or any state of charge set or preset by the controller or input by the user). Optionally, the charge start time is determined as the latest time the controller determines that it can initiate charging to the energy storage device from the one or more energy sources (by turning on the one or more energy sources and turning off the load switch to the grid) such that the energy storage device reaches the second target state of charge by the time of need. Optionally, the step of determining the charge start time based on the charge finish time and the power prediction (forecast data) comprises: i) determining the difference of the second target state of charge and the nominal charge state, thereby providing the first cumulative charge, optionally wherein the first cumulative charge is an amount of energy (e.g. in FIG. 22, the second target state of charge is 5000 watt-hours and the nominal state of charge is 2500 watt-hours, thereby providing the difference of 2500 watt-hours as the first cumulative charge); ii) determining a predicted energy production ('cumulative predicted power') of the one or more energy sources from the power prediction; iii) determining, from the cumulative predicted power production, a window of time ('stage 2' window' such as the stage 2 window in FIG. 22) which ends at the charge finish time and begins at a latest time such that the first cumulative charge is produced during the stage 2 window; iv) providing the beginning of the stage 2 window as the charge start time; and v) optionally setting the controller to turn off the first load switch at the charge start time. Step v) is sometimes optional or can be dependent on whether the controller determines to not turn on the first load switch at the first charge start time based on a determination made by a grid load algorithm (e.g. a grid load algorithm comprising step S9A4 in FIG. 18 or another step of determining whether to turn off the load switch at the charge start time to target the higher state of charge or whether to target the nominal state of charge).

Figure 22:
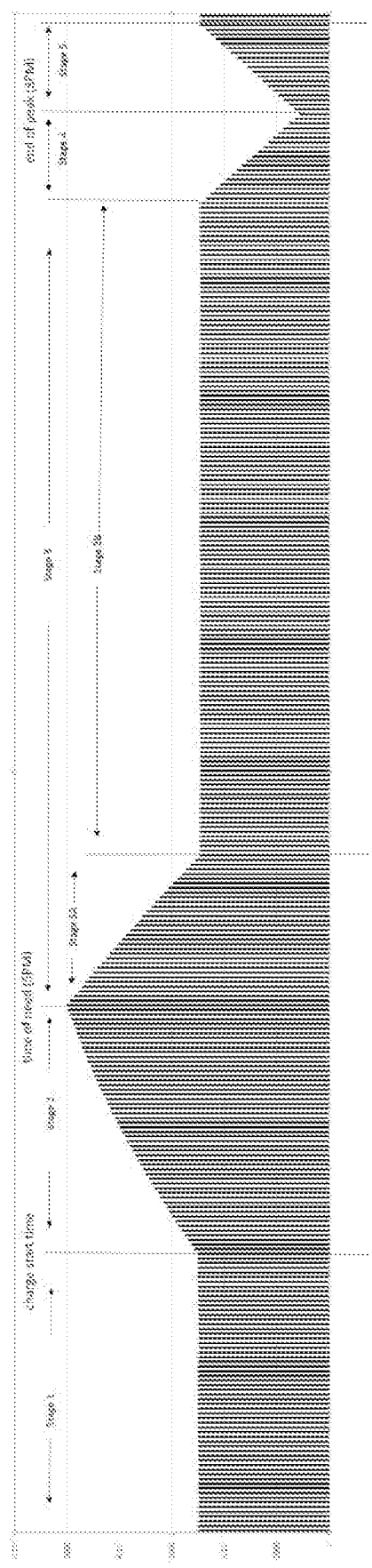
FIG. 22 depicts predicted stage of charge (watt hours) vs time of an energy storage device.

Optionally, the power prediction comprises a plurality of time slices, each comprising a time and a respective energy production (e.g. time and energy forecast in table 29), and the stage 2 window comprises a final time slice corresponding to the charge finish time, and a beginning time slice that provides the stage 2 window with a sum of time slice energy productions from the beginning time slice to the final time slice that corresponds to (e.g. is equal to or greater than) the first cumulative charge, e.g. as depicted in FIG. 22. Optionally, the controller determines the beginning time slice by;
  a. providing a hypothetical beginning time slice (e.g. any time slice that precedes the time of need);
  b. obtaining, based on the power prediction, the respective energy productions of each of the time slices of the window spanning from the hypothetical beginning time slice to the final time slice;
  c. summing the obtained respective energy productions, thereby providing a hypothetical sum;
  d. selecting the hypothetical beginning time slice as the beginning time slice of the stage 2 window if the hypothetical sum is equal to or greater than the first cumulative charge; and
  e. if the hypothetical sum is not greater than the first cumulative charge, changing the hypothetical time slice to an earlier time slice, and repeating the above steps a)-d) (providing, obtaining, summing, and selecting), using the changed hypothetical time slice.

Figure 27:
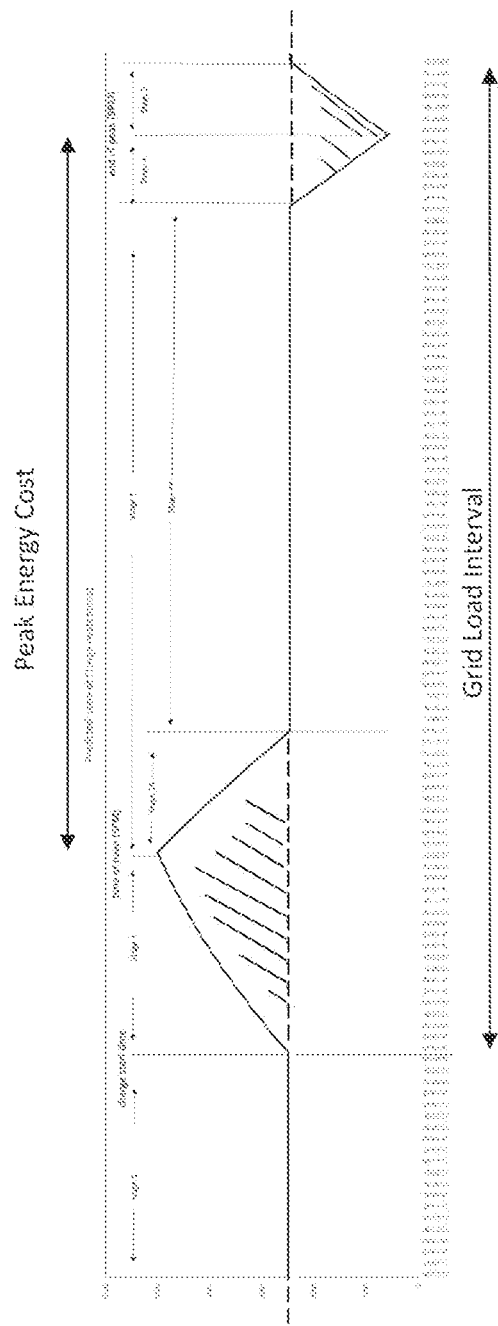
FIG. 27 depicts predicted stage of charge (watt hours) vs time of an energy storage device, shading areas that deviate from nominal.

Optionally, the controller is configured to:
a) calculate a plurality of predicted states of charge of the energy storage device across a window ('grid load interval' such as the grid load interval shown in FIG. 27) spanning from the charge start time until at least the time of need (e.g. as shown in FIG. 29 for 'with time shifting')

b) obtain a correlation of state of charge and detriment to the energy storage device, optionally wherein the correlation of state of charge and detriment is a correlation of detriment and deviation of state of charge from the nominal state of charge (e.g. a correlation obtained from a cell health table as in FIG. 26, noting that FIG. 26 correlates a measured integral of % deviation in stateofcharge from nominal with a respective % change in resistance, and noting that % change in resistance is itself a reflection of and correlated to detriment to the longevity of the battery cell);

c) apply the correlation to the one or more predicted states of charge, thereby providing a predicted detriment to the energy storage device (e.g. using a determined % deviation from nominal over the grid load interval, e.g. as determined at the end of the table in FIG. 29, and plugging in the determined % deviation from nominal to the cell health table in FIG. 26 to retrieve a respective change in resistance);

d) obtain a correlation of detriment to the energy storage device and cost (e.g. where the detriment is a percentage reduction in the longevity (life) of a battery and the controller receives a cost (e.g. negative value or dollar amount) of the battery (e.g. a brand-new battery having 100% of its life left)).

e) apply, to the predicted detriment, the correlation of energy storage device detriment and cost, thereby providing a predicted cost (e.g. the cost due to lost life of the battery, such as dollars lost, due to holding the battery at a charge stage other than nominal);

f) obtain a first unit value (or a plurality of first unit values) of energy (e.g. price per unit of energy such as dollars per kwh) and a second unit value (or a plurality of second unit values) of energy, for example by receiving the first and second values by user input or by looking the values up in an energy unit value table such as the table shown in FIG. 30, optionally, wherein the first unit value of energy is selected as a unit value of energy that exceeds a unit value corresponding to the unit value corresponding to the present time or wherein optionally the first unit value of energy is selected as a unit value which represent a peak unit value over a predetermined window of time (e.g. the next day, week, or 24 hours), and optionally the second unit value is the value corresponding to the present time or corresponding to the stage 1 window;

g) determine a first value of a second cumulative charge based on the first unit value (or first unit values) (e.g. multiply the second cumulative charge (e.g. kwh) times the peak rate of 0.52/kwh in FIG. 30) optionally wherein the second cumulative charge is equal to the first cumulative charge (e.g. the amount of energy from stage 2 in FIG. 22 which is temporarily stored and shifted to the time of peak rate), or a sum of the first cumulative charge and a third cumulative charge (e.g. the amount of energy change from stage 4 in FIG. 22 which is predicted to be transferred during the time of peak rate) which is the difference between the nominal state of charge a fourth target state of charge that is lower than the nominal state of charge, optionally equal to two times the first cumulative charge, for example a fourth target state of charge that is the same deviation from nominal as the second target state of charge (in which case the second cumulative charge is twice that of the first cumulative charge);

h) determine a second value based on the second cumulative charge and the second unit value (or second unit values) (e.g. multiply the second cumulative charge (e.g. kwh) times the rate of 0.26/kwh corresponding to the stage 1 window in FIG. 30);

i) perform one of:
  i) determine a net value of the second cumulative charge based on the difference of the first value of the second cumulative charge and the predicted cost (e.g. first value minus the predicted cost) and then compare the net value and the second value; or
  ii) determine a difference of the first value and the second value (e.g. first value minus the second value), and determine the difference of A) the difference of the first value and the second value and B) the predicted cost (e.g. (first value minus the second value) minus the predicted cost);

j) responsive to determining that the net value is greater than the second value or responsive to determining the difference of A) and B) is positive, turn off the first load switch at the charge start time and turn on the first load switch at the time of need (in other words, determining to use time shifting) and k) optionally, responsive to determining that the net value is not greater than the second value or responsive to determining the difference of A) and B) is negative, control the first load switch to target the nominal state of charge during a window of time spanning from the charge start time to at least the time of need (in other words, determining not to use time shifting).

For the sake of illustration of the paragraph immediately above, it is to be noted that the first unit value can correspond to a peak rate (e.g. first unit value of $0.52, 5 pm-8 pm rate for weekdays in the summer, FIG. 30). Additionally, the second unit value can correspond to a non-peak rate (e.g. second unit value of $0.26, 5 pm-8 pm rate for weekdays in the summer, FIG. 30). In this example, there are only two unit values of energy ($0.52 for peak, and $0.26 for before peak and after peak). However, it is possible that there could be multiple different first unit values (e.g. multiple different peak rates or rates meeting a specified conditions such as exceeding a threshold) and/or multiple different second unit values (e.g. multiple different non peak rates such as for the winter rates which have a before peak rate of $0.24 and an after peak rate of $0.28). When multiple first unit values or second unit values are provided, the first value (for the time shifting scenario, the amount of energy time shifted multiplied by the respective peak rate(s)) and/or the second value (for the non-time shifting scenario, the amount of energy time shifted multiplied by the respective non-peak rate(s)) may be calculated by dividing the second cumulative charge (i.e. the amount of energy which is time shifted in the time shifting scenario) into respective portions of the second cumulative charge, wherein each portion corresponds a respective unit value (e.g. from FIG. 30) at which the energy would be transferred for the specified scenario, e.g. multiplying a first portion of second cumulative charge by the unit value the first portion would be transferred at for the given scenario to provide a first portion value, multiplying a second portion of second cumulative charge by the unit value the second portion would be transferred at for the given scenario to provide a second portion value, and adding the two portion values together to provide the total value of the time shifted energy for the given scenario (noting that the value of the time shifted energy which is being determined can be the value of the time shifted value when it is time shifted or when it isn't time shifted). The rest of this paragraph will describe an example in which there are multiple second unit values. To illustrated this, in a situation in which the winter rates of FIG. 30 are used, the first unit value would be $0.42. Accordingly, in this illustrated example, there is only one peak rate (a single first unit value of $0.42) for determining the first value (i.e. the second cumulative charge is multiplied by $0.42 to provide the first value). However, the winter rates of FIG. 30 show that the before peak (8 am-5 pm) rate is $0.24 while the after peak (8 pm-8 am) rate is $0.28. Accordingly, in this illustrated example, there are two non peak rates (i.e. two second unit values) for determining the second value (i.e. the value of the time shifted energy if it were to be transferred to the grid at the time of production by the energy source(s) rather than time shifting). In the time-shifted example shown in FIG. 22, there are two stages in which time shifted energy is transferred to the grid, Stage 3A and Stage 4. Accordingly, in this illustration, the second cumulative charge is the sum of the discharged amount of energy in stage 3A and the discharged amount of energy in stage 4. Accordingly, the second cumulative charge can be divided into a first portion corresponding to stage 3a and a second portion corresponding to stage 4. The energy transferred to the grid in stage 3A (discharged amount of energy, i.e. the first portion) was (or is predicted by the controller to be) produced by the charge source(s) in stage 1, i.e. before peak (8 am-5 pm) such that the [first] second unit value for the first portion of the second cumulative charge (corresponding to stage 3A) is $0.24 (FIG. 30, winter rate for 8 am-5 pm). The energy transferred to the grid in stage 4 (discharged amount of energy, i.e. the second portion) is predicted by the controller to be produced by the charge source(s) in stage 5, i.e. after peak (8 pm-8 ampm) such that the [second] second unit value for the second portion of the second cumulative charge (corresponding to stage 4) is $0.28 (FIG. 30, winter rate for 8 pm-8 am). An explanation of why this occurs, it is to be noted that the energy transferred to the grid (in the time shifting scenario) at state 4 would have actually be produced (in the non-time shifting scenario) during stage 5. This is because the energy transferred to the grid at stage 4 (in the time shifting scenario) dropped below nominal, and this energy (produced in stage 5) was time shifted to the grid to an earlier time (stage 4) than the time of production (i.e. the time of production in the non time shifting scenario). In other words, the time shifted energy in stage 3A is time shifted forward from earlier and the time shifted energy from stage 4 is time shifted backwards from later. To time shift energy forward, the energy storage device stores energy at a state higher than nominal and then discharges the excess energy back to nominal (as in stage 3a) during the time of delivery of the time shifted energy. In contrast, to time shift energy backwards (from a future time), the energy storage device discharges energy to below the nominal state at the time of delivery (as in stage 4) and then later charges the battery back up to nominal (in stage 5). In other words, the energy time shifted to stage 3A was time shifted from stage 1, whereas the energy time shifted to stage 4 was time shifted from stage 5. Thus, when energy is time shifted from periods having different unit values (i.e. two or more second unit values), the controller can divide the second cumulative charge into respective portions (each corresponding to a discharge amount of energy time shifted from a respective period, such as stage 3a time shifted from stage 1 and stage 4 time shifted from stage 1) and multiply each portion by the respective second unit value (e.g. $0.24 for stage 1 and $0.28 for stage 5) and add the result to provide the second value of the second cumulative charge (i.e. the value of the energy if it were not time shifted).

In order to determine the [second] second unit value, which corresponds to the rate at which the second portion of the second cumulative charge (i.e. the amount discharged in stage 4) would have been transferred to the grid in the non-time shifting scenario (i.e. transferred to the grid at the time of production by the charge source(s)), the controller determines when the energy would have been produced by the charge sources.

Optionally, the grid load interval comprises a window ('stage 2 window' such as the stage 2 window shown in FIG. 22) spanning from the charge start time to the time of need (charge finish time), and the plurality of predicted states of charge comprise a series of predicted states of charge of the energy storage device for the stage 2 window (e.g. as in FIG. 29), wherein the series of predicted states of charge are calculated by the controller based on the power prediction, wherein the series of predicted states of charge are reflective of the first load switch being turned off at the charge start time. Optionally the series of predicted states of charge of the energy storage device for the stage 2 window comprise predicted state of charge for each of the time slices, wherein the predicted state of charge for each of the time slices is provided by: a) obtaining a predicted state of charge for a time slice adjacent to the respective slice; b) adding or subtracting the energy production of the respective slice to the predicted state of charge for the adjacent time slice.

Optionally, i) the grid load interval comprises a window ('first discharge window') spanning from the charge finish time to a time after the charge finish time (e.g. stage 3A, FIG. 22); ii) the plurality of predicted states of charge comprise one or more predicted states of charge of the energy storage device for the first discharge window; iii) the one or more predicted states of charge of the energy storage device during the first discharge window are calculated based on a specified discharge rate of energy to the first load, a specified starting state of charge for the beginning of the first discharge window, and a specified ending state of charge for the end of the first discharge window; iv) the specified starting state of charge for the beginning of the first discharge window is the second target state of charge; v) the specified ending state of charge for the end of the first discharge window is a third target state of charge that is lower than the second target state of charge, optionally wherein the third target state of charge is the nominal state of charge or is a target state of charge lower than the nominal state of charge; vi) the first discharge window spans from the charge finish time to an ending time at which the third target state of charge will be reached based on the specified discharge rate and the difference between the second target state of charge and the third target state of charge ('second cumulative charge'); and vii) the one or more predicted states of charge of the energy storage device during the first discharge window are reflective of the first load switch being turned on at the beginning of the first discharge window and optionally one or more charge sources being turned on or kept on. This can be accomplished in multiple ways. For example, in one method, the controller divides the first charge window into time slices as was done for the stage 2 window, and determines respective states of charge for each of the time slices. Another method can calculate a stage of charge representative of the entire window, such as a time-weighted deviation of stage of charge across the window.

For example, in the first method mentioned above for determining one or more predicted states of charge for the first discharge window, the controller can be configured to i) determine the difference between the second target state of charge and the third target state of charge, thereby providing a second cumulative charge, optionally wherein the second cumulative charge is an amount of energy; ii) calculate the one or more predicted states of charge of the energy storage device for the first discharge window by dividing the first discharge window into a plurality of time slices, providing the charge finish time as a beginning time slice of the first discharge window, and then determining, for each of the plurality of time slices of the first discharge window that follow, i) the expected state of charge for the beginning or preceding time slice of the first discharge window, and ii) a respective predicted state of charge of the energy storage device based on a net discharge amount for the respective time slice and the predicted state of charge of the energy storage device for the previous time slice, wherein the net discharge amount for each of the respective time slices is determined by the specified discharge rate and optionally an obtained power prediction for the one or more energy sources for the respective slice, (e.g. as in FIG. 29, the data of which corresponds to the scenario shown in FIG. 22 comprising stages 1-5) and wherein the plurality of time slices comprises a time slice corresponding to the third target state of charge as a final time slice of the first discharge window. This method is similar to the time slice charge state predictions used for the stage 1 window described hereinabove.

Figure 24:
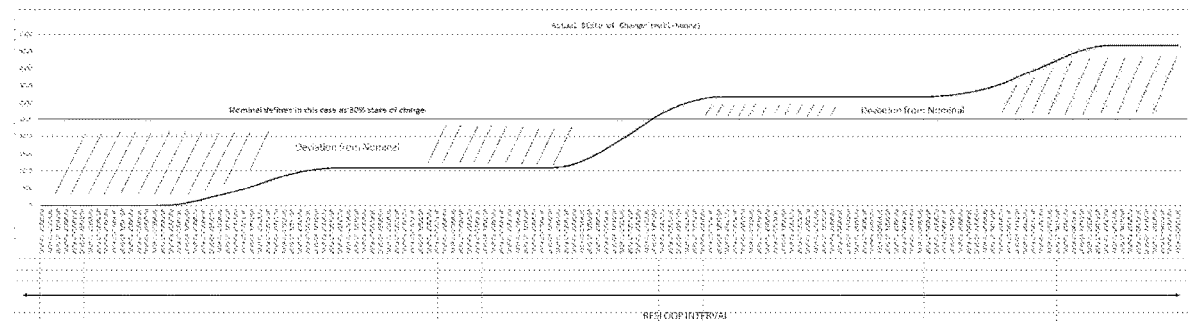
FIG. 24 depicts a stage of charge over an interval, shading areas that deviate from nominal.

These charge states of the respective time slices can be used to determine an absolute deviation from nominal (e.g. when the cell health table correlates detriment or change-in-resistance to deviation from nominal). For example, FIG. 24 illustrates a hypothetical scenario in which the state of charge crosses through nominal (50%), and the absolute deviation of states of charge can be the absolute value of the difference between a respective state of charge and nominal. Further, the controller can determine optionally the integral (area under the curve) of this absolute deviation by considering time spent at the deviation to determine a time-weighted deviation of a window as a whole (e.g. as performed at the end of the table of FIG. 29).

As an alternative to determining a predicted charge state for a plurality of time slices, the one or more predicted states of charge of the energy storage device during the first discharge window can be a time-weighted absolute charge state deviation from the nominal state of charge for the first discharge window. For example, the controller can be configured to i) determine the duration of the first discharge window based on the specified discharge rate (e.g. user-entered, set by the controller, or determined by historical measurements of energy delivery to the load) and the second cumulative charge; ii) determine a first absolute deviation from nominal of the second state of charge; iii) determine a second absolute deviation from nominal of the third target state of charge; iv) determine the time-weighted absolute charge state deviation from the nominal state based on the duration of the first discharge window, the first absolute deviation, and the second absolute deviation. For example, assuming the first discharge window corresponds to stage 3A in FIG. 22, the negative slope of the curve is reflective of the specified discharge rate (as in FIG. 27, which is representative of the same scenario shown in FIG. 22 but without the use of time slices). As such, assuming the energy sources are not producing power (e.g. it is night time for a solar array) or assuming the charge rate from the energy sources is negligible compared to the specified rate of discharge, the controller does not need to predict a charge state for a plurality of time slices. Instead, as detailed above, it can simply use the known (i.e. predicted) states of charge at the beginning and end of the first discharge window (e.g.

based on set targets) in combination with the discharge rate to determine a time-weighted average deviation from nominal across the window, as detailed in steps i)-iv) above. Alternatively, the controller can make a similar determination of time-weighted deviation across the first discharge window by determining a) a first absolute deviation from nominal of the second state of charge or a second absolute deviation from nominal of the third target state of charge; b) determining the time-weighted absolute charge state deviation from the nominal state based on the specified discharge rate, the duration of the first discharge window, and one of i) the first absolute deviation, or ii) the second absolute deviation.

Optionally, the grid load interval comprises a window ('second discharge window' such as stage 4) spanning from a first time to a second time, wherein the first time is later than the charge finish time. In this optional configuration, the controller sets the second time and a fourth target state of charge (e.g. the same minimum state of charge used for in-use mode) for the second time, wherein the fourth target state of charge is lower than the nominal state of charge, optionally wherein the second time is set as the end of a window which provides the first unit value (e.g. end of peak pricing based on a table lookup, e.g. based on the end of peak from FIG. 30)). The duration of time from the first time to the second time is based on the specified discharge rate, optionally the forecasted power generation for the enabled charge sources, and the difference between the fourth state of charge and the nominal state of charge ('third cumulative charge'). Optionally, the controller determines the first time based on the specified discharge rate and the difference between the fourth state of charge and the nominal state of charge. Optionally, the plurality of predicted states of charge comprise one or more predicted states of charge of the energy storage device for the second discharge window; the one or more predicted states of charge of the energy storage device during the second discharge window are calculated based on the specified discharge rate of energy to the first load, optionally the forecasted power generation for the enabled charge sources, the nominal state of charge being selected as a starting state of charge for the beginning of the second discharge window, and the fourth state of charge being selected as the ending state of charge for the end of the second discharge window; and the one or more predicted states of charge of the energy storage device during the second discharge window are reflective of the first load switch being turned on at the beginning of the second discharge window.

Optionally, the controller is configured to determine the difference between the nominal state of charge and the fourth target charge state, thereby providing the third cumulative charge (e.g. an amount of energy equal to the difference between the start of stage 4 and the end of stage 4 from FIG. 22). The controller can calculate the one or more predicted states of charge of the energy storage device for the second discharge window by i) dividing the second discharge window into a plurality of time slices; ii) providing the first time as a beginning time slice of the second discharge window; and iii) determining, for each of the plurality of time slices of the second discharge window that follow the beginning time slice of the second discharge window, a respective predicted state of charge of the energy storage device based on a net discharge amount for the respective time slice of the second discharge window and the predicted state of charge of the energy storage device for the previous time slice of the second discharge window, wherein the net discharge amount for each of the respective time slices of the second discharge window is determined by the specified discharge rate and optionally an obtained power prediction for the one or more energy sources for the respective slice of the second discharge window, and wherein the plurality of time slices of the second discharge window comprises a time slice corresponding to the fourth target state of charge and the second time as a final time slice of the second discharge window.

As with the first discharge window, the one or more predicted states of charge of the energy storage device during the second discharge window can comprise an absolute deviation of charge state from the nominal charge state for the second discharge window or time slice thereof.

As with the first discharge window, the absolute charge state deviation can optionally be a time-weighted absolute charge state deviation from the nominal state of charge for the second discharge window.

For example, the controller can be configured to determine the duration of the second discharge window based on the specified discharge rate and the third cumulative charge; determine a third absolute deviation from nominal of the fourth target state of charge (optionally determining a fourth absolute deviation from nominal of the nominal state of charge to be zero); determine the time-weighted absolute charge state deviation from the nominal state based on 1) the duration of the second discharge window, the third absolute deviation, and the use of zero as the absolute deviation of the nominal state of charge from the nominal state of charge or 2) the specified discharge rate, the duration of the second discharge window, and one of the third absolute deviation or the second absolute deviation.

Optionally, the grid load interval comprises a window ('stage 5 window' such as stage 5 in FIG. 22) spanning from the end of a discharge window (e.g. end of stage 4). The plurality of predicted states of charge can optionally comprise a series of predicted states of charge of the energy storage device for the stage 5 window, wherein the series of predicted states of charge for the stage 5 window are calculated by the controller based on a power prediction for the stage 5 window, wherein the series of predicted states of charge for the stage 5 window are reflective of the first load switch optionally being turned off at the start of the stage 5 window. Optionally the series of predicted states of charge of the energy storage device for the stage 5 window comprise predicted state of charge for each of the time slices of the stage 5 window, wherein the predicted state of charge for each of the time slices of the stage 5 window is provided by a) obtaining a predicted state of charge for a time slice adjacent to the respective slice of the stage 5 window; and b) adding or subtracting the energy production of the respective slice of the stage 5 window to the predicted state of charge for the adjacent time slice of the stage 5 window.

As described above, the controller can obtain predicted charge states and/or predicted energy production during a grid load interval. A grid load interval is a window of time over which predictions are made by the controller. Optionally, the grid load interval comprises a window over which energy storage state dynamics are predicted to change in the a time shifted scenario relative to a non-time shifted scenario (e.g. stages 2-5). For example, for a particular time of need (e.g. for a particular time shifting scenario based on a time of need), the grid load interval can start at the earliest time the energy storage device is predicted to deviate from nominal and end at the latest time at which the energy storage device is predicted to deviate from nominal. Optionally, the grid load interval includes one or more windows of time in which time shifted energy is produced by one or more energy sources (e.g. stage 1 for the energy time shifted to stage 3a and/or stage 5 for the energy time shifted to state 4).

Optionally, in addition to a grid time of need, the controller can determine an end of time of need (e.g. end of stage 4, FIG. 22), for example, the latest time at which the first unit value (e.g. peak rate) is provided.

Optionally, the controller compares predictions of charge state of a time shifted scenario (e.g. as in FIG. 22) to a non-time shifted scenario (e.g. the same period of the time shifted scenario but having a constant nominal state of charge).

Preparation Mode

A battery manager of the present invention comprises a module configured to provide a target state of charge of the energy storage device in preparation for use of the energy storage device ("preparation mode") by switching on one more switches connecting the energy storage device to a respective energy source and/or by switching off one or more switches connecting the energy storage device to a respective load. The preparation mode can have several features including targeting of state of charge that is greater than the state of charge targeted by the maintain mode.

The preparation mode can provide the increased charge state by, for example, targeting a specified charge state of the energy storage device (e.g. setting the target state of charge as a parameter).

As taught herein, while the maintain mode can be configured to provide a life-span maximizing state of charge, the preparation mode can be configured to increase the state of charge (e.g. to full charge, or to a determined or user specified target level), thereby providing a greater usability in the short term to the user (e.g. the most amount of energy which can be supplied before recharging).

Optionally, the increased charge state may be any charge state that is greater than a different charge state provided by another mode of the battery manager (e.g. relative to the charge state targeted by a maintain mode).

The preparation mode can be executed by the controller of the battery manager responsive to one or more triggers.

Optionally, the preparation mode can be executed by the battery manager upon the setting of a future time of need, for example the setting of an arrival time of a home owner, and the controller determining that a charge start time has elapsed.

Optionally, the trigger for preparation mode can be the elapse of a charge start time determined based on processing of one or more sets of forecast data, of an event requiring that increased energy (capacity) be available in the energy storage system. For example, detection of a wind-speed over a user settable rate in one or more time-slices of data returned from a wind-speed forecast API will trigger preparation mode with this time-slice (a time corresponding to the time slice) as the time of need, wherein the controller determines a charge start time there from. Alternatively, detection of precipitation within a range of time in a weather forecast will trigger preparation mode with the first time-slice of this detected range set as the time of need, wherein the controller determines a charge start time there from. Alternatively, detection of a planned power grid outage event within the forecast data provided by a power utility can provide the basis for the controller to determine a charge start time.

Optionally, the preparation mode is executed responsive to the battery manager controller determining that a charge start time (e.g. a charge start time determined based on a scheduled time of need event) has elapsed. For example, the battery manager controller can be configured to allow the user to enter a date and time for which the battery will be needed to be used by the user to drive loads, and the battery manager controller, based on forecast data and, e.g. other factors described herein, determines a charge start time, and that the charge start time has been reached.

Optionally, the battery manager controller can be configured to execute the preparation mode while the battery manager is running in a maintain mode (i.e. the controller transitions from the maintain mode to the preparation mode).

The preparation mode can increase the state of charge of the energy storage device by switching on one more switches connecting the energy storage device to a respective energy source or sources. Additionally, or alternatively, the preparation mode can increase the state of charge of the energy storage device by switching off one more switches connecting the energy storage device to a respective load (e.g. a load that was turned on by the maintain mode to reduce the state of charge to the maintain mode's target), for example when one or more energy sources are already currently connected to and charging the energy storage device. For example, when the switched off load(s) that was draining energy (e.g. electricity) from the energy storage device (e.g. battery) is no longer draining the energy storage device, the energy storage device now begins accumulating charge at a greater rate.

Optionally, the preparation mode charge mode targets a state of charge below the absolute full state of charge. Optionally, the target state of charge is determined as a state of charge below the absolute full state of charge that will meet a predicted energy requirement for the duration of a scheduled in-use period. Optionally, the predicted energy requirement is determined based on historical energy use data and/or forecasted power production (power prediction) by an energy source. Optionally, the historical energy use data is an average rate of energy consumption recorded by the controller from one or more previous uses (e.g. a previous in-use period). Accordingly, based on 1) historical energy consumption, 2) predicted duration of future in-use period (e.g. the time from a scheduled arrival event to a scheduled leave event or an average duration of stay), and 3) a forecasted power production (power prediction) for the energy source during the predicted in-use period, the controller can determine the state of charge (e.g. minimum state of charge) required to support load requirements during a future in-use period (e.g. corresponding to a user's stay at the location that uses the battery manager). For example, the controller can be configured to perform the following steps: 1) the in-use period (e.g. duration of stay) is determined as the difference, in time, between an arrival event and a leave event. 2) a historical average of energy consumption while in in-use mode is determined and stored in memory, e.g. average by month of the year; 3) the predicted energy consumption over the duration of stay (i.e. in-use period) is determined as the multiplication of the historical average consumption multiplied by duration of stay (e.g. in hours). 4) the amount of energy generation that will occur from the energy source (e.g. solar panel) during the stay is determined based on the power forecast data as taught herein (e.g. integration of power v. time forecast). 5) this calculated amount of energy generated from step 4 is subtracted from the determined energy required during the stay from step 3. This represents the net energy that will be consumed during the stay (i.e. the energy deficit resulting from the stay). 6) The net energy from stay determined in step 5, is subtracted from the present state of charge of the battery (or target state of charge of the maintenance mode). This represents the state of charge the battery would reach by the end of the stay (considering energy consumed and generated during the stay) if no charging occurred before the arrival event (note this could be a negative number at this point). 7) The amount of additional energy required before the arrival event is determined as the difference between the amount of energy available in the battery in the present charge state (or target state of charge of the maintain mode, e.g. 50% absolute state of charge) and the result of step 6. Note: the goal of this step is to manage the battery to an end state of 50% absolute state of charge, but this could optionally by some other number as set by the maintain mode range specified by the user (e.g., based on battery chemistry type). 8) If the amount of energy required, as determined in step 7 is a positive number, the charge start algorithm, as previously described, is applied, with optionally considering the charge source preference algorithm as previously described to produce the amount of energy determined in step 7. Accordingly, it is possible for the preparation mode to target a state of charge that is below a full state of charge, wherein the target is determined via the sum of the battery's present state of charge and the additional state of charge determined in step 7, thereby providing a state of charge that can satisfy the predicted net energy deficit of the stay while avoiding a full state of charge to increase longevity of the battery.

In-Use Mode

A battery manager of the present invention can comprise a module configured to provide a battery storage system in a state in which the energy storage device can be used to drive a load ('In-use mode'), e.g. a first load such as a load panel.

Optionally, the in-use mode is configured to turn on (e.g. and keep on such as by preventing turning off, e.g. absent an override) a switch connecting the energy storage device to a first load (e.g. load panel). For example, responsive to executing the in-use mode, the controller can turn on a first load and optionally turn off or keep off a second load (e.g. a second load turned on by the maintenance mode to reduce the present state of charge to the target state of charge of the maintain mode), and optionally keep on a third load (e.g. a load that is kept on in all modes such as a critical load).

Optionally, the in-use mode is configured to turn off (e.g. and keep off) a switch connecting the energy storage device to a second load (e.g. a second load that is turned on by a maintain mode to drain the energy storage device). Optionally, the in-use mode is configured to turn on (e.g. and keep on) a third load connected to the energy storage device, wherein the third load critical load.

Optionally, the in-use mode is configured to turn on (e.g. and keep on) a switch, or set of switches, connecting the energy storage device to one or more energy sources.

As an illustrative example, in-use mode can be executed manually by the user (e.g. when a home owner is present and desires to use loads), or based on a scheduled event (e.g. an arrival time inputted by the user or determined by another module) or if primary (e.g. grid) power is reported to or detected by the battery manager as down, the battery manager will control one or more switches to attempt to maintain the specified or determined maximum state of charge (e.g. defined by a usable energy capacity parameter).

Optionally, the in-use mode and a preparation mode are both configured to (e.g. absent an override or health/safety check failure) close or keep closed the same first switch(s) connecting an energy storage device and an energy source, and the in-use mode closes or keeps closed at least one second switch connecting the energy storage device and a load (e.g. load panel) and the preparation mode opens or keeps open the second switch.

Optionally, the in-use mode targets a state of charge (e.g. a state of charge higher than a state of charge targeted by the maintain mode), and is configured to turn on a first load responsive to the in-use mode being executed and is not configured to turn off (or is configured to keep on) the first-load responsive to the present state of charge dropping below the target state of charge of the in-use mode, e.g. wherein the first load is turned off or kept off in the preparation mode responsive to the controller determining that the present state of charge is less than the target state of charge of the preparation mode. Optionally, the in-use mode is configured for such a step of keeping on (or not turning off) the first load when the present state of charge drops below the target state of charge of the in-use mode, and optionally further, the controller is configured to turn off the first load when the controller determines a safety or health check has failed, e.g., the present state of charge drops below a lower limit of healthy state of charge (i.e. a lower limit that is less than that the target state of charge), e.g. a lower limit that is set as the lowest state of charge which is considered to be safe/health for the battery, or the temperature of the energy storage device has become outside of a range that is set as a safe/healthy range.

For example, the in-use mode, which is designed specifically to drive a load for the user, can be configured to leave a load (e.g. first load such as a load panel) on when the present state of charge drops below its respective target state of charge whereas the maintenance mode can be configured to turn off a load (e.g. the first load, or a second load used specifically by the maintenance mode to drain the energy source) when the present state of charge drops below the target state of charge of the maintenance mode. In such a configuration, the in-use mode can optionally be configured to turn off the first load only when the present state of charge drops below a specified safe/heathy level (e.g. 5% charge). Additionally, although the in-use mode can optionally target the same state of charge as the preparation mode, the in-use mode can differ from the preparation mode by how it controls one or more load switches when the present state of charge is less than the respective target state of charge of the mode. For example, the preparation mode can turn off (or keep off) the first load (e.g. load panel) and optionally a second load when the present state of charge is less than the target state of charge of the preparation mode but, as discussed above, the in-use mode does not turn off the first load when the present state of charge drops below the target state of charge of the in-use mode, and, for example, the in-use mode turns off and keeps off the second load at all times during normal operation (e.g. absent an override from the user or a higher priority module running simultaneously).

Optionally, the controller is configured to control a plurality of load switches, and the controller is configured to receive a setting of which load switch to turn on in in-use mode (e.g. a first load switch, e.g. connected to a load panel) and/or which load to turn on in maintain mode (e.g. a second load switch, e.g. connected to a power grid or a critical load).

Power-Prediction Module

A battery manager of the present invention can comprise a module ('power prediction module') configured to determine an estimated amount of energy or power that an energy source will produce ('power prediction'). For example, the power prediction can comprise an amount of energy (e.g. kilowatt-hours) or the rate of energy generation (i.e. power such as kilowatts) that an energy source will produce over a future window of time. As taught herein, estimated amount of power (or energy) is a prediction of future power (or energy) and is, itself, forecast data. Additionally, the power prediction (e.g. amount of power that an energy source produces) can be a function of other forecast data (e.g. weather forecast).

While some embodiments of the present invention obtain from a remote server forecast data that includes estimated power production (e.g. as obtainable from Solcast), the present invention also contemplates a power prediction module that can calculate estimated power production (e.g. kilowatts) over time (e.g. power vs time) over a specific time window based on a combination of weather data and a correlation (e.g. correlation factor) that transforms (e.g. mathematical transformation such as multiplication) this weather data into a predicted amount of power generation. For example, weather data (e.g. wind speed per hour data) can be used in combination with a correlation such as a correlation comprising either a table look-up (wind speed vs. power generation) or a calculation to determine power vs wind speed or energy per hour vs wind speed.

The power-prediction module can, for example, calculate an estimated power production over a window, which is referenced by a charge start time-determining module to estimate how long it will take to charge an energy source, and determine a charge start time therefrom.

Optionally, the forecast data comprises a plurality of forecast values and respective times (e.g. calendar date/time). Through insight of the inventor, it has been discovered that the total charge (total energy production) provided by an energy source over the time window comprising the respective times can be a function of the integral of a curve of forecasted power vs time. The integral can be a mathematical integration of an equation of forecast power vs. time, or can be an area calculation (or estimation) of area under the curve of forecasted power vs. time.

As an illustrative embodiment, the radiance forecast data over time can have cyclical patterns where the base of the wave is zero (night time), and the peak of the wave occurs when the sun is most powerful (around noon) and where the peak is lowered based on factors such as cloud cover. The power-prediction module can perform an integration (area under the curve) of this power vs time curve to determine the amount of energy (e.g. in kilowatt-hours) produced by an energy source over a given window.

Optionally, the power-prediction module is configured to obtain first forecast data comprising weather forecast data values (e.g. solar radiance), one or more configuration parameters of an energy source (e.g. solar array size, angle of incidence, efficiency, and/or correlation of weather data to power production), and determine power production over time by a correlation of power production and the configuration parameters. Then, as discussed above, the power-prediction module can perform an integration (e.g. AUC determination) of the determined power production to calculate an estimated energy production over a window of time.

Optionally, the values of the first forecast data are corrected (e.g. based on multiplication or other mathematical operation) by a variable calculated from second forecast data. Examples of useful parameters include parameters obtained from second forecast data of a second data type different than the first. For example, the first forecast data can be radiance data and the second forecast data can be cloud cover data (e.g. where cloud cover data can be used to correct the radiance data).

Optionally, the power-prediction module is configured to use a correlation of forecast value (e.g. radiance or wind speed) and power production provided by an energy source, in the determination of power production over a window of time. Optionally, the power-prediction module is configured to calculate the correlation for making future determinations of power production by comparing (A) current or historical forecast data (forecast data corresponding to the current time or a previous time) and (B) a present or historical power production (e.g. power production calculated based on sensor readings taken during charging of the energy storage device from the energy source). Accordingly, a battery manager can, for example, be programmed initially with a correlation of forecast data (e.g. radiance data) and power production, and/or the battery manager can be created/updated based on historical data of the specific installation of the battery manager, as such a created/updated correlation may be influenced by the efficiency of the energy source or system, the geographical location, or the time of year.

Optionally, the preparation mode is configured to turn off one or more (e.g. all) energy sources when the present state of charge rises to the target state of charge of the preparation mode, e.g. which may correspond to a charge finish time.

Charge Start Time-Determining Module

A battery manager of the present invention can comprise a module configured to determine a time to start charging the energy storage device, e.g. at a high rate of charge ('charge start time-determining module'). For example, the module can determine a charge start time parameter which can be used to set a time at which the battery manager switches to a preparation mode.

The charge start time-determining module can be configured to determine the amount of energy required to bring the state of charge of an energy storage device from the current state of charge to a target state of charge such as the usable energy capacity (e.g. defined by a cumulative charge-to-full parameter), and determine a charge window indicating how long it will take for the energy source, or sources, to produce the determined amount of energy, based on a predicted power production (i.e. a power prediction) of the energy source, or sources, and set the charge start time as the beginning of the determined charge window. The charge window can be a window ending at a 'charge-complete time' and beginning at the charge start time. The charge-complete time can be set as the time of need, such as the time of a scheduled arrival event (e.g. a user-inputted time or determined time, corresponding to a time a user arrives home or a time the energy storage device is needed to provide energy to a load). Thus, the charge window can be the latest-starting window of time that allows the energy source to fully charge the storage device (or bring the energy storage device to a state of charge defined by a parameter such as usable energy capacity or portion thereof).

For example, the charge start time-determining module can be configured to calculate a duration of charging time required for an energy source (or sources) to charge the energy storage device from a first state of charge (e.g. the current state of charge or a state of charge targeted by a maintain mode) to a second state of charge (e.g. a maximum state of charge or a state of charge targeted by a preparation mode). The duration of charging time required can be determined with respect to a specific date (or time), for example with the second state of charge being reached at or by the specific date (or time).

Such a required duration of charging time can be determined from the estimated power calculated by the power-prediction module. For example, the estimated power calculated by the power-prediction module can be in the form of an array or curve of estimated power produced at specific future times.

The duration of charging time is a function of charging rate or power production provided by the energy source (and optionally discharging rate provided by the load(s)). Through insight in the mind of the inventor, it has been discovered that the charging rate provided by an energy source can vary, and that the variable charging rate can be predicted (calculated) based on forecast data. By way of example, the calculated charging rate from a solar cell is a function of at least solar radiance forecast. As another example, the calculated charging rate from a wind turbine is a function of at least wind speed forecast.

Optionally, the charge start time-determining module can be executed while the battery manager is running in the maintain mode, and then, for example, the battery manager switches from maintain mode to preparation mode when the present time reaches the determined charge start time.

Optionally, the charge start time determined can be saved as a parameter in the memory of the battery manager, and the system module can be configured to switch to the preparation mode when the charge start time is reached.

As an illustrative example, the charge start time-determining module can be configured to determine the time point in the forecast data (e.g. the hour) that equates to the arrival hour (e.g. step S3B0). It then cycles backward in time (backward through the array) from this time (e.g. step S3B6), summing the expected charge amount in each array element (e.g. each 30 minute time slice) (e.g. step S3B2) until either the summed charge equates to the cumulative charge to full parameter (e.g. step S3B4) or the present time (e.g. present hour) has been reached (e.g. step S3B5). If the present time has been reached during the cycling backwards for a start time, this indicates it is likely the system will not reach full state of charge by the arrival time. This provides the time to start charging (either the present time or the latest hour examined that will provide the required cumulative charge).

Optionally, a system includes a plurality of energy sources. Optionally, the controller sets a charge start time for each of the respective energy sources. Optionally, the battery manager controller is configured to set or determine a priority of the plurality of energy sources (e.g. prioritize a first energy source over a second energy source). Optionally, the battery manager controller controls a plurality of energy sources by respective energy source switches based on the priority. For example, prioritization could occur according to cost of energy for each source, with the lowest cost source assigned the highest priority. Alternatively, prioritization could be based on a clean rating (environment-friendliness rating) whereby cleaner energy sources are prioritized higher). Alternatively, prioritization could be based on a rating any factor or based on a combination of factors (e.g. cost, clean rating, and/or other factors). Optionally, the battery manager maintains an array of charge start times indicating a charge start time for each prioritized charge source connected. Optionally, charge start time array elements with a value of zero will be ignored (e.g. the charge source related to zero value charge start times will not be turned on in preparation mode). The battery manager controller can optionally use an algorithm that considers priority upon receipt of a time of need event (for example receipt of an arrival event from a user) to determine the charge start times. Optionally, the algorithm calculates the time to reach a target (e.g. 'full') state of charge (e.g. based on forecast data as described herein) using the first (higher priority) energy source. If a charge start time is determined that represents a time in the future, this time is set for the first priority charge source and the algorithm ends. If the charge start time is determined to be now (i.e. the required incremental charge cannot be produced by the first priority charge source between the present time and the time of need) the amount of energy generated by the first priority charge source is deducted from the cumulative amount of power (i.e. energy) to be generated in preparation mode. The charge start algorithm described is applied to the second priority charge source. If a charge start time is determined that represents a time in the future, this time is set for the second priority charge source charge start time and the algorithm ends. If the second priority charge start time is determined to be the present time (i.e. the required incremental charge cannot be produced by the second priority charge source between the present time and the time of need) the amount of energy generated by the second priority charge source is deducted from the cumulative amount of power to be generated in preparation mode. The charge start time for the second priority charge source is set to now (the present time). This process continues until a charge start time representing a time in the future is determined or until a charge start time has been determined for all available power sources.

Optionally, this algorithm also serves in this manner to control the rate of charge of the energy storage system. Energy storage systems, and particularly battery technology, can suffer decreased longevity based on, either high rates of charge over a small window of time, or low rates of charge over extended periods of time. They also suffer decreased longevity based on factors already described herein (e.g. cell temperature). The prioritization structure provides for optimization around this. If the energy storage system is of a type (e.g. includes a particular battery type) that prefers a high rate of charge over low time, a max rate flag can be set (either through selection of the battery chemistry type from a pull down, or via a specific over-ride setting available in the UI). Optionally, in this manner, the charge start time algorithm will include the power contribution of all power sources in each time slice as it calculates a charge start time starting with the time of need time and working backward in time according to the charge start time algorithm herein described. If instead, the energy storage system is of a type (e.g. includes a particular battery type) that prefers a low rate of charge over extended time, the system can use the prioritization algorithm described above to keep the rate of charge as low as possible (i.e. using the minimum number of charge sources) while still reaching a 'full state of charge' by the time of need.

The charge-state determining module can determine the charge state as an amount of energy (e.g. number of kilowatt-hours) held by the battery or as a percentage of the maximum capacity of the battery (e.g. wherein the maximum capacity is stored as a parameter and optionally corresponds to the absolute full state of charge or the usable energy capacity of the battery).

Optionally, the charge-state determining module is configured to obtain a cumulative charge (i.e. amount of energy to be delivered to raise the charge state of the energy storage device to a target charge state) and a power prediction including data of energy vs time (e.g. FIG. 7C) for an energy source (e.g. by integration of power vs time for the energy source) for a period (window) of time ending with a time of need.

Optionally, the controller determines which time slice should be the beginning time slice of the window by;

a) providing a hypothetical beginning time slice (e.g. any time slice that precedes the time of need);

b) obtaining, based on the power prediction, the respective energy productions of each of the time slices of the window spanning from the hypothetical beginning time slice to the final time slice (time of need);

c) summing the obtained respective energy productions, thereby providing a hypothetical sum; and d) selecting the hypothetical beginning time slice as the beginning time slice of the window if the hypothetical sum is equal to or greater than the cumulative charge; and e) if the hypothetical sum is not greater than the first cumulative charge, changing the hypothetical time slice to an earlier time slice, and repeating the above steps a)-d) (providing, obtaining, summing, and selecting) using the changed hypothetical time slice.

As an example of the above method of using hypothetical beginning time slices, the controller can perform a reverse summation of the energy vs time data to determine a sum of (i.e. cumulative) future energy vs time data (e.g. FIG. 10) by determining the amount of energy that will be produced during the last (i.e. ending) time slice of the energy vs time data, and then adding the amount of energy for each immediately previous time slice (each immediately previously time slice being the hypothetical beginning time slice), and repeating the step of adding the amount of energy for each immediately previous time slice (i.e. changing the hypothetical beginning time slice to the immediately previous time slice) until either the summed charge equates to the cumulative charge or the time slice (the hypothetical beginning time currently being used) corresponds to the present time (note: this indicates it is likely the system will not reach the cumulative charge by the arrival time).

As taught herein, the charge start time determining module can obtain a first time of need (e.g. via user input), e.g., in order to determine a charge start time to prepare the energy storage device for the user's arrival (e.g. to deliver energy to a first load). Additionally, or alternatively, the charge start time determining module can obtain a second time of need (e.g. via user input), e.g., in order to determine a charge start time to prepare the energy storage device for time-shifted delivery of energy to a second load (e.g. a grid).

Parameter-Polling Module

A battery manager of the present invention can comprise one or more modules configured to obtain parameter values from the memory of the battery manager and/or from one or more sensors connected to the battery manager. The battery manager can, for example, poll the sensors and/or memory for parameter values, and determine whether to perform one or more actions based on the parameter values (e.g. by comparing the parameter values to parameter targets).

Optionally, a parameter polling module used by the battery manager is configured to read data from a table of parameter values, e.g. a table which can also be polled by other modules (or a parameter polling module of another module). Thus, a global table of a parameter can be provided which can be polled by a plurality of modules of the battery manager.

Optionally, a parameter polling module used by the battery manager is configured to obtain readings from one or more sensors and to write data to a table of parameter values, e.g., writing parameters of cell voltage, cell current, cell resistance, cell Balancer chip temperature, and total current flowed into or out of an energy storage device.

A parameter polling module can be a series of steps (code) included within a module, or can be an independent executable that can be initiated by another module.

Charge State-Determining Module

A battery manager of the present invention can comprise a module for determining the charge state of a battery or cell thereof ('Charge State-Determining Module'). For example, the module can read a charge current from a battery or cell thereof (or both charge current and discharge current) and determine the state of charge of the battery or cell thereof.

For example, steps S601-S602 detail steps of reading sensors of current that indicate total current moving into the battery and the total current moving out of the battery which can be used to determine the charge state of a battery. For example, starting from a reference state of charge (e.g. a previous state of charge known by the controller), the controller can track the present state of charge by monitoring the amount of energy transferred into or out of the energy storage device.

Many algorithms for determining state of charge of a battery are known in the art. For example, the absolute full state of charge can be set as a parameter by a user, or by the controller after the controller senses a voltage spike which is known to occur at or near absolute full charge state. Similarly, the empty state of charge can be identified as the point at which a sharp voltage drop off occurs. Such states can be used as a reference state of charge to begin tracking on energy in/out of the storage device. For example, after setting a reference state of charge (for a particular time, the controller can monitor total current in and out of the battery, and then the controller can determine the present charge state (e.g. present amount of energy stored by the battery as a percentage of the energy present at absolute full charge). Other algorithms are known in the art which do not require the controller to identify the empty and absolute full charge state.

The determined charge state can be saved as a parameter and it can be compared to another parameter, e.g. a target parameter used by a maintain mode or an in-use mode.

For example, the battery manager can determine whether the present state of charge is within a target nominal range (e.g. 20%-80%) when the battery manager is in a maintain mode, and can determine whether the current state of charge is within a target nominal range (e.g. maximum charge) when the battery manager is in a preparation mode.

Additionally, the controller can predict future hypothetical charge states of future times by using a reference state of charge and simulating (i.e. calculating) current in/out of the energy storage device that will happen at the respective times, e.g. based on power prediction data (used to predict incoming current) or a specified discharge rate (used to predict outgoing current), optionally multiplying by time (e.g. to determine amp-hours) or by voltage and time (e.g. to determine kilo-watt-hours).

Any time of need can be set by the user (e.g. a local or a remote user of a networked computer). A grid time of need can alternatively be determined by the controller to be the time at which the cost (price) of electrical power will meet a specified condition, e.g. by referencing data such as a table correlating the unit value of energy with time (e.g. FIG. 30). The condition can be, for example, the cost exceeding a threshold cost (i.e. absolute cost), the cost exceeding a threshold deviation from average cost (e.g. average over a specified period of time such as 1 month or 1 day), the cost exceeding a threshold deviation from minimum cost (e.g. minimum cost over a specified period such as 1 day or 1 month), the cost being equal to peak cost or within a specified percentage of peak cost (e.g. where peak cost is determined over a specified period such as 1 day or 1 month). As a specific example, the time of need can be set to be the time of peak power cost (and therefore peak benefit for net metering).

Battery Balancing Module

A battery manager of the present invention can comprise a module for balancing batteries or cells of a battery. The battery balancing module can be configured to poll for one or more parameter values of each battery or cell, and determine whether each battery or cell has a parameter value outside of an allowable (target) value. The target value can be an average of sensed values (e.g. average voltage of all cells).

The battery balancing module can then, responsive to determining that the polled value (e.g. cell voltage) is higher than the target (e.g. average cell voltage), turn on a switch that causes the respective cell to discharge to one or more other cells to even out the charge between the cells, thus lowering the cell voltage of the respective cell.

For example, steps S603-S606 details a processing that can be performed by a battery balancing module.

User Interface Module

A battery manager of the present invention, or a remote device used in a system of the present invention, can optionally be configured with a module that receives input from a user through a user interface and/or sends output to (e.g. performs a display on) the user interface.

Optionally, the user interface module is configured to receive user input parameters from the user and store them in a parameter table.

Optionally, the user interface module is configured to receive a user input that causes one or more settings of the battery module to be changed. For example, the user input can comprise an input of an "arrival event" or a "leave event", which can cause the battery manager to change to a specific mode of operation, e.g., preparation mode or maintain mode, respectively.

Figure 8:
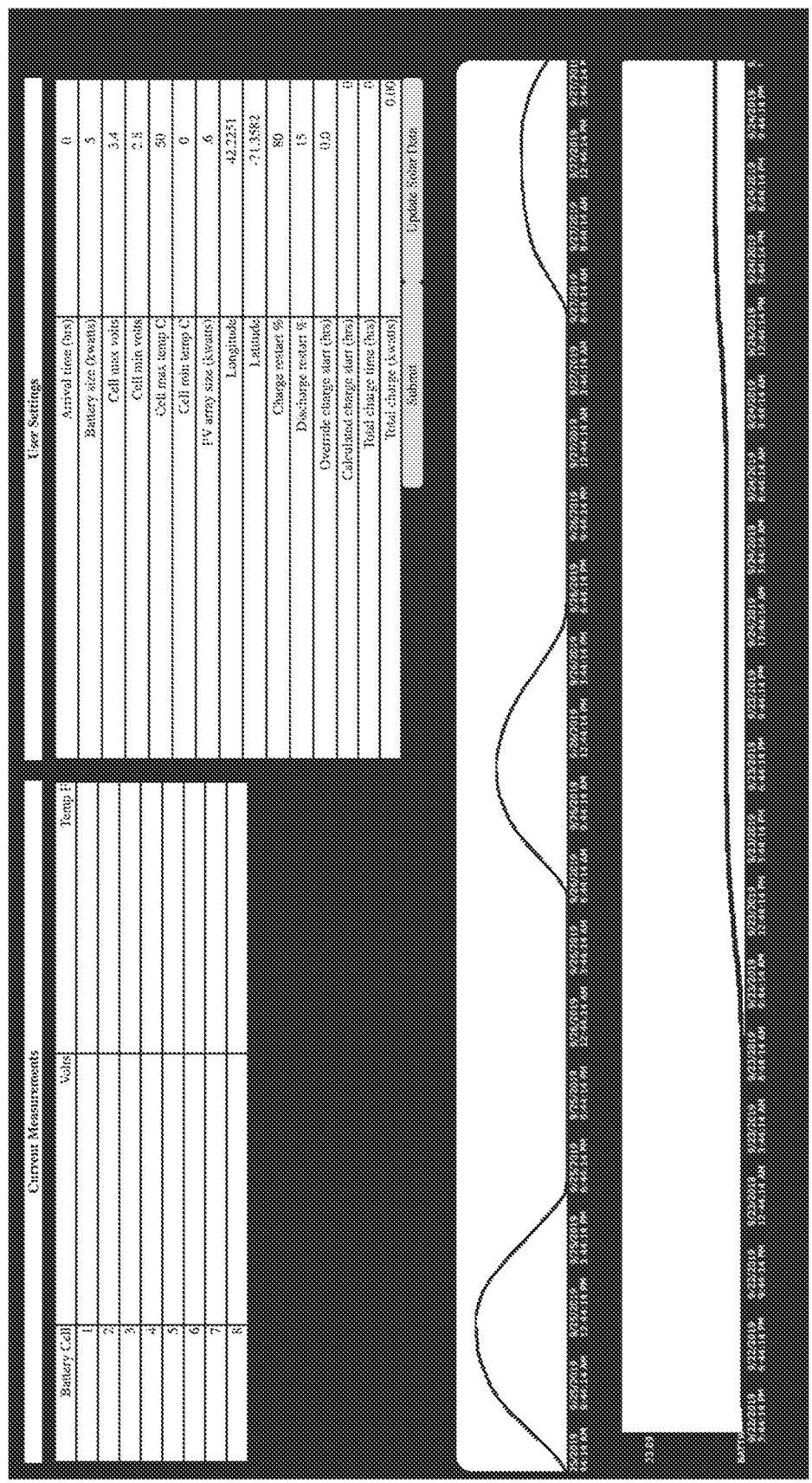
FIG. 8 depicts a graph of predicted power useful in the present invention (top) and a graph of predicted charge state useful in the present invention (bottom).

Optionally, the user interface module is configured to create a graphical display of forecast data or power prediction, e.g. received from the forecast retrieving unit or determined by the power-predicting module. Optionally, the graphical display comprises a graph of power or energy over a time window. Optionally, the time window is a future time window. Optionally, the time window starts at the current time and ends at a future time. Optionally, the time window starts at the current time and ends at a scheduled arrival event. Optionally, the user interface module updates the graphical display based on updated forecast data or power prediction data one or more times (e.g. periodically or responsive to a user requesting the graphical display). FIG. 8 depicts an example of a predicted power graph.

Optionally, the user interface module is configured to display a determined charge start time and/or a forecast of energy generated over time.

Module for Determining Value of Energy

A grid mode of a controller can optionally be configured to determine a value of energy for comparing to a detriment (cost or negative value). The value can be obtained in any manner, e.g. can be a user-entered value, a value preset in the controller, or a value the controller calculates. As taught herein, the value can be compared to a determined detriment Optionally, the controller obtains one or more unit-values of energy (e.g. price per unit of energy such as dollar/kwh) and calculates the value of energy by multiplying an amount of energy (e.g. calculated amount of energy) by the one or more unit values of energy. The grid mode can be configured to compare the value of energy transferred to the grid in a time-shifting scenario (i.e. from an energy storage device that deviates from a nominal state of charge at least at some point) to the value of energy transferred to the grid in a non-time-shifting scenario (i.e. from an energy storage device that does not deviate from a nominal state of charge). As such, the total energy transferred to the grid at each unit value (e.g. a first unit value corresponding to peak rate and a second unit value corresponding to a non-peak rate) can be determined in both scenarios and the difference in these total amounts of energy (for each window of time having a unique unit value) can be calculated to determine i) the difference between the amount of energy transferred to the grid at the first unit value in the time-shifting scenario and the amount of energy transferred to the grid at the first unit value in the non-time-shifting scenario, and ii) the difference between the amount of energy transferred to the grid at the second unit value in the time-shifting scenario and the amount of energy transferred to the grid at the second unit value in the non-time-shifting scenario, and iii). However, the comparison can alternatively be made by simply finding the amount of energy, in the time-shifting scenario that causes the energy storage device to deviate from nominal, because, in a time-shifting scenario this amount of energy is the amount transferred to the grid at the first unit value that is not transferred to the grid at the first unit value by the non-time-shifting scenario. In other words, because both scenarios can optionally experience a period of time in which energy is transferred to the grid while the energy storage device is at a nominal state of charge, this energy transferred to the grid while the energy storage device is at a nominal state of charge is optionally equivalent in both cases and therefore optionally does not contribute to a difference and the period(s) at nominal state of charge can optionally be omitted from consideration. Accordingly, the controller can determine the amount of energy resulting from charging or discharging an energy storage device to a charge state other than nominal, and optionally a value associated with the amount of energy. This calculated amount of energy can be considered the amount of energy transferred to the grid in the time-shifting scenario at the first (higher) unit value that is transferred to the grid at one or more second (lower) unit values in the non-time-shifting scenario. This amount of energy (energy stored in excess of the nominal state or amount of energy discharged below the nominal state) is sometimes referred to herein as a cumulative charge.

Optionally, the amount of energy can be a predicted (calculated) amount resulting from charging or discharging an energy storage device to a charge state other than nominal. Accordingly, the amount of energy can optionally be any amount of energy that results in the charge state deviating from nominal. For example, the amount of energy can include a predicted amount of energy predicted to be stored in excess of the nominal state of charge and/or a predicted amount of energy discharged under (from) the nominal state of charge. The amount of energy predicted to be charged in excess of the nominal state of charge can optionally be obtained by determining the difference of a predicted high charge state and the nominal charge state. For example, a 5 kwh battery which is charged to 80% (4 kwh) provides an amount of energy of 1.5 kwh in excess of the nominal state of 50% (i.e. 4 kwh minus 2.5 kwh equals 1.5 kwh). Similarly, the amount of energy predicted to be discharged below the nominal state of charge can optionally be obtained by determining the difference of a predicted low charge state and the nominal charge state. For example, a 5 kwh battery which is charged to 20% (1 kwh) provides an amount of energy of 1.5 kwh relative to (under) the nominal state of 50% (i.e. 2.5 kwh minus 1 kwh equals 1.5 kwh). Additionally, the amount of energy used to determine the value of the energy (in combination with the unit value) can be the sum of an amount of energy stored in excess of the nominal state (e.g. during a first period of time) and an amount of energy stored at a level less the nominal state (e.g. during a second period of time). As an illustration, FIG. 22 depicts the amount of energy stored in a battery having a nominal state of charge of 2500 watt-hours. The amount of energy used to determine the value of the energy (in combination with the unit value) can be A) the amount of energy stored in excess of the nominal state of charge (at 5 PM, the time of need, about 2502 wh as calculated from time slice 113 of FIG. 29, i.e. 5002 wh stored minus 2500 wh (watt-hours) at nominal), B) the amount of energy discharged from the nominal state of charge (at 8 PM, the end of peak, about 1939 wh as calculated from time slice 303 of FIG. 29, i.e. 2500 wh nominal minus 561 wh stored), or a sum of A) and B).

As discussed above, the calculated amount of energy can be considered the amount of energy transferred to the grid in the time-shifting scenario at the first (higher) unit value that is transferred to the grid at one or more second (lower) unit values in the non-time-shifting scenario. Accordingly, the controller can optionally determine a) a first value of the amount of energy based on a first unit value (a specified unit value such as a price per unit of energy, e.g. a peak price per kwh, e.g. determined via table lookup) corresponding to the time of need, wherein the first value is reflective of the value of the amount of energy time shifted (in the time-shifting scenario) to a period corresponding to the higher first unit value; and b) a second value of the amount of energy based on one or second unit values (a specified unit value such as a price per unit of energy, e.g. a non-peak prices per kwh, e.g. determined via table lookup) corresponding to the time the energy would have been produced by the energy source(s) (rather than time shifting the energy transfer), wherein the second value is reflective of the value of the amount of energy that is not time shifted (in the non-time-shifting scenario) to the period corresponding to the higher first unit value that is otherwise time-shifted in the time-shifting scenario. After correcting the first value by subtracting the cost (negative value to longevity detriment), thereby providing a net first value, the controller can compare the net first value (time shifted value) to the second value (non-time-shifted value) to determine whether the net first value is greater, and determine to use time-shifting if the net first value is greater (e.g. turning off the grid load at the charge start time and turning on the grid load at the time of need). Module for Determining Detriment to the Enemy Storage Device A grid load mode can optionally be configured to determine a detriment to the energy storage device due to any period of time at which the energy storage device has a state of charge other than nominal, i.e. that deviates from the nominal state of charge.

According to the present inventor, the longevity (total life) of an energy storage device can be prolonged (optimized) by maintaining the energy storage device at a nominal state of charge, e.g. 50% state of charge for batteries such as Li-ion. In fact, some batteries experience very little or negligible detriment to their life if they are maintained at nominal. However, when storage devices are charge above nominal state or discharged below nominal state, the life of the battery is reduced, i.e. a detriment to longevity occurs. The amount of detriment is accurately correlated to the state of charge (or deviation of the state of charge from nominal) and the duration of time at which the energy storage device experienced such state of charge (or deviation of the state of charge from nominal). For example, Battery University (https://batteryuniversity.com/learn/article/rising_internal-_resistance) discusses the correlation of state of charge to resistance, which is itself correlated to the life of the energy storage device.

Accordingly, a controller can determine a detriment to an energy storage device given a particular state of charge (e.g. based on the deviation from nominal). One of the steps of the controller in grid mode can optionally comprise predicting (calculating) a detriment to the energy storage device at a future time or window of time based on the state of charge (e.g. based on the deviation from nominal) the energy storage device is predicted to experience during the time or time window.

A useful method of determining a detriment can comprise i) obtaining a predicted charge state (e.g. deviation from nominal) of the energy storage device; 2) obtaining a correlation of charge state and detriment (e.g. a cell health table as in FIG. 26), and 3) applying the predicted charge state to the correlation to retrieve the corresponding detriment (e.g. change in resistance). For example, cell health table shown FIG. 26 provides correlation of measured integral of % deviation in state of charge over time from nominal with a respective rate of % change in resistance, noting that % change in resistance is itself a reflection of and correlated to detriment to the longevity of the battery cell). For example, the controller can be provided with a specified change in resistance over the entire life of the energy storage device and determine detriment to the longevity (e.g. percent of life) caused by a particular resistance change.

Optionally, the controller additionally correlates the detriment with a cost (negative value) corresponding to the detriment.

As described herein, the controller can perform predictive calculations of charge state of the energy storage device using scenarios, e.g. a set of hypothetical conditions, in which the controller considers (for the scenario) that one or more conditions will be present. Such conditions can include one or more of: turning a load switch (e.g. grid load) on or off at a particular time such as off at a charge start time and on at a time of need, a predicted amount of energy produced by an energy source(s) at a particular time or over a particular window (e.g. predicted by forecast data such as a power prediction).

The controller optionally uses the scenarios to predict the resulting charge state of the energy storage device. For example, the charge state of the energy storage device for a particular point or window of time can be predicted (i.e. calculated) by setting a condition of a reference state of charge (e.g. target state of charge) for a point in time that is separated from the particular point or window of time by a specified amount of time. The controller can use a specified discharge rate to predict (calculate) the amount of or the rate at which energy will be transferred out of the energy storage device (assuming the respective load switch is simulated to be on) and can use one or more power forecasts to predict (calculate) the amount of or the rate at which energy will transferred to the energy storage device (assuming a respective one or more energy source switches is simulated to be on). This is similar to determinations made by a charge state determining module for real-world charge state determination, except that it is made in a predictive simulation using the set of conditions.

Optionally, the controller determines, for a period of time from a calculated charge start time to a grid time of need (e.g. time at peak power price), the duration of time that the storage device will spend at one or more charge states (e.g. relative to the optimal charge state). Using this duration of time and a decay rate of battery life (due to detriment) corresponding to a given charge state, the controller can calculate, for each of the one or more charge states, a predicted decrease in life of the storage device due to the duration the storage device will spend at the respective charge state.

Various methods can be used to determine the cost of storing energy in a storage device at a state of charge greater than nominal. According to the present inventor, cell resistance or change thereof is correlated with remaining battery life. As such, in one example, a measurement of cell resistance can be made, and a relationship of cell life to cell resistance is used (e.g. via a lookup table correlating cell life with measured cell resistance) to determine remaining life of a battery. For example, cell resistance of X ohms might indicate 100% remaining battery life and cell resistance of Y ohms indicates 0% remaining battery life.

Optionally, the controller can detect the resistance (e.g. ohms) of the storage device or cell thereof. The controller can obtain a correlation of resistance and remaining life of the storage device or cell thereof (e.g. via a lookup table). In other words, the controller can calculate remaining life of the storage device or cell thereof by determining the resistance, and can calculate a % reduction in cell life by obtaining starting and ending resistance over a period of time or set of charge and/or discharge cycles.

Optionally, the controller is configured to:
a) calculate a plurality of predicted states of charge of the energy storage device across a window ('grid load interval' such as the grid load interval shown in FIG. 27) spanning from the charge start time until at least the time of need (e.g. as shown in FIG. 29 for 'with time shifting')
b) obtain a correlation of state of charge and detriment to the energy storage device, optionally wherein the correlation of state of charge and detriment is a correlation of detriment and deviation of state of charge from the nominal state of charge (e.g. a correlation obtained from a cell health table as in FIG. 26, noting that FIG. 26 correlates a measured integral of % deviation in stateofcharge from nominal with a respective % change in resistance, and noting that % change in resistance is itself a reflection of and correlated to detriment to the longevity of the battery cell);
c) apply the correlation to the one or more predicted states of charge, thereby providing a predicted detriment to the energy storage device (e.g. using a determined % deviation from nominal over the grid load interval, e.g. as determined at the end of the table in FIG. 29, and plugging in the determined % deviation from nominal to the cell health table in FIG. 26 to retrieve a respective change in resistance);
d) obtain a correlation of detriment to the energy storage device and cost (e.g. where the detriment is a percentage reduction in the longevity (life) of a battery and the controller receives a cost (e.g. negative value or dollar amount) of the battery (e.g. a brand-new battery having 100% of its life left)).
e) apply, to the predicted detriment, the correlation of energy storage device detriment and cost, thereby providing a predicted cost (e.g. the cost due to lost life of the battery, such as dollars lost, due to holding the battery at a charge state other than nominal);

As discussed herein, one or more charge states of a window can be predicted (calculated) before applying a correlation of charge state and detriment to the charge state to obtain a respective detriment. The method of predicting charge state can be accomplished in multiple ways. For example, in one method, the controller divides a particular window into a time slices, providing a specified reference state of charge for at least one of the time slices, and then, for an adjacent time slice being evaluated, providing the net amount of energy transferred in or out of the energy storage device, and summing the net amount of energy transfer with the reference state of charge to provide the state of charge of the time slice being evaluated. The net amount transferred in or out during the time slice can be calculated as a sum of energy transferred in/out during the specific time slice, e.g. using a power prediction to calculate energy amount transferred into the energy storage device and/or a specified discharge rate to calculate an amount of energy transferred out of the energy storage device. The controller can repeat the process for each time slice of a window to determine the predicted charge states across the window.

Optionally, these charge states of the respective time slices can be used to determine an absolute deviation from nominal (e.g. when the cell health table correlates detriment or change-in-resistance to deviation from nominal). For example, FIG. 24 illustrates a hypothetical scenario in which the state of charge crosses through nominal (50%), and the absolute deviation of states of charge can be the absolute value of the difference between a respective state of charge and nominal. Further, the controller can optionally determine the integral (area under the curve) of this absolute deviation by considering time spent at the deviation to determine a time-weighted deviation of a window as a whole (e.g. as performed at the end of the table of FIG. 29) such as an average deviation over the window or a percent deviation (e.g. relative to theoretical maximum deviation) of the window as a whole.

Although the method of dividing a window into time slices provides an accurate method of predicting charge state, the controller can be configured to determine the charge state across a window in different ways. For example, a controller can calculate a state of charge representative of the entire window, such as a time-weighted deviation of state of charge across the window.

Optionally, the controller can determine a predicted state of charge of the energy storage device during the window as a time-weighted charge state such as a time-weighted charge state deviation (e.g. time-weighted absolute deviation). For example, the controller can be configured to determine the time-weighted absolute charge state deviation via the one or more parameters of a window such as i) the starting time of a window; ii) the ending time of a window; iii) the target state of charge for the start of a window; iv) the target state of charge for the end of a window; v) a cumulative charge amount to be transferred to or form the energy storage device during the window; vi) a duration of a window; and vii) a specified discharge rate. For example the subsets could include a) i, iii, v, and vii b) i, iii, vi, vii c) i, iii, iv, vii; d) vi; or e) v, vii. Other subsets exist as well. With the teachings provided herein, the skilled artisan will immediately recognize how to select subsets of parameters useful to determine a time weighted charge state over a window.

Assuming for example, that the controller considers the rate of energy transfer to be constant (e.g. during a period of discharge to load with constant current and with no simultaneous energy production or with constant energy production), the controller can calculate a time-weighted charge state which is reflective of the entire window (e.g. an average of the window). However, it is to be noted that, when the window contains periods including states of charge over nominal and state of charge under nominal, a simple mean may cause the over-nominal period to cancel out the under-nominal period, which would not accurately reflect the detriment over the window. As such, the controller can optionally calculate the average absolute deviation over the window. While several parameters are listed above, the skilled artisan will recognize that only a subset of these parameters are needed by the controller and various subsets are useful. This is a simple mathematical computation. For example, assuming the window corresponds to stage 4 in FIG. 27, the controller can select, for example, a specified discharge rate and a starting or ending target state, and starting or ending time or a window duration to determine a time-weighted charge state (e.g. average absolute deviation of charge state) used to determine the corresponding detriment during the window. It is to be noted that the window in the stage 4 in FIG. 27, the negative slope of the curve is reflective of the specified discharge rate (as in FIG. 27, which is representative of the same scenario shown in FIG. 22 but without the use of time slices). As such, assuming the energy sources are not producing power (e.g. it is night time for a solar array) or assuming the charge rate from the energy sources is negligible compared to the specified rate of discharge or is constant, the controller does not need to predict a charge state for a plurality of time slices. Instead, as detailed above, it can simply determine an average or time-weighted deviation from nominal.

In a simple example, the energy storage device is discharged from a first state of charge (that existing at the time of need event) to a nominal state at a constant rate with no charge sources turned on. In this example, the controller can determine a time weighted absolute deviation of state of charge from using only i) a time of need (e.g. the starting time of the window); ii) a state of charge at the time of need; iii) a specified constant discharge rate; and iv) the nominal state of charge. From this the controller can determine the time weighted absolute deviation of state of charge from nominal via the following steps:

Step 1—As the rate of discharge is linear, the time interval from the start of discharge to the end of discharge (e.g. when the nominal state is reached) is determined as the (first state of charge minus the nominal state of charge) divided by the rate of discharge.

Step 2—The time weighted absolute deviation of state of charge from nominal is then determined as ((the first charge state—the second charge state) divided by two) multiplied by the time interval.

In a more complex example, the energy storage device is discharged from a first state of charge (that existing at the time of need event) to a state lower than the nominal state of charge at a constant rate with no charge sources turned on. In this example, the controller can determine a time weighted absolute deviation of state of charge using only i) a time of need (e.g. the starting time of the window); ii) a state of charge at the time of need; iii) a specified constant discharge rate; iv) the nominal state of charge; and v) the state of charge at the second state of charge lower than the nominal state of charge (i.e. the state of charge that exists at the end of the discharge window). From this the controller can determine the time-weighted absolute deviation of state of charge from nominal by examining the total discharge time window as two independent time windows, including 1) the time window from the time of need event until the energy storage system reaches a nominal state of charge, and 2) the time window that exists from the time the energy storage system reaches a nominal state of charge to the time the energy storage system reaches a lower state of charge. The controller may then determine a time-weighted absolute deviation of state of charge from nominal via the following steps:

Step 1—The time-weighted absolute deviation of state of charge from nominal for the first time interval defined above is determined as described in steps 1 & 2 above.

Step 2—The time-weighted absolute deviation of state of charge from nominal for the second time interval defined above is determined by first determining the length in time of the second interval as the (nominal state of charge minus the second (e.g. lower than nominal) state of charge) divided by the rate of discharge. This determined time interval length can then be multiplied by (the nominal state of charge minus the second state of charge) divided by two.

Step 3—The first time-weighted absolute deviation of state of charge from nominal for the first time interval can be added to the second time-weighted absolute deviation of state of charge to yield a total time-weighted absolute state of charge across the complete time interval composed of time intervals one and two.

Sensors

In the present invention, the battery manager can be configured to obtain readings from one or more sensors (e.g. by providing a linkage to the sensor and providing a parameter polling module configured to receive signals over the linkage).

Examples of useful sensors include sensors of the state or environment of an energy storage device (e.g. battery). For example, such sensors can include voltage, temperature, current, and resistance. Other sensors of the state or environment of an energy storage device include parameters related to the battery management controller itself, such as the temperature and voltage of various on-board computer chips.

Optionally, a battery, or other energy storage device, comprises a plurality of cells, and a sensor is provided for each cell. For example, each cell can include a voltage sensor, a temperature sensor, a current sensor, and/a resistance sensor.

Examples of useful structures for voltage sensors, temperature sensors, current sensors, and resistance sensors are well known in the art.

As taught herein, modules run by the battery manager can include a step of obtaining a reading from one or more sensors, e.g., a step that is performed to make a determination of whether to control a switch.

Optionally, the battery manager controller monitors the temperature of each of a plurality of battery cells (e.g. reported by sensors) as well as a forecast of temperature (e.g. per hour) between a charge start event and the time of need. The algorithm can use this information to optimize the charging process to charge at a higher rate at times when temperature (atmospheric temperature) is lower. This optimization can be accomplished via a goal seeking algorithm.

Switches

In the present invention, the battery manager is configured to control one or more switches, e.g. to turn the switch on or off (e.g. by providing a linkage to the switches and providing a module configured to send signals to the switch to turn the switch on or off, e.g. by closing or opening a switch). The one or more switches are controlled by the battery manager to charge or discharge an energy storage device such as a battery (e.g. based on a targeted charge state of a preparation mode). Accordingly, by the uses of switches, a battery manager or module thereof can control one or switches to turn on or off one or more energy sources or loads connected to the energy storage device.

A switch useful in the invention can be any switch that connects a first device and a second device to allow the flow of electricity between the devices through the switch when the switch is on and disallow the flow of electricity between the devices when the switch is off.

When a switch is provided connecting an energy source with a battery, the battery manager can turn on the switch (e.g. close the switch) to allow the energy source to charge the battery, thereby potentially charging the battery. When a switch is provided connecting a battery and a load, the battery manager can turn on the switch to allow the battery to supply power to the load, thereby potentially discharging the battery.

Optionally, a first switch is provided (or linkage thereto) connecting a first energy source with the battery. Additionally, or alternatively, a second switch (or linkage thereto) is provided connecting the battery to a first load. Optionally, a third switch (or linkage thereto) is provided connecting the battery to a second load. Optionally, a fourth switch (or linkage thereto) is provided connecting a second energy source with the battery. There is no limit to the number of switches connecting loads and energy sources to the battery.

Optionally, a switch (or linkage thereto) is provided connecting a first battery with a second battery, or connecting a first cell of the battery with a second cell of the battery. Such a switch can be controlled by the battery manager to even the charge states between two batteries or cells, e.g., when different charge state have been detected (e.g. by a sensor taught herein).

Optionally, a load switch controls a critical load bus, powering one or more critical loads, such as emergency lighting, sump pumps, emergency heaters, and other critical loads.

As taught herein, modules run by the battery manager can include a step of turning one or more switches on or off, e.g., a step that is performed responsive to a determination made by the module (e.g. reaching a target state of charge or falling below a target state of charge).

Other Features

Optionally, the battery manager controller is configured to obtain data from a source of neural network and/or machine learning (e.g. memory or other component local to the controller or a remote server). The neural network and/or machine learning is trained through processing of data logged from the battery manager controller (e.g. potentially across multiple or all users of the battery manager). The neural network and/or machine learning receives data of or related to one or more of (e.g. each of) rate of charge, cell temperature, ambient (weather) temperature, cell resistance (which often an indication of degradation of the battery), forecast data and power prediction. In this process, the neural network and/or machine learning is trained based on this historical data to determine the optimal charge path from the present time to the time at which a future time of need is identified, factoring in the known data and its impact on cell resistance (longevity of the battery). Optionally, the now trained neural network operates on forecast data, such as temperature change over time, available charge rate over time, duration of charge and optionally other parameters to determine the optimal charge path from present time to a time of need.

Methods

In one embodiment, the present invention provides a method of using a battery manager taught herein. The method comprises performing the functions of the modules of the battery manager. Accordingly, for each function or set of functions of a battery manager taught herein, the invention provides a corresponding method of using a battery manager to provide the function or set of functions. The following methods are non-limiting examples of such methods.

A method of the invention can be performed by one or more controllers to control, by a plurality of respective switches, one or more loads connected to an energy storage device and one or more energy sources connected to the energy storage device, the method comprising obtaining forecast data; and controlling one or more of the plurality of switches based on the forecast data.

Optionally, the forecast data comprises weather forecast data or a power prediction obtained based on the weather forecast data. Optionally, the step of controlling one or more of the plurality of switches based on the forecast data comprises setting a charge start time at which to increase the rate of charging of the energy storage device by controlling one or more of the plurality of switches. Optionally, the step of controlling one or more of the plurality of switches based on the forecast data comprises switching to a selected charge mode of a plurality of charge modes based on the forecast data, wherein the plurality of charge modes target different states of charge of the energy storage device or different charge rates of the energy storage device.

Optionally, the plurality of charge modes a maintain mode and a preparation mode. For example, the maintain mode can target a first target state of charge for the energy storage and the preparation mode can target a second target state of charge for the energy storage device, wherein the first target state of charge and the second target state of charge are different. Optionally, the first target state of charge is lower than the second target state of charge (e.g. the first target state of charge is charge is from 20% to 80%, e.g. for lithium Ion battery).

Optionally, the step of setting a charge start time comprises obtaining a time of need (e.g. arrival time), setting the time of need as a charge finish time at which to complete charging to the second target state of charge, and determining, based on the forecast data, the charge start time as a latest time at which the rate of charge can be increased to reach the second target state of charge by the charge finish time (e.g. using AUC determination of a power prediction).

Optionally, the method comprises turning on a first load upon the elapse of a time of need as elapsed (or upon executing in-use mode) and optionally turning off the first load upon the elapse of a leave time (e.g. or upon transitioning to maintain mode). Optionally, the method comprises, during a first period of time from the time of need to the leave time (or in the in-use mode), keeping on an energy source (e.g. responsive to the controller determining the present state of charge is less than a target state of charge used during the first period) and not turning off the first load responsive to the controller determining that the present state of charge has dropped below the target state of charge. Optionally, the method comprises, during a second period of time from the leave time to a charge start time (or in maintain mode), turning off or keeping off the first load during the entire second period or turning off or keeping off the first load responsive to the controller determining that the present state of charge dropped below a target state of charge used during the second period but not used as a target during the first period (e.g. the target state of charge of a maintain mode). Optionally, the method comprises, during the second period of time (or during the maintain mode) responsive to the controller determining that the present state of charge has raised above the target state of charge used during the second period (e.g. the target state of charge of a maintain mode), turning on a load (e.g. the first load) and optionally turning off the energy source. Optionally, the method comprises, during a third period of time from the charge start time to the time of need (or a second time of need that has the same effect on the controller as the previous time of need) (or in a preparation mode) turning off or keeping off the first load during the entire third period or turning off or keeping off the first load responsive to the controller determining that the present state of charge is below a target state of charge used during the third period (e.g. the target state of charge of a preparation mode). This embodiment provides an energy source and a load that are controlled in one manner during the first period (e.g. in use mode), and controlled in another manner during the second period (e.g. maintain mode) and/or the third period (e.g. preparation mode).

Optionally, the method comprises turning on a first load upon and turning off or keeping off a second load upon the elapse of a time of need (or upon executing in-use mode) and optionally turning off the first load upon the elapse of a leave time (e.g. or upon transitioning to maintain mode). Optionally, the method comprises, during a first period of time from the time of need to the leave time (or in the in-use mode), keeping on an energy source (e.g. responsive to the controller determining the present state of charge is less than a target state of charge used during the first period) and not turning off the first load responsive to the controller determining that the present state of charge has dropped below the target state of charge. Optionally, the method comprises, during a second period of time from the leave time to a charge start time (or in maintain mode), turning off or keeping off the first load during the entire second and turning off or keeping off the second load responsive to the controller determining that the present state of charge dropped below a target state of charge used during the second period but not used as a target during the first period (e.g. the target state of charge of a maintain mode). Optionally, the method comprises, during the second period of time (or during the maintain mode) responsive to the controller determining that the present state of charge has raised above the target state of charge used during the second period (e.g. the target state of charge of a maintain mode), turning on the second load and optionally turning off the energy source. Optionally, the method comprises, during a third period of time from the charge start time to the time of need (or a second time of need that has the same effect on the controller as the previous time of need) (or in a preparation mode) turning off or keeping off the first load and/or second load during the entire third period or turning off or keeping off the first load and/or second load responsive to the controller determining that the present state of charge is below a target state of charge used during the third period (e.g. the target state of charge of a preparation mode). This embodiment provides an energy source and a first load and as second load that are controlled in one manner during the first period (e.g. in use mode), and controlled in another manner during the second period (e.g. maintain mode) and/or the third period (e.g. preparation mode).

Optionally, the method comprises, turning off the first load and optional second load upon the controller determining that the storage device has failed a health or safety check (e.g. the present state of charge below a healthy/safe range or the temperature outside a health/safe range). Control of the first load and optional second load based on a failed health or safety check can override control of the first and second loads, e.g. even when a charge mode is configured to turn on or keep on the load(s) based on a comparison of the present state of charge with a target of the mode. For example, the in-use mode can be configured to keep the first load on, even when the state of charge is below its target state of charge, but a failure of a health/safety check can cause the controller to turn off the first load. Similarly, failure of a health/safety check can cause the controller, at any time, to turn off any load or energy source, regardless of whether the charge mode running at the time would controller the load or energy source differently.

Optionally, the in-use mode and a preparation mode are both configured to (e.g. absent an override or health/safety check failure) close or keep closed the same first switch(es) connecting an energy storage device and an energy source, and the in-use mode turns off at least one second switch connecting the energy storage device and a load (e.g. load panel) and keeps the first switch(es) on, and the preparation mode turns on the at least one second switch and keeps (e.g. does not switch off absent an override or health/safety check failure) the first switch(es) on.

Optionally, the in-use mode targets a state of charge (e.g. a state of charge higher than a state of charge targeted by the maintain mode), and is configured to turn on a first load responsive to the in-use mode being executed and is not configured to turn off (or is configured to keep on) the first-load responsive to the present state of charge dropping below the target state of charge of the in-use mode, e.g. wherein the first load is turned off or kept off in the preparation mode responsive to the controller determining that the present state of charge is less than the target state of charge of the preparation mode. Optionally, the in-use mode is configured for such a step of keeping on (or not turning off) the first load when the present state of charge drops below the target state of charge of the in-use mode, and further, the controller is configured to turn off the first load when the controller determines a safety or health check has failed, e.g., the present state of charge drops below a lower limit of state of charge (i.e. a lower limit that is less than that the target state of charge), e.g. a lower limit that is set as the lowest state of charge which is considered to be safe/health for the battery, or the temperature of the energy storage device has become outside of a range that is set as a safe/healthy range.

Computer-Readable Medium

In one embodiment, the present invention provides a non-transitory computer readable medium comprising a program, that when executed by a controller of a battery manager, causes the battery manager to perform a method of the invention and/or the functions of the modules of the battery manager taught herein.

EXAMPLES

Example 1 System Comprising a Battery Manager

FIG. 1 depicts a system comprising a controller 1 of a battery manager, an energy storage device 2 (e.g. battery), an energy source 3, a first load 4, and a second load 5. Energy storage device 2 is connected to energy source 3 by switch 10. Energy storage device 2 is connected to first load 4 by switch 11. Energy storage device 2 is connected to second load 5 by switch 12. The controller 1 can control (e.g. open and close) the switches 10, 11, and 12, and thereby control the flow of energy from the energy source 3 to the energy storage device 2, and from the energy storage device 2 to the first load 4 and the second load 5.

The system comprises a plurality of sensors of the energy storage device 2, e.g. a resistance sensor 6, a temperature sensor 7, a current sensor 8, and/or a voltage sensor 9. Optionally, the energy storage device is a multi-cell battery and the system comprises one or more sensors (e.g. a sensor of each of said sensor types) for each of the cells. The controller 1 can obtain readings from the sensors and, for example update parameter values in a table using the sensor readings.

The controller 1 of the battery manager is networked via network 13 with a remote device 15 and a forecast server 14. The remote device 15 provides a user interface module configured for receiving user input on the remote device 15 and sending the user input, or data produced therefrom, to the controller 1. The forecast server 14 provides a forecast server from which the controller 1 can obtain forecast data.

The controller 1 comprises a plurality of modules for performing functions, such as one or more parameter-polling modules, a forecast retrieving module, a charge-state determining module, a charge start time determining module, and a system module.

The one more parameter-polling modules can be configured for obtaining readings from sensors, writing parameter values to a parameter table based on the readings, writing parameter values to a parameter table based on user input, writing parameter values to the parameter table based on calculations made, and/or reading parameter values from the table.

The forecast retrieving module can be configured to obtain the forecast data from the forecast server.

The charge state-determining module can be configured to determine the present charge state of the energy storage device 2.

The charge start time-determining module can be configured to determine a time at which charging begins in order to raise the charge state of the energy storage device 2 to a target charge state (e.g. determined based on forecast data).

The system module can be configured to select a mode from a plurality of charge modes that target different charge states. For example, the plurality of modes from which the selection is made can include a preparation mode, a maintain mode, and an in-use mode.

The sensor readings can be used by the controller 1, alone or in combination with other parameters, to make determinations of charge start time, or time to switch between charge modes.

For example, parameters set by user input (e.g. arrival time and/or leave time), can be used in combination with other parameters such as present charge state and target charge state to make a determination such as charge start time and/or whether to increase or reduce the charge state of the energy storage device 2 by opening or closing the switches 10, 11, and 12.

Optionally, the system comprises a plurality of energy sources 3 (e.g. grid power and solar or wind), each connected to the energy storage device by a respective switch 10.

Optionally, the first load 4 and the second load 5 are differentially controlled by different modes. First load 4 can be, e.g. a load panel, which is turned on (e.g. always kept on absent a health check fail) in in-use mode and turned off (e.g. always kept off) in maintenance mode, and second load 5 can be a load that is used by maintenance mode, but not by in-use mode, to discharge the energy source when it is above a target charge state range.

Example 2 Configuration of a Battery Manager Used in a System

The battery manager used in the system depicted in FIG. 1 (e.g. as detailed in Example 1) can be configured with a plurality of modules that cause the battery manager to perform steps of obtaining sensor readings, obtaining or determining other parameter values (e.g. based on user input and/or forecast data), and controlling the switches according to specific control instructions.

FIGS. 2-6 depict examples of modules that can be used alone or in concert according to the present invention. As an illustrative example, the modules in FIGS. 2-6 are run by a designated processor or core thereof, as recited in the parentheses below the module name(s). For example, the module in FIG. 2 can be a thread run by core 0 (i.e. core number zero) of a first processor, the module FIGS. 2-6 depict processor cores 0-3 as part of a multiple-core processor of the controller 1 of the battery manager, and processor 4 as part of a computer that provides a user interface (e.g. a networked computer such as remote device 15).

The modules can be units of code executed by the same processor, or can be separate threads executed by distinct processors, which can be distributed on the same or different computers. For example, a plurality of threads (e.g. each run by a respective processor or processor core) can be provided, wherein each of the threads comprises one or more modules taught herein. The plurality of threads can optionally run simultaneously (e.g. each by a respective processor or processor core). FIGS. 2-6 depict configurations in which a thread is run by a specified processor or core thereof (core 1/thread 1, core 2/thread 2, core 3/thread 3 in FIGS. 2-4, of a first processor, and a thread run by a second processor in FIG. 5/FIG. 6). This separation of the modules into respective threads or cores (e.g. each thread run by a respective core or processor) is a non-limiting illustration of how the modules of the invention can configured. Accordingly, for each figure shown, the invention also contemplates an embodiment wherein the modules or threads shown are run by any processor or core (e.g. all modules of the figures run by the same processor core). Additionally, while some of the modules shown in the Figures are combined into a single thread (e.g. parameter polling module of steps 601,602, charge state-determining module of step s602, a battery balancing module of steps s603-605 combined into thread 1, FIG. 1) the invention also contemplates an embodiment wherein the modules are separated to distinct threads (e.g. that call each other) or are combined with other modules to a single thread.

Figure 2:
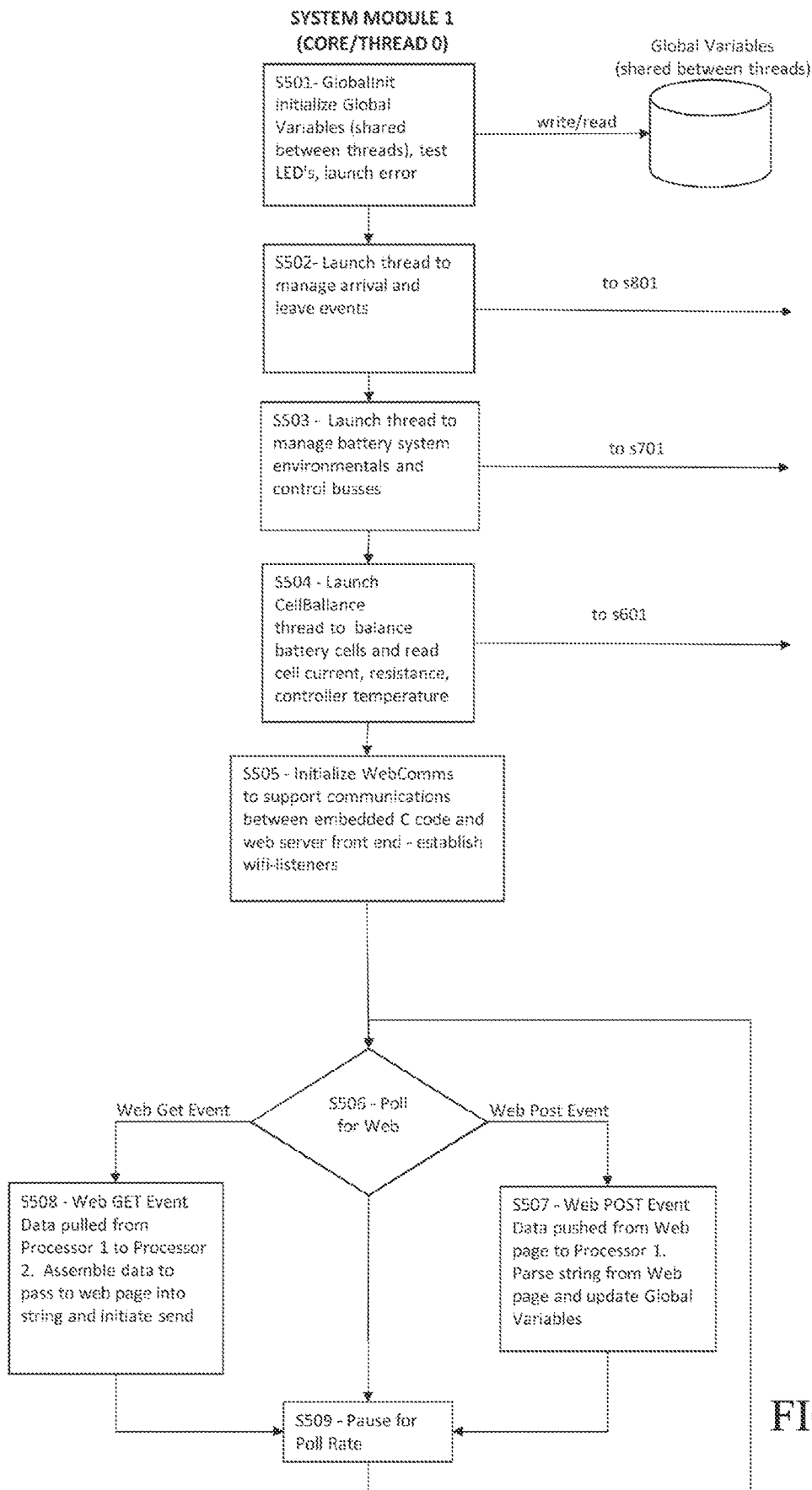
FIG. 2 depicts an example of steps that can be performed by a system module.

Additionally, the modules or threads depicted in FIGS. 2-6 can access the same parameter table(s), shown as "Global Variables" in FIG. 2.

Example 3 System Module

The figures depict flowcharts of various modules. In the illustrative embodiments shown, modules are arranged into a plurality of threads which can be run simultaneously, and each thread is run by a designated processor, or processor core. For example, processor 1 can have four cores (cores 0-3 in the figures), each running a designated thread. Further, a second processor (processor 2 in the figures) can modules in run one or more threads. Accordingly, while the figures detail a configuration of specific modules being run by a specific core as a respective thread, the invention is not limited to such a controller architecture and any controller architecture can be used.

FIG. 2 depicts an example of steps that can be performed by a first system module. The first system module executes a number of other modules from the same or different processor.

S501—Global Init

On power up, this state is entered. The multi-core processor can support 8 simultaneous threads of execution. These independent processor cores/threads communicate with one another through a set of global variables that are instantiated in this state. LED's exist to indicate the state that the algorithm is in and whether the system is in error. These LED's are flashed in this state to ensure they are working. The error handling code is launched into an independent core. For example, a parameter-polling module can be used to read values and/or write values (e.g. default or startup values) to a parameter table of Global Variables.

S502—Launch Thread to Manage Arrival and Leave Events (a System Module).

An algorithm of a second system module is launched into a new core/thread that controls switches that in turn control whether charging or discharging is allowed for the energy storage device. An example of this algorithm is described further in steps S801-S810 (e.g. inclusive of steps S8A1-S8A14) and shown in FIG. 5.

S503—Launch Thread to Manage Environmentals and Cell Balance

An algorithm for controlling switches based on energy storage system sensed parameters such as an over or under voltage event or an under or over temperature event.

S504—Launch Thread to Balance Cells (a Battery Balancing Module)

An algorithm of a battery balancing module is launched into a new core/thread that ensures each cell in the energy storage device remains in balance with the others. An example of this algorithm also reads cell specific parameters (cell voltage, cell current, cell resistance, cell Balancer chip temp) into the global variables for use by the other cores as further described in states S601-S606 and shown in FIG. 3.

S505—Initialize WebComms

Optionally, a multi-core processor of the battery manager controller communicates to a second processor (e.g. referred to as a Web/UI processor below) on the battery manager controller via a serial interface. This Web/UI processor (e.g. running the thread shown in FIGS. 5/6) in turn sends and receives data from a user interface (for example a web user interface of a remote device) that can be anywhere in the world via the internet. These communication mechanisms are initialized including the 'listeners' for either POST or GET events from the User Interface (data to or from the User Interface). This WebUI processor also performs the API calls, via the internet, to download sets of forecast data related to the weather and available charge sources.

S506—Poll for Web Event

The remaining loop will poll to see if an event has been received from the Web/UI processor. The event will either be a request to pull data from the battery manager controller 1, or a request to push data from the User Interface, via the Web/UI processor, down to the battery manager controller 1.

S507—Web Post Event

The controller 1 of the battery manager receives data from other modules, such as module run by processor 2 (e.g. a second controller providing a WebUI, e.g., as a result of step S311). This data includes any updates the user makes to parameters through the User Interface. Additionally, a portion of the algorithm to determine when to allow charging based on an 'arrival' or 'leave' event exists on the second controller (e.g. Web/UI processor) (see states S300-S311). The result of these computations is also received by the controller 1 of the battery manager from the second controller.

S508—Web GET Event

The controller 1 responds to a request from another module, such as a module run on Processor 2, (e.g. a second controller providing a WebUI) to pull data from the controller 1 of the battery manager (e.g. request performed by step S402). This data, stored, e.g. in a table of global variables, includes individual cell temperature, voltage, resistance, current as well as battery balancer chip temperature, total current into or out of the energy storage device, and optionally other sensor data.

S509—Pause for Poll Rate

This delay provides an optional configuration to control how frequently the poll event in S506 occurs (e.g. multiple times a second).

Example 4 System Module

Set Mode Based on Time Events

Figure 4:
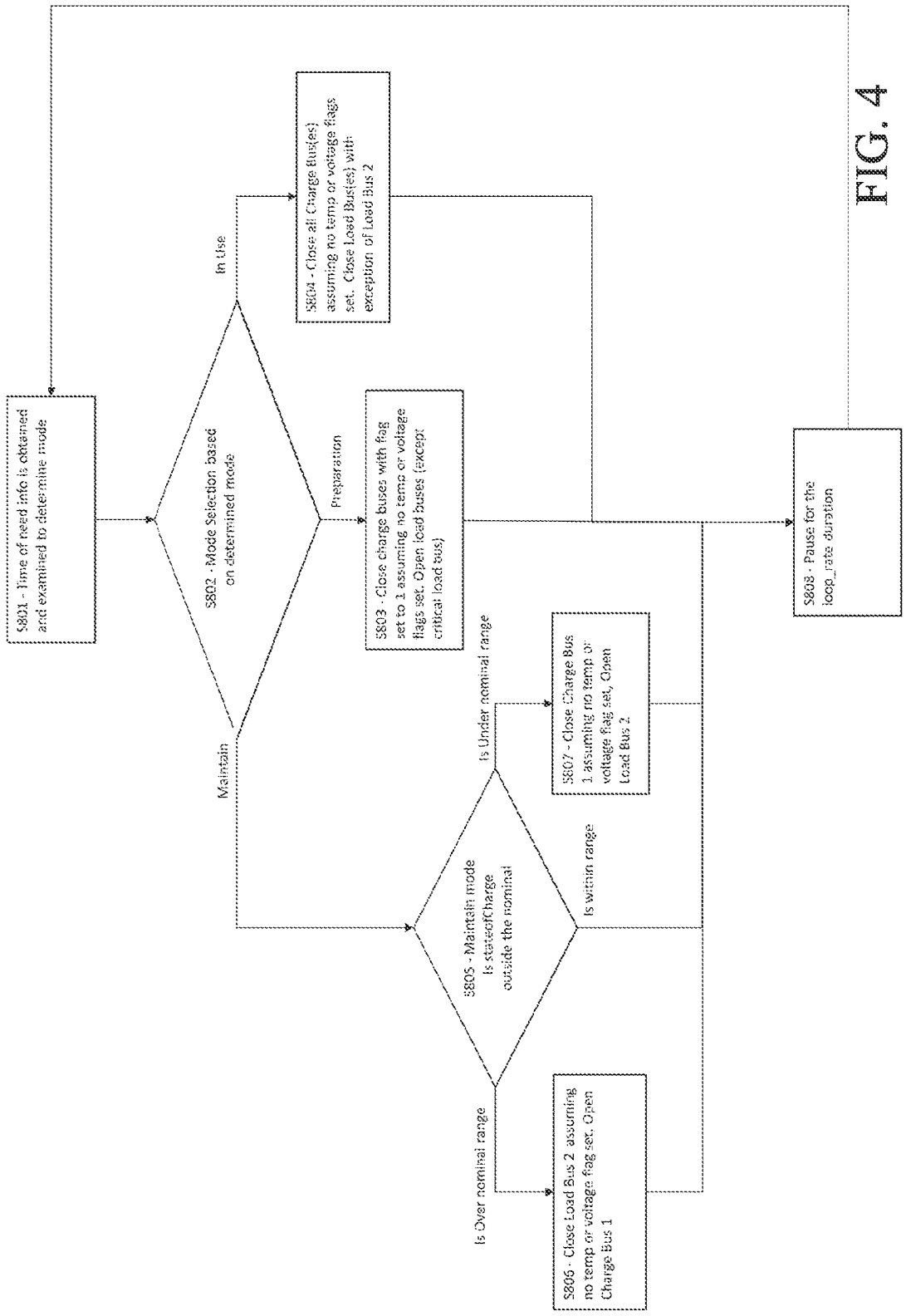
FIG. 4 depicts an example of steps that can be performed by a system module and charge modes useful in the present invention.

Steps s801-s802 of FIG. 4 depict a system module useful in the present invention. The system module depicted in FIG. 4 can be executed, for example, by the system module depicted in FIG. 2. In the examples taught herein, the term "bus" is used to describe a linkage to an energy source or a load. A bus that connects the energy storage device to an energy source is referred to as a charge bus. A bus that connects the energy storage device to a load is referred to as a load bus or a discharge bus (discharge bus being used to describe a load that is used to purposefully discharge the battery). The phrase 'closing a bus' or 'closing a bus switch' means turning on a switch that connects the energy storage device to the respective energy source or load. The phrase opening a bus means turning off a switch that connects the energy storage device to the respective energy source or load.

The controller can operate in a plurality of modes. For example, the plurality of modes could include a preparation mode that prepares the energy storage device for a user's arrival, an in-use mode configured to place the energy storage device in a configuration for use of the first load (e.g. load panel) by a user (e.g. while the home/domicile is occupied by the user) and a maintain mode. In maintain mode, the system seeks to maintain the optimal state to ensure longest life. For example, in the case of many types of lithium-ion batteries, the optimal is a 50% state of charge. In 'In Use' mode, for example if the home owner is present, or if primary (e.g. grid) power is down, the system will attempt to maintain the specified or determined maximum state of charge, e.g. by turning on an energy source switch. In maintain mode, the battery manager controller 1 obtains a time to start charging, e.g. as a parameter value (e.g. a variable array of chargestarttimes calculated in the WebUIProcessor, step S309, based on forecast and optionally other information). The controller 1 remains in maintain mode until a chargestarttime has passed for one or more charge sources and then begins charging to reach the maximum charge by the time of need event.

S801—Determine Mode

Local (e.g. temporary) variables are initialized (e.g. given initial values). These variables are temporary storage for the maximum and minimum voltage and temperature measured across the individual cells. They are used to ensure the energy storage device hasn't exceeded acceptable (e.g. target) operational parameters. The global variable storing a time of need event is examined via an algorithm to determine the proper mode. An example of this algorithm is included in S8A1-S8A14 in FIG. 12.

S802—Mode Selection

The result of the algorithm encapsulated in S801 is passed to decision logic that selects a functional path dependent on whether S801 determines the current state to be 'maintain', 'preparation', or 'In Use'. The result of state S801 is a mode selection. On this selection (either maintain, preparation, or in use) the algorithm follows the illustrated code path.

Example 5 Charge Modes

S803—Preparation Mode

The system checks the voltage and temperature flags from S701-S702, and closes (or allows to remain closed) any charge buses in the charge source flag array that are set to 1 (i.e. any energy source which is designated by the system to be available for use based on a health check or a user-designation check of sources to use). The controller will not close a charge bus if the system is over voltage or if the system is over or under temperature (i.e. if flag was set to 0 in S702). This state also checks that all load buses are open, optionally with the exception of the critical load bus.

S804—In Use Mode

Close all charge buses (or only the charge busses from a renewable energy source). This state also ensures that the load bus (or all load buses, or all load buses with the exception of Load Bus 2 (a load used in support of maintenance mode to purposefully drain the battery to maintain nominal state). Similar to the above, the temperature and voltage flags determined S701-S702 are checked before closing the charge buses. Additionally, the Load Buses will not be closed if S701-S702 indicate a temperature event or an under voltage event.

S805—Maintain Mode

The algorithm compares the present battery state of charge, e.g. as a percentage of absolute full state of charge to the range specified by the user for the maintain mode.

If the battery state of charge is over nominal, controller performs step s806. If the battery state of charge is under nominal, the controller performs step 807. Optionally, if it is within range (or at nominal) it does nothing and returns to S808 —Pause for the loop duration, or back to s805 if the controller is configured to remain in maintain mode until an override occurs.

S806—Close Load Bus

If the state of charge is above the nominal range, a designated load bus switch is closed (e.g. assuming there is no under voltage or over or under temperature flags set from states S701-S702, i.e. assuming flag was not set to 0 in S702). This step also ensures no charge bus remains closed. The closed load bus can be the same load bus closed in the in-use mode, or it can be Load bus 2, as shown in FIG. 4 S806.

S807—Close Charge Bus

If the state of charge is above the nominal range, the designated charge bus switch is closed, assuming there are no over voltage or over or under temperature flags from S701-S702. This state ensures no load bus remains closed, optionally with the exception of the critical load bus. This bus will not remain closed if S701-S702 indicates an under-voltage or temperature out of range event.

S808—Pause for Loop Rate

Optionally, this thread pauses for a specified time to control the rate at which the states of this thread execute in loop.

Example 6 System Module—Mode Determination

Figure 12:
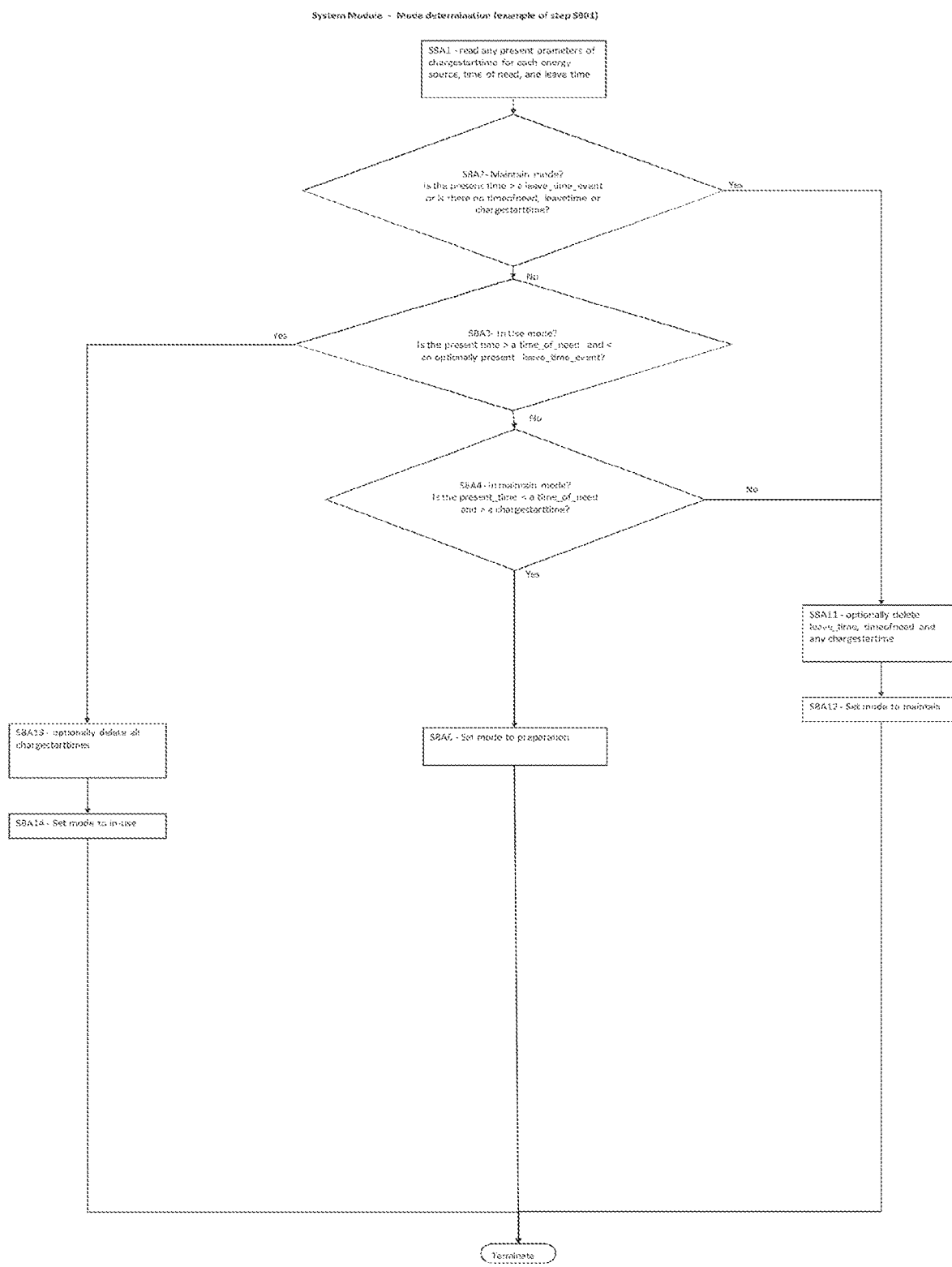
FIG. 12 depicts an example of steps a system module can use to determine which charge mode to use presently.

FIG. 12 depicts steps that can be used to determine which charge mode to use based on the based on time of need, leave time, and charge start time(s). FIG. 12 depicts a specific example of how to perform step s801.

S8A1—Read Parameters

Parameters are read such as charge start time(s), leave time, and time of need. Optionally, a plurality of charge start times for different energy sources is provided as an array. In this configuration, the controller can examine the charge start array to determine the charge start times for each respective energy source. The charge start array is used herein as an illustrative example of charge start time data.

S8A2—Check for Maintain Mode

If the present time is greater than a leave time, or optionally there is no time of need, leave time, or charge start time set for any energy source, the controller determines to operate in use maintain mode. Optionally the determination further requires that the present time is less than a charge start time (e.g. all charge start times) that occurs after the leave time.

S8A11—Delete the Times

The system has determined to operate in maintain mode. The leave time, time of need, and charge start times are optionally deleted (or tagged for non-use).

S8A12—Set Mode to Maintain

When the controller has determined to use maintain mode, the mode variable is set to MAINTAIN. The mode variable is used by the system module to determine which charge mode to execute.

S8A3—Check for In Use Mode

Following a "no" at S8A2, if the present time is greater than a time of need and optionally if the present time is less than a leave time that occurs after the time of need, the controller determines to execute In Use mode S8A13—Delete the Charge Start Times Optionally, the charge start time (or all the charge start times) are deleted (or tagged for non-use).

S8A14—Set Mode to In Use

The system has determined to us In Use mode. The mode variable is set to IN_USE.

S8A4—Check for Preparation Mode

Following a "no" at S8A3, if the present time is less than a time of need (e.g. arrival time) and greater than the charge start time (or the charge start time of a first energy source in a charge start array), the system determines itself to be in preparation mode. If not, it determines to use maintain mode.

S8A6—Set Mode to Preparation

The mode variable is set to PREPARATION.

Figure 31:
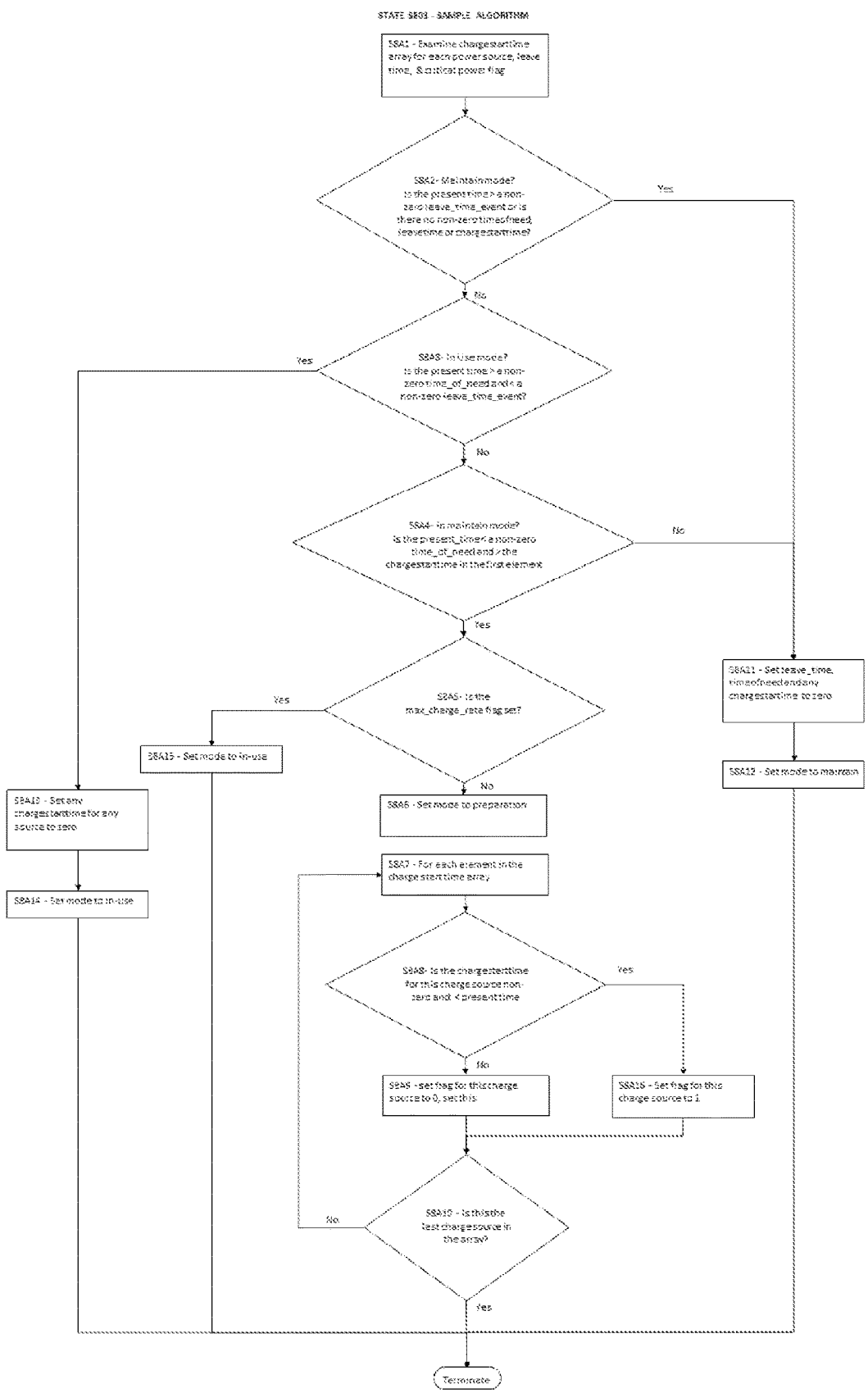
FIG. 31 depicts an example of steps a system module can use to determine which charge mode to use presently. This flow chart is an alternative to FIG. 12 which may be used if the system includes an array of (i.e. multiple) charge sources.

As an alternative to the steps depicted in FIG. 12, the controller can use the steps depicted in FIG. 31, e.g. if the system includes multiple charge sources. A flag set to "1" means that the controller turns this charge source on. A flag set to "0" means the controller turns this charge source off.

Example 7 Battery Health-Checking Module

One of the modules depicted in FIG. 3 is a battery health-checking module.

S701—Check State

The global variables populated from states S601-S602 are checked to see if any cell is over or under voltage or any cell or the battery controller itself is over or under temperature. Any over voltage cell will cause all charge buses (i.e. all switches connecting the battery to an energy source or other charging source) to be immediately opened (switched off by setting a flag to 0). Any under voltage cell will cause all discharge (load) buses to be immediately open (switched off by setting a flag to 0). Any over or under temperature event will cause all buses (charge and discharge) to be immediately turned off (by setting flags to 0).

S702—Set Bus Flags

Flags are set to indicate whether charging or discharging should be allowed based on the checks from S701. Specifically, the controller sets a flag to 1 for a specified load or energy source when the system passes the health test for that load or energy source, and sets to 0 when the system fails the health test for the load or energy source. These flags are then polled in mode states S803-S807. Optionally, these system health flags must be set to 1 to allow a charge or discharge bus switch to be closed (i.e. to allow charging or discharging of the energy storage system Example 8 Parameter-Polling Module and Charge State-Determining Module One of the threads depicted in FIG. 3 includes a parameter polling module, a charge-state determining module, and a battery balancing module.

Read Sensors on Battery Controller

S601 Read BattMon Params

This state reads health and welfare of the battery controller itself. It operates by polling the current temperature and checking the voltage levels on the battery controller.

S602 Read Cell Params

The sensors tied to each cell of the battery are read. Readings include cell temperature, voltage, resistance, current (into or out of the cell). These readings are placed into the global variable arrays: CELL_VOLTS, CELL_TEMPS, CELL_CURRENT, CELL_RESISTANCE to be shared among execution threads.

Such steps are examples of steps that can be performed by a parameter-polling module The amount of current flowing into and out of the battery as a whole is measured and placed into the global variables CHARGE_CURRENT and DISCHARGE_CURRENT. Parameters are determined from the sensor readings as follows: The average cell voltage (AVE_CELL_VOLTS) is determined as an average of the read cell voltages.

The state of charge of the battery (STATE_OF_CHARGE) is determined via a counting algorithm such as a standard Coulomb counting algorithm (essentially a polling of current into and out of the battery, with a translation to overall state of charge).

Such steps are examples of steps that can be performed by a charge state-determining module.

Example 9 Battery-Balancing Module

Balance Cells

S603 Loop through array of CELL_VOLTS

Establishes a loop to read through the global array of cell voltages as set in S602 based on the latest sensor readings S604—Compare CELL_VOLTS to AVE_CELL_VOLTS Each individual cell voltage as measured in S602 is compared to the average cell voltage as determined in S602 to determine the next step of execution.

S605—Discharge to Stack

If this cell voltage is higher than the average cell voltage the controller board begins to discharge the cell by sending current to the top of the cell stack (via switch(es)). Optionally, it does this through use of a fly-back transformer residing on the controller board.

S606—Pause for Loop-Rate

If the cell voltage is lower than average, nothing is done. Optionally, a configurable delay occurs controlling the frequency at which the system executes states S601-S605.

Example 10 Parameter-Polling Module

Figure 5:
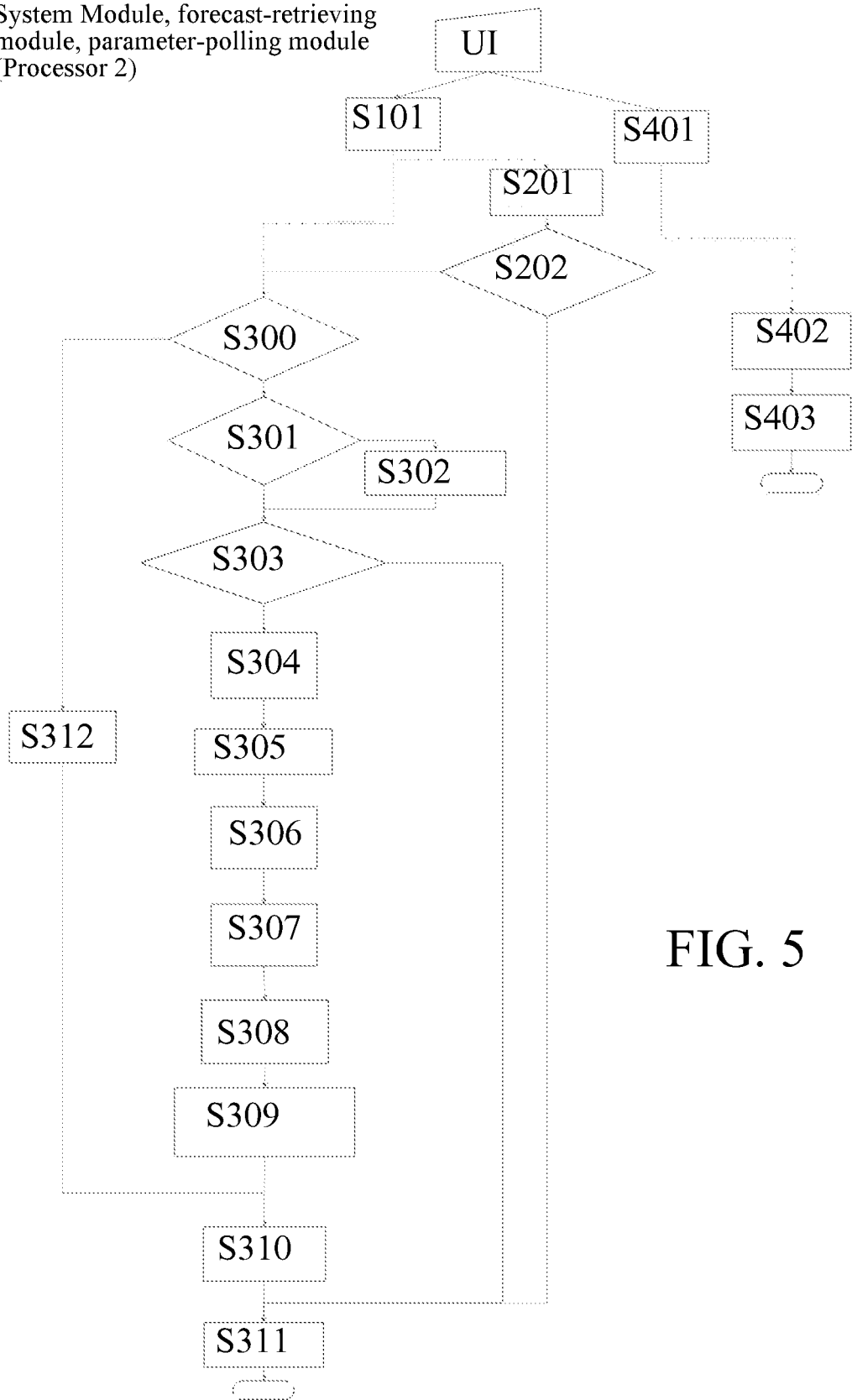
FIG. 5 depicts a flow chart with an example of steps that can be performed by modules useful in the present invention, e.g. a parameter-polling module (s101, s201, s202,311, s401-s403), a system module (s300-s304 and s311) a forecast-retrieving module (s305-s306), a charge start time-determining module (s308,s309), and a user-interface module (s307, s310) useful in the present invention.

Steps s101, s201, s202, s401-s403 of FIGS. 5/6 depict steps that can be performed by a parameter-polling module, e.g. a parameter-polling module which is part of a user interface module or a parameter-polling module which is executed by a user interface module.

Figure 6:
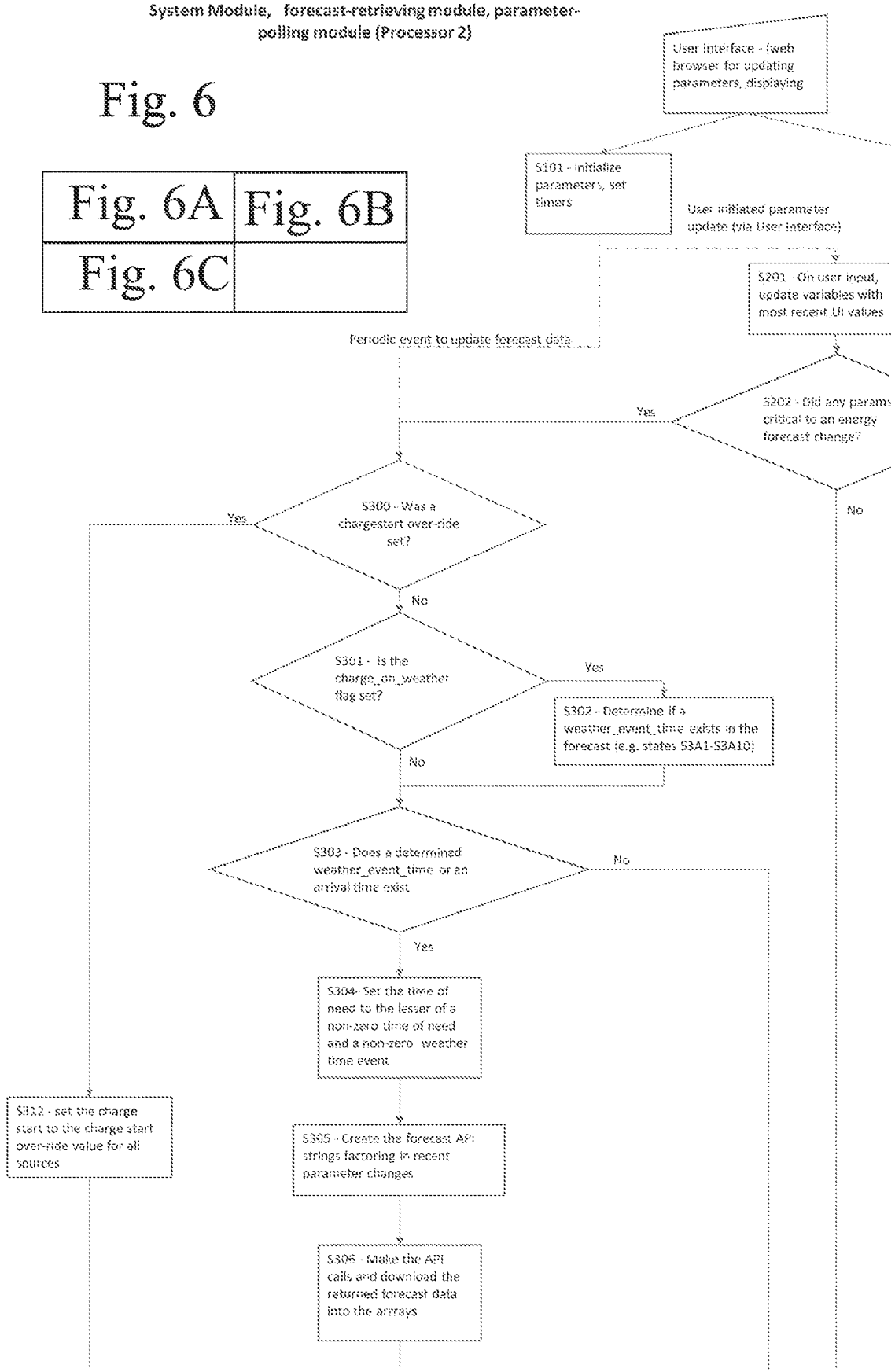
FIG. 6 depicts the same flow chart depicted in FIG. 5, except split into multiple sheets.
Figure 6B:
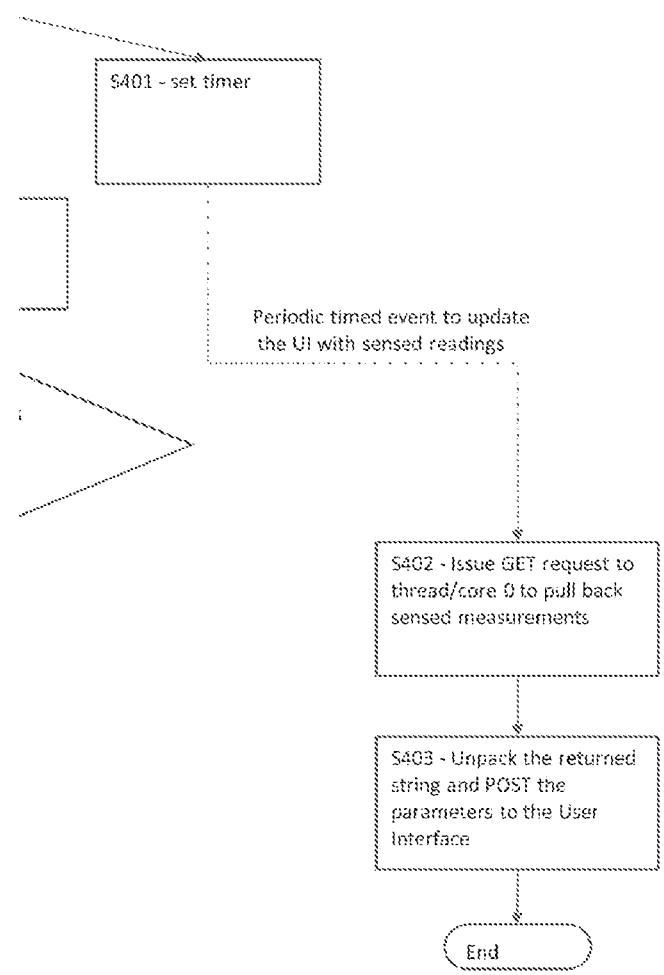
Figure 6C:
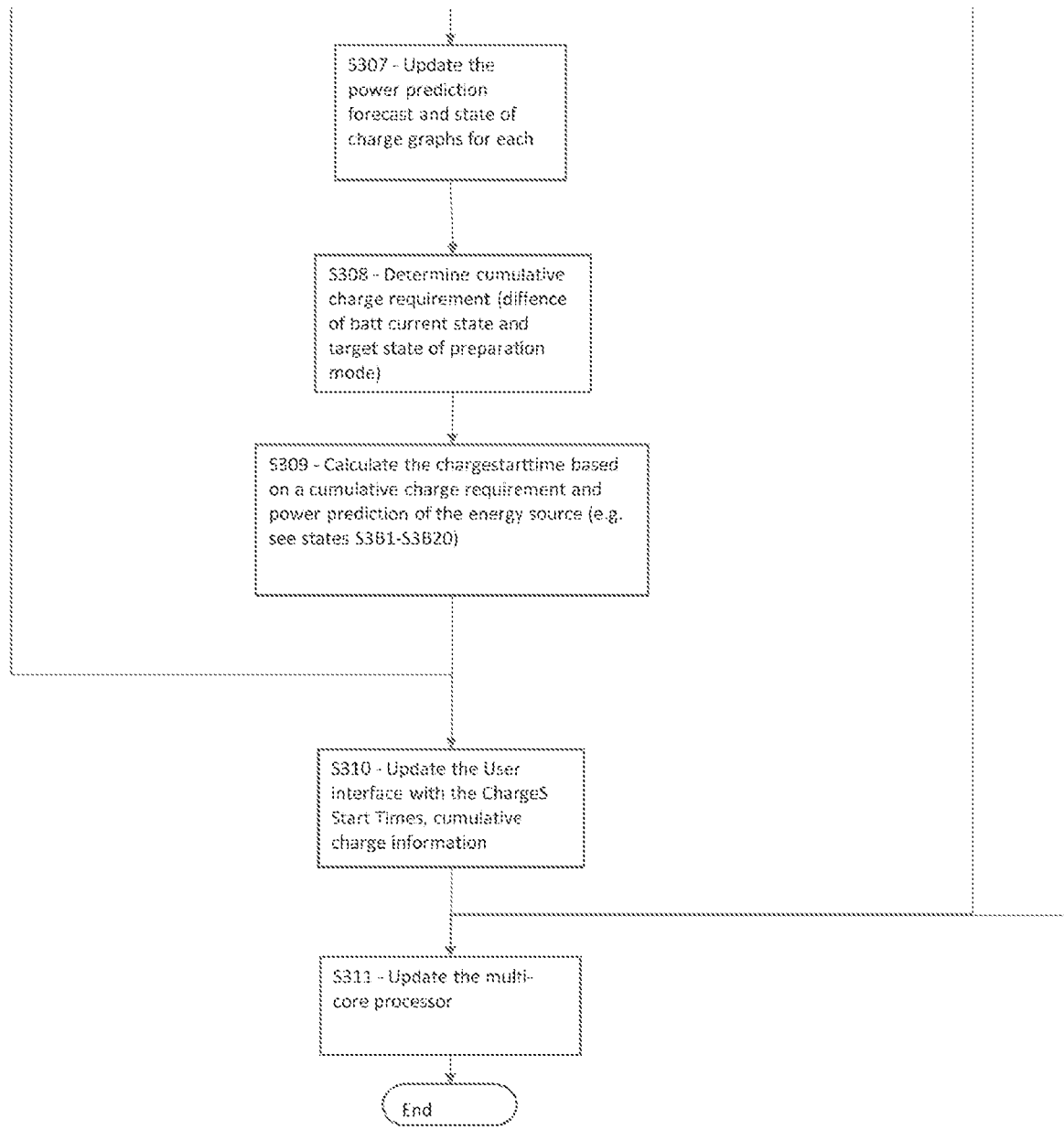

While this specific illustration of FIG. 6 shows a thread executed on a second processor ('Processor 2', e.g. of an independent processor residing on the controller board), the steps shown in FIG. 6 can be performed by any processor (e.g. the same processor which executes other modules such that those illustrated in the other figures).

S101—Initialize Parameters

The global settings (variables) are initialized to their factory default values. These setting may later be changed by the user via the user interface. Memory is instantiated to store forecast data and to store data regarding the health of the energy storage device returned from the controller of the battery manager. Two timed events are set. The first event causes the algorithm to download (e.g. by performing a single reach-out via web API's) the pertinent forecast data from a forecast server (e.g. via a forecast service at a specified internet site). The second event instructs the system to perform the same reach-out every period (for example every hour) to update this data.

S201—User Input

When a user changes any parameter using the user interface (UI), the system calls a function to update all global variables (e.g. the table of "global variables' in FIG. 2) with the parameter received via user input. Dependent on the new input, other states may be invoked as further described here-in.

S202—Key Parameter Update

The system examines the updated parameter to determine if it is a parameter that would impact the values of one or more sets of forecast data that will be retrieved. As an example, the calls (e.g. API calls) for forecast data might take user location (e.g. latitude and longitude) as a parameter. If the user changes a location parameter, the algorithm forces a call (e.g. API call) to update any forecast dependent on location, factoring in the new parameter. Key parameters include parameters that affect the values of forecast data, such as: Latitude, Longitude, Arrival Time, Leave Time, Solar Array Capacity, Solar Array Angle of Incidence, Power Conversion Tables.

Optionally, one or more parameters are read and/or written by the parameter-polling module such as: arrivalTime, leaveTime, battsizekwatts, battmaxvolt, battminvolt, battmaxtemp, battmintemp, pvcapkwatts, latitude, longitude, chrgrestart, dischrgrestart, chargestartoverrride, charge_on_weather, and/or min/max charge rate flag.

S401—Set Timer

This step sets a timer to periodically pull back data related to the state of the energy storage device from the controller 1 of the battery manager that directly manages the health of the energy storage device.

S402—GET Data from Battery Manager Controller (e.g. Multi-Core Processor)

The controller (processor 2) issues a GET request to the controller 1 of the battery manager to cause the return of table (e.g. from processor 1) of parameters (e.g. table 'global variables') for values (cell temperatures, cell voltages, state of charge, temperature of the cell balancer chips, temperature of the controller board, cell resistance, cell current). Such a step of polling by the controller 1 is illustrated in FIG. 2 S508.

S403—Update UI

The return string is unpacked into the global variables related to the WebUI processor. The User Interface display is updated with the, now updated, values of the Web/UI global variables.

Example 11 Forecast Retrieval

Steps s300-s312 of FIG. 6 depict steps comprising or related to forecast retrieval that can be performed by a controller to obtain forecast data from a forecast server or forecast service thereof.

S300—Charge Start Over-Ride Set?

The charge start over-ride is a parameter that allows the user to intercede and instruct the system to start charging the battery at a specified time. If this value is set, it takes precedence over other modules (e.g. the charge start time determining module) to determine charge start times (e.g. If a charge start over-ride exists, there is no need to further calculate the charge start times for any attached charge sources).

S312—Set the Charge Start Array Times

The charge start times for the energy source (if one) or each energy source (if multiple) of the charge start array is set to the charge start over-ride time for the respective energy source.

S301—is the Charge on Weather Flag Set?

The charge on weather flag is a parameter (e.g. user-specified) that indicates whether the controller to check a weather forecast for a catastrophic weather event.

S302—Determine if a Weather_Event_Time Exists

The weather forecast(s) is checked to determine if a weather event (e.g. a forecast value meeting a target or exceeding a threshold) exists, and recording the time of the weather event as the weather event_time. Examples include a wind-speed that exists in any time-slice of the forecast over a set threshold (indicating the potential for grid power loss). Another example includes a predicted amount of precipitation over a set threshold in a given window of time. An example of such an algorithm is described in states S3A1-S3A10.

Steps s303 and s304 can be performed by a system module.

S303 Check for Time of Need or Weather Event Time

A check to determine if an arrival time exists (as specified by the user via the user interface) or a weather event time has been determined (see state S302). If neither exists, the algorithm moves to state S311. It is possible for the controller to set either of such times as a 'time of need' of energy from the energy storage device.

S304 Set the Time of Need

In this state the time of need is set to the sooner of an arrival time or a weather event time as determined in state S302.

Steps s305 and s306 can be performed by a forecast retrieving module.

S305—Create the Forecast API Strings

Certain forecast APIs available accept parametric data to improve the accuracy of the forecast data returned. For this reason, the API calls are assembled (including any changed/updated parameters that will impact the forecast) in this state. The most common examples of parametric data are location (typically latitude and longitude), however other types include may be incorporated such as solar array capacity (e.g., in in kilowatts 'pvcapkwatts'), angle of incidence of the solar array, and/or efficiency rating.

S306—API Calls and Store to Retrieve Forecast

The API calls are made to a networked forecast server 14. The returned data (forecast data) is parsed into a set of arrays. APIs exist today that will return power data (typically measured in kwatts per time increment, e.g., an hour) as an array of data (e.g. in JSON, XML or CSV format), where each array element represents a progressive section of time, and each array value represents one or more weather forecast values.

As an example, the Solcast API (available at https://solcast.com) can receive as parameters (e.g. from the battery manager controller 1 or controller of a user interface thereof), latitude, longitude, solar array size, and angle of incidence of the panels and returns a power prediction in a time-slice format of estimated power generation per time-slice (for example 30 minutes) in the forecast as an array. Solcast's determined prediction of this power production is based on data maintained at Solcast regarding solar radiance per time of year as well as cloud cover data (e.g. provided by satellite imagery data related to cloud cover). For other forecast servers where this is true, the data can be directly parsed into a power prediction (e.g. a 'power-generation' array).

Where a forecast service is used that provides weather forecast data (e.g. and not the power data), the present system, or battery manager thereof can use a power prediction module that performs one or more calculations using the retrieved weather forecast based on values of configuration parameters of the energy source (e.g. angle of incidence of a solar panel) in order to convert the weather forecast data it into a power prediction, e.g. a power prediction comprising the power (or total energy) per time-slice format described.

As another example, in the case of wind power generation, or other type of power production, a simple API (for example the AERIS weather API available at https://www.aerisweather.com) may return wind speed (or other weather forecast) for each time-slice over the forecast period. Wind generator manufacturers provide information relating wind-speed to power generated, which can be stored as a configuration parameter of the energy source, and used by the controller of the present invention to correlate wind forecast data to a power prediction. For example, this data of the configuration parameter(s) (e.g. correlation), combined with the returned wind-speed data, can be used by the controller to yield the power per time-slice required in a power prediction, e.g. a power prediction comprising a 'power generation' array (e.g. an array of time slice vs power during the time slice). Accordingly, the battery manager can perform this calculation of power prediction using configuration parameters of the energy source, such as location data to obtain the appropriate forecast and a correlation factor relating weather forecast (e.g. wind speed) to energy production for the specific energy source used in the system. The result can be added to the power generation array for each time-slice (e.g. every 30 minutes) in the array. The result of this step is an array representing the amount of energy expected to be generated from each power generation source over the length of the forecast.

S307—Update the Power Graph

A function is called to create or update graphs on the UI (user interface) that present the expected power available to charge the energy storage device (e.g. per unit of time such as per 30 minutes) over a time window of days (e.g. a window starting at the present time and/or ending at a future time), such as a period of time over the coming days. This graph is informational and can be provided in a format that is especially advantageous to the user. For example, FIG. 8 depicts a first (top) graph of power (e.g. watts) v time and a second (bottom) graph of the cumulative power (i.e. amount of energy, e.g. watt-hours) produced over the time window. Whether the power actually produced (or producible) during this time window is used to charge the energy storage device can be controlled by the steps that follow.

Steps s308-s309 can be performed by a charge start time-determining module.

308—Determine Energy Requirement ('Cumulative Charge')

One of the user parameters represents a target state of charge (e.g. targeted by a preparation mode), which can be, for example, the useable energy capacity of the energy storage device. In the case of a battery, the useable energy capacity can be expressed as the amount of energy (e.g. number of kilo-watt hours) the battery is designated to store in total (e.g. a value set slightly below a known absolute full state of charge). One of the global variables mentioned in step S101 stores the current charge state of the energy storage device as determined by the multi-core processor. This value is updated by the controller periodically (e.g. see step S602). In the case of a battery, this is often expressed as the number of kilo-watt hours of energy currently present in the battery.

Step 308 computes the energy required (the cumulative charge) to reach a target state of charge defined by a stored parameter (e.g. usable energy capacity such as state of full charge'), which can be calculated as the difference between the current charge state and the target charge state. Alternatively, the target can be determined as the state of charge that provides an amount of energy that satisfies a predicted future energy need. For example, the state of charge can be determined through an understanding of past energy consumption, knowledge of a duration of stay, and knowledge of the energy production forecast during the duration of stay to determine the state of charge required to support load requirements during the stay. For example, 1) the duration of stay is determined as the difference, in time, between an arrival event and a leave event. 2) a separate, historical average of energy consumed in in-use mode is maintained by the system, e.g. for each month of the year. 3) the predicted energy consumption over the duration of stay is determined as the multiplication of the appropriate average consumption metric multiplied by the hours in the duration of stay. 4) the total amount of energy that will occur during the duration of stay is determined based on the forecast data (e.g. integration of power prediction) as previously described. 5) this calculated amount of energy generated from step 4 is subtracted from the predicted energy consumption during the stay from step 3. 6) The remaining energy required, as determined in step 5, is subtracted from the present charge state of the battery. This represents the state of charge the battery would reach if no charging occurred before the arrival event. Note this could be a negative number at this point. 7) The amount of additional energy required before the arrival event is determined as the difference between the amount of energy available when the battery is charged to 50% state of charge and the result of step 6. Note: the goal of this step is to manage the battery to an end state of 50% absolute state of charge, but this could optionally by some other number as set by the maintain mode range specified by the user (typically based on battery chemistry type). 8) If the amount of energy required, as determined in step 7 is a positive number, the charge start algorithm, as previously described, is applied, potentially considering the charge source preference algorithm as previously described to produce the amount of energy determined in step 7. This maximum state of charge, that is determined via the sum of the battery current state of charge and the additional state of charge determined in step 7, might be well below the absolute full state of charge and therefore contribute to the longevity of the energy storage system.

S309—Determine ChargeStart Time

The 'cumulative charge' from step S308 represents the total charge that must be delivered to the energy storage device by the time of need event. The algorithm determines the specific time-slice in the forecast (i.e. power prediction) produced in in s307 that corresponds to the time of need event (e.g. which 30 minute window includes or immediately precedes the time of need event). The controller performs a reverse summation, determining the amount of energy that will be produced during the last time slice, and then adding the amount of energy for each immediately previous time slice, and repeating the step of adding the amount of energy for each immediately previous time slice until either the summed charge equates to the cumulative charge determined in S308 or the time slice added to the sum corresponds to the present time (note: this indicates it is likely the system will not reach full state of charge by the arrival time). This identified time slice provides the time to start charging (the present time or the time slice that sums to the cumulative charge) in order to reach the 'target state of charge' (e.g. usable energy capacity) by the arrival time.

Optionally, are multiple energy sources charge sources and the controller is configured to determine a charge start time based on 1) simultaneously starting charging from the multiple energy sources to charge at a higher (e.g. maximum) rate; or 2) assigning a priority to the energy sources and determining whether the highest priority energy source can provide the cumulative charge requirement by itself (by reversing summing the forecast data for the highest priority energy source until a charge start time is determined), and, if the highest priority energy source is determined not to be able to provide the cumulative charge requirement by itself, then serially adding the next highest priority energy source (reversing summing the forecast data for each energy source) to determine if the next highest priority energy source can, in combination with the higher priority energy source(s), provide the cumulative charge requirement by the time of need. Additionally, the controller can be configured to operate in each of these modes (high rate and low rate/priority driven charging) to determine charge start times, and allow a user to select between these modes. An example of an algorithm to provide such determinations of charge start time(s) based on multiple energy sources is provided in states S3B0-S3B21.

S310—Update the User Interface

The calculated charge start time(s) from S309 and cumulative charge value from s308 are updated on the User Interface.

S311—Update the Parameters Accessed by the Multi-Core Processor

The parameters, including the calculated charge start time(s) (if created) are stored in the table of global variables, e.g. by sending the parameters to core/thread 0 of processor 1.

Example 12 Determining a Catastrophic Event from Forecast

Figure 13:
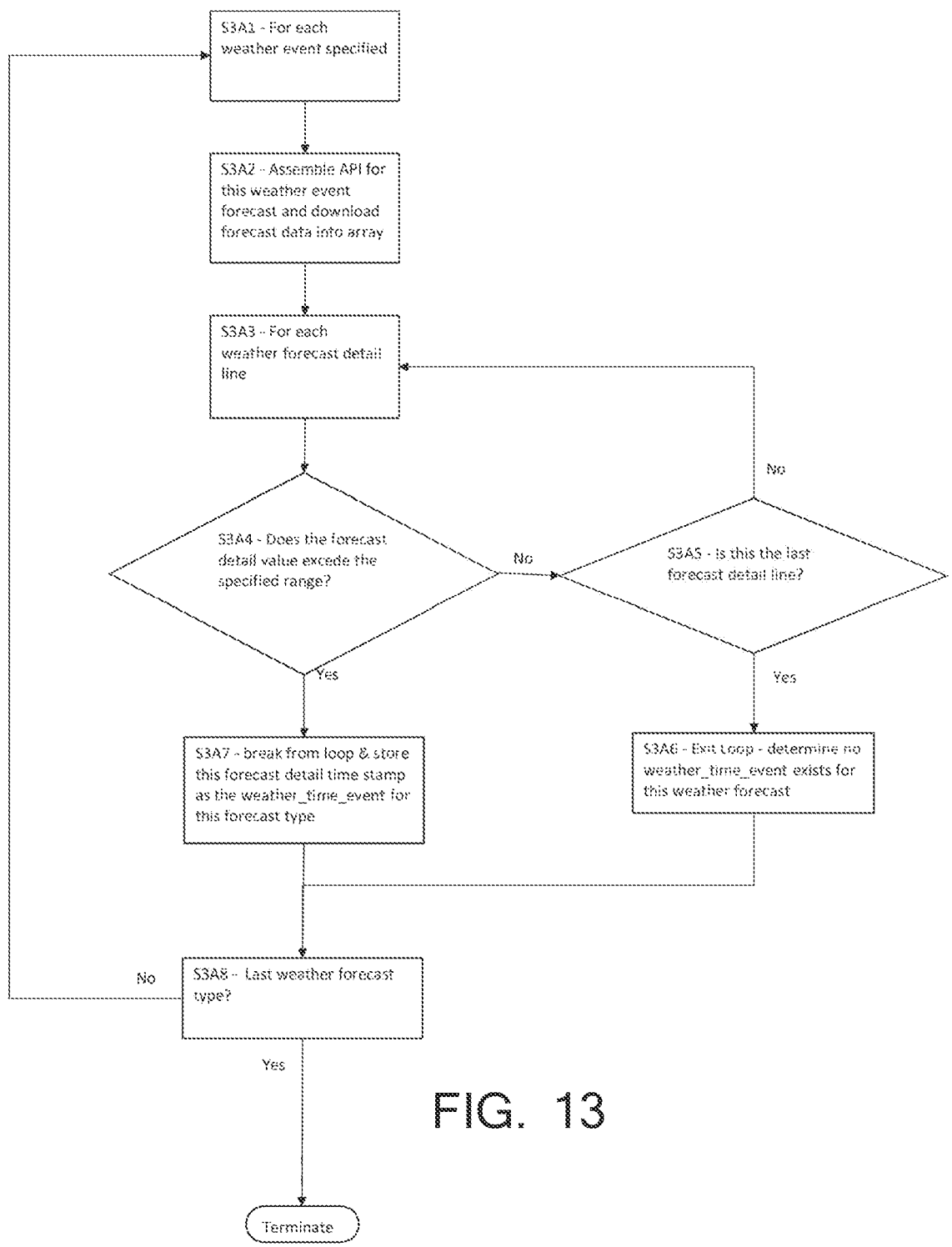
FIG. 13 depicts an example of steps a controller can use to determine whether a catastrophic event occurs in a forecast, e.g. to set the time of the catastrophic event as time of need.

FIG. 13 States S3A1-S3A8 provide an example algorithm for polling forecast data to determine whether a catastrophic weather event exists (i.e. something in the forecast is over a user specified threshold (or outside a specified range) indicating there is reasonable probability that primary power (optionally, grid power) will be disabled at or around the time of the weather event). For example, the catastrophic weather event can be defined as a forecast wind speed or forecasted precipitation greater than respective threshold.

S3A1—for Each Weather Forecast (Select Weather Forecast from a Plurality of Weather Forecasts)

When multiple weather forecasts are obtained, this step can be used to select a weather forecast as the basis for the subsequent steps. Each time this step is repeated (after looping from s3A8), the controller selects the next weather forecast S3A2—Assemble the API Call The API call for this weather forecast is assembled incorporating any recent parameter changes (e.g. longitude/latitude). The API call is made and the returned data is downloaded into an array representing each time-slice of the weather forecast with the proper weather value. The forecast is provided as an array of time vs forecast value (e.g. wind speed).

S3A3—for Each Weather Forecast Detail

A loop is established to cycle through each weather forecast detail line (i.e. each time slice/weather forecast value combination) in the downloaded weather forecast array from step S3A2.

S3A4—does the Forecast Detail Exceed the Specified Range

The weather forecast detail line for this weather forecast is compared to the range parameters associated with this weather forecast type to determine if it is out of range (e.g. exceeds a threshold)

S3A5—Last Weather Forecast Detail Line

If this is the last weather forecast detail line, the loop ends. If not, the array counter is incremented, and the function returns to the top of loop.

S3A6—Exit Loop

The controller has determined that no catastrophic event (i.e. weather_time_event) is present in this weather forecast.

S3A7—on Out of Range Event

If the comparison in S3A4 yields an out of range event on a weather forecast detail line (e.g. exceeding a threshold), the time associated with the weather forecast detail line is used to establish a weather_time_event for this weather forecast detail type. In other words, the controller has determined that a catastrophic event is present in this weather forecast and recorded the time of the catastrophic event as a weather_time_event. The weather_time_event can be used as a time of need used by a charge start time determining module.

S3A8—Last Weather Forecast Type?

If this is the last weather forecast type, terminate, otherwise return to the top of the loop to process the next weather forecast type (in search of an out of range event).

Example 13 Charge Start Determining Module

Steps S3B0-S3B21 describe an optional algorithm to determine one or more charge start times based on forecast data. Forecast data can include weather data (to be converted to the power prediction) or can include the power prediction itself. For example, wind speed data to be converted to power prediction corresponding to the power that will be produced by a wind-generator given the wind speed data. As another example, the forecast can include grid power availability over time. Optionally, this algorithm can consider an option to charge at higher rate (e.g. maximum rate with all charge sources enabled) over minimum time, or an option to charge at a lower rate by prioritizing charge sources. Prioritization of charge sources can be based on cost of energy, availability of energy, cleanliness of energy (i.e. either sustainable or preferred) or any other priority mechanism, including a combination of these parameters.

Figure 14:
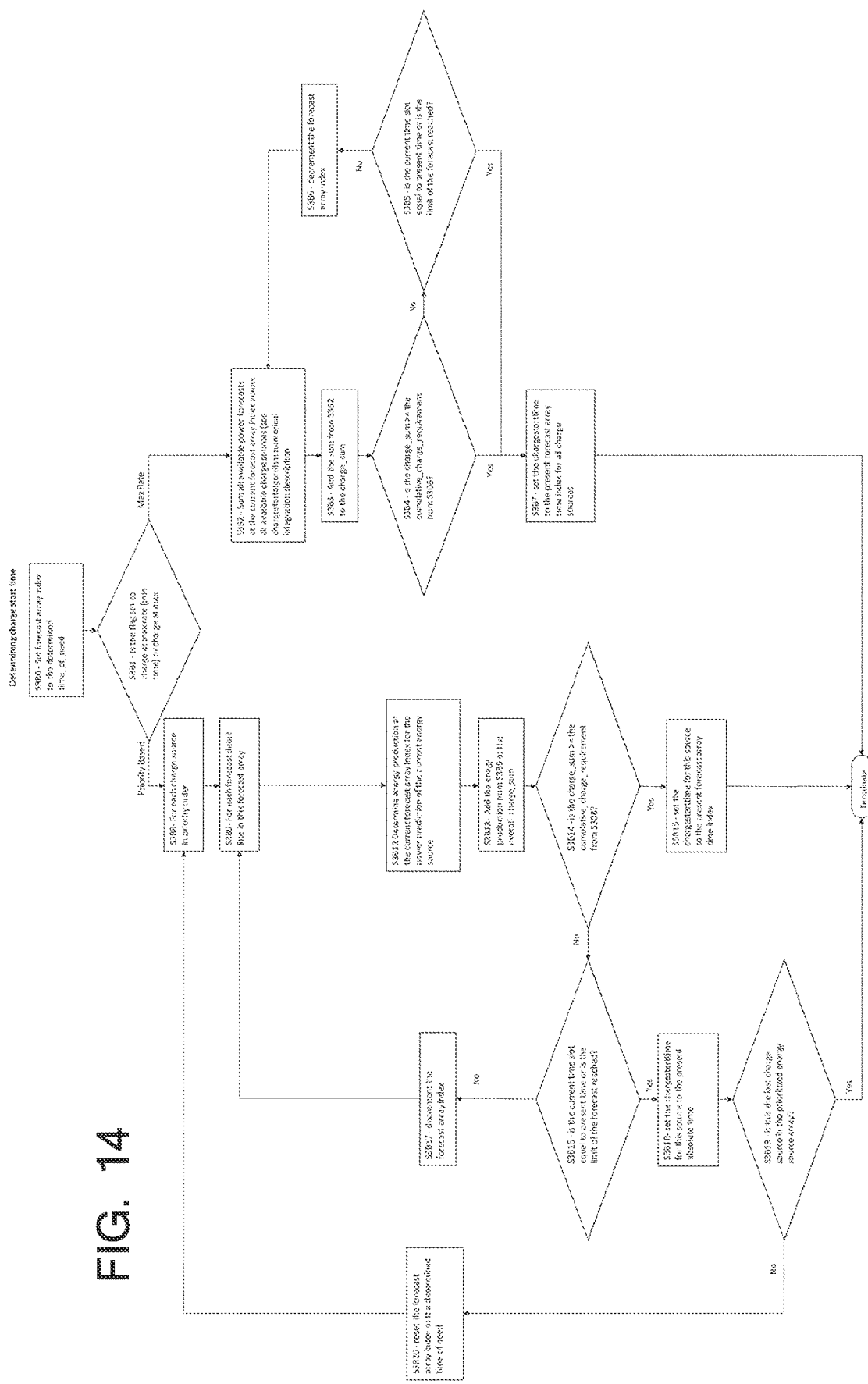
FIG. 14 depicts an example of steps that can be performed by a charge start time determining module.

A forecast can be obtained in the form of an array (e.g. time vs forecast value). FIG. 14 depicts steps which refer to an array index. The array index is the time in the array that that is currently being used for calculations. For example, the index can be set to a first time (e.g. a time of need), one or more calculations are performed using the data corresponding to the index, and then the index can be set to a second time (e.g. the index value decremented to the next earlier time) and one calculations are performed using the data corresponding to the current index.

FIG. 12 depicts two loops from which the controller can select when there are multiple energy sources. Alternatively, the controller can be configured to be able to use just one of these loops (max rate or priority based).

The forecast data used in this embodiment can be of two types, either A) weather forecast which the controller will transform into a power predication, or B) the power prediction itself (e.g. the forecast provide direct data as a rate of energy (i.e. power) generation over each given time slice). If the forecast is not a direct power prediction, it must be converted into power (or energy). For example, a forecast of expected wind-speed data can be converted to power prediction either through a conversion table or formula provided by the wind generator manufacturer into the corresponding power produced. In some cases, the forecast data itself directly provides data as power per unit time-slice.

S3B0—Set Forecast Array Index

The forecast array index is set to correspond the time of need event (e.g. from state S304. For example, a time slice of an array including or immediately preceding the time of need is selected as the current index.

S3B1—is Max Charge Rate Set?

The charge rate flag is checked to determine if charging should occur at max rate (all energy sources switched on simultaneously), or through a prioritization algorithm.

S3B2—Sum Available Power Forecasts

If the max charge rate mode is entered, the algorithm sums the energy (e.g. energy determined from integration of power v time data) available in each of the available power forecast arrays (i.e. the forecasts for reach energy source) for this time index to determine the total energy delivered across all energy sources in this time-slice.

S3B3—Update Charge_Sum

The running total ('charge_sum') of energy forecasted across the time-slices of the energy sources is updated with the amount determined in state S3B2.

S3B4—Cumulative Charge Reached?

The charge_sum from S3B3 is compared to the cumulative charge required (as determined in S308) to determine whether the charge_sum is greater than or equal to cumulative charge. In other words, this step determines whether predicted energy production from the time slice being evaluated (the current index) to the time of need will meet the cumulative charge required.

S3B5—Forecast Limit Reached?

If the forecast array counter has cycled backward (i.e. decremented) from the time of need event to either present time, or the limit of the forecast array, the loop exits.

S3B6—If the condition in S3B5 is false, the forecast array index counter is decremented and the loop repeats.

S3B7—Set Charge Start Time

This step is entered from state S3B4 or state S3B5. When reached, this state sets the charge start time for all energy sources to the time represented by the most recently examined forecast detail line.

S3B8—Loop Based on Energy Source Priority

Select the energy source for evaluation in the current loop iteration. Energy sources are selected for evaluation (i.e. performing the subsequent steps) in priority order.

S3B9—Loop Based on Forecast Detail Lines

For the selected energy source, the respective forecast is obtained and the forecast detail line (i.e. the combination of time/forecast value) corresponding to the current array index from the respective forecast is selected as the basis for subsequent steps (i.e. the time slice being currently evaluated). For each charge source connected, each forecast detail line is examined in turn (e.g. starting with the time of need as the index value and decrementing one time slice each loop iteration, as in S3B17)

S3B12—Determine Energy Production at the Current Forecast Array Index for the Power Prediction (i.e. the Time Slice Currently being Evaluated) of the Current Energy Source Selected S3B8 (the 'Current Forecast')

This can be performed by integration of the forecasted power prediction (e.g. integration of Power vs time in FIG. 7B to obtain energy vs time in FIG. 7C) as described in Example 14 which teaches a numerical or graphical integration approach for the charge source under examination. This approach converts a power per unit time slice to an amount of energy generated per unit time slice.

S3B13—Add the Energy Per Time Slice to the Running Sum

Figure 11:
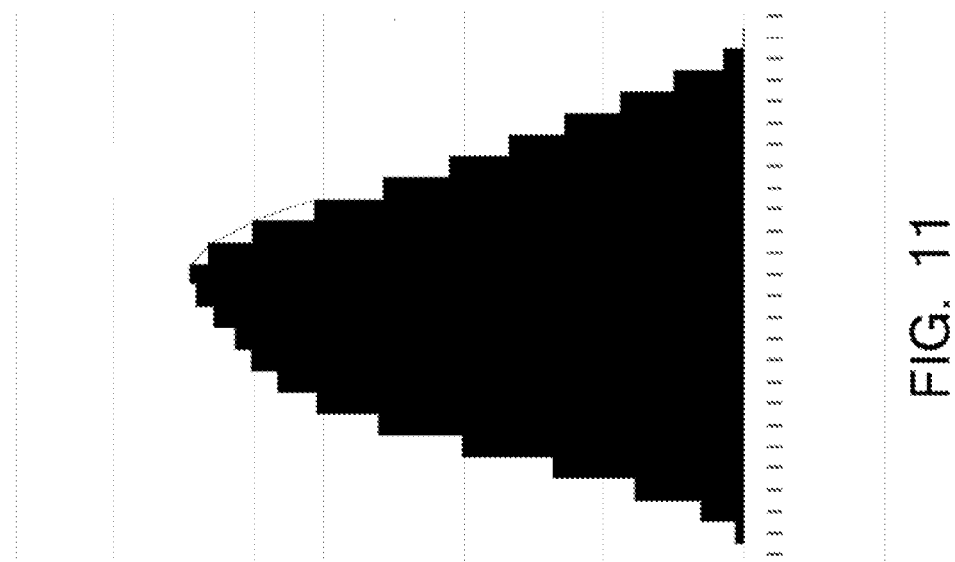
FIG. 11 depicts a graphical illustration of a trapezoidal method of integrating data, useful to determine energy produced from data of power vs. time.

The algorithm keeps a running sum of the energy (the charge_sum) over the time-slices examined. Further optimizations via methods such as the Trapezoidal method (e.g. FIG. 11) or Simpsons rule can improve the accuracy of the numerical integration as described in herein S3B14—Check Charge_Sum Against the Cumulative Charge Requirement The running charge_sum is checked to determine whether it is greater than or equal to the cumulate_charge_requirement as determined in S308.

S3B15—Set Charge Start Time

If the charge_sum is greater than or equal to the cumulative_charge_requirement, the charge start time is set to the time represented by the current forecast detail line array index and the algorithm terminates S3B16—Check Current Time Index If the charge_sum is not greater than or equal to the cumulative_charge_requirement, does this time-slice in the forecast array for this charge source represent either present time or the beginning forecast time slice in the array (i.e. no more time slices are left to examine).

S3B17—Decrement Array Index

If the check in S3B16 is false, the forecast array index is decremented to the immediately previous time slice and the loop repeats.

S3B18—Set the Charge Start Time

If the check in S3B16 is true, either the array index has decremented back to the present time or it has decremented back to the beginning of the forecast array. In this case, the charge start time for the current energy source being examined is set to the time represented by the current array index.

S3B19—Check Charge Source

At this state, the algorithm checks whether another energy source is available in the array of energy sources. If not, the algorithm terminates.

S3B20—Reset the Forecast Array Index

If another charge source is available in the charge source array (from S3B19), the forecast array index is reset to the determined time of need. The energy source array index is incremented to the next highest priority energy source (i.e. the forecast for the next highest priority energy source is selected) and control returns to the top of loop.

Example 14 Parameters

The following parameters are examples of useful parameters stored, read, and/or written by a battery manager of the present invention. The parameters below are parameters illustrate the invention and are referenced in the Examples described above.

CELLS_SUMMED; // a sum of the individual cell volt readings

SUM_OF_CELLS; // Provided by batt monitor (accuracy check against CELLS_SUMMED)

AVE_CELL_VOLTS; // Used to determine which cells should discharge for balancing

CELL_CHARGE_FLAGS; // Shared value indicating which cells are currently discharging for the purpose of cell balancing CELL_VOLTS[CELLCOUNT]; // Recorded voltage of each cell OUV_FLAGS1, OUV_FLAGS2, OUV_FLAGS3, // indication of whether cells are under or over voltage (read at battery monitor level)

MUXFAIL, //Muxfail indicates the battery monitor is in error. THSD means thermal shutdown for battery monitor CELL_TEMPS[CELLCOUNT]; // recorded temperature of each cell BALANCER_TEMPS[CELLCOUNT]; // recorded temperature of each balancer chip STATE_OF_CHARGE; // recorded state of charge of battery (based on a monitoring of the amount of current in/out)

CHARGE_CURRENT; // measured current entering battery

DISCHARGE_CURRENT; // measured current leaving battery

CELL_CURRENT[CELLCOUNT]; // measured current at each cell

CELL_RESISTANCE[CELLCOUNT]; // measured resistance at each cell level (useful for predicting battery life)

V_ANALOG, V_DIGITAL, BATTMON_TEMP; // Analog and digital voltage at battery monitor and batt monitor temperature ChargeAllowed, DischargeAllowed; // controls whether charge (turning on an energy source) or discharge (turning on a load) are allowed (e.g. set based on whether the battery sensors, e.g. temperature, read values or the controller makes determinations designated as safe/healthy or unsafe/unhealthy). In optional embodiments of the invention, "allowed" (or not allowed) means that the charge modes are enabled (or disabled when not allowed) from turning on or keeping on a load or energy source based on logic of the charge mode (e.g. a maintain mode disallowed from triggering a load on, due to unsafe temperature, when the charge state is greater than the range designated for maintain mode; or the in-use mode disallowed from keeping its load on when the battery is below a safe/healthy range for state of charge).

chargeRestart, dischargeRestart; // with respect to the state of charge, the percentage above a lower limit or below an upper limit (e.g. designated limits of safe/healthy state of charge) before a charge restart can occur after an energy source has been turned off due to being above the healthy range or before a discharge restart can occur after a load has been turned off due to being below the healthy range maxVolts, minVolts, maxTemp, minTemp; // store the volt and temp allowable range (used in determining bus state)

batteryCapacity; // Basic system settings chargeStartHour, chargeStartSeconds; // this is specific to when to start charging based on forecast data tmpChargeFlag, tmpDischargeFlag; // temp flags to recover from bus shut-off err counter; // stores global error count (used in error logging)

tmpchrgrestrt_volts; // temp variables to know what the batt volts need to be to restart the charge or discharge bus tmpdischrgrestrt_volts; // temp variables to know what the batt volts need to be to restart the discharge bus volatile time_t seconds; // time stored to manage arrival and leave events to optimize charging volatile struct webRegistry webcomms_webReg[WEB_REG_LEN]; // struct to handle communication listeners with web front end (assists in managing communications between the multi-core processor and the web/UI processor)

Example 15 Power Prediction Based on Weather Forecast

One optional feature of the present invention is the determination of a charge start time based on a forecast. The forecast can be a forecast of power production (power prediction) which is produced based on a weather forecast.

The amount of solar radiance power hitting the earth in any location is a function of a number of variables, including location and time of year. This amount of power can be predicted based on historical data. In a simple application, tables of solar radiance data can be used to predict solar power at any geographic location on the planet.

However, other factors such as cloud cover %, cloud cover type and other parameters can reduce the amount of power received via a solar array to a lower amount. This information is available within weather forecast data from a number of sources (e.g. Solcast), often as publicly accessible APIs (Application Programming Interfaces) that can be called from within a program on a computer connected to the internet.

In one embodiment, the invention creates a request (e.g. API call) including parameters such as latitude, longitude, and a configuration parameter of the energy source such as solar array size (in watts), and optionally another configuration parameter such as solar array angle of incidence. The forecast server (or API thereof) applies correlations to forecast data to accurately predict the amount of power based on the forecasted solar radiance in this location at the desired time of year and satellite imagery used to predict cloud cover over the location over the forecast period.

The solar radiance power (power prediction for the solar panel), considering factors such as cloud cover and cloud density can be provided as a continuous power graph over time, as shown in FIG. 7A which is the solar radiance power delivered as a function of time. The cumulative amount of power delivered over time (i.e. total energy during the window, e.g. in watt-hours) can be calculated as the area under the curve of power vs. time shown in FIG. 7A. Expressed another way, the cumulative power delivered can be expressed as the first integral of the equation describing the power rate curve as shown in FIG. 7A. Optionally, curve fitting algorithms can be applied to determine an equation from the curve of power vs. time, but an alternative method is to use close approximations which are readily obtained via simple numerical integration techniques.

As alternative to a perfect curve of power vs. time, the power prediction can be provided (e.g. from a server such as Solcast based on the API described above) as a series of power values at discrete points in time (time-series data provided as an array), e.g. expressed as power (rate at which energy is delivered) in kilowatts. A plot (bar graph) of this time-series data is shown in is shown in FIG. 7B; the time-series data is based on the same parameters used in the power prediction shown in FIG. 7A (i.e. for the same solar array size, time period and location used as a basis for FIG. 7A). The cumulative amount of power (energy, e.g. expressed in watt-hours) delivered can be determined from this data through any numerical integration technique. For example, the cumulative amount of power (total energy produced) in each time-slice (in this case 30 minute time-slices) can be approximated as the power rate (e.g. Watts) multiplied by the slice duration (e.g. in hours, in this case ½ hour), e.g. to provide the total watt-hours in each time slice, as shown in FIG. 7C.

As an alternative to the steps of integrating forecast data discussed above, the battery manager controller can use any other strategy of integrating the data. For example, the method of integration can be modified to increase the accuracy, for example, the duration of the time slice can be reduced (e.g. using data points of 15 minute intervals rather than 30 minute intervals). Additionally, the integration can include the Trapezoidal method, Simpson's rule, or any other known integration methods that provide accurate approximation of AUC determination. For example, an approach in applying the Trapezoidal rule can be seen in FIG. 11. In a simple application of the Trapezoidal rule, a further approximation of the continuous curve is made by imagining a line connecting each pair of data points in FIG. 3 in series, from the start time of the forecast data to the end. The area under this line can be determined as (DataPoint(n)−DataPoint(n+1))*time length (in this case 30 minutes or ½ hour) and summed to the time-slice value already determined for time slice n, thereby improving the cumulative power summation (total energy over a window of time). The Trapezoidal rule method can be used to provide a result obtained by averaging the left and right Riemann sums, and is sometimes defined this way. Stated another way, the integral can be even more accurately approximated by partitioning the integration interval, applying the Trapezoidal rule to each subinterval, and summing the results, as shown in the equation below, which is known in the art as a method of integrating using the trapezoidal rule.

$$\int_a^b f(x)dx \approx \sum_{k=1}^{N} \frac{f(x_{k-1})+f(x_k)}{2}\Delta x_k =$$

$$\frac{\Delta_x}{2}(f(x_0)+2f(x_1)+2f(x_2)+2f(x_3)+2f(x_4)+\ldots+2f(x_{N-1})+f(x_N)).$$

Such a "chained" (or "composite") version is a useful implementation of a method of integrating forecast data using trapezoidal rule.

As discussed in the example below, the present invention can obtain such a power prediction to predict the amount of energy (e.g. watt-hours) that will be produced by an energy source over a window of time, e.g. spanning from a charge start time to an in-use time (e.g. arrival time).

Example 16 Determining Cumulative Energy Produced Over a Window and Determining Charge Start Time A method of determining a charge start time can include steps of obtaining a forecast of power (power prediction) over time (e.g. array of power vs. time), e.g. as detailed in Example 15 (e.g. illustrated in FIG. 7B or 7C) and determining the cumulative amount (i.e. the summation) of energy (e.g. watt-hours) that will be produced over a window of time based on the forecast of power.

The cumulative energy (e.g. in watt-hours) delivered over the complete window can be determined by summing the individual time-slice cumulative power (also expressed in watt-hours). The cumulative energy accumulated vs time can be calculated through this summing approach is illustrated in FIG. 9.

Figure 9:
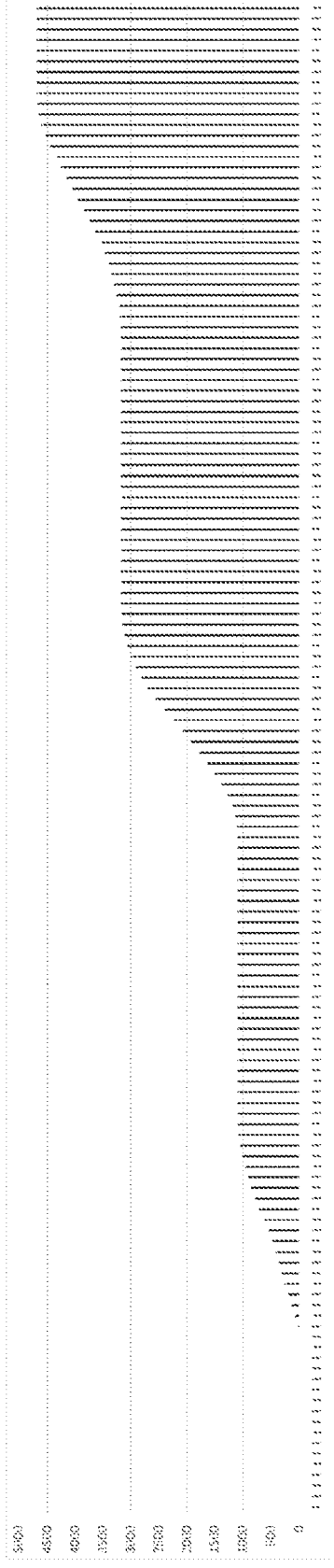
FIG. 9 depicts the sum of previous energy produced (also called cumulative energy) for each time point. The window of time represented by the data starts at the present time (2019-09-21; 23:00) and ending at a time of need (e.g. arrival time) (2019-09-24; 21:30). Each time increment is 0.5 hour. The value at each given time slice is the area under the curve of the data depicted in FIG. 7C, for a window of time starting at the time slice of the present time (2019-09-21; 23:00) and ending at the given time slice.

For example, FIG. 9 depicts cumulative energy (expressed in watt-hours) over a window that ends at the time of need (e.g. an arrival event), and starts, for example, at the present time. The cumulative energy at each time point is the sum of all prior time slices, taken from the data represented by FIG. 7C.

Through such an approach, the invention can generate accurate predictions of total energy produced over a window of time. The total energy produced over time is calculated by a first step of 1) an integration of time-sliced power data points (e.g. to transform, by integration, the time-sliced data points shown in FIG. 7B into the time sliced energy production shown in FIG. 7C), coupled with a second step of numerical integration (e.g. summing, for each time point in FIG. 7C, the energy produced for all previous time slices to produce data of the total energy produced over time as shown in FIG. 9), the energy generated across any continuous time duration can be determined.

Using the data of cumulative energy generated by an energy source across a window of time (e.g. shown in FIG. 9), the invention can determine the amount of energy (e.g. watt-hours) added to an energy storage device over a specified window of time (so long as that window is within the time range of the forecast data). As shown in FIG. 9, each point of the graph illustrates the amount of cumulative energy that is predicted to have been produced in total, when charging is started at the beginning of the window. Accordingly, the battery controller can determine a charge start time by setting the charge start time as the beginning of a window (e.g. the latest window) that provides the needed sum of energy produced by the time in need (i.e. the window ending at the time of need).

The battery manager controller can determine the present (or future) charge state of a battery (e.g. kilowatt-hours stored in the battery) and then use the above-described method of determining future total energy production by the energy source, thereby predicting the amount of energy that will be added to the battery by the energy source over the time window. By summing the present charge state and the amount of energy predicted to be added over the window, the controller can provide a prediction of the charge state of the battery at the end of the window.

Example 17 Determining Cumulative Energy Produced Over a Window by Reverse Summation and Determining Charge Start Time The controller of the battery manager can determine the amount of cumulative power (energy) produced over a window of time, e.g. as detailed in Example 16. Additionally, or alternatively, the controller can predict (e.g. for each of a plurality of time points) the amount of cumulative energy (e.g. kilowatt-hours) that will be produced from a time of need backward in time to an earlier point in time ('reverse cumulative power'). By determining reverse cumulative energy (i.e. for a given time point, the amount of energy that can be produced from the given time point to a later time of need), and comparing this to the determined amount of power required to transition the battery from a 'nominal state of charge' that might be achieved in a maintenance mode to a 'full state of charge' required in an in-use mode, the battery manager controller can thereby determine at which given time charging should be started to provide a target charge state to the battery by the time of need.

Figure 10:
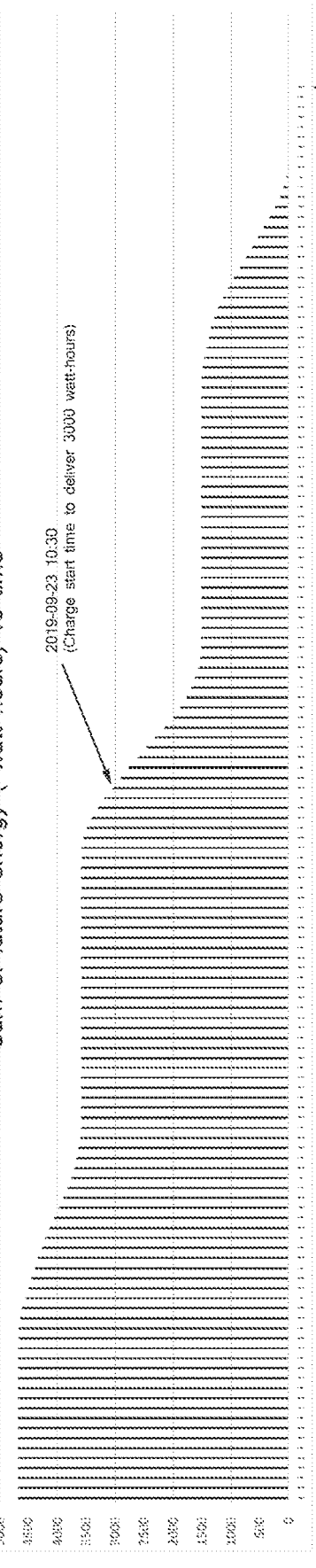
FIG. 10 depicts a graphical illustration of sum of future energy (also called reverse cumulative energy) for each time point. The graph is produced by reverse summation of energy sum over time (starting from the time of need and summing energy power in reverse towards the beginning of the window). The window of time represented by the data starts at the present time (2019-09-21; 23:00) and ending at a time of need (e.g. arrival time) (2019-09-24; 21:30). Each time increment is 0.5 hour. The value at each given time slice is the area under the curve of the data depicted in FIG. 7C, for a window of time starting at the given time slice and ending at the time slice of the time of need (2019-09-24; 21:30).

For example, FIG. 10 depicts the amount of energy remaining to be produced (while the energy source is switched on) before a future time point (end of the time window which is set as the time of need), i.e. the sum of the energy at the given time point and all future time points until the time of need (where the time of need is 2019-09-21 T21:30). Whereas the points in FIG. 9 are calculated from FIG. 7C by summing all previous time slices (back until the start of the window), the points in FIG. 10 are calculated from FIG. 7C by summing all future time slices (forward until the end of the window). In other words, for a given time point, the energy value is the sum of the energy predicted to be produced during said given time point, and all future time points (within the window represented by the data). Thus, a given time point indicates the amount of energy the energy source will produce until the end of the window if charging is started at said given time point.

Thus, by providing a window of time which ends at a specified time of need (e.g. an arrival time), the invention can predict how much energy will be produced starting from anywhere within the window (or at any of the plurality of time points), and ending at the time of need. By subtracting 1) the predicted amount of energy to be produced from a given time point from 2) the amount of power (energy) needed to bring a battery to a target charge state, the battery controller can determine the latest time for which said difference is zero, and, for example, set the charge start time as the determined latest time.

In the above graph shown in FIG. 10, the time of need is Sep. $24^{th}$ at 21:30 (9:30 pm). If a 5 kilowatt-hour (i.e. 5000 watt-hour) battery is currently maintained at (has a present charge state of) 2 kilowatt-hours, the cumulative amount of power required to bring the battery to a full state of charge is 3 kilowatt-hours (i.e. the difference of 5 and 2). Working backward in time (time-slices) from the time-of-need event, the reverse summation indicates that this amount of energy is forecasted to be produced (at the latest) between Sep. $23^{rd}$ at 10:30 (10:30 am) and the time of need (Sep. $24^{th}$ at 9:30 pm), thus determining a charge start time of Sep. $23^{rd}$ at 10:30.

Accordingly, these steps can be performed by the charge start time-determining module to determine the charge start time.

Example 18 Charge Start Time when Multiple Energy Sources are Connected

Example 17 details steps that can be performed by the charge start time-determining module to determine the charge start time. Additionally, or alternatively, the invention contemplates one or more additional determinations that can be made based on the same process.

For example, in one embodiment, the invention contemplates multiple charging sources. In such an embodiment, a respective forecast can optionally be obtained for each energy source. In order to achieve maximum longevity of a particular energy storage device, the battery manager controller can be configured for maximum charge rate over minimum time to reach its target charge state, or minimum charge rate over maximum time. The invention contemplates multiple executions of this charge start algorithm to optimally instruct the micro-controller to selectively control (turn on) these one or more charge sources by closing a switch between each charge source and the energy storage device.

When multiple energy sources are connected, the battery manager controller can optionally be configured to operate in one or more modes (e.g. modes selectable between by the user).

In one example mode, the battery manager controller can be configured to determine a charge start time based on the maximum rate of charging that can be provided by the system (e.g. simultaneously charging from multiple energy sources), by determining the charge start time when the respective forecast data for each of the multiple energy sources is summed within each time slice (and then cumulatively summed across time slices in the numerical integration) to reach the total amount of energy produced by all the energy sources and determining the latest charge start time that will bring the battery to the target charge state by time of need. In this mode, charging can be started from the multiple charging sources simultaneously at the determined charge start time.

Additionally or alternatively, in another example mode, the battery manager controller can be configured for minimum charge rate (over maximum time) by calculating the charge start time when only a first (e.g. a primary) energy source is enabled (or if there is not enough time between now and the time of need—i.e. the charge start time-determining module determines that the desired cumulative power (energy) amount will not be reached in the reverse sum process from the time of need back to present), a second pass with a second energy source turned on (again starting at the time of need and summing backward, continuing from the sum determined from the first pass contemplating the first charge source), and optionally a third energy source, until either the desired cumulative charge amount is derived, or all energy sources are exhausted. In this mode, charging can be started from a first energy source at a first charge start time, and then charging can be started from a second (e.g. lower priority) energy source at a second (later) charge start time, whereby the second charge start time is as late as possible such that collectively, the multiple energy sources provide the cumulative power (energy) by the time of need.

Example 19 Maintain Mode with Grid Load Algorithm

Figure 21:
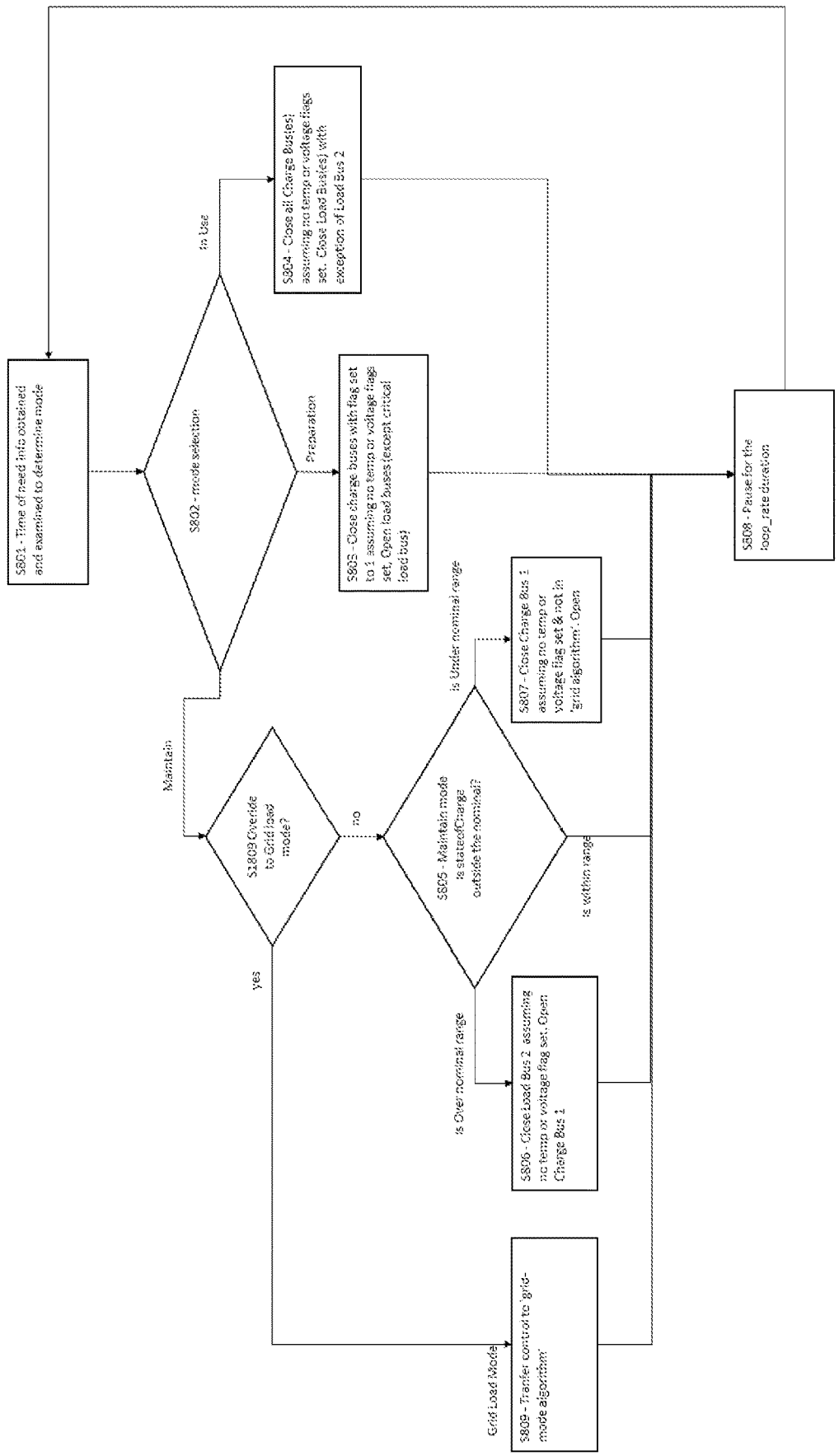
FIG. 21 depicts an example of steps that can be performed by a system module and charge modes useful in the present invention.

FIG. 21 depicts an example of steps that can be performed by a system module (s801,s802) and charges modes useful in the present invention. FIG. 21 is the same as FIG. 4, except that the maintain mode of FIG. 21 (s805-s807 and s809) includes an additional optional steps S1809 and s809. The maintain mode can include instructions (e.g. an override based on a setting, e.g. user setting, to use grid mode) to execute s809 based, e.g., on a specific setting to use s809 instead of s806/s807. Such a setting can optionally be set by a user who desires to use s809 instead of s806/s807 or can optionally be set automatically when a controller detects that a power grid is connected to a load bus. Alternatively, the invention contemplates a configuration in which s809 is used in a system that does not have (or only optionally includes) steps s805-s807. For example, the invention contemplates a configuration that is the same as FIG. 21, except that s805-s807 are deleted in their entirety, and the selection of "maintain" at s802 invokes s809. For example, s809 can optionally be the maintain mode in its entirety, or without the consideration of s805-s807.

S809 is a grid mode algorithm which sends energy to the grid in maintain mode. This allows the controller to target a stage of charge of an energy storage device to maximize the life of the storage device, and using the grid to dispense of excess energy produced by one or more energy storage devices and/or energy stored in the storage device which is in excess of a nominal range.

An example of such a grid mode algorithm is described in the following example.

Example 20 Grid Load Algorithm

FIG. 17 depicts steps S809A-S809F that may be performed by a controller that has been set to maintain mode, i.e. the maintain mode is configured to perform the steps shown in FIG. 17 and described below. As discussed herein, a maintain mode is optionally configured to open a first load bus (e.g. a load panel) and determine how to control a second load bus (or other load bus) and a charge bus. The maintain mode can determine how to use energy supplied from one or more charge busses (e.g. renewable energy sources such as solar or wind).

For example, S809A-S809F can be used by the configuration shown in FIG. 21 when S809 is triggered, i.e., 5809A-5809F represent a specific example of S809. These steps are an example of what is referred to herein as a 'grid mode' or 'grid load algorithm'

The steps of this example are a specific case of 'maintain mode' that can be set, e.g. by the user, if the system is connected to a power grid capable of net metering. In this case, the power grid is provided as a load which can draw energy from the storage device and/or energy source. Such a load can, for example, be provided on a second load bus (load bus 2') or a third load bus (load bus 3'). For example, the power grid can be connected to a third load bus, wherein a critical load is connected to the second load bus and/or a load panel is connected to a first load bus. Optionally, a controller determines that it is in 'grid mode' (e.g. by detection that a power grid is connected to a load, or by user selection) and transfers control of the load and source switches (i.e. busses) to the 'grid load algorithm' (S809A-S809E). For the sake of illustration, FIG. 17 refers to 'load bus 2' as the bus to which the grid is connected; however, the invention alternatively contemplates an embodiment in which the grid is connected to a third load bus, for example, when the second load bus is connected to another load (e.g. critical load).

S809A—Storage Optimized Algorithm?—Optional Step

Optionally, the controller can determine whether to use a storage optimized sub-mode of the grid load algorithm. For example, this optional determination can be made based on user input (e.g. user selection of "yes/no") or administrator control (e.g. setting based by a second user who is an authenticated administer-type user). If a setting has not been made for (e.g. the user has not selected) a storage optimized algorithm, the system will move to state 5809B, otherwise it invokes one of the one or more optimization algorithms that make use of the available storage via a transition to state 5809F. If optional step s809A is not present, the controller transitions to s809B, which is somewhat similar to S805 of FIG. 4, except that S809A has the ability to invoke three different load/charge bus states (S809C-E).

S809B—Is state of charge outside of nominal?

The system checks state of charge to determine how to set the load and charge busses.

S809C—Over Nominal

If the system state of charge is over the nominal range set for maintain mode, the one or more charge buses are opened, the load bus 2 is closed (or remains closed).

S809D—Nominal

If the state of charge is within range, all renewable charge busses remain closed. The load bus 2 is or remains closed.

As described herein, the grid mode can be the maintain mode in its entirety or the grid mode can be an optional series of steps (e.g. a sub mode) within the maintain mode. While the nominal state of charge for other types (non-grid modes) of maintain mode can optionally be a specific state of charge (e.g. 50% or 50%+/−5% such as 45%-55%), the grid mode can optionally target a nominal state range that is relatively wide, e.g. 40%-60% or 30%-70%. As a specific illustration, in the case of lithium ion batteries, although the most optimum state of charge for the sake of battery longevity is 50%, the grid mode can target a wider range of stage of charge for its nominal state, e.g. 30%-70%. While states of charge above or below 50% are less optimum for battery longevity, the cost of having to replace a battery at an earlier date due to the battery's lifetime being expended earlier can be offset by the gain from transferring energy to the grid at a higher price (e.g. per kwh) and can sometimes only be obtained by storing the energy temporarily (overcharging past 50%) in wait for the higher price to become available.

While in the state evoked by step 809D, the charge bus(es) and the load bus 2 are closed. Optionally, in this state, the state of charge of the battery does not change, e.g. because the grid on load bus 2 can consume all energy produced by the energy sources as it is produced and none is sent to the battery.

Optionally, in this state, the controller can be configured to open the bus to the battery, thereby preventing the flow of energy between the controller and the battery. Alternatively, the controller can be configured to only supply energy to the battery if the state of charge becomes less than nominal (i.e. trigger s809E after looping back through s809B for the next iteration) and open the charge buss(es) if the state of charge becomes greater than nominal (i.e. trigger s809C after looping back through s809B for the next iteration)

5809E—Under Nominal

If the state of charge is below the set nominal range for maintain mode, the renewable charge busses remain open. The load bus 2 is closed.

The maintain mode shown in FIG. 17 and described above may be used, e.g., as an alternate for any other maintain mode taught herein. For example, one embodiment which can use these steps is the embodiment shown in FIG. 4, except that steps S805-S807 (maintain mode, FIG. 4) are deleted and replaced with steps S809A-5809F. In this example embodiment, step s809A is performed where S805 would have been performed.

S809F—Invoke 'Storage Optimized Algorithm' Optional Step

Optionally, e.g., if the user has selected to use a storage optimized algorithm, the system will leverage the attached storage capacity to optimize return of power to the grid. The optimization compares a prediction of reduced longevity of the attached energy storage against the value of the sold power. An example algorithm is provided in states S9A1-59A7.

The controller is optionally configured to return (noted by the 'return') step to a previous step after any of steps S809C-S809E are performed. The invention contemplates several different embodiments, e.g., in which such a return is a return to s809a, S809B, or S805, s801, or s802. Alternatively, the controller can be configured without such a 'return' step and instead be configured to trigger any of the afore mentioned steps (e.g., s809a, S809B, or S805, s801, or s802) on a periodic basis (e.g. after a set period of time has elapsed since previously triggering said afore mentioned step). In such an alternative configuration, the trigger of said afore mentioned step can also trigger the controller to halt any operations occurring in the maintain mode such that conflicting commands are not given simultaneously.

Example 21 Maintain Mode with Grid Load Optimization Algorithm

FIG. 18 depicts steps S9A1-S9A7 that may be performed by a controller that has been set to maintain mode, i.e. the maintain mode is configured to perform the steps shown in FIG. 18 and described below. As discussed herein, a maintain mode is optionally configured to open a first load bus (e.g. a load panel) and determine how to control a second load bus (or other load bus) and a charge bus. The maintain mode can determine how to use energy supplied from one or more charge busses (e.g. renewable energy sources such as solar or wind).

For example, S9A1-S9A7 can be used by the configuration shown in FIG. 17 when S809F is triggered, i.e. , S9A1-S9A7 can represent a specific example of S809F. Alternatively, S9A1-S9A7 can be used by the configuration shown in FIG. 21 when S809 is triggered, i.e. , S9A1-S9A7 can represent a specific example of S809. These steps are an example of what can be included in a 'grid mode', also referred to herein as 'grid load algorithm'

The steps of this example are a specific case of 'maintain mode' that can be set, e.g. by the user, if the system is connected to a power grid capable of net metering and. In this case, the power grid is provided as a load which can draw energy from the storage device and/or energy source. Such a load can, for example, be provided on a second load bus (load bus 2') or a third load bus (load bus 3'). For example, the power grid can be connected to a third load, wherein a critical load is connected to the second load bus and/or a load panel is connected to a first load bus. Optionally, a controller determines that it is in 'grid mode' (e.g. by detection that a power grid is connected to a load, or by user selection) and transfers control of the load and source switches (i.e. busses) to the 'grid load algorithm' (5809A-5809E). For the sake of illustration, FIG. 18 refers to 'load bus 2' as the bus to which the grid is connected; however, the invention alternatively contemplates an embodiment in which the grid is connected to a third load bus, for example, when the second load bus is connected to another load (e.g. critical load).

For the sake of illustration, S9A1 can be triggered upon a "yes" from the determination made in 5809A. However, the invention also contemplates a configuration in which S9A1 is triggered by default upon entering S809 or upon the "maintain" selection being made in S802, i.e. the configuration shown in FIG. 18 can be provided alone or in combination with the steps shown in FIG. 17.

As discussed herein, a time of need can be set to correspond to an arrival time e.g. of a home owner, to charge the battery to a relatively high state of charge (e.g. relative to nominal state) in order to prepare the home for use by the home owner. However, as described below, the invention can be additionally or alternatively configured to set a time of need as a time at which the price of energy is relatively high (sometimes referred to herein as a 'grid time of need') such that the energy storage device is charged to a relative high state by the time of need, for delving energy to a power grid at the time of need. Accordingly, in this optional embodiment, the steps taught herein of 1) setting a charge start time, 2) setting the time of need as a charge finish time at which to complete charging to a second (relatively high) target state of charge, and determining, based on the forecast data, the charge start time as a latest time at which the rate of charge can be increased to reach the second target state of charge by the charge finish time (e.g. by integration using area under the curve (AUC) determination of a power prediction, e.g., where the power prediction includes watts over time) can be used in the same or similar manner to prepare the energy storage device for selling energy back to the grid, e.g. instead of in preparation for the arrival of a user. It may optionally be, however, that the second target state of charge targeted in preparation for the user's arrival time of need (targeted in preparation mode) is set higher than the second state of charge targeted in preparation for the grid time of need (in a grid algorithm of a maintain mode), for example, because the state of charge targeted in the maintain mode for the grid time of need can take into account the detriment on the battery life imparted by a higher state of charge.

Accordingly, while the present invention can optionally turn on a first load bus (e.g. connected to a load panel) upon the elapse of an arrival time of need as elapsed (or upon executing in-use mode), the invention can optionally turn on a second load bus (or third load bus), which is connected to a grid, upon the elapse of a grid time of need, e.g. and keeping the first load bus off, i.e. open.

The following steps are examples of steps that can be used alone or in combination with the optional configurations described immediately above as well as any other configurations taught herein.

S9A1—Set 'Time of Need' Event

A grid time of need is set. The time of need is set by the user (e.g. a local or a remote user of a networked computer) or can be determined by the controller to be the time at which the cost (price) of electrical power will meet a specified condition, e.g. by referencing data such as a table correlating the unit value of energy with time (e.g. FIG. 30). The condition can be, for example, the cost exceeding a threshold cost (i.e. absolute cost), the cost exceeding a threshold deviation from average cost (e.g. average over a specified period of time such as 1 month or 1 day), the cost exceeding a threshold deviation from minimum cost (e.g. minimum cost over a specified period such as 1 day or 1 month), the cost being equal to peak cost or within a specified percentage of peak cost (e.g. where peak cost is determined over a specified period such as 1 day or 1 month). As a specific example, the time of need can be set to be the time of peak power cost (and therefore peak benefit for net metering).

S9A3—Perform Optimization Algorithm

An optimization algorithm executes to use forecast data to optimize how energy is stored in the energy storage in the energy storage device such that the controller increases the amount of energy that can be sent to the grid at peak cost (e.g. per watt hour) while considering the cost due to detriment of the storage device from overcharging past the nominal state of charge. For example, an optimization algorithm can, for the interval between a specified charge start time and the time of need, determine a cost (detriment to battery life, i.e., longevity loss) of exceeding the nominal state of charge and determine a value (e.g. benefit of selling power to the grid) of the energy stored at said excess of the nominal state of charge. The determined cost is subtracted from the determined value to provide a net value of storing energy until the time of need, as "stored value".

As discussed herein, the calculated charge start time may change based on a change in weather forecast. In this scenario, the controller can optionally perform the above determination again using the updated charge start time. In such an optional embodiment, the charge start time is recalculated (e.g. using updated forecast data) every specified interval, e.g. defined by MAINLOOP_INTERVAL time (e.g. preset in the controller or entered by user input).

States S9B2-S9B7 represent an example algorithm of determining the value of time shifting power for sending to the grid at a later time (time of need). Alternatively, States S9C11-S9C13 represent another example algorithm.

S9A4—Check Algorithm Result

After determining a net value (i.e. the value of storing the energy and selling later at a higher price), the net value can be compared to the predicted value of the power if it were to be sold at the time of generation to determine if use of storage is warranted (i.e. the battery kept at nominal state of charge and the power sold at the lower price at the time of generation by the energy source).

The value of selling the forecasted energy production at the time of generation (i.e. instantly selling power as it is produced) is determined as "instant value".

When the "stored value" exceeds the "instant value", the gain from storing the energy for sale at the time of need is "positive" ("pos" at S9A4). When the "instant value" exceeds the "stored value", the gain from storing the energy for sale at the time of need is "negative" ("neg" at S9A4).

Optionally, if the charge start time was updated following the passing of a MAINLOOP_INTERVAL of time, the result generated from the above step recalculated to determine a "pos" or "neg".

Said another way, S9A4 can determine a relative cost, i.e. the cost (detriment to battery life) due to exceeding the nominal state relative to the cost (detriment to battery life) due to keeping the energy storage device at the nominal state, and also determine a relative value, i.e. the value (benefit of selling power to the grid) of the energy stored at said excess of the nominal state of charge and sold at peak price relative to the value (benefit of selling power to the grid) at the price instantaneous to the time at which the energy source produces the power. If the relative value is less than the relative cost (i.e. a "neg" at S9A4), the controller chooses to transfer power to the grid instantaneously rather than storing energy in excess of the nominal state of charge, i.e. load bus 2 is closed or remains closed when the energy storage device exceeds the nominal state of charge. In contrast, if the relative value is greater than the relative cost (i.e. a "pos" at S9A4), the controller chooses to store energy in excess of the nominal state of charge and transfer energy to the grid at the grid time of need, i.e. load bus 2 is opened at the charge start time and then closed at the grid time of need.

S9A5—Use Storage

If the outcome of S9A4 is positive, energy is accumulated in the energy storage device once the current is greater than or equal to the charge start time. The load busses are open. The one or more charge buses (e.g. renewable energy source busses) are closed. Optionally, controller opens the one or more charge busses if the state of charge of the energy storage device reaches the target state of charge. Optionally, once of the current time of need is greater than or equal to the time of need, the load bus 2 is closed to deliver energy to the grid.

S9A6—Operate to Target Nominal Charge State

When the result of S9A4 is negative, the system will operate according to states S809B-E, i.e. transition to state S809B (and optionally trigger the steps that follow in FIG. 17).

S9A7—Pause for MAINLOOP_INTERVAL—Optional Step

The system optionally pauses for a specified interval (e.g. 1 min or 5 min). The system will continually loop up until the grid 'time of need' (e.g. time of peak power cost) to reapply the algorithm, for example, if the forecast data changes or other variables changed.

Example 22 Determining Value of Stored Energy Relative to Cost of Exceeding Nominal State of Charge FIG. 19 depicts steps that can be performed to determine, for the interval between a specified charge start time and the time of 'return to nominal' (or time of need), determine a cost (detriment to battery life, i.e., longevity loss) of exceeding the nominal state of charge and determine a value (benefit of selling power to the grid) of the energy stored at said excess of the nominal state of charge. These steps are an example of step s9a3 in FIG. 18.

In a first method, in order to determine the detriment to the battery, the controller can divide the window of time between the charge start time to the time of 'return to nominal' into a plurality of intervals (time slices) and then, for each interval (referred to as a time slice below), examine the interval of time and determine the state(s) of charge, and corresponding detriment to the battery, that the battery will experience during said interval of time. This determent to the battery can be subtracted from the value, wherein said value is the value of selling said excess energy at the grid time of need. Such a difference provides the net value from said interval due to storing the energy. The resulting net value of each interval is added together to determine the total sum net value.

Alternatively, in a second method, the controller can divide the window from the charge start time to the time of 'return to nominal' by the hypothetical time stamps at which the battery would transition from one state of charge to the next (e.g. in increments of 1% or 5% state of charge) and determine how long the battery will spend at each state of charge to determine the detriment to the battery imparted by each state of charge, and then sum the detriments to determine the total detriment to the battery due to exceeding the nominal state of charge.

An example using the first method follows.

S9B2 Determine Charge Start Time

A charge start time is provided that precedes the time of need. For example, the same calculation steps used in S305-309 are used to determine a 'charge-start time', noting that the maintain mode can optionally use a different target state of charge. Specifically, the algorithm performs steps S305-309 to determine a charge start time that can be used to charge the storage device such that the storage device reaches a target state of charge by the grid time of need. However, the present invention contemplates that target state of charge used here for a grid time of need can optionally be the same as or different than (e.g. less than) the target state of charge targeted for an arrival time of need. Additionally, the present state of charge (i.e. the nominal state of charge) can optionally be the same as or different than (e.g. greater than, or a range the high end of which is greater than) the present state of charge from which charging is commenced in preparation mode.

S9B3—Loop Backward in Time

For each time slice from the time of return to nominal (or 'time of need') back to the 'charge-start time' a set of calculations are determined. Alternatively, the controller can start at the charge—start time and loop forward in time, for each time slice, towards the time of return to nominal (or 'time of need') back to the 'charge-start time.

S9B4—Determine Predicted Power

For this specific time slice, the predicted energy generation (from the power generation forecasts), e.g., in kwh, is determined. This amount of energy is multiplied by the price of energy corresponding to the grid time of need (i.e. the rate at which energy can be sold at the time of need) and stored.

S9B5—Determine Predicted Longevity Loss

The controller determines a loss in longevity of the storage device due to exceeding the nominal state of charge.

The controller references data (e.g. a lookup table) that correlates, for each of a plurality of states of charge (e.g. relative to an optimal or nominal state of charge that provides maximum life of the storage device), the rate at which the life of the storage device decreases. For example, at the optimal state of charge (e.g. 50%), the life of the storage device decreases at the lowest rate. At a state of charge other than the optimal state of charge, the life of the storage device decreases at a rate greater than said lowest rate. Typically, the life of the storage device decreases at a greater rate the more the state of charge deviates from the optimal state of charge and the longer over time the deviation in state of charge exists.

The predicted delta in state of charge (relative to an optimal state of charge that provides maximum life of the storage device) is determined from the power forecast, optionally as a percent deviation from nominal as referenced against a maximum deviation from nominal state of charge. This delta in state of charge is optionally converted into a delta in cell or system resistance via lookup from a table (e.g. in the CELL_HEALTH_TABLE (see S900-S902)). The delta in state of charge (relative to optimal) is then converted into a predicted change in life of the storage device (e.g. based on change in cell resistance), again via lookup in the CELL_HEALTH_TABLE. The change in life of the storage device (e.g. as a percentage) over this interval (e.g. time slice or RESLOOP_INTERVAL) is determined. For example, this predicted change in life of the storage device can be determined by comparing a predicted change in cell resistance over this interval (e.g. time slice or RESLOOP_INTERVAL) to an expected total change in resistance that will occur over the cell life (e.g. provided by the battery manufacturer and inputted by the user), thereby determining the % of cell life reduction that will occur in this interval (e.g. time slice or RES LOOP_INTERVAL). This % reduction in cell life is then multiplied by a capital cost (e.g. user entered capital cost) of the battery or other energy storage device, thereby determining the cost of using the storage device at a charge state other than optimal.

S9B6—Determine Net Value

The values determined in state S9B5 and S9B4 are compared through subtraction. The result is added to a running total across all intervals (e.g. time slices or RESLOOP_INTERVALS) for this analysis S9B7—Increment Time Time is advanced by the time slice in preparation for the next analysis cycle. In this manner, the algorithm walks through, by the time slice interval, the entire time from the charge start time to the time of need to determine a cumulative value.

Example 23 Predicting Net Value of Time Shifting Power Delivery Using Multiple Scenarios As described above, the invention can use a step of determining the net value of time shifting power delivery (i.e. temporarily storing energy at an excess of the nominal charge state and delivering at a time of need), e.g. the result determined in step s9b6. The invention contemplates an embodiment which determines a predicted net value for each of a plurality of scenarios. The plurality of scenarios differ from one another by the charge source(s) used for charging and/or the state of charge used as the target (goal) for the time of need.

As detailed in FIG. 19 and Example 22 and FIG. 28, the net value is based, at least in part, on the charge start time determined for a respective scenario (e.g. the charge start time determined in S9B2). As detailed herein, the invention contemplates multiple ways of determining a charge start time. Any of these methods can be used to determine the charge start time. Additionally, the invention contemplates a method that runs multiple scenarios, each using a charge start time determined using a different method, and determines the respective predicted net value provided there from. In this embodiment, the controller can select the scenario that provided the greatest net value for comparing with the value of not time shifting power delivery (i.e. delivering energy to the grid at the time the energy was produced by the energy source(s)). The different methods (i.e. different scenarios) can include a different set of charge source(s) selected for determining the charge start time. For example, step S3B1 includes a decision to use one of two methods (for determining a charge start time. The controller can determine the charge start time for each method (e.g. priority based vs max rate from S3B1) produced by the decision, and determine the net value produced by the respective method of determining a charge start time.

As an illustrative embodiment, the controller can repeat steps s9c3-s9c8, s9c11-13 of FIG. 28 (or FIG. 19 in its entirety), each repetition using a different charge start time to determine a predicted net value. Each of the iterations can use a different charge source, set of charge sources, or method of selecting charge sources (e.g. selection at S3B1). Additionally or alternatively, each of the iterations can use a different state of charge used as the target (goal) for the time of need, for example, the controller runs a scenario for each of the following target states of charge: highest allowable state of charge (e.g. defined by 'usable energy capacity' parameter) and one or more (e.g. each of) a state of charge greater than 90% and less than the highest allowable state of charge, a state of charge greater than 80% and less than 90% the highest allowable state of charge, a state of charge greater than 70% and less than 80% the highest allowable state of charge, and a state of charge greater than 60% and less than 70% the highest allowable state of charge.

As one illustrative embodiment, if the system includes two charge sources and is configured for selecting between two optional states of charge as the target (goal) for the time of need, the controller can determine all possible scenarios of the two charge sources and the two target states of charge. This provides three options for charge sources ($1^{st}$, $2^{nd}$ or both turned on at the same time) and two options for target states of charge, providing a total of six methods of charge start determination and six respective predicted net values.

Additionally, or alternatively, the controller can use a charge start time determination method of priority based determination ('priority' selected at S3B1). It is to be noted that, in this method, multiple charge sources may be used in the determination of a single predicted net value (single scenario), but each charge source may have a unique charge start time (e.g. a highest priority charge source having the earliest charge start time). In this scenario, instead of a single charge start time at S9C3, the multiple charge start times are used in conjunction with respective charge sources having respective power deliveries (due to respective power forecasts). Accordingly, in this scenario, the predicted states of charge across various windows of time (e.g. S9C4, S9C6-S9C8) are calculated based on the sum rate of power delivery for all charge sources that considered to be presently on in the scenario being evaluated (i.e. the charge start time for the respective charge source is earlier than the time slice being evaluated).

Example 24 Determination of Grid Time of Need

As described here-in, the invention contemplates a specific implementation of maintain mode ('grid mode' or 'grid load algorithm') in which the energy storage system maintains a battery at a nominal state by keeping renewable energy sources turned on (i.e. closing the respective charge bus) and closing a load bus (e.g. second load bus) connected to the grid (e.g. via net metering) to send energy to the grid from the charge bus that would otherwise cause the battery to charge to a state above a set nominal state of charge (e.g. 50%). This configuration ensures the system does not charge the battery above its nominal state. In one approach, these charge and load busses are switched on and off by the device to maintain a nominal state of charge as already described. In this manner, renewable power is returned to the grid via net metering and the user benefits from the sale of such excess energy while also benefiting from prolonging the life of the battery by keeping the battery at its nominal state of charge.

In many regions of the world, power from the grid is available at different rates (typically $ per kilo-watt hour) at different times of day, month, season, etc (e.g. the price rate tables indicated in the Table in FIG. 30, e.g. for the Southern Edison Time of Use Plan). In such cases, a more advanced optimization is possible through the use of the capacity available in the energy storage system and through knowledge of weather and other forecast data as described here-in. In one example, the system is made aware of grid power price data either via user entry, direct API access, or through some other means. With this knowledge, the energy storage system can be used to optimize the financial return of net metering. This optimization involves use of the storage system to shift the provision of power to the grid to times of higher rate of return (e.g. between 5 and 8 pm according to the Table in FIGS. 29 and 30).

As taught herein, a controller can obtain data indicating the price of energy as correlated with the time at which the energy is supplied to the grid. The table in FIG. 30 provides an example of such data, which is Southern California EDISON Time-Of-Use Rate Plans (effective 10-1-2020) https://www.sce.com/residential/rates/Time-Of-Use-Residential-Rate-Plans Accordingly, when setting a grid time of need, a controller can reference data, such as the table above, determine the highest energy price, and set the grid time of need at the time which provides the highest energy price. In this specific example, the controller can read the data, and set 5 pm as the grid time of need because it provides the highest price. This process is an example of step s9A1 in FIG. 18.

Example 25 Determining Grid Time of Need, Charge Start Time, End of Time of Need, Predicted States of Charge, Discharge Remainder Time As discussed herein, in one embodiment of the present invention, a controller determines the value of time shifting power delivery to the grid during maintain mode. Essentially, the controller determines the value of the energy stored in the battery, and determines a cost of holding the battery at a state of charge (energy level) other than (above or below) nominal. In order to determine (predict) the total cost of holding the battery at a storage state other than nominal, the controller evaluates a future time window by dividing the window into a plurality of time slices, determining the detriment (wear) on the battery caused by the battery being held at a level other than nominal during each respective time slice, and summing the detriments of all time slices, and determining a cost associated with said total summed detriment. In order to determine the predicted storage state associated with each time slice, the controller determines various transition points in time. These transition points are the predicted points in time when the controller will optionally change the target stage of charge of the battery (or other energy storage device). The transition are shown in FIG. 22 and FIG. 27 with vertical lines extending above the chart, and can optionally include a charge start time (transition of stage 1 to stage 2), a grid time of need (transition of stage 2 to stage 3), a return to nominal (transition of stage 3a to 3b), a discharge remainder time (transition of stage 3 to stage 4) end of time of need (or end of peak, transition from stage 4 to stage 5), and the end of the grid load interval (end of stage 5).

S9C1—Set 'Time of Need' Event

The controller can obtain a grid time of need from, e.g. from a table, e.g. a table that provides a time of need, or determine the time of need from a table that correlates time and pricing, from which the controller determines a time of need as a time at which the price of electricity meets a specified criteria, e.g. is relatively high compared to other times. For example, the device uses the start of the peak grid power cost as a grid 'time of need' event. The time is optionally derived from Time of Use pricing offered by the grid provider (e.g. FIG. 30), but can represent any time, optionally where grid power at that time of day, week or some other periodicity is more expensive than at other times.

As an example, this time can be entered by the user, or downloaded from a grid server (computer) via API.

S9C2—Set 'End of Time of Need' Event

The controller can obtain a grid end of time of need, e.g. from a table, e.g. a table that provides an end of time of need, or determine the end of time of need from a table that correlates time and pricing (e.g. FIG. 30), from which the controller determines an end time of need as a time at which the price of electricity stops being meeting the criteria discussed above for determining a time of need (e.g. the price stops being the relatively high price).

As an example, the controller uses the end of the peak grid power cost as a grid 'end of time of need' event. This time can be entered by the user, or downloaded from the grid server via API. The time is typically derived from Time of Use pricing offered by the grid provider. For the sake of understanding, the end of time of need is used in the maintain mode in a similar manner as an in-use mode optionally uses a 'leave event', i.e. a time that designates the end of a window of time in which power will be supplied to a specified load.

S9C3—Determine Charge-Start-Time

The device applies the algorithms specified herein, including the available forecast data, to determine the time at which it must start charging the energy storage device in order for it to reach a specified target state of charge (optionally the highest state of charge permitted in the 'In-Use' mode described here-in) by the grid 'time of need' event established in S9C1. This charge start time can be determined by understanding a first state of charge (e.g. a nominal state of charge), and a second state of charge (e.g. a higher state of charge) and determining, for each time slice from the first state of charge to the second, the amount of power forecast to be added within the interval and summed with the predicted state of charge from the prior time-slice. A time to start charging can be determined by starting from a time of need and second state of charge and subtracting the amount of energy forecast to be produced in each time slice working backward in time (time slices) until the first state of charge is reached. This resultant time represents the time to start charging in order to reach the second state of charge at the time of need. This is stored as a charge-start-time. For the sake of understanding, the controller can use the same calculation steps that other embodiments of the invention use to determine the charge start time that designates the transition to preparation mode.

S9C4—Predict State of Charge Between Charge-Start-Time and 'Time of Need'.

For each time slice between the charge start time and the time of need, the device records the predicted State of Charge across the respective time slice. The state of charge for a given time slice can be calculated from the numerical integration of power from the charge start time to the current time slice being evaluated (i.e. adding the energy produced during each of the time slices from the charge start time to the time slice currently being evaluated). This range of values (describing all the time slices) is recorded and will be used in the calculations of subsequent steps.

Additionally, the controller optionally retains a running total of the expected return from net metering throughout this stage and the subsequent steps S9C5-8. This return is maintained for two hypothetical cases, 1) assuming the energy storage system is used to shift power to the time of peak grid cost (i.e. energy is stored in the storage device in excess of the nominal state and sent to the grid at the time of need) and 2) assuming the energy storage system is not used to shift power to the time of peak grid cost (i.e. energy is sent to the grid at the time it is produced by the charge source rather than storing for sending later) as articulated in the table shown in FIG. 29. The return factors in the unit value (rate) in existence at the time (Time of Use) the power is sent to the grid (i.e. load bus) as indicated in the table shown in FIG. 29. The time of use for the first hypothetical case is the window between the time of need and the end of time of need. The time of use for the second case is the time at which the charge source(s) produced the power.

S9C5—Predict Latest Time ('Discharge Remainder' Time) to Start Discharge from Nominal to Lower Target State of Charge The controller obtains a discharge rate to the power grid (load bus). This is the rate at which energy is sent to the load bus. This discharge rate can optionally be a parameter entered by the user.

The controller is optionally configured such that, when the grid time of need actually occurs, the controller causes the energy storage device to return a nominal state of charge, by discharging (closing the load bus) at the 'time of need' time.

Based on the discharge rate, the controller optionally calculates the latest time to start discharging (the 'discharge remainder' time), such that the energy storage device would reach a target low State of Charge (optionally the lowest attainable State of Charge of the 'In Use' mode described here-in) at the time end of time of need (the time at which peak grid power cost ends). The target low state of charge here is lower than the nominal state of charge (or lower than the lower end of a nominal range).

S9C6—Predict State of Charge from 'Time of Need' to 'Discharge Remainder' Time

Using the same calculation method performed in step SC94, the controller calculates (predicts) the State of Charge of the energy storage device for each time-slice that exists as it discharges back to a nominal state, optionally starting at the 'time of need' event, and until it reaches the 'discharge remainder' time at which point it will start discharging the remainder of the available power in the energy storage system back to the grid.

S9C7—Predict State of Charge from 'Discharge Reminder' Time to 'Leave' Event Time.

Similar to the process described in step SC96 and SC94, the device predicts the State of Charge that will exist for each time slice from the 'discharge remainder' time to the 'leave' event time.

S9C9 Perform Cost Compare—Optional Step

The device optionally checks a setting (e.g. user-settable) to determine whether it should compare the energy value gained by temporarily storing energy in excess of the nominal state in the energy storage device and sending the stored energy to the grid during the time window of need (the time between the grid time of need and the end of time of need), thereby shifting the transfer power to the grid into the peak grid power cost time range. If the cost compare option is selected, the controller will execute state S9C11 and begin the process of predicting the cost of leveraging the energy storage system in this manner (ie, due to a decrease in longevity and any additive operational costs). If the cost compare is not selected, the device will proceed to step S9C10.

S9C10 Set Timings for Each Stage Over Grid Load Interval

The predictions in states S9C1-9 result in a set of determined times. The controller then turns on and off the load bus connected to the grid and the charge buss(es) in order to effect the following:

At the charge-start-time, turn off the grid-connected load bus (and optionally other load busses, optionally with the exception of a critical load bus). Keep the charge busses on (e.g. solar and wind power).

In a perfect scenario (provided forecast and battery physics were accurately predicted), the above steps will cause the energy storage device to reach a the target State of Charge (optionally the highest State of Charge as defined in the 'In Use' mode) by the grid 'time of need' event.

In one configuration, at the 'time of need', the controller turns on the load bus connected to the grid in order to discharge the energy storage device back to its nominal state. Then, upon reaching the nominal state, the controller keeps targeting the nominal state of charge, e.g. as described in states S809B-E until the 'discharge remainder' time. In alternative configuration, the low target stage of charge can be targeted once the time of need occurs (i.e. the controller does not keep the storage device at the nominal state of charge for a period of time).

Assuming the controller is configured in the first configuration above (keeping the storage device at nominal state for a period of time), then at the 'discharge remainder time', the controller turns on the load bus connected to the grid until the energy storage system reaches the target low State of Charge (optionally the lowest state of charge defined in the 'In Use' mode). Provided the forecast and system (e.g. battery) physics were accurately predicted, this target low State of Charge should be reached approximately at the end of the peak grid power rate period (also referred to as the 'end of time of need' event).

At the 'end of time of need event", the controller targets the nominal state of charge, e.g. as described in states S809B-E. Optionally, the controller will remain in this state until approaches the next charge-start-time when the cycle repeats.

Example 26 Determining Value of Stored Energy Relative to Cost of Exceeding Nominal State of Charge and Choosing Whether to Time Shift Power Delivery As previously described, FIG. 19 (S9B2-S9B7) is one method of determining the value of storing energy in excess of the nominal state to time shift (delay) delivery of energy to the grid. In an alternative method, the steps word S9C11 Perform CELL_HEALTH_TABLE lookup State S9C11 is entered from state S9C9, e.g. if a setting is made to perform the cost compare. The controller references the accumulated deviation of State of Charge from nominal across stages 2, 3A, 4 and 5 as show in FIG. 27 (or FIG. 22) and as described in states S9C4-8 from the charge-start-time to the eventual return to nominal state to determine the amount of deviation from nominal that occurs over the interval as a percentage of the maximum deviation from nominal that could occur over the range. This percentage is used to perform a table lookup in the CELL_HEATH-_TABLE, which returns a rate of change of resistance (which is correlated to battery life detriment) at this % state of charge deviation from nominal. This resistance rate of change can be multiplied by the respective duration of the evaluated time slice or other interval in time to determine the expected change in resistance experienced over the interval.

S9C12 Perform Calculation of Cost Impact to Battery of Grid Load Use

The calculated change in resistance determined in step S9C11 is compared to an expected change in resistance over the useful life of the battery. The expected change can be obtained from data stored in memory or input by the user. For example, the calculated change in resistance is divided by the expected change to provide a fraction. This comparison (e.g. fraction) can then be multiplied by the capital cost of the battery to determine a cost in using the battery to time shift power into the time of peak grid cost (i.e. the detrimental cost of temporarily storing the energy at a level in excess of the nominal state of charge).

S9C13 Perform Calculation of Value in Time Shifting Power to Interval of Peak Grid Cost The running totals of power described in state S9C4 result in a value of net metering over the time interval when the energy storage device 1) is used and 2) is not used to temporarily store the energy at a level in excess of the nominal state of charge and transfer the energy later (at the grid time of need at higher price). These two values are compared through subtraction to determine the delta in return gained by time shifting power into the period of peak grid power cost by temporarily storing the energy at a level in excess of the nominal state of charge. Applicant notes that the term "time shifting" refers to the process of temporarily storing the energy at a level in excess of the nominal state of charge, and transferring the energy to the load bus (grid) at a later grid time of need (at higher price), rather than the transferring the energy to the load bus at the time the energy is provided by the charge bus.

S9C14 Does the value of using the ESS outweigh the cost?

The value determined in state S9C13 of using the energy storage system is compared through subtraction to the cost (impact to longevity of the battery) as determined in state SC912. If the result is positive, the controller transitions to state S9C10 to coordinate the use of the energy storage system for time shifting power transfer. If the result is negative, the controller targets the nominal state of charge does (e.g. operates according to states S809B-E).

Example 27 Grid Mode Charge State Dynamics

FIGS. 17-20, 28 and the accompanying example text provide embodiments in which a controller determines a grid time of need for initiating the transfer of energy from a system of the invention to the grid and determines a charge start time to raise the state of charge of the energy storage device to a target state of charge by a time of need per step S9A5. Optionally, the controller closes the load bus connected to the grid (e.g. load bus 2) at the time of need and opens the load bus at a second time (e.g. at the end of a peak price window or a time at which the storage device reaches nominal or a target stage of charge below nominal).

FIG. 22 illustrates a predicted (calculated) state of charge of an energy storage device (Y axis) vs time (X axis) over several windows. In the Figure, the target state of charge is set to be 5000 watt-hours; the nominal state of charge is 2500 watt-hours.

Within the grid mode, the controller can operate in several stages as follows.

Stage 1—While in maintain mode, the controller controls one or more charge busses connected to respective renewable energy sources (e.g. solar or wind) and a load bus (e.g. load bus 2) connected to the grid to target a nominal state of charge (e.g. 2500 watt hours or 50%) on the energy storage device, e.g. as per steps S809B-E. For example, the controller ensures the energy storage device remains above a lower end of range of nominal state of charge through selectively switching off the load bus (e.g. S809E), and ensures the energy storage device remains below the upper end of this range by selectively switching on the load bus and/or switching off an energy source (e.g. S809C). This can be achieved, for example, by continuously and repeatedly performing S809B and performing the respective control step that follows. The transition of stage 1 to stage 2 is marked by a charge start time.

While in stage 1, the controller determines a grid time of need to be the time at which the peak energy cost exists (i.e. 5 pm as in Example 24) e.g. as per S9C1. The controller determines a charge start time e.g. as per S9C3, in order to reach a target state of charge (e.g. 5000 watt hours or 100%) by the determined grid time of need, e.g. as detailed in the examples above. Optionally, the target state of charge is same as the maximum state of charge for the 'in use' mode as described here-in.

Stage 2—Assuming that the controller determines to open the load bus connected to the grid (e.g. load bus 2) at the charge start time (and keep it open until the time of need), the energy storage device reaches the targeted by the determined grid time of need of 5 μm. The transition of stage 2 to stage 3 is marked by a grid time of need (e.g., S9C10).

Stage 3—Responsive to the current time passing the time of need, the controller closes the load bus. The controller can be configured to keep the load bus closed until a lower target state of charge is reached (e.g. the lower end of a range of nominal state of charge). The transition of stage 3 to stage 4 is marked by a discharge remainder time (e.g. S9C10).

Optionally, the controller can perform the same control of busses as performed in stage 1 such that the nominal state of charge is targeted. This can be achieved, for example, by continuously and repeatedly performing S809B and performing the respective control step that follows. However, because the current state of charge is now much higher than the nominal stage of charge, the controller will spend a period of time with the load bus to the grid closed. The controller records the rate of discharge of energy into the grid while transitioning from the state of charge at time of need to the nominal state of charge or the time required to discharge the energy form the target state of charge to the nominal state of charge. The system remains in this state of targeting a nominal state of charge, for example, by continuously and repeatedly performing S809B and performing the respective control step that follows until entering Stage 4.

Stage 4—Optionally, the controller determines that the current price of energy is still within a peak price window, for example, determining the peak price window ends at 8 pm from the date discussed in Example 24 and the current time is between 5 μm and 8 pm e.g. per step S9C5. When this determination is made, the controller chooses to close (or keeps closed) the load bus connected to the grid. Accordingly, the state of charge is reduced to below the state of charge targeted in stage 1. Optionally, the controller keep the load bus closed until a lower target state of charge is reached (e.g., lower than the state of charge targeted in stage 1). Optionally, the target state of charge is same as the minimum state of charge for the 'in use' mode as described here-in. The transition of stage 4 to stage 5 is marked by an end of time of need (or end of peak) e.g. per S9C7.

Optionally, the controller uses the rate of discharge determined in Stage 3 to calculate the time (Tdis) to transition from the current state of charge to the lower state of charge. For example, once the current state of charge reaches the nominal state of charge, the controller can use the rate of discharge determined in Stage 3 to calculate the time (Tdis) to transition from the nominal state of charge to the lower state of charge.

If in stage 3, the controller began targeting the nominal state of charge (e.g. by opening the load bus to the grid) upon dropping below the nominal state of charge, the system can close the load bus to the grid, even though the current state of charge is within nominal range, in order to further discharge the energy storage device to the lower target state of charge (that is lower than the nominal range) prior to the end of peak energy price window. Optionally, the controller can be configured to determine the latest time at which the load bus to the grid can be closed (starting from nominal stage of charge) in order to reach the lower target state of charge by the end of peak energy price window. In this configuration, the controller is optionally configured to close the load bus no later than the determined latest time (e.g. per step S9C5).

Stage 5—The controller returns the energy storage device to nominal state of charge, e.g. by invoking a previously used maintain mode, e.g. performing step S809B, S809AS or S805, and/or by optionally leveraging a priority structure described here-in to selectively enable a charge source(s) and disable a load source(s) to return to a nominal state of charge. Charge sources may optionally include renewable sources or the grid itself (e.g. where the grid is connected to a load bus and a charge bus). The transition of stage 5 to stage 6 is marked by an end of grid load interval Example 28 Calculations for Determining Value of Stored Energy Relative to Cost of Exceeding Nominal State of Charge As described above, a charge start time can be calculated which can be used to start charging a battery over the nominal state of charge leading up to a grid time of need. However, the controller can optionally be configured whether to actually start charging the battery at the charge start time (e.g. see step S9C9).

Further optimization can occur by determining the net value of temporarily storing energy above the nominal state, as described above, to shift energy return to the grid to a time of peak financial return (i.e. when the power is net-metered back to the grid at the highest rate per kilowatt-hr). The net value can be compared to the cost (e.g. detriment to the battery) of storing energy at a state of charge higher than the nominal state (e.g step S9C9). This aggregate cost can represent both the capital cost (i.e. the loss in longevity of the energy storage system that occurs through its use outside of a nominal range) and an operational cost (i.e. any ongoing cost such as HVAC, increased maintenance, etc) that occurs through its use outside of a nominal range.

The invention contemplates a means of performing this trade-off in order to make a go or no-go decision in using the energy storage system to shift return of power to the grid by charging the battery to above the nominal state. This trade-off is performed through four steps:

1. Referencing a table (e.g. the CELL_HEALTH_TABLE as described herein) that correlates deviation from a nominal state of charge over time to an increase in resistance of the battery (e.g. each of the cells in the energy storage device) e.g. per state S9C11. Applicant notes that state of charge can be determined (e.g. by tracking current in/out of battery) and that battery life can be determined from resistance measurements. The table can also be created and updated by the controller by tracking the state of charge) and tracking the induced resistance or change in resistance (e.g. see steps S900-S903).

2. Predict (calculate) the amount of deviation in state of charge that will exist over time, e.g. in executing stage 2, 3a, 3b, 4, and/or 5 of the grid load algorithm as illustrated in FIG. 22 (e.g. steps S9C4-8).

3. Using the predicted deviation from step 2 in combination with the table (finding the corresponding % deviation in state of charge) to return a % change in resistance from the CELL_HEALTH_TABLE (e.g. step S9C11). (note: it is assumed, as indicated by FIG. 2 above that the increase in resistance of a cell is linear throughout its life. However, commonly known curve fitting and extrapolation techniques can be applied in cases where this curve is non-linear. Examples include linear and non-linear regression analysis.

4. Using the % change in resistance from step 3 to determine a corresponding % change in longevity and the associated capital cost (using a known cost of the energy storage device) e.g. per step S9C12. The capital cost of using the system to temporarily overcharge the battery (thereby delaying the transfer of energy to the grid) can be compared to the value of selling energy later at peak price rather than immediately as it is produced by the energy source, e.g. per step S9C14.

Examples of steps S900-S903 are detailed below.

Step 1. Referencing, and Optionally Updating, a CELL_HEALTH_TABLE

FIG. 9 demonstrates how a state of charge can be predicted at particular points in time from a known starting state of charge and a forecast of instantaneous power generation at each time interval in a range as described in Example 15 and Example 16.

In a similar manner, a current state of charge can be determined from a known starting state of charge and actual measurements of current (or wattage) in/out of the battery. As described in state S602, the controller keeps track of actual state of charge over time. It determines this through a subtraction of the current into the storage system minus the current out of the storage system to yield the net current (either in or out). This instantaneous net current amount is converted to an instantaneous power measurement (e.g. in watts) through the equation Power(watts)=Voltage(volts)×Current(amps). The instantaneous power measurement can be converted to an overall increment (or decrement) to the system state of charge (e.g. in watt-hours) by multiplying the instantaneous power calculated (in watts) by the measurement interval in time. This measurement is stored in the database for every measurement interval.

Figure 23:
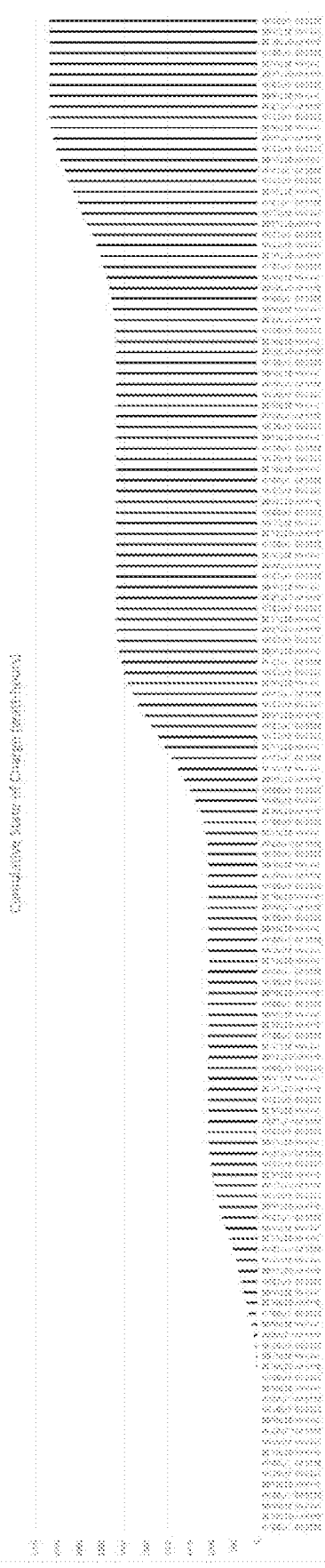
FIG. 23 depicts cumulative charge (watt hours) vs time of an energy storage device during a period of charging

While the data in FIG. 9 is from a predicted future sum of energy stored (starting from zero watt hours), similar data can be used to illustrate the tracking of current state of charge. An example of tracking state of charge over time (during charging from zero stored energy) is provided in FIG. 23.

Figure 25:
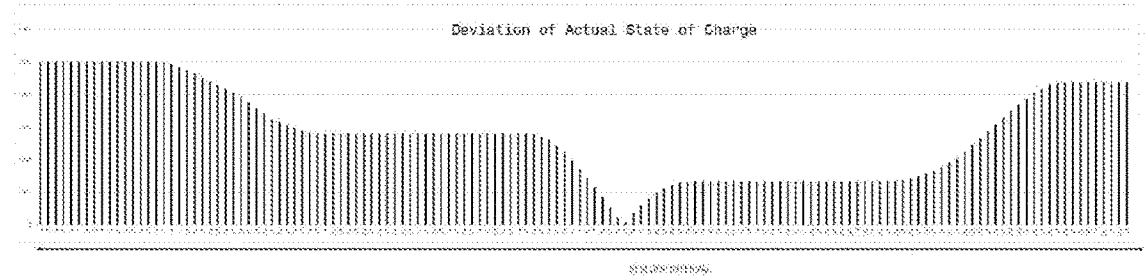
FIG. 25 depicts the same interval shown in FIG. 24, but having the actual state of charge for each time slice converted to deviation from nominal.

The tracked state of charge can be compared to the nominal state of charge (e.g. 50%) to determine the deviation from nominal at each measurement point in time as shown in FIG. 24. The absolute value of this deviation can be determined as illustrated in FIG. 25 and integrated using the optional approaches described here-in (e.g. AUC determination) to determine the total deviation from nominal state of charge across the RESLOOP interval.

The deviation of state of charge from nominal across the RESLOOP interval can be represented as a % of the total possible deviation from nominal. In FIG. 25, the maximum state of charge of the energy storage device is 5 kilo-watt hours. The RESLOOP interval is indicated as 142 seconds. Assuming a nominal 50% state of charge (in this case 2.5 kilo-watt hours), the maximum deviation of state of charge can be expressed as 5 kilo-watt hours−2.5 kilo-watt hours multiplied by 142 seconds=355 kilo-watt hour seconds. Through the numerical integration techniques described herein, the actual deviation of state of charge from nominal across the RESLOOP interval is determined as 199.8 kilo-watt-hour seconds. The percent deviation is then determined as 199.8/355=56.281% (e.g. step S900).

The CELL_HEALTH_TABLE can optionally have n number of rows, each representing a bucket of % deviation of state of charge as a percentage of maximum across the RESLOOP interval (ie in a 100 row table, row one would represent 0-1% deviation, row two 1-2% deviation, etc). This table can be initialized either via data provided by the manufacturer or via direct measurement on a sample energy storage device of the same type. The controller can optionally use a period of time over which cell resistance is measured when populating the CELL_HEALTH_TABLE, referred to below as a RESLOOP INTERVAL (e.g. step S901).

The table is updated at each RESLOOP interval after system start through the following steps. At the start and end of each RESLOOP interval, the resistance is measured for each of n cells in the energy storage system. The delta in resistance (DELTA_RESn) for each cell across the RESLOOP interval can be determined through the subtraction of these two measurements. This DELTA_RESn is used as an update for each cell in the proper row (bucket) of the CELL_HEALTH_TABLE along with the exact % deviation of state of charge determined as described here-in (see Table in FIG. 29). In other words, for each % bucket, for each cell number, Cell-n, the starting cell resistance, ending cell resistance, DELTA_RESn, RESLOOP length in time, and exact % deviation of state of charge is stored (e.g. step S902).

The above description implies a fixed length in time for the RESLOOP parameter. Alternatively, the measurement time can be determined as the time by which an accurate measurement of DELTA_RESn is determined (which may be different depending on the profile of deviation of the state of charge). Because this value is stored along with the other data elements in the CELL_HEALTH_TABLE, it can be factored into the later use of the CELL_HEALTH_TABLE as exampled in the table shown in FIG. 26.

In the CELL_HEALTH_TABLE of 26 (an example of a correlation of state of charge and detriment), the column labelled "measured integral % deviation of state of charge from nominal" over time is a quotient of deviation from nominal divided by maximum deviation. To create or update the correlation (for example the Table shown in FIG. 26), the quotient is determined by a) obtaining an area (e.g. integral) of the actual or predicted state of charge above (or below) the nominal state of charge over time (e.g. nominal state of charge over time illustrated in FIG. 24, and respective absolute deviation over time illustrated in FIG. 25, wherein the area of the FIG. 25 provides the integral) and b) obtaining an area of maximum deviation (a theoretical maximum) of state of charge above (or below) the nominal state of charge over this time period. Using the data in FIG. 24 as an example, the controller would determine the area indicated by the shaded portion (e.g. which is equal to the integral of the curve in FIG. 25) and divide this area by the theoretical maximum deviation from nominal (e.g. 2500 watt-hrs maximum deviation for a 5000 watt-hr battery, wherein nominal is 50% of 5000 watt-hours). For example, the user can input (e.g. into a user interface) a theoretical maximum charge and the controller can determine the theoretical maximum deviation as 50% (or another specified percentage) of the theoretical maximum charge, or as another example, the controller can determine theoretical maximum charge (e.g. absolute full charge) using historical voltage measurements to detect these spikes or drops as a 'knee of the curve' that informs the controller when the battery is at absolute full charge. The % deviation of state of charge from nominal over the time interval is then determined by the quotient of area a) over area b). Similarly to retrieve data from the table, the controller can input a predicted integral % deviation of state of charge from nominal into the table and retrieve the predicted corresponding change in resistance. The change in resistance over the period of time is determined as the difference between the resistance measured at the start of the period of time (e.g. the RESLOOP Interval) and the resistance measured at the end of the period of time. In this example, % deviation from nominal is used as the state of charge in the correlation and % resistance change is used as the detriment. However, other surrogates for state of charge and detriment may be used to provide the correlation, as long as they are a reflection of the state of charge and detriment.

Step 2 Predict (Calculate) the Amount of Deviation in State of Charge that Will Exist Over Time As discussed above, FIG. 22 illustrates predicted (calculated) state of charge of an energy storage device (Y axis) vs time (X axis) over several windows of time over which the energy storage device is transitioned from a nominal state of charge, through a charging period to a higher target state of charge, through a discharge period back to the nominal state of charge. Because each of these times and changes in state of charge can be predicted (via the weather forecast and other data described here-in), the forecast deviation of state of charge from nominal across a complete 'Grid Load Interval' can be determined as a percentage, e.g. a percentage of the maximum deviation from nominal state of charge that the storage device is capable of experiencing, leveraging the approach described in 'step 1 of updating the cell health table (see FIG. 27 and area that deviates from nominal). The table in FIG. 29 indicates the numerical integration used to determine this percentage as 24.065% (indicated at the bottom of FIG. 29). See also steps S9C1-S9C8.

Step 3 Determine A % Change in Resistance from Forecast % Deviation from Nominal The % determined in the numerical integration process described in the table shown in in FIG. 29 (e.g. 24.065%) is used to perform a table 'look-up' of the proper rows to retrieve from the CELL_HEALTH_TABLE (e.g. see table in FIG. 26). The percent change in resistance, DELTA_RESn, expected for each cell is returned in retrieval of these rows. This DELTA_RESn returned is refined to determine an RDELTA_RESn for each cell according to equations 3.a. RDELTA_RESn is normalized in time to NT_RDELTA_RESn through understanding of the difference in time between the 'Grid Load Interval' and the 'RESLOOP Interval' as returned from the table according to equations 3.b (e.g., see also steps S9C11-S9C13).

Equation 3.a. Refining return of DELTA_RESn

% ActIntStndDevFromNom=24.065%

% MeasIntStndDevFromNom=24.211%

BucketRng=% BucketStop−% BucketStart=25−24=1

% MeasIntoRng=(% MeasIntStndDevFromNom−% BucketStart)/BucketRng=(24.211−24)/1=0.211

% ActIntoRng=(% ActIntStndDevFromNom−% BucketStart)/BucketRng=(24.065−24)/1=0.065

DeltaIntoRng=% ActIntoRng−% MeasIntoRng=−0.146

RDELTA_RES1=DELTA_RES1+ DELTA_RES1*DeltaIntoRng=0.0051+0.0051* (−0.146)=0.0043554

Equation 3.b. Normalizing RDELTA_RESn over time

Grid Load Int=End Grid Ld Int−Start Grid Ld Int=20:18:33−16:10:36=14,877 secs (see Table in FIG. 29)

TIMENormalizationFactor=((Grid Load Interval− RESLOOP_INTERVAL)/RESLOOP_INTERVAL)

TIMENormalizationFactor=(14,877 secs−18000 secs)/18000 secs=−0.1735

NT_RDELTA_RESn=RDELTA_RESn+ TIMENormalizationFactor*RDELTA_RESn

NT_RDELTA_RES1=0.0043554+(− 0.1735*0.0043554)=0.00359974

Step 4. Convert a % Change in Resistance to Cost to Compare

NT_RDELTA_RESn for each cell can be converted to the loss in longevity of each cell as a percentage of longevity by dividing NT_RDELTA_RESn by the expected change in resistance of the cell over its operational life (e.g. entered by user, or obtained by lookup table given cell type, where user enters cell type and lookup table retrieves corresponding expected change in resistance over its life). Optionally, this percentage can be applied against the capital cost of each cell through multiplication then summed across cells to determine the net cost of performing the five stages indicated in FIG. 22. Optionally, the average percentage across all cells can be applied against the capital cost of the complete system.

For example, a cell could begin life at a resistance of 40 mOhms and end life at 105 mOhms, yielding a 65 mOhm change in resistance throughout its life. The methods of steps 1-3 produced an NT_RDELTA_RES1 of 0.00359974 mOhms (for the sake of example assume this reading applies to all cells measured). The capital cost of using the energy storage system in the manner described is then determined via the following equation 4.a below Equation 4.a Determining cost CostOfUse=(NT_RDELTA_RESn/DeltaLifeRes) *CaptialCostofSystem CostOfUse=(0.00359974/65)*$6,500=$0.3600. This cost of use is the cost (detriment) due to storing energy in the battery above nominal state (for sale at a time of need).

The table of FIG. 29 demonstrates the difference in total sale price of 1) the energy sold at the peak (time of need) price; and 2) instantaneous (i.e. selling at the time of energy production which would include peak and non-peak prices) of $3.1813−$2.3671=$0.8142

The total net gain of using the ESS in this example is then the difference between the two total sale prices (3.1813−$2.3671=0.8142) minus the cost of CostOfUse (0.36). In other words, the total net gain of using the ESS (energy storage system) to time shift the delivery of power into the peak window is $0.8142−$0.3600=$0.4542. In this example calculation, the controller determines to time shift power, i.e. to control the load switch to produce the scenario depicted in FIG. 22 (opening the load bus at the beginning of stage 2, closing the load bus at the end of stage 2, opening the load bus at the end of sage 3a, closing the load bust at the start of stage 4b, and opening the load bus at the start of stage 5). See also step S9C13-14 & S9C10.

Example 29 Example Embodiments

Among the various embodiments of the present invention are the following example embodiments (EE's).
1. A battery management system comprising
a) an energy storage device;
b) one or more energy sources configured to charge the energy storage device,
c) one or more loads configured for drawing energy from the energy storage device;
d) a plurality of switches comprising:
i) a first energy source switch connecting a first energy source of the one or more energy sources to the energy storage device; and
ii) a first load switch connecting the energy storage device to a first load of the one or more loads; and
e) a controller configured to obtain forecast data and control one or more of the plurality of switches based on the forecast data;
f) optionally, wherein the forecast data comprises weather forecast data or a power prediction obtained based on the weather forecast data;
g) optionally, wherein the controller is configured to operate in a plurality of modes that target different states of charge or charge rates of the energy storage device, wherein the controller can change the state of charge or rate of charge of the energy storage device to obtain by controlling one or more of the plurality of switches;
h) optionally, wherein the controller is configured to select between the plurality of modes, wherein at least one of said plurality of modes is configured for said control of the one or more of the plurality of switches based on the forecast data;
i) optionally, wherein the system is connected to grid power; and
j) optionally, wherein the one or more loads comprise a second load connected to the energy storage device by a second load switch which is controllable by the controller.
2. The battery management system of EE 1, wherein:
a) the plurality of modes comprises a first mode ('maintain mode') and a second mode ('preparation mode'), wherein the maintain mode targets a first target state of charge for the energy storage device and the second mode targets a second target state of charge for the energy storage device, wherein the first target state of charge and the second target state of charge are different, optionally wherein the first target state of charge is lower than the second target state of charge, optionally wherein the first target state of charge is charge is from 20% to 80%.
3. The battery management system of EE 1, wherein:
a) the plurality of modes comprises a first mode ('maintain mode'), a second mode ('preparation mode'), and optionally a third mode ('in-use mode'), wherein
b) the maintain mode targets a first target state of charge that maximizes the longevity of the energy storage device;

c) the preparation mode targets a second target state of charge of the energy storage device, optionally wherein the second target state of charge is greater than the first target state of charge; and d) the optional in-use mode, when present, activates, by switch, a load which is optionally not activated in the second mode; and e) the controller can change the mode used presently from the maintain mode to the preparation mode, and optionally from the preparation mode to the in-use mode; and f) optionally, the change to the preparation mode is triggered by the present time reaching a charge start time, wherein the charge start time is determined based upon a time of need, optionally wherein the time of need is a user-input arrival time or a time of need corresponding to the time of a catastrophic event determined from the forecast, optionally wherein the catastrophic event is determined as the time at which a value in the forecast exceeds a specified threshold.

4. The battery management system of EE 2 or EE 3, wherein:

a) the first energy source comprises a solar cell or solar array and the controller is configured to select the second mode based on a solar radiance forecast, or a power prediction produced therefrom;

b) the first energy source comprises a wind-powered generator and the controller is configured to select the second mode based on a wind forecast, or a power prediction produced therefrom; or c) the first energy source comprises grid power and the controller is configured to select the second mode based on a forecast of grid power, or a power prediction produced therefrom.

5. The battery management system of any of EEs 2-4, wherein the maintain mode causes the controller to turn on at least one of the one or more loads when the present state of charge of the energy storage device is greater than the first target state of charge of the energy storage device, and/or wherein the maintain mode causes the controller to activate at least one of the one or more energy sources when the present state of charge is lower than the first target state of charge.

6. The battery management system of EE 2, wherein a) the plurality of modes comprises a third mode ('in-use mode') that targets a third target state of charge, optionally wherein the third target state of charge is higher than the first target state of charge;

b) the in-use mode is configured to turn on the first load, optionally wherein said turning on of the first load by the in-use mode occurs at the start of the in-use mode;

c) the in-use mode is configured to keep the first load on when the present state of charge is less than the third target state of charge, and d) the maintain mode load mode causes the controller to turn on the second load responsive to the controller determining that the present state of charge is greater than the first target state of charge; and e) optionally, one or both of the preparation mode and the in-use mode are configured to turn off or keep off the second load, and optionally wherein said turning off or keeping off of the second load by the preparation mode or the in-use mode occurs at the start of the respective mode;

f) optionally, the maintain mode turns off the first load; and g) optionally, the maintain mode keeps the first load off when the present state of charge is greater than the first target state of charge.

7. The battery management system of any of EEs 2-6, wherein the controller a) obtains historical energy use data based on a historical amount of energy drawn from the energy storage device by the one or more loads;

b) determines a stay period based on an arrival time and a leave time;

c) determines a predicted amount of energy produced by the energy source during the stay period based on the power prediction;

d) determines a predicted amount of energy use by the one or more loads during the stay period based on the historical energy use data; and e) determines the second target state of charge as a state of charge that, when achieved at the arrival time and supplemented by the predicted amount of energy produced during the stay period, provides the predicted amount of energy use during the stay period.

8. The battery management system of any of EEs 2-7, wherein the controller is connected to a forecast server via a network, and the controller obtains the forecast data from the server.

9. The battery management system of any of EEs 2-8, wherein the controller is configured to:

a) obtain a time of need;

b) set the time of need as a time at which to complete charging to the second target state of charge ('a charge finish time'); and c) determine a charge start time at which the controller executes the preparation mode, wherein the controller determines the charge start time based on the charge finish time, and the forecast data.

10. The battery management system of EE 9, wherein a) the forecast data comprises a power prediction;

b) the power prediction comprises a correlation of time and rate of power production for the one or more energy sources;

c) the power prediction is of a first time window including or ending at the charge finish time, and including a period of time preceding the charge finish time;

d) the step of determining the charge start time based on the charge finish time and the forecast data comprises:

i) determining a present state of charge of the energy storage device, optionally wherein the present state of charge is the actual state of charge currently experienced by the energy storage device or a target state of charge of the maintain mode;

ii) determining the second target state of charge of the energy storage device, optionally wherein the second target state of charge is the usable energy capacity of the energy storage device;

iii) determining the difference of the second target state of charge and the present charge state, thereby providing a cumulative charge;

iv) determining an amount of energy ('cumulative predicted power') production from the power prediction;

v) determining, from the cumulative predicted power production, a second window of time ending at the charge finish time, and beginning at a latest time from which the cumulative charge is produced by the charge finish time; and vi) providing the beginning of the second window as the charge start time.

11. The battery management system of EE 10, wherein
a) the power prediction comprises a plurality of time slices, each comprising a time and a power production, and
b) the second window of time comprises
i) a final time slice corresponding to the charge finish time, and
ii) a beginning time slice that provides the second window with a sum of time slices from the beginning time slice to the last time slice that corresponds to the cumulative charge.

12. The battery management system of EE 10 or 11, wherein the controller is configured to create the power prediction by:
a) obtaining weather forecast data;
b) obtaining a correlation of weather forecast data and power production of the energy source; and
c) determining the power prediction based on the weather forecast data and the correlation.

13. The battery management system of any of EEs 1-12, wherein the controller is configured to receive a command from the remote device via the network, wherein the command causes the controller to switch between the modes.

14. The battery management system of EE 1, wherein:
a) the one or more energy sources comprises a second energy source switch connected to the energy storage device by a second energy source switch controllable by the controller;
b) the plurality of modes comprises a maintain mode and a plurality of preparation modes comprising a first preparation mode and a second preparation mode;
c) the first preparation mode targets a first state of charge;
d) the second preparation mode targets a second state of charge;
e) the maintain mode targets a third target state of charge;
f) the third target state of charge is less than the first target state of charge and less than the second target state of charge are different, and optionally, the first target state of charge and the second target state of charge are the same;
g) the controller is configured to:
i) select a preparation mode of the plurality of preparation modes; and
ii) run in the maintain mode and then run in the selected preparation mode;
h) the controller is configured to
i) determine a time at which to complete charging to the first target state of charge ('a charge finish time');
ii) obtain a first power prediction for the first energy source over a window of time comprising at least a first window of time starting with the present time and ending with the charge finish time;
iii) determine a first target amount of energy, optionally wherein the first target amount of energy is the energy required to be delivered to the energy storage device to provide the energy storage device with the first target state of charge;
iv) set, responsive to determining that the first energy source cannot provide the first target amount of energy within the first window of time, a first charge start time as the present time;
v) determine, based on the first power prediction, a first amount of energy that will be produced by the first energy sourced during the first window;
vi) obtain a second power prediction for the second energy source over at a window of time comprising at least the first window
vii) determine, responsive to determining that the first amount of energy is less than the first target amount of energy, the difference between the first target amount of energy and the first amount of energy, thereby providing a second target amount of energy;
viii) determine, based on the second power prediction, whether the second energy source can provide the second target amount of energy within the first window of time; and
ix) set, responsive to determining that the second energy source can provide second target amount of energy within the first window of time, the second charge start time as a latest time at which, based on the second power prediction, charging can be started from the second energy source to provide the second target amount of energy by the charge finish time;
x) determine, based on the first power prediction and the second power prediction, whether the first energy source and the second energy source can collectively provide the first target amount of energy within the first window of time; and
xi) set, responsive to determining that the first energy source and the second energy source can collectively provide the first target amount of energy within the first window of time, the third charge start time as a latest time at which, based on the first power prediction and the second power prediction, charging can be started from both the first energy source and the second energy source to provide the first target amount of energy by the charge finish time.

15. The battery management system of EE 1, wherein:
a) the one or more energy sources comprises a second energy source switch connected to the energy storage device by a second energy source switch controllable by the controller;
b) the plurality of modes comprises a maintain mode and a first preparation mode;
c) the first preparation mode targets a first state of charge;
d) the maintain mode targets a second target state of charge;
e) the second target state of charge is less than the first target state of charge;
f) the controller is configured to:
i) run in the maintain mode and then run in the first preparation mode;
g) the controller is configured to
i) determine a time at which to complete charging to the first target state of charge ('a charge finish time');
ii) obtain a first power prediction for the first energy source over a window of time comprising at least a first window of time starting with the present time and ending with the charge finish time;
iii) determine a first target amount of energy, optionally wherein the first target amount of energy is the energy required to be delivered to the energy storage device to provide the energy storage device with the first target state of charge;
iv) set, responsive to determining that the first energy source cannot provide the first target amount of energy within the first window of time, a first charge start time as the present time;
v) determine, based on the first power prediction, a first amount of energy that will be produced by the first energy sourced during the first window;
vi) obtain a second power prediction for the second energy source over at a window of time comprising at least the first window
vii) determine, responsive to determining that the first amount of energy is less than the first target amount of energy, the difference between the first target amount of energy and the first amount of energy, thereby providing a second target amount of energy;

viii) determine, based on the second power prediction, whether the second energy source can provide the second target amount of energy within the first window of time; and
ix) set, responsive to determining that the second energy source can provide the second target amount of energy within the first window of time, the second charge start time as a latest time at which, based on the second power prediction, charging can be started from the second energy source to provide the second target amount of energy by the charge finish time.

100. A method performed by one or more controllers to control, by a plurality of respective switches, one or more loads connected to an energy storage device and one or more energy sources connected to the energy storage device, the method comprising
a) obtaining forecast data; and
b) controlling one or more of the plurality of switches based on the forecast data,
optionally, wherein the forecast data comprises weather forecast data or a power prediction obtained based on the weather forecast data;
optionally, wherein the step of controlling one or more of the plurality of switches based on the forecast data comprises setting a charge start time at which to increase the rate of charging of the energy storage device by controlling one or more of the plurality of switches; and
optionally, wherein the step of controlling one or more of the plurality of switches based on the forecast data comprises switching to a selected charge mode of a plurality of charge modes based on the forecast data, wherein the plurality of charge modes target different states of charge of the energy storage device or different charge rates of the energy storage device.

101. The method of the immediately previous EE, wherein the plurality of charge modes comprises a first mode ('maintain mode') and a second mode ('preparation mode'), wherein the maintain mode targets a first target state of charge for the energy storage and the preparation mode targets a second target state of charge for the energy storage device, wherein the first target state of charge and the second target state of charge are different, optionally wherein the first target state of charge is lower than the second target state of charge, optionally wherein the first target state of charge is charge is from 20% to 80%.

102. The method of any previous method EE, wherein the step of setting a charge start time comprises:
a) obtaining a time of need;
b) setting the time of need as a time at which to complete charging to the second target state of charge ('charge finish time'); and
c) determining, based on the forecast data, the charge start time as a latest time at which the rate of charge can be increased to reach the second target state of charge by the charge finish time.

103. The method of the immediately previous method EE, wherein
a) the forecast data comprises a power prediction;
b) the power prediction comprises a correlation of time and rate of power production for the one or more energy sources;
c) the power prediction is of a first time window including or ending at the charge finish time, and including a period of time preceding the charge finish time;
d) the step of determining the charge start time comprises:
i) determining the present state of charge of the energy storage device;
ii) determining the second target state of charge of the energy storage device, optionally wherein the target charge state is the usable energy capacity of the energy storage device;
iii) determining the difference of the second target charge state and the present charge state, thereby providing a cumulative charge;
iv) determining a cumulative predicted power production from the power prediction;
v) determining, from the cumulative predicted power production, a second window of time ending at the charge finish time, and beginning at a latest time from which the cumulative charge is produced by the charge finish time; and
vi) providing the beginning of the second window as the charge start time.

103a. The method of the immediately previous method EE, wherein
a) the power prediction comprises a plurality of time slices, each comprising a time and a power production, and
b) the second window of time comprises
i) a last time slice corresponding to the charge finish time, and
ii) a beginning time slice that provides the second window with a sum of time slice power productions from the beginning time slice to the last time slice that corresponds to the cumulative charge.

104. The method of any previous method EE, wherein the power prediction is provided by
a) obtaining weather forecast data;
b) obtaining a correlation of weather forecast data and power production of the energy source;
c) determining the power prediction based on the weather forecast data and the correlation.

105. The method any previous method EE, wherein
a) the energy source comprises a solar cell or solar array and the step of selecting a charge mode comprises selecting the preparation mode based on a solar radiance forecast, or a power prediction produced therefrom;
b) the energy source comprises a wind-powered generator and the step of selecting a charge mode comprises selecting the preparation mode based on a wind forecast, or a power prediction produced therefrom;
c) the energy source comprises grid power and the step of selecting a charge mode comprises selecting the preparation mode based on a forecast of grid power, or a power prediction produced therefrom.

107. The method of any previous method EE, comprising:
a) controlling, in the maintain mode, a switch to activate a load when the present state of charge of the energy storage device is greater than the first target state of charge of the energy storage device, and/or
b) controlling, in the maintain mode a switch to activate at least one of the one or more energy sources when the present state of charge is lower than the first target state of charge of the energy storage device.

108. The method of any previous method EE, comprising
a) switching from the maintain mode to the preparation mode based on the forecast data, optionally wherein said switching is performed at a determined charge start time;
b) switching from the preparation mode to a third mode ('in-use mode') that targets a third target state of charge, wherein the third target state of charge is higher than the first target state of charge, optionally wherein said switching to the in-use mode is performed at a determined time of need, c) turning on, responsive to switching to the in-use mode, a first load of the one or more loads and then keeping the first load on when the present state of charge is less than the third target state of charge;
d) turning off or keeping off, responsive to switching to the preparation mode and/or the in-use mode, a second load of the one or more loads; and
e) turning on, while in the maintain mode, the second load responsive to the controller determining that the present state of charge is greater than the first target state of charge.

109. A computer-readable medium comprising a control program that, when read by a controller, causes the controller to perform the method of any previous EE.

110. A computer-readable medium comprising a control program that, when read by a controller, causes the controller to perform the method of any previous EE.

111. A battery manager comprising:
a controller configured to control a plurality of switches, wherein the plurality of switches comprises:
iii) a first energy source switch for connecting a first energy source to an energy storage device; and
iv) a first load switch for connecting the energy storage device to a first load; and
a memory device storing control instructions that, when read by the controller, causes the controller to obtain forecast data and control one or more of the plurality of switches based on the forecast data;
optionally wherein
a) the forecast data comprises weather forecast data or a power prediction obtained based on the weather forecast data;
b) the controller is configured to operate in a plurality of modes that target different states of charge or charge rate of the energy storage device, wherein the controller can change the state of charge or rate of charge of the energy storage device to obtain by controlling one or more of the plurality of switches;
c) the controller is configured to select between the plurality of modes, wherein at least one of said plurality of modes is configured for said control of the one or more of the plurality of switches based on the forecast data; and
d) the plurality of switches comprises a second load switch for connecting a second load to the energy storage device 112. A computer-readable medium comprising a control program that, when read by a controller, causes the controller to be configured as the battery manager of any of the previous battery manager EEs.

113. A computer-readable medium comprising a control program that, when read by a controller, causes the controller to be configured as the controller of any of the previous system EEs.

200. The battery management system of any of EEs 2-8, wherein
a) the controller comprises one or more modes;
b) the one or more modes comprises a first mode ('maintain mode'), and optionally a second mode ('preparation mode'), and optionally a third mode ('in-use mode'),
c) the maintain mode targets a first target state of charge ('nominal state of charge') that maximizes the longevity of the energy storage device;
d) the controller is configured to obtain a time of need and set the time of need as a time at which to complete charging to a second target state of charge ('a charge finish time');
e) the forecast data comprises a power prediction;
f) the power prediction comprises a correlation of one or more times and a respective one or more rates of power production for the one or more energy sources;
g) the power prediction is of a first-time window including or ending at the charge finish time, and including a period of time preceding the charge finish time;
h) the controller is configured to determine a charge start time based on a) the power prediction and b) the difference between the nominal state of charge and a second target state of charge ('first cumulative charge'), optionally wherein the charge start time is determined as the latest time the energy storage device can commence charging from the one or more energy sources with at least the first load switch turned off such that the energy storage device reaches the second target state of charge by the time of need;
i) optionally, the step of determining the charge start time based on the charge finish time and the forecast data comprises:
i) determining the difference of the second target state of charge and the nominal charge state, thereby providing the first cumulative charge, optionally wherein the first cumulative charge is an amount of energy;
ii) determining an energy ('cumulative predicted power') production from the power prediction;
iii) determining, from the cumulative predicted power production, a window of time ('stage 2 window') which ends at the charge finish time and begins at a latest time such that the first cumulative charge is produced during the stage 2 window;
iv) providing the beginning of stage 2 window as the charge start time; and
j) optionally, the controller is configured to turn off the first load switch at the charge start time.

201. The battery management system of EE 200, wherein
a) the power prediction comprises a plurality of time slices, each comprising a time and a respective energy production, and
b) the stage 2 window comprises
i) a final time slice corresponding to the charge finish time, and
ii) a beginning time slice that provides the stage 2 window with a sum of time slice energy productions from the beginning time slice to the final time slice that corresponds to (e.g. is equal to or greater than) the first cumulative charge.

202. The battery management system of EE 201, wherein the controller determines the beginning time slice by;
a) providing a hypothetical beginning time slice;
b) obtaining the respective energy productions of each of the time slices of a window spanning from the hypothetical beginning time slice to the final time slice;
c) summing the obtained respective energy productions, thereby providing a hypothetical sum; and
d) selecting the hypothetical beginning time slice as the beginning time slice of the stage 2 window if the hypothetical sum is equal to or greater than the first cumulative charge; and
e) optionally, if the hypothetical sum is not greater than the first cumulative charge, changing the hypothetical time slice to an earlier time slice, and repeating steps a)-d) recited by this EE.

203. The battery management system of any of EEs 201-202, wherein the controller is configured to:
a) calculate a plurality of predicted states of charge of the energy storage device across a window ('grid load interval') spanning from the charge start time until at least the time of need,
b) obtain a correlation of state of charge and detriment to the energy storage device, optionally wherein the correlation of state of charge and detriment is a correlation of deviation of state of charge from the nominal state of charge;

c) apply the correlation to the one or more predicted states of charge, thereby providing a predicted detriment to the energy storage device;

d) obtain a correlation of detriment to the energy storage device and cost;

e) apply, to the predicted detriment, the correlation of energy storage device detriment and cost, thereby providing a predicted cost;

f) obtain a first unit value of energy and a second unit value of energy, g) determine a first value of a second cumulative charge based on the first unit value, optionally wherein the second cumulative charge is equal to the first cumulative charge, equal to two times the first cumulative charge, or a sum of the first cumulative charge and a third cumulative charge which is the difference between the nominal state of charge and a fourth state of charge that is lower than the nominal state of charge and;

h) determine a second value of the second cumulative charge based on the second unit value;

i) perform one of:

i) determine a net value of the second cumulative charge based on the difference of the first value of the second cumulative charge and the predicted cost and then compare the net value and the second value; or ii) determine a difference of the first value and the second value, and determine the difference of A) the difference of the first value and the second value and B) the predicted cost;

j) responsive to determining that the net value is greater than the second value or responsive to determining the difference of A) and B) is positive, turn off the first load switch at the charge start time and turn on the first load switch at the time of need; and k) optionally, responsive to determining that the net value is not less than the second value or responsive to determining the difference of A) and B) is negative, control the first load switch to target the nominal state of charge during a window of time spanning from the charge start time to at least the time of need.

204. The battery management system of EE 203, wherein
i) the grid load interval comprises a window (stage 2 window) spanning from the charge start time to the charge finish time,
ii) the plurality of predicted states of charge comprise
(1) a series of predicted states of charge of the energy storage device for the stage 2 window, wherein the series of predicted states of charge are calculated by the controller based on the power prediction, wherein the series of predicted states of charge are reflective of the first load switch being turned off at the charge start time.
(2) optionally the series of predicted states of charge of the energy storage device for the stage 2 window comprise predicted states of charge for each of the time slices, wherein the predicted state of charge for each of the time slices is provided by:
(a) obtaining a predicted state of charge for a time slice adjacent to the respective slice;
(b) adding or subtracting the energy production of the respective slice to the predicted state of charge for the adjacent time slice.

205. The battery management system of EE 203 or 204, wherein
i) the grid load interval comprises a window ('first discharge window') spanning from the charge finish time to a time after the charge finish time;
ii) the plurality of predicted states of charge comprise one or more predicted states of charge of the energy storage device for the first discharge window;
iii) the one or more predicted states of charge of the energy storage device during the first discharge window are calculated based on a specified discharge rate of energy to the first load, a specified starting state of charge for the beginning of the first discharge window, and a specified ending state of charge for the end of the first discharge window;
iv) the specified starting state of charge for the beginning of the first discharge window is the second target state of charge;
v) the specified ending state of charge for the end of the first discharge window is a third target state of charge that is lower than the second target state of charge, optionally wherein the third target state of charge is the nominal state of charge or is a target state of charge lower than the nominal state of charge
vi) the first discharge window spans from the charge finish time to an ending time at which the third target state of charge will be reached based on the specified discharge rate and the difference between the second target state of charge and the third target state of charge ('second cumulative charge'); and
vii) the one or more predicted states of charge of the energy storage device during the first discharge window are reflective of the first load switch being turned on at the beginning of the first discharge window.

206. The battery management system of EE 205, wherein the controller is configured to
a) determine the difference between the second target state of charge and the third target charge state, thereby providing a second cumulative charge, optionally wherein the second cumulative charge is an amount of energy;
b) calculate the one or more predicted states of charge of the energy storage device for the first discharge window by
i) dividing the first discharge window into a plurality of time slices
ii) providing the charge finish time as a beginning time slice of the first discharge window;
iii) determining, for each of the plurality of time slices of the first discharge window that follow the beginning time slice of the first discharge window, a respective predicted state of charge of the energy storage device based on a net discharge amount for the respective time slice and the predicted state of charge of the energy storage device for the previous time slice, wherein the net discharge amount for each of the respective time slices is determined by the specified discharge rate and optionally an obtained power prediction for the one or more energy sources for the respective slice, and wherein the plurality of time slices comprises a time slice corresponding to the third target state of charge as a final time slice of the first discharge window.

207. The battery management system of EE 205, wherein the one or more predicted states of charge of the energy storage device during the first discharge window comprise an absolute deviation of charge state from the nominal charge state for the first discharge window or time slice thereof.

208. The battery management system of EE 207, wherein
a) the absolute charge state deviation is a time-weighted absolute charge state deviation from the nominal state of charge for the first discharge window.

209. The battery management system of EE 207, wherein the controller is configured to
i) determine the duration of the first discharge window based on the specified discharge rate and the second cumulative charge;
ii) determine a first absolute deviation from nominal of the second state of charge;
iii) determine a second absolute deviation of the third target state of charge from nominal state of charge;
iv) determine the time-weighted absolute charge state deviation from the nominal state based on
(1) the duration of the first discharge window, the first absolute deviation, and the second absolute deviation.
210. The battery management system of EE 207, wherein the controller is configured to
i) determine
(1) a first absolute deviation from nominal of the second state of charge; or
(2) a second absolute deviation from nominal of the third target state of charge;
ii) determine the time-weighted absolute charge state deviation from the nominal state based on
(1) the specified discharge rate,
(2) the duration of the first discharge window, and
(3) one of
(a) the first absolute deviation, or
(b) the second absolute deviation.
211. The battery management system any of EEs 203-210, wherein
i) the grid load interval comprises a window ('second discharge window') spanning from a first time to a second time, wherein the first time is later than the charge finish time;
ii) the controller sets the second time and a fourth target state of charge for the second time, wherein the fourth target state of charge is lower than the nominal state of charge, optionally wherein the second time is set as the end of a window which provides the first unit value (e.g. end of peak grid pricing based on a table lookup);
iii) the duration of time from the first time to the second time is based on the specified discharge rate and the difference between the fourth state of charge and the nominal state of charge ('third cumulative charge'), optionally, wherein the controller determines the first time based on the specified discharge rate and the difference between the fourth state of charge and the nominal state of charge,
iv) the plurality of predicted states of charge comprise one or more predicted states of charge of the energy storage device for the second discharge window;
v) the one or more predicted states of charge of the energy storage device during the second discharge window are calculated based on the specified discharge rate of energy to the first load, the nominal state of charge being selected as a starting state of charge for the beginning of the second discharge window, and the fourth state of charge being selected as the ending state of charge for the end of the second discharge window;
vi) the one or more predicted states of charge of the energy storage device during the second discharge window are reflective of the first load switch being turned on at the beginning of the second discharge window.
212. The battery management system of EE 211, wherein the controller is configured to
a) determine the difference between the nominal state of charge and the fourth target charge state, thereby providing the third cumulative charge, optionally wherein the third cumulative charge is an amount of energy;
b) calculate the one or more predicted states of charge of the energy storage device for the second discharge window by
i) dividing the second discharge window into a plurality of time slices
ii) providing the first time as a beginning time slice of the second discharge window;
iii) determining, for each of the plurality of time slices of the second discharge window that follow the beginning time slice of the second discharge window, a respective predicted state of charge of the energy storage device based on a net discharge amount for the respective time slice of the second discharge window and the predicted state of charge of the energy storage device for the previous time slice of the second discharge window, wherein the net discharge amount for each of the respective time slices of the second discharge window is determined by the specified discharge rate and optionally an obtained power prediction for the one or more energy sources for the respective slice of the second discharge window, and wherein the plurality of time slices of the second discharge window comprises a time slice corresponding to the fourth target state of charge and the second time as a final time slice of the second discharge window.
213. The battery management system of EE 211, wherein the one or more predicted states of charge of the energy storage device during the second discharge window comprise an absolute deviation of charge state from the nominal charge state for the second discharge window or time slice thereof.
214. The battery management system of EE 213, wherein
a) the absolute charge state deviation is a time-weighted absolute charge state deviation from the nominal state of charge for the second discharge window.
215. The battery management system of EE 214, wherein the controller is configured to
i) determine the duration of the second discharge window based on the specified discharge rate and the third cumulative charge;
ii) determine a third absolute deviation from nominal of the fourth target state of charge;
iii) optionally determine a fourth absolute deviation from nominal of the nominal state of charge to be zero;
iv) determine the time-weighted absolute charge state deviation from the nominal state based on
(1) the duration of the second discharge window, the third absolute deviation, and the use of zero as the absolute deviation of the nominal state of charge from the nominal state of charge or
(2) the specified discharge rate, the duration of the second discharge window, and one of the third absolute deviation or the second absolute deviation.
216. The battery management system of any of EEs 203-215, wherein
i) the grid load interval comprises a window ('stage 5 window') spanning from the end of a discharge window which is optionally selected from the first discharge window and the second discharge window to a time after the said end of a discharge window,
ii) the plurality of predicted states of charge comprise
(1) a series of predicted states of charge of the energy storage device for the stage 5 window, wherein the series of predicted states of charge for the stage 5 window are calculated by the controller based on a power prediction for the stage 5 window, wherein the series of predicted states of charge for the stage 5 window are reflective of the first load switch being turned off at the start of the stage 5 window;
(2) optionally the series of predicted states of charge of the energy storage device for the stage 5 window comprise predicted state of charge for each of the time slices of the stage 5 window, wherein the predicted state of charge for each of the time slices of the stage 5 window is provided by:
(a) obtaining a predicted state of charge for a time slice adjacent to the respective slice of the stage 5 window;
(b) adding or subtracting the energy production of the respective slice of the stage 5 window to the predicted state of charge for the adjacent time slice of the stage 5 window.
217. The battery management system of any of EEs 202-217, wherein if it is determined that the difference of the first value minus the second value is not greater than the cost, the controller increases the charge start time, thereby providing a new charge start time, determines a new target charge state for the end of the stage 2 window that is predicted to be able to be reached based on the forecast data and the new charge start time, and repeats steps a-j of EE 204 using the new charge start time and new target charge state, optionally wherein the new target charge state is determined as the greatest charge state that can be reached using a selected one or more energy sources based on the respective forecast for each of the one or more energy sources.
218. The battery management system of any of EEs 200-218, wherein the controller is configured to create the power prediction by:
a) obtaining weather forecast data;
b) obtaining a correlation of weather forecast data and power production of the energy source; and
c) determining the power prediction based on the weather forecast data and the correlation.

The citations provided herein are hereby incorporated by reference for the cited subject matter.

What is claimed is:
1. A battery management system comprising
a) an energy storage device;
b) one or more energy sources configured to charge the energy storage device,
c) one or more loads configured for drawing energy from the energy storage device;
d) a plurality of switches comprising:
  i) a first energy source switch connecting a first energy source of the one or more energy sources to the energy storage device; and
  ii) a first load switch connecting the energy storage device to a first load of the one or more loads; and
e) a controller configured to obtain forecast data and control one or more of the plurality of switches based on the forecast data;
wherein
  i) the forecast data comprises data or a power prediction obtained based on the weather forecast data or the forecast data comprises the weather forecast data;
  ii) the controller is configured to operate in a plurality of modes;
  iii) at least one of said plurality of modes is configured for said control of the one or more of the plurality of switches based on the forecast data;
  iv) the plurality of modes comprises a first mode ('maintain mode'), a second mode ('preparation mode'), and a third mode ('in-use mode');
  v) the maintain mode targets a first target state of charge that, when the energy storage device is maintained at the first target state of charge, increases the life span of the energy storage device relative to the life span of the energy storage device when the energy storage device is maintained at a second target state of charge;
  vi) the preparation mode targets the second target state of charge of the energy storage device, wherein the second target state of charge is greater than the first target state of charge;
  vii) the in-use mode turns on, by switch, a load;
  viii) the controller can change the mode used presently from the maintain mode to the preparation mode, and
  ix) the controller can change the mode used presently from the preparation mode to the in-use mode.
2. The battery management system of claim 1, wherein the first target state of charge is from 20% to 80%.
3. The battery management system of claim 1, wherein:
the change to the preparation mode is triggered by the present time reaching a charge start time, wherein the charge start time is determined based upon a time of need, optionally wherein the time of need is a user-input arrival time or a time of need corresponding to the time of a catastrophic event determined from the forecast data, or optionally wherein the catastrophic event is determined as the time at which a value in the forecast data exceeds a specified threshold.
4. The battery management system of claim 1, wherein:
a) the first energy source comprises a solar cell or solar array and the controller is configured to select the second mode based on a solar radiance forecast, or a power prediction produced therefrom;
b) the first energy source comprises a wind-powered generator and the controller is configured to select the second mode based on a wind forecast, or a power prediction produced therefrom; or
c) the first energy source comprises grid power and the controller is configured to select the second mode based on a forecast of grid power, or a power prediction produced therefrom.
5. The battery management system of claim 1, wherein the maintain mode causes the controller to turn on at least one of the one or more loads when the present state of charge of the energy storage device is greater than the first target state of charge of the energy storage device, and/or wherein the maintain mode causes the controller to activate at least one of the one or more energy sources when the present state of charge is lower than the first target state of charge.
6. The battery management system of claim 1, wherein
a) the in use mode targets a third target state of charge, wherein the third target state of charge is higher than the first target state of charge;
b) the in-use mode is configured to turn on the first load, optionally wherein said turning on of the first load by the in-use mode occurs at the start of the in-use mode;
c) the in-use mode is configured to keep the first load on when the present state of charge is less than the third target state of charge;
d) the maintain mode load mode causes the controller to turn on a second load responsive to the controller determining that the present state of charge is greater than the first target state of charge;
e) optionally, one or both of the preparation mode and the in-use mode are configured to turn off or keep off the second load, and optionally wherein said turning off or keeping off of the second load by the preparation mode or the in-use mode occurs at the start of the respective mode;
f) optionally, the maintain mode turns off the first load; and
g) optionally, the maintain mode keeps the first load off when the present state of charge is greater than the first target state of charge.

7. The battery management system of claim 1, wherein the controller
   a) obtains historical energy use data based on a historical amount of energy drawn from the energy storage device by the one or more loads;
   b) determines a stay period based on an arrival time and a leave time;
   c) determines a predicted amount of energy produced by the energy source during the stay period based on the power prediction;
   d) determines a predicted amount of energy use by the one or more loads during the stay period based on the historical energy use data; and
   e) determines the second target state of charge as a state of charge that, when achieved at the arrival time and supplemented by the predicted amount of energy produced during the stay period, provides the predicted amount of energy use during the stay period.

8. The battery management system of claim 1, wherein the controller is connected to a forecast server via a network, and the controller obtains the forecast data from the forecast server.

9. The battery management system of claim 8, wherein the controller is configured to:
   a) obtain a time of need;
   b) set the time of need as a time at which to complete charging to the second target state of charge ('a charge finish time'); and
   c) determine a charge start time at which the controller executes the preparation mode, wherein the controller determines the charge start time based on the charge finish time and the forecast data.

10. The battery management system of claim 9, wherein
   a) the forecast data comprises a power prediction;
   b) the power prediction comprises a correlation of time and rate of power production for the one or more energy sources;
   c) the power prediction is of a first time window including or ending at the charge finish time, and including a period of time preceding the charge finish time; and
   d) the step of determining the charge start time based on the charge finish time and the forecast data comprises:
      i) determining a present state of charge of the energy storage device, optionally wherein the present state of charge is the actual state of charge currently experienced by the energy storage device or a target state of charge of the maintain mode;
      ii) determining the second target state of charge of the energy storage device, optionally wherein the second target state of charge is the usable energy capacity of the energy storage device;
      iii) determining the difference of the second target state of charge and the present state of charge, thereby providing a cumulative charge;
      iv) determining an amount of energy ('cumulative predicted power') production from the power prediction;
      v) determining, from the cumulative predicted power production, a second window of time ending at the charge finish time and beginning at a latest time from which the cumulative charge is produced by the charge finish time; and
      vi) providing the beginning of the second window as the charge start time.

11. The battery management system of claim 10, wherein
   a) the power prediction comprises a plurality of time slices, each comprising a time and a power production, and
   b) the second window of time comprises
      i) a final time slice corresponding to the charge finish time, and
      ii) a beginning time slice that provides the second window with a sum of time slices from the beginning time slice to the last-final time slice that corresponds to the cumulative charge.

12. The battery management system of claim 10, wherein the controller is configured to create the power prediction by:
   a) obtaining the weather forecast data;
   b) obtaining a correlation of the weather forecast data and power production of the energy source; and
   c) determining the power prediction based on the weather forecast data and the correlation.

13. The battery management system of claim 1,
   wherein the controller is configured to receive a command from a remote device via a network, wherein the command causes the controller to switch between the plurality of modes.

14. The battery management system of claim 1, wherein:
   a) the one or more energy sources comprises a second energy source switch connected to the energy storage device by a second energy source switch controllable by the controller;
   b) the preparation mode comprises a plurality of preparation modes comprising a-a first preparation mode and a second preparation mode;
   c) the first preparation mode targets a first preparation mode target state of charge;
   d) the second preparation mode targets a second preparation mode target state of charge;
   e) the first target state of charge is less than the first preparation mode target state of charge and less than the second preparation mode target state of charge;
   f) the controller is configured to:
      i) select a preparation mode of the plurality of preparation modes; and
      ii) run in the maintain mode and then run in the selected preparation mode; and
   g) the controller is configured to
      i) determine a time at which to complete charging to the first preparation mode target state of charge ('a charge finish time');
      ii) obtain a first power prediction for the first energy source over a window of time comprising at least a first window of time starting with the present time and ending with the charge finish time;
      iii) determine a first target amount of energy, optionally wherein the first target amount of energy is the energy required to be delivered to the energy storage device to provide the energy storage device with the first preparation mode target state of charge;
      iv) set, responsive to determining that the first energy source cannot provide the first target amount of energy within the first window of time, a first charge start time as the present time;
      v) determine, based on the first power prediction, a first amount of energy that will be produced by the first energy sourced during the first window;
      vi) obtain a second power prediction for the second energy source over at a window of time comprising at least the first window vii) determine, responsive to determining that the first amount of energy is less than the first target amount of energy, the difference between the first target amount of energy and the first amount of energy, thereby providing a second target amount of energy;

viii) determine, based on the second power prediction, whether the second energy source can provide the second target amount of energy within the first window of time; and ix) set, responsive to determining that the second energy source can provide the second target amount of energy within the first window of time, the second charge start time as a latest time at which, based on the second power prediction, charging can be started from the second energy source to provide the second target amount of energy by the charge finish time;

x) determine, based on the first power prediction and the second power prediction, whether the first energy source and the second energy source can collectively provide the first target amount of energy within the first window of time; and xi) set, responsive to determining that the first energy source and the second energy source can collectively provide the first target amount of energy within the first window of time, a third charge start time as a latest time at which, based on the first power prediction and the second power prediction, charging can be started from both the first energy source and the second energy source to provide the first target amount of energy by the charge finish time.

15. The battery management system of claim 1, wherein:
a) the one or more energy sources comprises a second energy source connected to the energy storage device by a second energy source switch controllable by the controller;
b) the controller is configured to
   i) determine a time at which to complete charging to the first second target state of charge ('a charge finish time');
   ii) obtain a first power prediction for the first energy source over a window of time comprising at least a first window of time starting with the present time and ending with the charge finish time;
   iii) determine a first target amount of energy, optionally wherein the first target amount of energy is the energy required to be delivered to the energy storage device to provide the energy storage device with the first second target state of charge;
   iv) set, responsive to determining that the first energy source cannot provide the first target amount of energy within the first window of time, a first charge start time as the present time;
   v) determine, based on the first power prediction, a first amount of energy that will be produced by the first energy source during the first window;
   vi) obtain a second power prediction for the second energy source over a window of time comprising at least the first window;
   vii) determine, responsive to determining that the first amount of energy is less than the first target amount of energy, the difference between the first target amount of energy and the first amount of energy, thereby providing a second target amount of energy;
   viii) determine, based on the second power prediction, whether the second energy source can provide the second target amount of energy within the first window of time; and
   ix) set, responsive to determining that the second energy source can provide the second target amount of energy within the first window of time, the second charge start time as a latest time at which, based on the second power prediction, charging can be started from the second energy source to provide the second target amount of energy by the charge finish time.

16. The battery management system of claim 1, wherein the first energy source comprises a solar cell or solar array and the controller is configured to change the presently-used mode from the first mode to the second mode based on a solar radiance forecast or a power prediction produced therefrom.

17. A method performed by one or more controllers to control, using a plurality of respective switches, one or more loads connected to an energy storage device and one or more energy sources connected to the energy storage device, the method comprising:
a) obtaining forecast data;
b) controlling one or more of the plurality of switches based on the forecast data, wherein the forecast data comprises a power predicted based on weather forecast data or the forecast data comprises the weather forecast data;
c) executing, as a presently-used mode, a first mode that targets a first target state of charge that, when the energy storage device is maintained at the first target state of charge, increases the life span of the energy storage device relative to the life span of the energy storage device when the energy storage device is maintained at a second target state of charge; and then
d) changing the presently-used mode from the first mode to a second mode that targets the second target state of charge of the energy storage device, wherein the second target state of charge is greater than the first target state of charge; and then
e) changing the presently-used mode from the second mode to a third mode that turns on, by switch, a load of the one or more loads connected to the energy storage device;
wherein;
the step of controlling one or more of the plurality of switches based on the forecast data comprises the step of changing the presently-used mode from the first mode to the second mode based on the forecast data.

18. The method of claim 17, wherein the first target state of charge is from 20% to 80%.

19. The method of claim 17, comprising:
a) obtaining a time of need;
b) setting the time of need as a time at which to complete charging to the second target state of charge ('charge finish time'); and
c) determining, based on the forecast data, a charge start time as a latest time at which a rate of charge of the energy storage device can be increased to reach the second target state of charge by the charge finish time.

20. The method of claim 19, wherein
a) the forecast data comprises the power prediction;
b) the power prediction comprises a correlation of time and rate of power production for the one or more energy sources;
c) the power prediction is of a first time window including or ending at the charge finish time, and including a period of time preceding the charge finish time; and d) the step of determining the charge start time comprises:
   i) determining the present state of charge of the energy storage device;
   ii) determining the second target state of charge of the energy storage device, optionally wherein the second target state of charge is the usable energy capacity of the energy storage device;
   iii) determining the difference of the second target state of charge and the present state of charge, thereby providing a cumulative charge;
   iv) determining a cumulative predicted power production from the power prediction;
   v) determining, from the cumulative predicted power production, a second window of time ending at the charge finish time and beginning at a latest time from which the cumulative charge is produced by the charge finish time; and
   vi) providing the beginning of the second window as the charge start time.

21. The method of claim 20, wherein
   a) the power prediction comprises a plurality of time slices, each comprising a time and a power production, and
   b) the second window of time comprises
      i) a final time slice corresponding to the charge finish time, and
      ii) a beginning time slice that provides the second window with a sum of time slice power productions from the beginning time slice to the final time slice that corresponds to the cumulative charge.

22. The method of claim 17, wherein the one or more energy sources comprise a solar cell or solar array and the method comprises changing the presently-used mode from the first mode to the second mode based on a solar radiance forecast or a power prediction produced therefrom.

\* \* \* \* \*